(12) United States Patent
Nonaka et al.

(10) Patent No.: US 7,073,073 B1
(45) Date of Patent: Jul. 4, 2006

(54) DATA PROVIDING SYSTEM, DEVICE, AND METHOD

(75) Inventors: Akira Nonaka, Tokyo (JP); Tadashi Ezaki, Tokyo (JP)

(73) Assignee: Sony Corporation, Tokyo (JP)

( * ) Notice: Subject to any disclaimer, the term of this patent is extended or adjusted under 35 U.S.C. 154(b) by 645 days.

(21) Appl. No.: 09/786,516

(22) PCT Filed: Jul. 6, 2000

(86) PCT No.: PCT/JP00/04488

§ 371 (c)(1),
(2), (4) Date: Jun. 27, 2001

(87) PCT Pub. No.: WO01/02968

PCT Pub. Date: Jan. 11, 2001

(30) Foreign Application Priority Data

| Jul. 6, 1999 | (JP) | ................................ 11/192413 |
| Jul. 7, 1999 | (JP) | ................................ 11/193561 |
| Jul. 7, 1999 | (JP) | ................................ 11/193562 |
| Apr. 21, 2000 | (JP) | ............................ 2000/126305 |

(51) Int. Cl.
*G06F 11/30* (2006.01)
*G06F 12/14* (2006.01)
*H04L 9/32* (2006.01)

(52) U.S. Cl. .................. 713/193; 713/189; 713/155; 713/156; 713/157; 713/158; 713/176; 713/165; 380/277; 380/278; 380/279; 380/281; 380/282; 380/283; 380/284; 380/285; 380/286; 705/51; 705/52; 705/53; 705/54; 705/55; 705/56; 705/57; 705/71; 705/50; 705/58; 705/59; 726/26; 726/27; 726/28; 726/29; 726/30; 726/2; 726/4; 726/5; 726/6; 726/7

(58) Field of Classification Search ............ 705/51–57, 705/71; 713/281–282, 189, 155–158, 176; 380/155–158, 277–286; 726/2–7, 26–30
See application file for complete search history.

(56) References Cited

U.S. PATENT DOCUMENTS

| 5,764,762 | A | 6/1998 | Kazmierczak et al. |
| 5,910,987 | A | 6/1999 | Ginter et al. |
| 5,915,019 | A | 6/1999 | Ginter et al. |
| 5,917,912 | A | 6/1999 | Ginter et al. |
| 5,949,876 | A | 9/1999 | Ginter et al. |
| 5,982,891 | A | 11/1999 | Ginter et al. |
| 6,253,193 | B1 * | 6/2001 | Ginter et al. .................. 705/57 |

FOREIGN PATENT DOCUMENTS

| EP | 0 895 148 A1 | 2/1999 |
| EP | 1 043 878 A2 | 10/2000 |

(Continued)

*Primary Examiner*—Ayaz Sheikh
*Assistant Examiner*—Longbit Chai
(74) *Attorney, Agent, or Firm*—Sonnenschein Nath & Rosenthal LLP

(57) ABSTRACT

A content provider 101 distributes a secure container 104 storing content data encrypted using content key data, content key data encrypted using distribution key data, and encrypted usage control policy data indicating the handling of the content data to a SAM $105_1$ of a user home network 103 etc. The SAM $105_1$ etc. decrypts the content data and usage control policy data stored in the secure container 104 and determines the purchase mode and usage mode and other handling of the content data based on said decrypted usage control policy data.

125 Claims, 98 Drawing Sheets

FOREIGN PATENT DOCUMENTS

| | | |
|---|---|---|
| EP | 1 130 492 A2 | 9/2001 |
| EP | 1 132 828 A1 | 9/2001 |
| JP | 10161937 | 6/1998 |
| JP | 1185504 | 3/1999 |
| WO | 9627155 | 9/1996 |
| WO | 9810381 | 3/1998 |
| WO | WO 99/15947 * | 4/1999 |
| WO | WO 00/08909 | 2/2000 |

* cited by examiner

PROCESSING FOR REQUESTING ISSUANCE OF PUBLIC KEY CERTIFICATE DATA FROM CP TO ESC

PROCESSING FOR REGISTRATION OF USAGE CONTROL
POLICY DATA AND CONTENT KEY DATA IN ESC

PROCESSING FOR SETTLEMENT IN ESC

FIG.18

DATA STORED IN EXTERNAL MEMORY 201

USAGE LOG DATA 108
SAM REGISTRATION LIST

FIG.19

DATA STORED IN STACK MEMORY 200

CONTENT KEY DATA Kc
USAGE CONTROL POLICY DATA(USP) 106
LOCK KEY DATA $K_{LOG}$ OF STORAGE UNIT(FLASH MEMORY) 192
PUBLIC KEY CERTIFICATE $CER_{CP}$ OF CONTENT PROVIDER 101
USAGE CONTROL STATUS DATA(UCS) 166
SAM PROGRAM DOWNLORD CONTAINER $SD_1$ TO $SDC_3$

PROCESSING FOR REPRODUCTION OF CONTENT DATA

PROCESSING OF SAM FOR TRANSFERRING CONTENT AFTER DETERMINING PURCHASE MODE TO OTHER SAM

PROCESSING OF SAM WHEN WRITING CF, ETC. INPUT FROM OTHER SAM INTO STORAGE MEDIUM

PROCESSING FOR DETERMINATION OF PURCHASE MODE IN SAM OF CONTENT DISTRIBUTED ON-LINE

PROCESSING FOR DETEMINATION OF PURCHASE MODE OF CONTENT DISTRIBUTED ON-LINE IN SAM

PROCESSING OF SAM 105₃

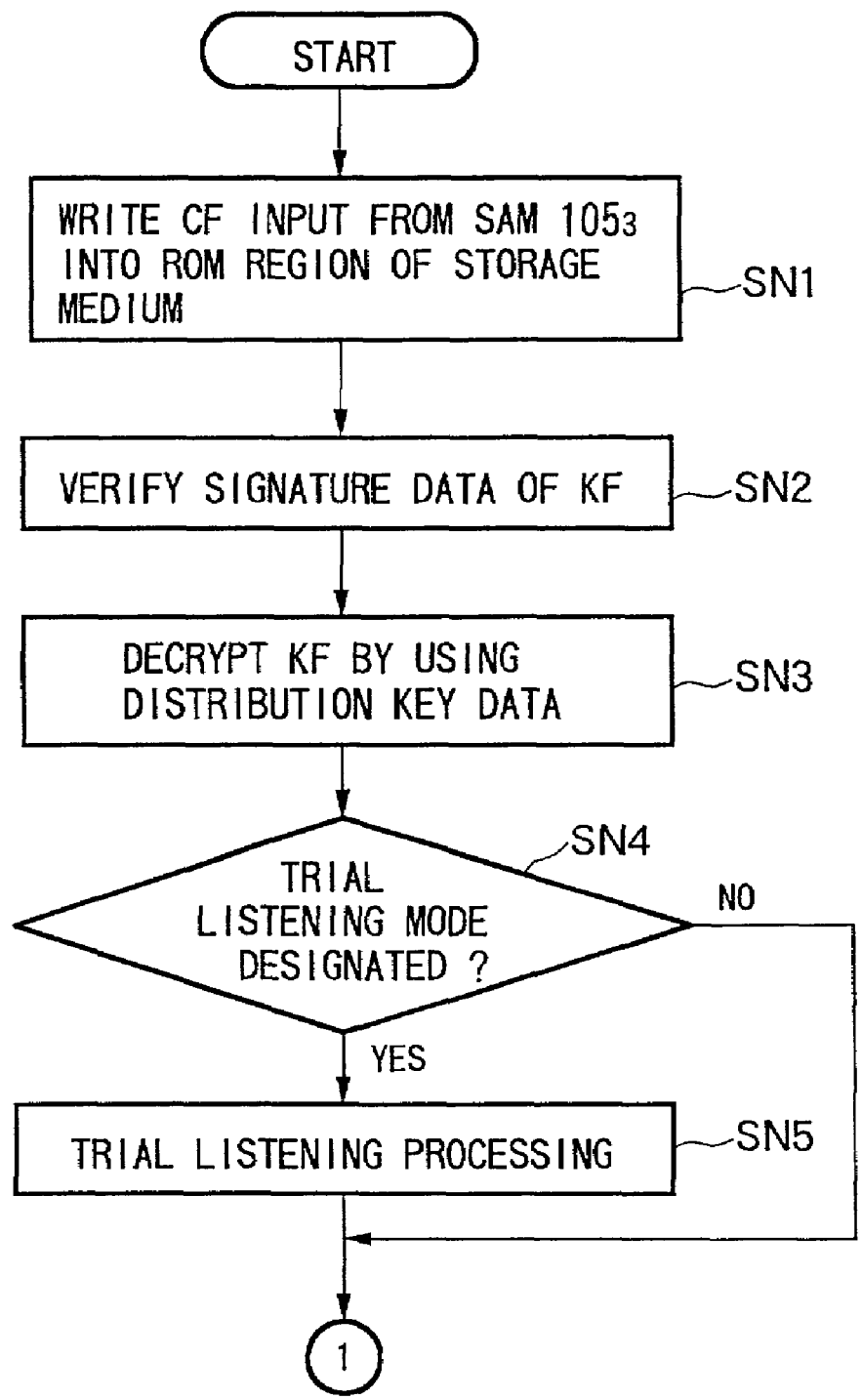

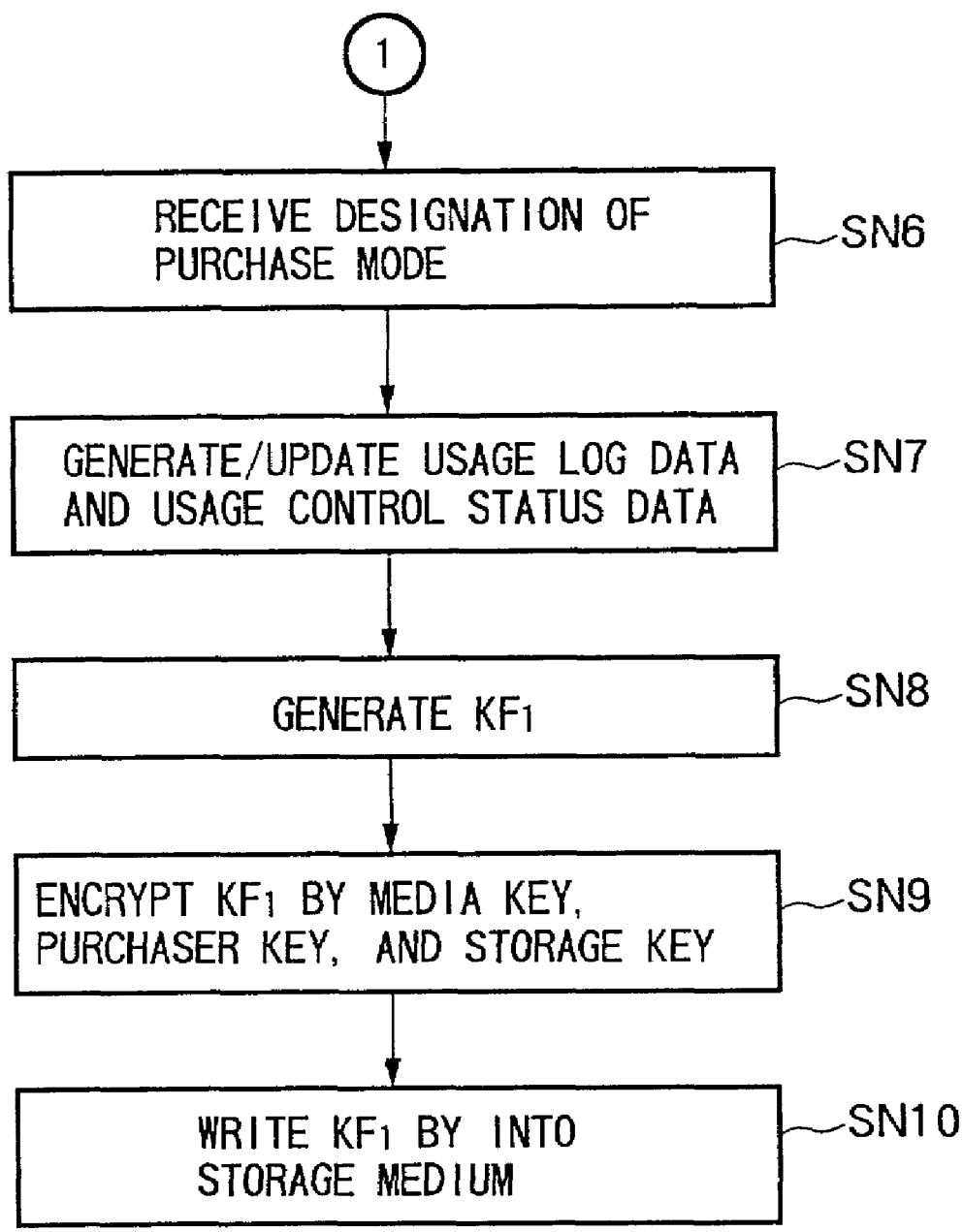

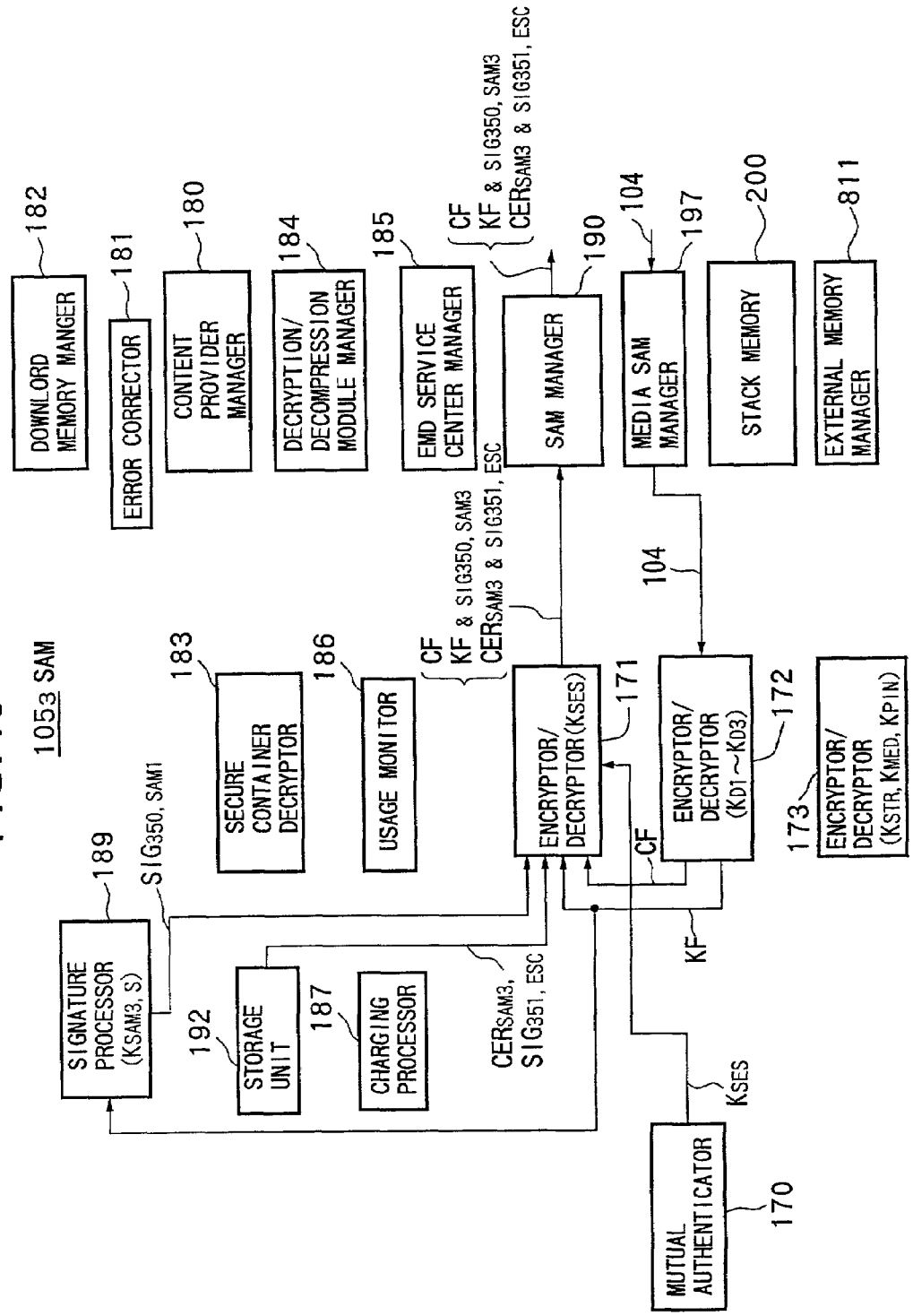

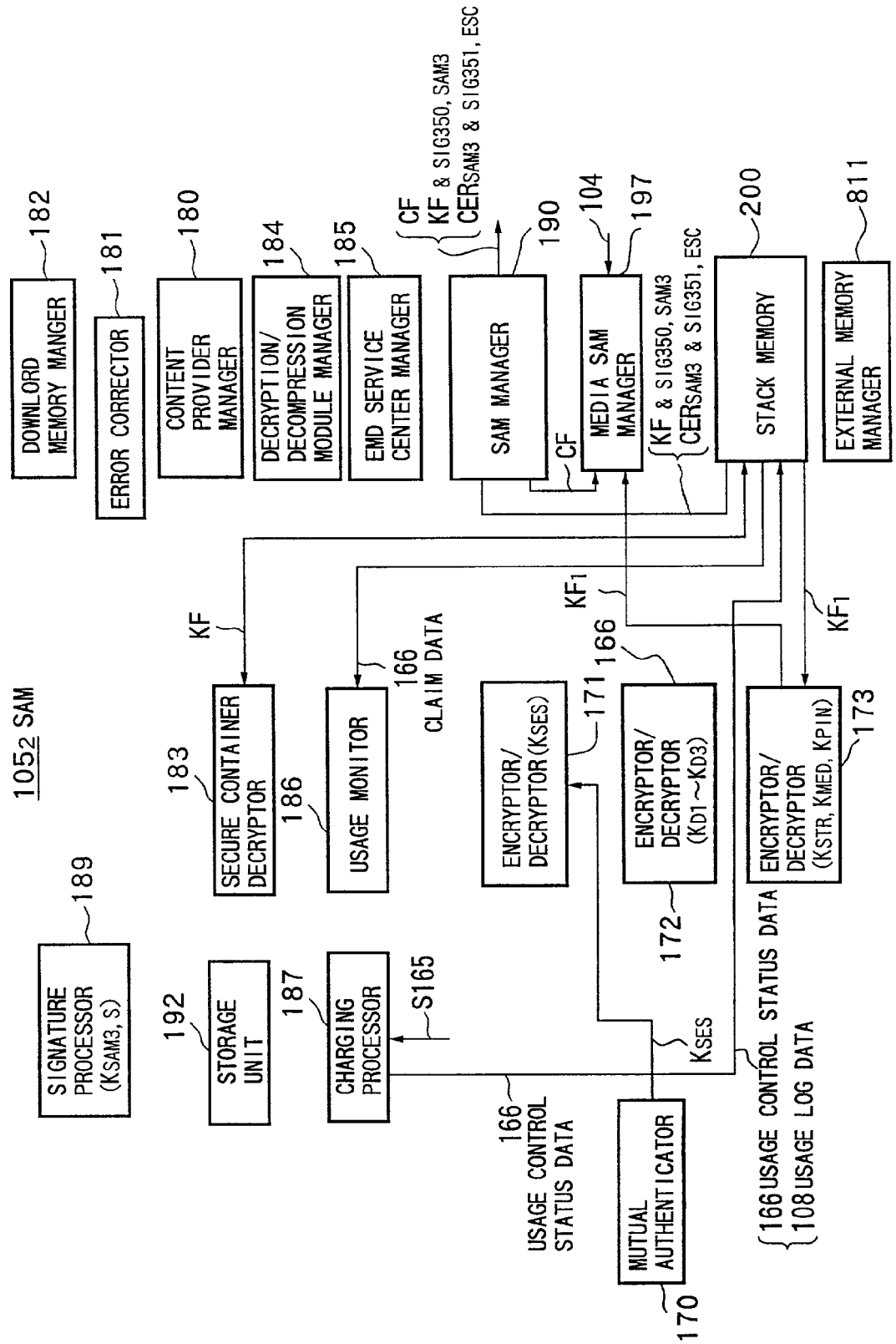

FIG. 42A  101(CP)→SAM105₁ (IN BAND) 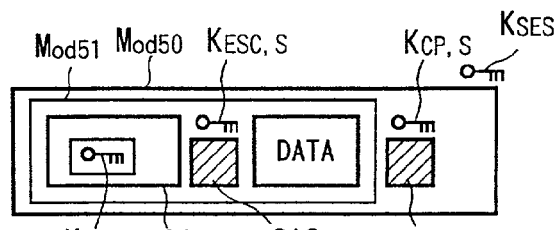
FIG. 42B  101(CP)→SAM105₁ (OUT OF BAND) 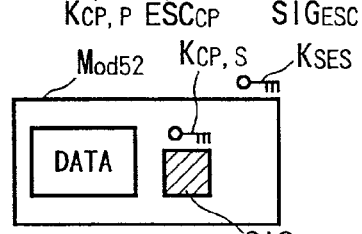
FIG. 42C  102(ESC)→SAM105₁ (OUT OF BAND) 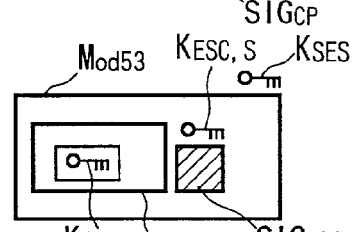
FIG. 42D  SAM105₁→101(CP) (IN BAND) 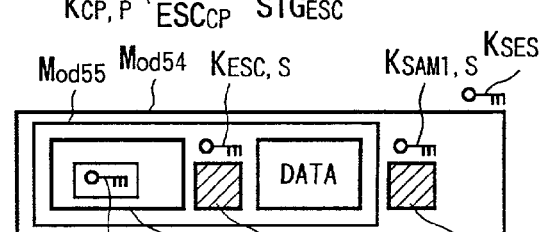
FIG. 42E  SAM105₁→101(CP) (OUT OF BAND) 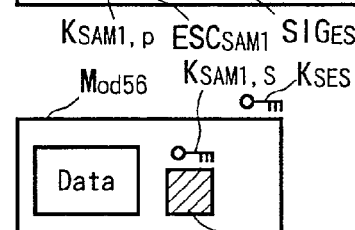
FIG. 42F  102(ESC)→101(CP) (OUT OF BAND) 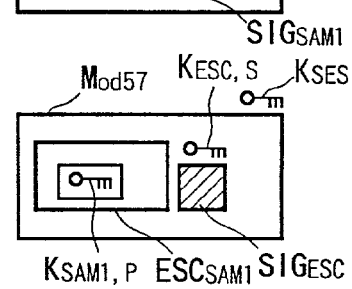

FIG.43A 101(CP)→102(ESC) (IN BAND)
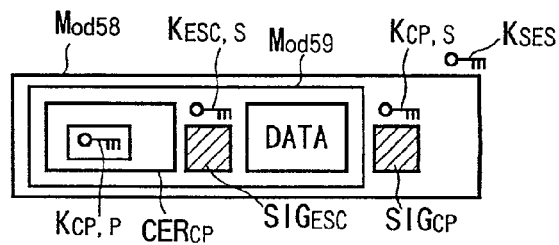
FIG.43B 101(CP)→102(ESC) (OUT OF BAND)
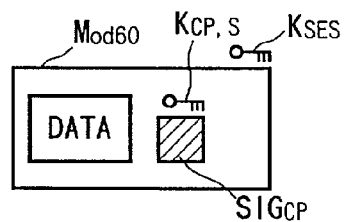
FIG.43C SAM105₁→102(ESC) (IN BAND)
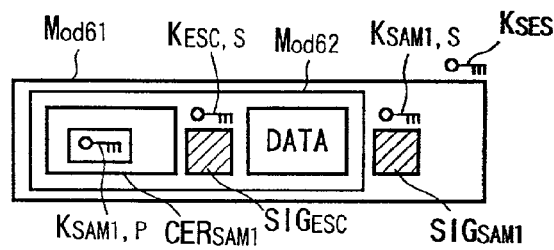
FIG.43D SAM105₁→102(ESC) (OUT OF BAND)
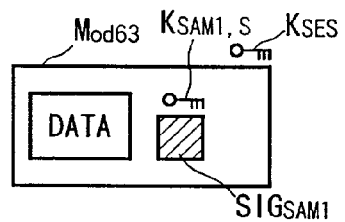

SAM REGISTRATION LIST

FIG.51

310 SERVICE PROVIDER

FIG.59

CONTENT OF USAGE LOG DATA 308

IDENTIFIER Content_ID
IDENTIFIER CP_ID
IDENTIFIER SP_ID
SIGNAL ORIGIN DATA OF CONTENT DATA C
COMPRESSION METHOD OF CONTENT DATA C
IDENTIFIER MEDIA_ID OF STORAGE MEDIUM
IDENTIFIER SAM_ID
USER_ID OF USER PROCESSING OF ESC IN RESPONSE TO ISSUANCE
REQUEST OF PUBLIC KEY CERTIFICATE DATA FROM SP

FIG.66

STORAGE DATA OF STACK MEMORY 200

CONTENT KEY DATA $K_C$
USAGE CONTROL POLICY DATA(UCP) 106
LOCK KEY DATA $K_{LOC}$ OF NOVOLATILE MEMORY 201
PUBLIC KEY CERTIFICATE DATA $CER_{CP}$ OF CONTENT PROVIDER 301
PUBLIC KEY CERTIFICATE DATA $CER_{SP}$ OF SERVICE PROVIDER 301
USAGE CONTROL STATUS DATA(UCS) 166
SAM PROGRAM DOWNLOAD CONTAINER $SD_1$ TO $SDC_3$
PRICE TAG DATA 312

PROCESSING FOR DECRYPTION OF KF IN SAM

PROCESSING FOR DETERMINATION OF PURCHASE MODE OF SECURE CONTAINER IN SAM

PROCESSING FOR REPRODUCTION OF CONTENT DATA

PROCESSING OF SAM WHEN WRITING CF, ETC. INPUT FROM OTHER SAM INTO STORAGE MEDIUM

DIGITAL BROADCAST (FIRST)

DATA PROVIDING SYSTEM, DEVICE, AND METHOD

This application claims priority to Japanese Applications No. 11-192413, filed Jul. 6, 1999, No. 11-193561, filed Jul. 7, 1999, No. 11-193562, filed Jul. 7, 1999, and No. 2000-126305, filed Apr. 21, 2000, which applications are incorporated herein by reference to the extent permitted by law.

TECHNICAL FIELD

The present invention relates to a data providing system and a data providing apparatus and method of the same for providing content data and a management apparatus and a data processing apparatus used in the same.

BACKGROUND ART

There is a data providing system for distributing encrypted content data to data processing apparatuses of users concluding a predetermined contract and comprising the related data processing contract and comprising the related data processing apparatuses decrypt, reproduce, and store the content data.

As one of such data providing systems, there is a conventional EMD (electronic music distribution) system for distributing music data.

FIG. 100 is a view of the configuration of a conventional EMD system 700.

In the EMD system 700 shown in FIG. 100, content providers 701a and 701b encrypt content data 704a, 704b, and 704c and copyright information 705a, 705b, and 705c by session key data obtained after mutual authentication and supply them to a service provider 710 on-line or off-line. Here, the copyright information 705a, 705b, and 705c include for example SCMS (serial copy Management system) information, electronic watermark information requesting burying in content data, and information concerning the copyright requesting burying in a transmission protocol of the service provider 710.

The service provider 710 decrypts the received content data 704a, 704b, and 704c and copyright information 705a, 705b, and 705c by using the session key data.

Then, the service provider 710 buries the copyright information 705a, 705b, and 705c in the content data 704a, 704b, and 704c decrypted or received off-line to generate content data 707a, 707b, and 707c. At this time, the service provider 710 changes a predetermined frequency domain of for example the electronic watermark information in the copyright information 705a, 705b, and 705c and buries it in the content data 704a, 704b, and 704c and buries the SCMS information in a network protocol used when transmitting the related content data to the user.

Further, the service provider 710 encrypts the content data 707a, 707b, and 707c by using content key data Kca, Kcb, and Kcc read from a key database 706. Thereafter, the service provider 710 encrypts a secure container 722 with the encrypted content data 707a, 707b, and 707c stored therein by the session key data obtained after the mutual authentication and transmits the same to a CA (conditional access) module 711 existing in terminal equipment 709 of the user.

The CA module 711 decrypts the secure container 722 by using the session key data. Further, the CA module 711 receives the content key data Kca, Kcb, and Kcc from the key database 706 of the service provider 710 by using an electronic settlement and CA or other charging function and decrypts them by using the session key data. Due to this, in the terminal equipment 709, it becomes possible to decrypt the content data 707a, 707b, and 707c by using the content key data Kca, Kcb, and Kcc.

At this time, the CA module 711 performs charge processing in units of content, generates charging information 721 in accordance with the result of this, encrypts this by the session key data, and then transmits the same to a right clearing module 720 of the service provider 710.

In this case, the CA module 711 collects the items it desires to manage relating to the service provided by the service provider 710 itself, that is, the contract (update) information of the user and the monthly base fee or other network rent, performs charge processing in units of content, and secures the security of a physical layer of the network.

The service provider 710 distributes profit between the service provider 710 and the content providers 701a, 701b, and 701c when receiving the charge information 721 from the CA module 711.

At this time, the profit is distributed from the service provider 710 to the content providers 701a, 701b, and 701c via for example the JASRAC (Japanese Society for Rights of Authors, Composers, and Publishers). Further, the profit of the content provider is distributed to the copyright owner, artist, song writer and/or composer, and affiliated production company of the related content data by the JASRAC.

Further, the terminal equipment 709, when storing the content data 707a, 707b, and 707c decrypted by using the content key data Kca, Kcb, and Kcc in a RAM type storage medium 723 or the like, rewrites the SCMS bits of the copyright information 705a, 705b, and 705c to control copying. Namely, the user side controls copying to protect the copyright based on the SCMS bits buried in the content data 707a, 707b, and 707c.

The SCMS was established for preventing storing from a CD (compact disc) to a DAT (digital audio tape). Copying between one DAT and another DAT is still possible. Further, even when burying electronic watermark information in the content data, when a problem arises, only the content provider which provided the content data concerned is specified. Illegal copying is not prevented by technical means.

Accordingly, in the EMD system 700 shown in FIG. 100, there is the problem in that the right (profit) of the content provider is not sufficiently protected.

Further, in the above EMD system 700, since the copyright information of the content provider is buried in the content data by the service provider, the content provider must inspect if the information has been buried as requested. Further, the content provider must inspect if the service provider has distributed the content data as contracted. For this reason, there is the problem that the load for the inspection is large.

Further, in the EMD system 700, the charging information 721 from the terminal equipment 709 of the user is processed by the right clearing module 720 of the service provider 710, so there is a concern if the profit which should be received by the content provider in accordance with the usage of the content data by the user can be suitably received by the content provider.

DISCLOSURE OF THE INVENTION

The present invention was made in consideration with the problem of the above related art and has as an object thereof to provide a data providing system and a data providing apparatus and methods of the same and a data processing apparatus and a management apparatus capable of suitably protecting the profits of the owners of rights (related parties) of a content provider.

Further, the present invention has as another object the provision of a data providing system and a data providing apparatus and methods of the same and a data processing apparatus and a management apparatus capable of reducing the load of the inspection for protecting the profits of the owners of rights of a content provider.

In order to solve the problems of the prior art and achieve the above objects, the data providing system of a first aspect of the present invention is a data providing system for distributing content data from a data providing apparatus to a data processing apparatus, wherein the data providing apparatus distributes a module storing the content data encrypted by using content key data, encrypted content key data, and an encrypted usage control policy data indicating handling of the content data to the data processing apparatus and wherein the data processing apparatus decrypts the content key data and the usage control policy data stored in the distributed module and determines the handling of the content data based on the related decrypted usage control policy data.

In the data providing system of the first aspect of the invention, the module storing the content data encrypted by using the content key data, the encrypted content key data, and the encrypted usage control policy data indicating the handling of the content data is distributed from the data providing apparatus to the data processing apparatus.

Then, in the data processing apparatus, the content key data and the usage control policy data stored in the distributed module are decrypted, and the handling of the content data is determined based on the related decrypted usage control policy data.

By storing the usage control policy data indicating the handling of the related content data in the module storing the content data in this way, in the data processing apparatus, it becomes possible to handle (use) the content data based on the usage control policy data generated by related parties of the data providing apparatus.

Further, in the data providing system of the first aspect of the invention, preferably the data providing apparatus distributes the module storing the encrypted content key data and the usage control policy data to the data processing apparatus by using distribution key data, and the data processing apparatus decrypts the content key data and the usage control policy data stored in the distributed module by using the distribution key data.

Further, the data providing system of the first aspect of the invention preferably further has a management apparatus for managing the distribution key data and distributing the distribution key data to the data providing apparatus and the data processing apparatus.

Further, a data processing apparatus of a second aspect of the invention is a data processing apparatus utilizing content data distributed from a data providing apparatus, which receives a module storing content data encrypted by using content key data, encrypted content key data, and encrypted usage control policy data indicating the handling of the content data from the data providing apparatus, decrypts the content key data and the usage control policy data stored in the related received module, and determines the handling of the content data based on the related decrypted usage control policy data.

Further, a data providing system of a third aspect of the invention is a data providing system comprising a data providing apparatus, a data distribution apparatus, and a data processing apparatus, wherein the data providing apparatus provides a first module storing content data encrypted by using content key data, encrypted content key data, and encrypted usage control policy data indicating the handling of the content data to the data distribution apparatus, the data distribution apparatus distributes a second module storing the encrypted content data, content key data, and usage control policy data stored in the provided first module to the data processing apparatus, and the data processing apparatus decrypts the content key data and the usage control policy data stored in the distributed second module and determines the handling of the content data based on the related decrypted usage control policy data.

In the data providing system of the third aspect of the invention, the first module storing the content data encrypted by using the content key data, encrypted content key data, and encrypted usage control policy data indicating the handling of the content data is provided from the data providing apparatus to the data distribution apparatus.

Next, the second module storing the encrypted content data, content key data, and usage control policy data stored in the provided first module is distributed from the data distribution apparatus to the data processing apparatus.

Next, in the data processing apparatus, the content key data and the usage control policy data stored in the distributed second module are decrypted, and the handling of the content data is determined based on the related decrypted usage control policy data.

Further, in the data providing system of the third aspect of the invention, preferably the data distribution apparatus distributes the second module storing price data indicating the price of the content data to the data processing apparatus.

Further, a data providing system of a fourth aspect of the invention is a data providing system comprising a data providing apparatus, at least a first data distribution apparatus and a second data distribution apparatus, and a data processing apparatus, wherein the data providing apparatus provides a first module storing content data encrypted by using content key data, encrypted content key data, and encrypted usage control policy data indicating the handling of the content data to the plurality of data distribution apparatuses, the first data distribution apparatus distributes the second module storing the encrypted content data, content key data, and usage control policy data stored in the provided first module to the data processing apparatus, the second data distribution apparatus distributes a third module storing the encrypted content data, content key data, and usage control policy data stored in the provided first module to the data processing apparatus, and the data processing apparatus decrypts the content key data and the usage control policy data stored in the distributed second module and the third module and determines the handling of the content data based on the related decrypted usage control policy data.

Further, a data providing system of a fifth aspect of the invention is a data providing system comprising at least a first data providing apparatus and a second data providing apparatus, a data distribution apparatus, and a data processing apparatus, wherein the first data providing apparatus provides a first module storing first content data encrypted by using first content key data, encrypted first content key data, and encrypted first usage control policy data indicating the handling of the first content data to the data distribution apparatus, the second data providing apparatus provides a second module storing second content data encrypted by using second content key data, encrypted second content key data, and encrypted second usage control policy data indicating the handling of the second content data to the data distribution apparatus, the data distribution apparatus distributes a third module storing the encrypted first content data, the first content key data, and the first usage control policy data stored in the provided first module and the encrypted second content data, the second content key data, and the second usage control policy data stored in the provided second module to the data processing apparatus, and the data processing apparatus decrypts the first content key data and the first usage control policy data stored in the distributed third module, determines the handling of the first content data based on the related decrypted first usage control policy data, decrypts the second content key data and the second usage control policy data stored in the distributed third module, and determines the handling of the second content data based on the related decrypted second usage control policy data.

Further, a data providing apparatus of a sixth aspect of the invention is a data providing apparatus for distributing content data to a data processing apparatus for using the content data and distributes a module storing content data encrypted by using the content key data, encrypted content key data, and encrypted usage control policy data indicating the handling of the content data to the data processing apparatus.

Further, a data providing method of a seventh aspect of the invention is a data providing method for distributing content data from a data providing apparatus to a data processing apparatus, comprising the steps of distributing a module storing content data encrypted by using content key data, encrypted content key data, and encrypted usage control policy data indicating the handling of the content data from the data providing apparatus to the data processing apparatus and having the data processing apparatus decrypt the content key data and the usage control policy data stored in the distributed module and determine the handling of the content data based on the related decrypted usage control policy data.

Further, a data providing method of an eighth aspect of the invention is a data providing method using a data providing apparatus, data distribution apparatus, and data processing apparatus, comprising the steps of providing a first module storing content data encrypted by using content key data, encrypted content key data, and encrypted usage control policy data indicating the handling of the content data from the data providing apparatus to the data distribution apparatus, distributing a second module storing the encrypted content data, content key data, and usage control policy data stored in the provided first module from the data distribution apparatus to the data processing apparatus, and having the data processing apparatus decrypt the content key data and the usage control policy data stored in the distributed second module and determine the handling of the content data based on the related decrypted usage control policy data.

Further, a data providing method of a ninth aspect of the invention is a data providing method using a data providing apparatus, at least a first data distribution apparatus and second data distribution apparatus, and a data processing apparatus, comprising the steps of providing a first module storing content data encrypted by using content key data, encrypted content key data, and encrypted usage control policy data indicating the handling of the content data from the data providing apparatus to the data distribution apparatuses, distributing a second module storing the encrypted content data, content key data, and usage control policy data stored in the provided first module from the first data distribution apparatus to the data processing apparatus, distributing a third module storing the encrypted content data, content key data, and usage control policy data stored in the provided first module from the second data distribution apparatus to the data processing apparatus, and having the data processing apparatus decrypt the content key data and the usage control policy data stored in the distributed second module and the third module and determine the handling of the content data based on the related decrypted usage control policy data.

Further, a data providing method of a 10th aspect of the invention is a data providing method using at least a first data providing apparatus and second data providing apparatus, a data distribution apparatus, and a data processing apparatus, comprising the steps of providing a first module storing first content data encrypted by using first content key data, encrypted first content key data, and encrypted first usage control policy data indicating the handling of the first content data from the first data providing apparatus to the data distribution apparatus, providing a second module storing second content data encrypted by using second content key data, encrypted second content key data, and encrypted second usage control policy data indicating the handling of the second content data from the second data providing apparatus to the data distribution apparatus, distributing a third module storing the encrypted first content data, the first content key data, and the first usage control policy data stored in the provided first module and the encrypted second content data, the second content key data, and the second usage control policy data stored in the provided second module from the data distribution apparatus to the data processing apparatus, and having the data processing apparatus decrypt the first content key data and the first usage control policy data stored in the distributed third module, determine the handling of the first content data based on the related decrypted first usage control policy data, decrypt the second content key data and the second usage control policy data stored in the distributed third module, and determine the handling of the second content data based on the related decrypted second usage control policy data Further, a data providing system of an 11th aspect of the invention is a data providing system comprising a data providing apparatus, data processing apparatus, and management apparatus, wherein the data providing apparatus distributes content data and usage control policy data indicating the handling of the related content data to the data processing apparatus and requests to the management apparatus to certify legitimacy of the usage control policy data, the data processing apparatus uses the distributed content data based on the distributed usage control policy data, and the management apparatus manages the data providing apparatus and the data processing apparatus and certifies the legitimacy of the usage control policy data in response to a request from the data providing apparatus.

At this time, the legitimacy of the usage control policy data is certified by the management apparatus by the management apparatus preparing for example signature data with respect to the usage control policy data.

In the data providing system of the 11th aspect of the invention, the content data and the usage control policy data indicating the handling of the related content data are distributed from the data providing apparatus to the data processing apparatus.

Next, the data processing apparatus uses the distributed content data based on the distributed usage control policy data.

Further, the legitimacy of the usage control policy data is certified in the management apparatus in response to a request from the data providing apparatus.

Further, in the data providing system of the 11th aspect of the invention, preferably the data providing apparatus makes the request by transmitting a module storing the usage control policy data, its own identifier, and at least signature data generated by using its own secret key data with respect to the usage control policy data to the management apparatus.

Further, in the data providing system of the 11th aspect of the invention, preferably the management apparatus distributes public key certificate data for certifying the legitimacy of the public key data corresponding to the secret key data of the data providing apparatus to the data providing apparatus together with the signature data generated by using its own secret key data, and the data providing apparatus makes a request by transmitting a module storing the public key certificate data, the usage control policy data, its own identifier, and the signature data to the management apparatus.

Further, in the data providing system of the 11th aspect of the invention, preferably the management apparatus manages distribution key data, distributes the related distribution key data to the data processing apparatus, generates signature data generated by using its own secret key data with respect to the usage control policy data in response to a request from the data providing apparatus, encrypts a module storing the related generated signature data and the usage control policy data by using the distribution key data, and transmits the same to the data providing apparatus, the data providing apparatus distributes a module received from the management apparatus to the data processing apparatus, and the data processing apparatus decrypts the module received from the data providing apparatus by using the distribution key data, verifies the legitimacy of the signature data stored in the related module by using the public key data of the management apparatus, and uses the distributed content data based on the usage control policy data stored in the module when it decides it is legitimate.

Further, a data providing system of a 12th aspect of the invention is a data providing system comprising a data providing apparatus, data processing apparatus, and management apparatus, wherein the data providing apparatus encrypts content data by using content key data, distributes the related encrypted content data to the data processing apparatus, and requests to the management apparatus to certify the legitimacy of the content key data, the data processing apparatus decrypts the distributed content data by using the content key data and uses the related decrypted content data, and the management apparatus manages the data providing apparatus and the data processing apparatus and certifies the legitimacy of the content key data in response to a request from the data providing apparatus.

In the data providing system of the 12th aspect of the invention, the content data encrypted by using the content key data is distributed from the data providing apparatus to the data processing apparatus.

Next, the data processing apparatus decrypts the distributed content data by using the content key data and uses the related decrypted content data.

Further, the legitimacy of the content key data is certified in the management apparatus in response to a request from the data providing apparatus.

Further, a data providing system of a 13th aspect of the invention is a data providing system comprising a data providing apparatus, data distribution apparatus, data processing apparatus, and management apparatus, wherein the data providing apparatus provides content data and usage control policy data indicating the handling of the related content data to the data distribution apparatus and requests to the management apparatus to certify the legitimacy of the usage control policy data, the data distribution apparatus distributes the provided content data and the usage control policy data to the data processing apparatus, the data processing apparatus uses the distributed content data based on the distributed usage control policy data, and the management apparatus manages the data providing apparatus and the data processing apparatus and certifies the legitimacy of the usage control policy data in response to a request from the data providing apparatus.

In the data providing system of the 13th aspect of the invention, the content data encrypted by using the content key data is distributed from the data providing apparatus to the data processing apparatus.

Next, the data processing apparatus decrypts the distributed content data by using the content key data and uses the related decrypted content data.

Further, the legitimacy of the content key data is certified in the management apparatus in response to a request from the data providing apparatus.

A data providing system of a 14th aspect of the invention is a data providing system comprising a data providing apparatus, data distribution apparatus, data processing apparatus, and management apparatus, wherein the data providing apparatus encrypts content data by using content key data, provides related encrypted content data, and usage control policy data indicating the handling of the related content data to the data distribution apparatus, and requests to the management apparatus to certify the legitimacy of the content key data, the data distribution apparatus distributes the provided content data and the usage control policy data to the data processing apparatus, the data processing apparatus uses the content data containing the decryption of the content data using the content key data based on the distributed usage control policy data, and the management apparatus manages the data providing apparatus and the data processing apparatus and certifies the legitimacy of the content key data in response to a request from the data providing apparatus.

In the data providing system of the 14th aspect of the invention, the content data encrypted by using the content key data and usage control policy data indicating the handling of the related content data are provided from the data providing apparatus to the data distribution apparatus.

Next, the content data and the usage control policy data provided from the data distribution apparatus to the data processing apparatus are distributed to the data processing apparatus.

Next, the data processing apparatus uses the content data containing the decryption of the content data using the content key data based on the distributed usage control policy data.

Further, the management apparatus certifies the legitimacy of the content key data in response to a request from the data providing apparatus.

Further, a management apparatus of a 15th aspect of the invention is a management apparatus for managing a data providing apparatus for distributing content data and usage control policy data indicating the handling of the related content data and a data processing apparatus for using the distributed content data based on the distributed usage control policy data and certifies the legitimacy of the usage control policy data in response to a request from the data providing apparatus.

Further, a management apparatus of a 16th aspect of the invention is a management apparatus for managing a data providing apparatus for distributing content data encrypted by using content key data and usage control policy data indicating the handling of the related content data and a data processing apparatus for decrypting the content data distributed based on the distributed usage control policy data by using the content key data, then using the related content data and certifies the legitimacy of the content key data in response to a request from the data providing apparatus.

Further, a management apparatus of a 17th aspect of the invention is a management apparatus for managing a data providing apparatus for providing content data and usage control policy data indicating the handling of the related content data, a data distribution apparatus for distributing the provided content data and the usage control policy data, and a data processing apparatus for using the content data distributed based on the distributed usage control policy data and certifies the legitimacy of the usage control policy data in response to a request from the data providing apparatus.

Further, a data providing method of an 18th aspect of the invention is a data providing method using a data providing apparatus, data processing apparatus, and management apparatus, comprising the steps of distributing content data and usage control policy data indicating the handling of the related content data from the data providing apparatus to the data processing apparatus, having the data processing apparatus use the distributed content data based on the distributed usage control policy data, and certifying the legitimacy of the usage control policy data in the management apparatus in response to a request from the data providing apparatus.

Further, a data providing method of a 19th aspect of the invention is a data providing method using a data providing apparatus, data processing apparatus, and management apparatus, comprising the steps of distributing content data encrypted by using content key data from the data providing apparatus to the data processing apparatus, having the data processing apparatus decrypt the distributed content data by using the content key data, and certifying the legitimacy of the content key data in the management apparatus in response to a request from the data providing apparatus.

Further, a data providing method of a 20th aspect of the invention is a data providing method using a data providing apparatus, data distribution apparatus, data processing apparatus, and management apparatus, comprising the steps of providing content data and usage control policy data indicating the handling of the related content data from the data providing apparatus to the data distribution apparatus, distributing the provided content data and the usage control policy data from the data distribution apparatus to the data processing apparatus, having the data processing apparatus use the distributed content data based on the distributed usage control policy data, and certifying the legitimacy of the usage control policy data in the management apparatus in response to a request from the data providing apparatus.

Further, a data providing method of a 21st aspect of the invention is a data providing method using a data providing apparatus, data distribution apparatus, data processing apparatus, and management apparatus, comprising the steps of providing content data encrypted by using content key data and usage control policy data indicating the handling of the related content data from the data providing apparatus to the data distribution apparatus, distributing the content data and the usage control policy data provided from the data distribution apparatus to the data processing apparatus to the data processing apparatus, using the content data containing the decryption of the content data using the content key data based on the distributed usage control policy data in the data processing apparatus, and certifying the legitimacy of the content key data in the management apparatus in response to a request from the data providing apparatus.

Further, a data providing system of a 22nd aspect of the invention is a data providing system comprising a data providing apparatus, data processing apparatus, and management apparatus, wherein the data providing apparatus distributes content data and usage control policy data indicating the handling of the related content data to the data processing apparatus, the data processing apparatus determines at least one of a purchase mode and a usage mode of the distributed content data based on the distributed usage control policy data and transmits log data indicating the log of at least one of the related determined purchase mode and usage mode to the management apparatus, and the management apparatus manages the data providing apparatus and the data processing apparatus and performs profit distribution processing for distributing the profit obtained accompanied with the purchase and the usage of the content data in the data processing apparatus to related parties of the data providing apparatus based on received log data.

In the data providing system of the 22nd aspect of the invention, the content data and the usage control policy data indicating the handling of the related content data are distributed from the data providing apparatus to the data processing apparatus.

Next, the data processing apparatus determines at least one of the purchase mode and the usage mode of the distributed content data based on the distributed usage control policy data.

Next, the log data indicating the log of at least one of the related determined purchase mode and usage mode is transmitted from the data processing apparatus to the management apparatus.

Next, the management apparatus manages the data providing apparatus and the data processing apparatus and perform the profit distribution processing for distributing the profit obtained accompanied with the purchase and the usage of the content data in the data processing apparatus to related parties of the data providing apparatus based on the received log data.

Further, a data providing system of a 23rd aspect of the invention is a data providing system comprising a data providing apparatus, data distribution apparatus, data processing apparatus, and management apparatus, wherein the data providing apparatus provides content data and usage control policy data indicating the handling of the related content data to the data distribution apparatus, the data distribution apparatus distributes the provided content data and the usage control policy data to the data processing apparatus, the data processing apparatus has a first module for communicating with the data distribution apparatus and a second module for determining at least one of a purchase mode and usage mode of the distributed content data based on the distributed usage control policy data and transmitting log data indicating the log of the related determined purchase mode and usage mode to the management apparatus, and the management apparatus manages the data providing apparatus, data distribution apparatus, and data processing apparatus and performs profit distribution processing for distributing the profit obtained accompanied with the data processing apparatus receiving the distribution of the content data and purchasing and using the content data to related parties of the data providing apparatus and the data distribution apparatus based on the log data received from the second module.

In the data providing system of the 23rd aspect of the invention, the content data and the usage control policy data indicating the handling of the related content data are provided from the data providing apparatus to the data distribution apparatus.

Next, the provided content data and the usage control policy data are distributed from the data distribution apparatus to the data processing apparatus.

Next, the data processing apparatus determines at least one of the purchase mode and the usage mode of the distributed content data based on the distributed usage control policy data.

Next, the log data indicating the log of the determined purchase mode and usage mode is transmitted from the data processing apparatus to the management apparatus.

Next, the management apparatus performs profit distribution processing for distributing the profit obtained accompanied with the data processing apparatus receiving the distribution of the content data and purchasing and using the content data to related parties of the data providing apparatus and the data distribution apparatus based on the received log data.

Further, a data providing system of a 24th aspect of the invention is a data providing system comprising a data providing apparatus, data distribution apparatus, data processing apparatus, and management apparatus, wherein the data providing apparatus provides content data and usage control policy data indicating the handling of the related content data to the data distribution apparatus, the data distribution apparatus distributes the provided content data and the usage control policy data to the data processing apparatus and performs charge processing concerning the distribution of the content data based on a data distribution apparatus use purchase log data received from the data processing apparatus, the data processing apparatus has a first module for creating the data distribution apparatus use purchase log data indicating the log of the purchase of the content data distributed from the data distribution apparatus and transmitting the same to the data distribution apparatus and a second module for determining at least one of the purchase mode and the usage mode of the distributed content data based on the distributed usage control policy data and transmitting a management apparatus use log data indicating the log of the related determined purchase mode and usage mode to the management apparatus, and the management apparatus performs profit distribution processing for distributing the profit obtained accompanied with the purchase and the usage of the content data in the data processing apparatus to related parties of the data providing apparatus and the data distribution apparatus based on the management apparatus use log data.

Further, a data providing system of a 25th aspect of the invention is a data providing system comprising a data providing apparatus, data distribution apparatus, data processing apparatus, and management apparatus, wherein the data providing apparatus provides the content data to the data distribution apparatus, the data distribution apparatus distributes the provided content data to the data processing apparatus, the data processing apparatus uses the distributed content data, and the management apparatus manages operation of a data providing service by the data providing apparatus, the data distribution apparatus, and the data processing apparatus.

Further, a data providing system of a 26th aspect of the invention is a data providing system comprising a data providing apparatus, data distribution apparatus, data processing apparatus, and management apparatus, wherein the data providing apparatus provides content data to the data distribution apparatus, the data distribution apparatus distributes the provided content data to the data processing apparatus, the data processing apparatus uses the distributed content data, and the management apparatus manages the operation of a data providing service by the data providing apparatus, the data distribution apparatus, and the data processing apparatus, wherein the transmission of data among the data providing apparatus, the data distribution apparatus, the data processing apparatus, and the management apparatus is carried out by using mutual authentication using a public key encryption method, signature creation, signature verification, and encryption of data by a common key encryption method.

Further, a data providing system of a 27th aspect of the invention is a data providing system comprising a data providing apparatus, data distribution apparatus, data processing apparatus, and management apparatus, wherein the data providing apparatus provides content data to the data distribution apparatus, the data distribution apparatus distributes the provided content data to the data processing apparatus, the data processing apparatus uses the distributed content data, and the management apparatus manages the operation of a data providing service by the data providing apparatus, the data distribution apparatus, and the data processing apparatus, generates signature data indicating that the related data is generated by itself by using its own secret key data when each of the data providing apparatus, the data distribution apparatus, and the data processing apparatus supplies the data to another apparatus, and generates and manages public key certificate data of public key data corresponding to the secret key data of the data providing apparatus, the data distribution apparatus, and the data processing apparatus when the legitimacy of the signature data corresponding to the data is verified by using the public key data of the related other apparatus when receiving the supply of the related data from the other apparatus, wherein the data providing apparatus, the data distribution apparatus, and the data processing apparatus acquire the their own public key certificate data from the management apparatus before communicating with the other apparatus and transmit the related acquired public key certificate data to the other apparatus.

Further, a data providing system of a 28th aspect of the invention is a data providing system comprising a data providing apparatus, data distribution apparatus, data processing apparatus, and management apparatus, the data providing apparatus provides content data to the data distribution apparatus, the data distribution apparatus distributes the provided content data to the data processing apparatus, the data processing apparatus uses the distributed content data, and the management apparatus manages the operation of a data providing service by the data providing apparatus, the data distribution apparatus, and the data processing apparatus, generates the signature data indicating that the related data is generated by itself by using its own secret key data when each of the data providing apparatus, the data distribution apparatus, and the data processing apparatus supplies data to another apparatus, and generates and manages public key certificate data of public key data corresponding to the secret key data of the data providing apparatus, the data distribution apparatus, and the data processing apparatus when the legitimacy of the signature data corresponding to the data is verified by using the public key data of the related other apparatus when receiving the supply of the related data from the other apparatus, wherein the data providing apparatus, the data distribution apparatus, and the data processing apparatus acquire their own public key certificate data from the management apparatus before communicating with the other apparatus and transmit the related acquired public key certificate data to the other apparatus at the communication.

Further, a data providing system of a 29th aspect of the invention has a data providing apparatus, data distribution apparatus, data processing apparatus, and management apparatus, wherein the data providing apparatus provides content data to the data distribution apparatus, the data distribution apparatus distributes the provided content data to the data processing apparatus, the data processing apparatus uses the distributed content data, and the management apparatus manages the operation of a data providing service by the data providing apparatus, the data distribution apparatus, and the data processing apparatus, generates signature data indicating that the related data is generated by itself by using its own secret key data when each of the data providing apparatus, the data distribution apparatus, and the data processing apparatus supplies data to another apparatus, generates and manages public key certificate data of public key data corresponding to the secret key data of the data providing apparatus, the data distribution apparatus, and the data processing apparatus when the legitimacy of the signature data corresponding to the data is verified by using the public key data of the related other apparatus when receiving the supply of the related data from the other apparatus, and generates a public key certificate revocation list for specifying public key certificate data to be invalidated among the generated public key certificate data and thereby to restrict the communication or the distribution using public key certificate data specified by the public key certificate revocation list by the data providing apparatus, the data distribution apparatus, and the data processing apparatus.

Further, a data providing system of a 30th aspect of the invention has a data providing apparatus, data distribution apparatus, data processing apparatus, and management apparatus, wherein the data providing apparatus provides content data to the data distribution apparatus, the data distribution apparatus distributes the provided content data to the data processing apparatus, the management apparatus manages the operation of a data providing service by the data providing apparatus, the data distribution apparatus, and the data processing apparatus, generates signature data indicating that the related data is generated by an apparatus itself by using its own secret key data when the data providing apparatus supplies data to another apparatus, generates and manages public key certificate data of public key data corresponding to the secret key data of the data providing apparatus for when another apparatus verifies the legitimacy of the related signature data by using the public key data corresponding to the secret key data, generates a public key certificate revocation list for specifying public key certificate data to be invalidated among the generated public key certificate data, distributes the related public key certificate revocation list to the data processing apparatus, and the data processing apparatus verifies whether or not public key certificate data of the data providing apparatus providing the distributed content data is invalid based on the public key certificate revocation list distributed from the management apparatus and controls the usage of the distributed content data based on the result of the related verification.

Further, a data providing system of a 31st aspect of the invention has a data providing apparatus, data distribution apparatus, data processing apparatus, and management apparatus, wherein the management apparatus manages the operation of a data providing service by the data providing apparatus, the data distribution apparatus, and the data processing apparatus, generates signature data indicating that the related data is generated by an apparatus itself by using its own secret key data when the data providing apparatus supplies data to another apparatus, generates and manages public key certificate data of public key data corresponding to the secret key data of the data providing apparatus for when another apparatus verifies the legitimacy of the related signature data by using the public key data corresponding to the secret key data, generates a public key certificate revocation list for specifying public key certificate data to be invalidated among the generated public key certificate data, distributes the related public key certificate revocation list to the data distribution apparatus, and the data distribution apparatus verifies whether or not public key certificate data of the data providing apparatus providing the provided content data is invalid based on the public key certificate revocation list distributed from the management apparatus, and controls the distribution of the provided content data to the data processing apparatus based on the result of the related verification.

Further, a data providing system of a 32nd aspect of the invention has a data providing apparatus, data distribution apparatus, data processing apparatus, and management apparatus, wherein the management apparatus manages the operation of a data providing service by the data providing apparatus, the data distribution apparatus, and the data processing apparatus, generates signature data indicating that the related data is generated by an apparatus itself by using its own secret key data when the data distribution apparatus supplies data to another apparatus, generates and manages public key certificate data of public key data corresponding to the secret key data of the data distribution apparatus for when another apparatus verifies the legitimacy of the related signature data by using the public key data corresponding to the secret key data, generates a public key certificate revocation list for specifying public key certificate data to be invalidated among the generated public key certificate data, and distributes the related public key certificate revocation list to the data providing apparatus, the data providing apparatus verifies whether or not public key certificate data of the data distribution apparatus of the destination of provision of the content data is invalid and controls the provision of the content data to the data distribution apparatus based on the result of the related verification, the data distribution apparatus distributes the provided content data to the data processing apparatus, and the data processing apparatus uses the distributed content data.

Further, a data providing system of a 33rd aspect of the invention has a data providing apparatus, data distribution apparatus, data processing apparatus, and management apparatus, wherein the management apparatus manages the operation of a data providing service by the data providing apparatus, the data distribution apparatus, and the data processing apparatus, generates signature data indicating that the related data is generated by an apparatus itself by using its own secret key data when the data distribution apparatus supplies data to another apparatus, generates and manages public key certificate data of public key data corresponding to the secret key data of the data distribution apparatus for when another apparatus verifies the legitimacy of the related signature data by using the public key data corresponding to the secret key data, generates a public key certificate revocation list for specifying public key certificate data to be invalidated among the generated public key certificate data, and distributes the related public key certificate revocation list to the data distribution apparatus, the data providing apparatus provides content data to the data distribution apparatus, the data distribution apparatus distributes the provided content data and the distributed public key certificate revocation list to the data processing apparatus, and the data processing apparatus verifies whether or not public key certificate data of the data distribution apparatus distributing the distributed content data is invalid based on the distributed public key certificate revocation list and controls the usage of the distributed content data based on the result of the related verification.

Further, a data providing system of a 34th aspect of the invention has a data providing apparatus, data distribution apparatus, data processing apparatus, and management apparatus, wherein the management apparatus manages the operation of a data providing service by the data providing apparatus, the data distribution apparatus, and the data processing apparatus, generates signature data indicating that the related data is generated by an apparatus itself by using its own secret key data when the data distribution apparatus supplies data to another apparatus, generates and manages public key certificate data of public key data corresponding to the secret key data of the data distribution apparatus for when another apparatus verifies the legitimacy of the related signature data by using public key data corresponding to the secret key data, generates a public key certificate revocation list for specifying public key certificate data to be invalidated among the generated public key certificate data, and distributes the related public key certificate revocation list to the data processing apparatus, the data providing apparatus provides content data to the data distribution apparatus, the data distribution apparatus distributes the provided content data to the data processing apparatus, and the data processing apparatus verifies whether or not public key certificate data of the data distribution apparatus distributing the distributed content data is invalid based on the distributed public key certificate revocation list and controls the usage of the distributed content data based on the result of the related verification.

Further, a data providing system of a 35th aspect of the invention has a data providing apparatus, data distribution apparatus, data processing apparatus, and management apparatus, wherein the management apparatus manages the operation of a data providing service by the data providing apparatus, the data distribution apparatus, and the data processing apparatus, generates signature data indicating that the related data is generated by an apparatus itself by using its own secret key data when the data distribution apparatus supplies data to another apparatus, generates and manages public key certificate data of public key data corresponding to the secret key data of the data distribution apparatus for when another apparatus verifies the legitimacy of the related signature data by using public key data corresponding to the secret key data, generates a public key certificate revocation list for specifying public key certificate data to be invalidated among the generated public key certificate data, and distributes the related public key certificate revocation list to the data providing apparatus, the data providing apparatus provides content data and the public key certificate revocation list to the data distribution apparatus, the data distribution apparatus distributes the provided content data and public key certificate revocation list to the data processing apparatus, and the data processing apparatus verifies whether or not public key certificate data of the data distribution apparatus distributing the distributed content data is invalid based on the distributed public key certificate revocation list and controls the usage of the distributed content data based on the result of the related verification.

Further, a data providing system of a 36th aspect of the invention has a data providing apparatus, data distribution apparatus, a plurality of data processing apparatuses, and a management apparatus, wherein the management apparatus manages the operation of a data providing service by the data providing apparatus, the data distribution apparatus, and the data processing apparatuses, generates signature data indicating that the related data is generated by an apparatus itself by using its own secret key data when a data processing apparatus supplies data to another apparatus, generates and manages public key certificate data of public key data corresponding to the secret key data of the data processing apparatuses for when another apparatus verifies the legitimacy of the related signature data by using the public key data corresponding to the secret key data, generates a public key certificate revocation list for specifying public key certificate data to be invalidated among the generated public key certificate data, and distributes the related public key certificate revocation list to the data providing apparatus, the data providing apparatus provides content data and the public key certificate revocation list to the data distribution apparatus, the data distribution apparatus distributes the provided content data and a public key certificate revocation list to the data processing apparatuses, and the data processing apparatuses verify whether or not public key certificate data of the other data processing apparatuses are invalid based on the public key certificate revocation list distributed from the data distribution apparatus and control the communication with other data processing apparatuses based on the result of the related verification.

Further, a data providing system of a 37th aspect of the invention has a data providing apparatus, data distribution apparatus, a plurality of data processing apparatuses, and a management apparatus, wherein the management apparatus manages the operation of a data providing service by the data providing apparatus, the data distribution apparatus, and the data processing apparatuses, generates signature data indicating that the related data is generated by an apparatus itself by using its own secret key data when a data processing apparatus supplies data to another apparatus, generates and manages public key certificate data of public key data corresponding to the secret key data of the data processing apparatuses for when another apparatus verifies the legitimacy of the related signature data by using the public key data corresponding to the secret key data, generates a public key certificate revocation list for specifying public key certificate data to be invalidated among the generated public key certificate data, and distributes the related public key certificate revocation list to the data providing apparatus, the data providing apparatus provides content data to the data distribution apparatus, the data distribution apparatus distributes the provided content data and the distributed public key certificate revocation list to the data processing apparatuses, and the data processing apparatuses verify whether or not public key certificate data of other data processing apparatuses are invalid based on the public key certificate revocation list distributed from the data distribution apparatus, and control the communication with other data processing apparatuses based on the result of the related verification.

Further, a data providing system of a 38th aspect of the invention has a data providing apparatus, data distribution apparatus, a plurality of data processing apparatuses, and a management apparatus, wherein a data processing apparatus supplies registration data, indicating an already registered data processing apparatus connected in a predetermined network to which is connected, to the management apparatus, refers to a revocation flag in registration data supplied from the management apparatus and restricts communication with another data processing apparatus having public key certificate data indicated as invalid by the revocation flag, the management apparatus manages the operation of a data providing service by the data providing apparatus, the data distribution apparatus, and the data processing apparatuses, generates and manages public key certificate data of public key data corresponding to the secret key data for when a data processing apparatus generates signature data indicating legitimacy of data using its own secret key data when supplying data to another apparatus, generates a public key certificate revocation list for specifying public key certificate data to be invalidated among the generated public key certificate data, stores the related public key certificate revocation list, generates new registration data by setting the revocation flag in the registration data supplied from data processing apparatuses based on the related public key certificate revocation list, and distributes the related generated registration data to the data processing apparatuses, the data providing apparatus provides content data to the data distribution apparatus, and the data distribution apparatus distributes the provided content data to the data processing apparatuses.

Further, a data providing system of a 39th aspect of the invention has a data providing apparatus, data distribution apparatus, a plurality of data processing apparatuses, and a management apparatus, wherein the management apparatus manages the operation of a data providing service by the data providing apparatus, the data distribution apparatus, and the data processing apparatuses, generates and manages public key certificate data of public key data corresponding to the secret key data for when a data processing apparatus generates signature data indicating the legitimacy of data by using its own secret key data when supplying the related data to another apparatus, generates a public key certificate revocation list for specifying public key certificate data to be invalidated among the generated public key certificate data, and distributes the related public key certificate revocation list to the data providing apparatus, the data providing apparatus provides content data and the public key certificate revocation list to the data distribution apparatus, the data distribution apparatus distributes the provided content data and the public key certificate revocation list to the data processing apparatuses, and a data processing apparatus sets a revocation flag in registration data indicating an already registered data processing apparatus connected in a predetermined network to which it is connected based on the distributed public key certificate revocation list and restricts communication with another data processing apparatus having public key certificate data indicated as invalid by the related revocation flag.

Further, a data providing system of a 40th aspect of the invention has a data providing apparatus, data distribution apparatus, a plurality of data processing apparatuses, and a management apparatus, wherein the management apparatus manages the operation of a data providing service by the data providing apparatus, the data distribution apparatus, and the data processing apparatuses, generates and manages public key certificate data of public key data corresponding to the secret key data for when a data processing apparatus generates signature data indicating the legitimacy of the data by using its own secret key data when supplying the related data to another apparatus, generates a public key certificate revocation list for specifying public key certificate data to be invalidated among the generated public key certificate data, and distributes the related public key certificate revocation list to the data distribution apparatus, the data providing apparatus provides content data to the data distribution apparatus, the data distribution apparatus distributes the provided content data and the public key certificate revocation list to the data processing apparatuses, and a data processing apparatus sets a revocation flag in registration data indicating an already registered data processing apparatus connected in a predetermined network to which it is connected based on the distributed public key certificate revocation list and restricts communication with another data processing apparatus having public key certificate data indicated as invalid by the related revocation flag.

Further, a data providing system of a 41st aspect of the invention is a data providing system comprising a data providing apparatus, data distribution apparatus, data processing apparatus, and management apparatus, wherein the data providing apparatus provides content data and usage control policy data indicating the handling of the related content data to the data distribution apparatus, the data distribution apparatus distributes the provided content data and the usage control policy data to the data processing apparatus, the data processing apparatus has a first module for communicating with the data distribution apparatus and a second module for determining at least one of a purchase mode and usage mode of the distributed content data based on the distributed usage control policy data and transmitting log data indicating the log of the related determined purchase mode and usage mode to the management apparatus, the management apparatus manages the data providing apparatus, data distribution apparatus, and data processing apparatus and has a settlement function for performing profit distribution processing for distributing the profit obtained accompanied with the data processing apparatus receiving distribution of the content data and purchasing and using the content data to related parties of the data providing apparatus and the data distribution apparatus based on the log data received from the second module and performing settlement based on the result of the related profit distribution processing and a right management function for registering the usage control policy data.

Further, a data providing system of a 42nd aspect of the invention is a data providing system comprising a data providing apparatus, data distribution apparatus, data processing apparatus, and management apparatus, wherein the data providing apparatus provides content data and usage control policy data indicating the handling of the related content data to the data distribution apparatus, the data distribution apparatus has a charging function for performing settlement processing by using settlement claim data distributed from the management apparatus and distributes the provided content data and the usage control policy data to the data processing apparatus, the data processing apparatus has a first module for communicating with the data distribution apparatus and a second module for determining at least one of a purchase mode and usage mode of the distributed content data based on the distributed usage control policy data and transmitting log data indicating the log of the related determined purchase mode and usage mode to the management apparatus, the management appa-ratus manages the data providing apparatus, data distribution apparatus, and data processing apparatus and has a settlement claim data creation function for performing profit distribution processing for distributing the profit obtained accompanied with the data processing apparatus receiving distribution of the content data and purchasing and using the content data to related parties of the data providing apparatus and the data distribution apparatus based on the log data received from the second module, creating settlement claim data used when performing settlement based on the result of the related profit distribution processing, and supplying the same to the data distribution apparatus and a right management function for registering the usage control policy data.

Further, a data providing system of a 43rd aspect of the invention is a data providing system comprising a data providing apparatus, data distribution apparatus, data processing apparatus, and management apparatus, wherein the data providing apparatus has a charging function for performing settlement processing by using settlement claim data distributed from the management apparatus and provides content data and usage control policy data indicating the handling of the related content data to the data distribution apparatus, the data distribution apparatus distributes the provided content data and the usage control policy data to the data processing apparatus, the data processing apparatus has a first module for communicating with the data distribution apparatus and a second module for determining at least one of a purchase mode and usage mode of the distributed content data based on the distributed usage control policy data and transmitting log data indicating the log of the related determined purchase mode and usage mode to the management apparatus, the management apparatus manages the data providing apparatus, data distribution apparatus, and data processing apparatus and has a settlement claim data creation function for performing profit distribution processing for distributing the profit obtained accompanied with the data processing apparatus receiving the distribution of the content data and purchasing and using the content data to related parties of the data providing apparatus and the data distribution apparatus based on the log data received from the second module, creating settlement claim data used when performing settlement based on the result of the related profit distribution processing, and distributing the same to the data providing apparatus and a right management function for registering the usage control policy data.

Further, a management apparatus of a 44th aspect of the invention is a management apparatus for managing a data providing apparatus for distributing content data and usage control policy data indicating the handling of the related content data and a data processing apparatus for determining at least one of a purchase mode and a usage mode of the distributed content data based on the distributed usage control policy data and creating log data indicating the log of at least one of the related determined purchase mode and usage mode and receives the log data from the data processing apparatus and performs profit distribution processing for distributing the profit obtained accompanied with the purchase and the usage of the content data in the data processing apparatus to related parties of the data providing apparatus based on the related received log data.

Further, a management apparatus of a 45th aspect of the invention is a management apparatus for managing a data providing apparatus for providing content data and usage control policy data indicating the handling of the related content data, a data distribution apparatus for distributing the provided content data and the usage control policy data, and a data processing apparatus for determining at least one of a purchase mode and usage mode of the distributed content data based on the distributed usage control policy data and creating log data indicating the log of at least one of the related determined purchase mode and usage mode and performs profit distribution processing for distributing the profit obtained accompanied with the data processing apparatus receiving the distribution of the content data and purchasing and using the content data to related parties of the data providing apparatus and the data distribution apparatus based on the received log data.

Further, a data processing apparatus of a 46th aspect of the invention is a data processing apparatus for receiving distribution of content data and usage control policy data indicating the handling of the related content data from a data providing apparatus and transmitting the log data to a management apparatus for performing profit distribution processing for distributing the profit obtained accompanied with the purchase and usage of the related distributed content data to related parties of the data providing apparatus based on the predetermined log data, determines at least one of a purchase mode and usage mode of the distributed content data based on the distributed usage control policy data, and transmits the log data indicating the log of the determined designation mode and usage mode to the management apparatus.

Further, a data processing apparatus of a 47th aspect of the invention is a data processing apparatus for receiving distribution of content data and usage control policy data from a data distribution apparatus receiving the provision of content data and usage control policy data indicating the handling of the related content data from a data providing apparatus and transmitting log data to a management apparatus for performing profit distribution processing for distributing the profit obtained accompanied with the purchase and usage of the distributed content data to related parties of the data providing apparatus and the data distribution apparatus based on predetermined log data and has a first module for communicating with the data distribution apparatus and a second module for determining at least one of a purchase mode and usage mode of the distributed content data based on the distributed usage control policy data and transmitting log data indicating the log of the related determined purchase mode and usage mode to the management apparatus.

Further, a data processing apparatus of a 48th aspect of the invention is a data processing apparatus for receiving the distribution of content data and usage control policy data indicating the handling of the related content data from a data providing apparatus via a data distribution apparatus and transmitting the log data to a management apparatus for performing profit distribution processing for distributing the profit obtained accompanied with the purchase and usage of the related distributed content data to related parties of the data providing apparatus and the data distribution apparatus based on the management apparatus use log data and has a first module for creating data distribution apparatus use purchase log data indicating the log of the purchase of the content data distributed from the data distribution apparatus and transmitting the same to the data distribution apparatus and a second module for determining at least one of a purchase mode and usage mode of the distributed content data based on the distributed usage control policy data and transmitting the management apparatus use log data indicating the log of the related determined purchase mode and usage mode to the management apparatus.

Further, a data providing method of a 49th aspect of the invention is a data providing method using a data providing apparatus, data processing apparatus, and management apparatus comprising the steps of distributing content data and usage control policy data indicating the handling of the related content data from the data providing apparatus to the data processing apparatus, having the data processing apparatus determine at least one of the purchase mode and the usage mode of the distributed content data based on the distributed usage control policy data and transmitting log data indicating the log of at least one of the related determined purchase mode and usage mode to the management apparatus, and having the management apparatus perform profit distribution processing for distributing the profit obtained accompanied with the purchase and the usage of the content data in the data processing apparatus to related parties of the data providing apparatus based on the received log data.

Further, a data providing method of a 50th aspect of the invention is a data providing method using a data providing apparatus, data distribution apparatus, data processing apparatus, and management apparatus comprising the steps of providing content data and usage control policy data indicating the handling of the related content data from the data providing apparatus to the data distribution apparatus, distributing the provided content data and the usage control policy data from the data distribution apparatus to the data processing apparatus, having the data processing apparatus determine at least one of the purchase mode and the usage mode of the distributed content data based on the distributed usage control policy data and transmitting log data indicating the log of the related determined purchase mode and usage mode to the management apparatus, and having the management apparatus perform profit distribution processing for distributing the profit obtained accompanied with the data processing apparatus receiving the distribution of the content data and purchasing and using the content data to related parties of the data providing apparatus and the data distribution apparatus based on the log data received from the second module.

Further, a data providing method of a 51st aspect of the invention is a data providing method using a data providing apparatus, data distribution apparatus, data processing apparatus, and management apparatus comprising the steps of providing content data and usage control policy data indicating the handling of the related content data from the data providing apparatus to the data distribution apparatus, distributing the content data and the usage control policy data provided from the data distribution apparatus to the data processing apparatus to the data processing apparatus, having the data processing apparatus generate data distribution apparatus use purchase log data indicating the log of the purchase of the content data distributed from the data distribution apparatus and transmitting the same to the data distribution apparatus, determine at least one of a purchase mode and usage mode of the distributed content data based on the distributed usage control policy data, and transmit management apparatus use log data indicating the log of the related determined purchase mode and usage mode to the management apparatus, having the management apparatus clear the profit obtained accompanied with the purchase and the usage of the content data in the data processing apparatus to related parties of the data providing apparatus and the data distribution apparatus based on the management apparatus use log data, and having the data distribution apparatus perform charging processing concerning the distribution of the content data based on the data distribution apparatus use purchase log data received from the data processing apparatus.

BRIEF DESCRIPTION OF THE DRAWINGS

FIG. 7A is a view for explaining a format of a right registration request use module transmitted from the content provider to the EMD service center, while

FIG. 18 is a view for explaining the data stored in an external memory shown in FIG. 16.

FIG. 19 is a view for explaining the data stored in a stack memory.

FIG. 38 is a flowchart of the processing of the second AV apparatus of the case shown in FIG. 37.

FIG. 39 is a flowchart continuing from the flowchart shown in FIG. 38.

FIG. 40 is a view of the flow of the data in the SAM of the source of transfer in the case shown in FIG. 36.

FIG. 41 is a view of the flow of the data in the SAM of the source of transfer in the case shown in FIG. 36.

FIG. 42 is a view for explaining the format of the data transferred by an in-band method and an out-of-band method among the content provider, EMD service center, and SAM shown in FIG. 1.

FIG. 43 is a view for explaining the mode of the data transferred by the in-band method and the out-of-band method among the content provider, EMD service center, and SAM shown in FIG. 1.

FIG. 51 is functional block diagram of the service provider shown in FIG. 49 and a view of the flow of the data transferred with the user home network.

FIG. 59 is a view for explaining the content of a usage log data.

FIG. 66 is a view for explaining the data stored in the storage unit shown in FIG. 65.

as shown in FIG. 72.

BEST MODE FOR WORKING THE INVENTION

Below, an explanation will be made of an EMD (electronic music distribution) system according to embodiments of the present invention.

In the present embodiment, the content data distributed to the user means digital data wherein the information per se has value such as music data, video data, and a program. The explanation will be made below by taking as an example music data.

FIRST EMBODIMENT

Figure 1:
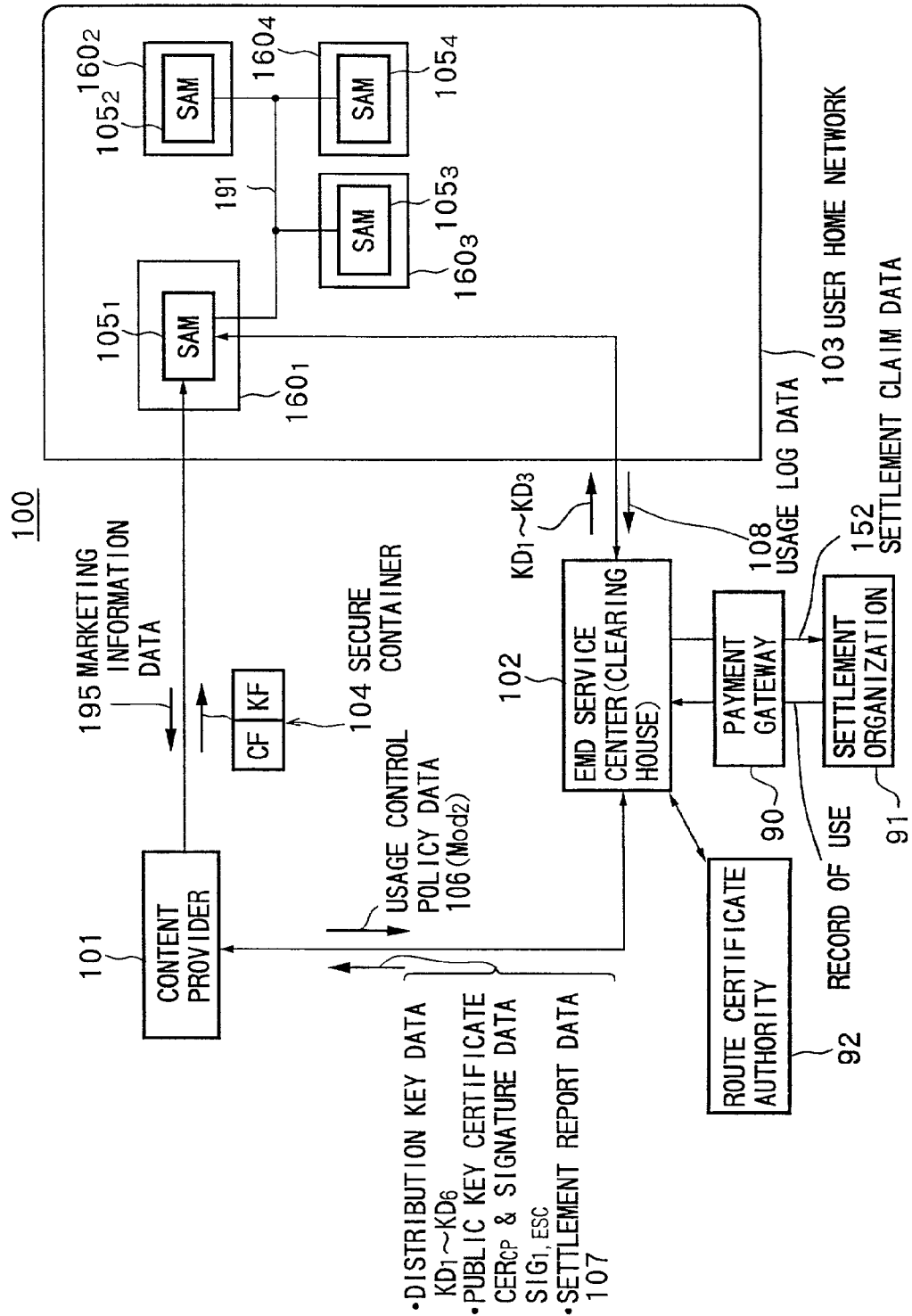
FIG. 1 is a view of the overall configuration of an EMD system of a first embodiment of the present invention.

FIG. 1 is a view of the configuration of an EMD system 100 of the present embodiment.

As shown in FIG. 1, the EMD system 100 has a content provider 101, an EMD service center (clearing house, below, also described as "ESC") 102, and a user home network 103.

Here, the content provider 101, EMD service center 102, and SAMs 105₁ to 105₄ correspond to the data providing apparatus, management apparatus, and data processing apparatuses of the present invention.

First, a brief explanation will be made of the EMD system 100.

In the EMD system 100, the content provider 101 transmits usage control policy (UCP) data 106 indicating the content of the right such as license conditions of content data C of the content which it is to provide to the EMD service center 102 as a high reliability authority manager. The usage control policy data 106 is authorized (certified) by the EMD service center 102.

Further, the content provider 101 encrypts the content data C by content key data Kc to generate a content file CF and, at the same time, encrypts the content key data Kc by distribution key data $KD_1$ to $KD5_8$ of a corresponding period distributed from the EMD service center 102. Then, the content provider 101 distributes a secure container (module of the present invention) 104 storing (encapsulating) the encrypted content key data Kc and content file CF and its own signature data to the user home network 103 by using a network such as the Internet, digital broadcasting, and storage medium.

In this way, in the present embodiment, by encapsulating and providing the digital content data C, the digital content which had been closely tied to a conventional storage medium is separated from the storage medium, thus value can be imparted to the digital content by itself.

Here, the "secure container" is the product capsule forming the most basic unit when selling the content data C (product) no matter which distribution route (distribution channel) it is provided through. Specifically, the secure container is a product capsule containing the encryption information for the charging, signature data for verifying the legitimacy of the content of the content data C, the legitimacy of the party preparing the content data, and the legitimacy of the distributor of the content data, and the information relating to the copyright such as the information concerning the electronic watermark information buried in the content data.

The user home network 103 has for example a network apparatus 160₁ and AV apparatuses 160₂ to 160₄.

The network apparatus 160₁ includes a SAM (secure application module) 105₁.

The AV apparatuses 160₂ to 160₄ include the SAMs 105₂ to 105₄. The SAMs 105₁ to 105₄ are connected to each other via a bus 191, for example, an IEEE (Institute of Electrical and Electronics Engineers) 1394 serial interface bus.

The SAMs 105₁ to 105₄ decrypt the secure container 104 received by the network apparatus 160₁ from the content provider 101 via the network or the like on-line and/or the secure container 104 received from the content provider 101 at the AV apparatuses 160₂ to 160₄ via storage media off-line by using the distribution key data $KD_1$ to $KD_3$ of the corresponding period and then verify the signature data.

The secure container 104 supplied to the SAMs 105₁ to 105₄ is reproduced or stored to a storage medium after the purchase and/or usage mode is determined in accordance with the operation of the user in the network apparatus 160₁ and the AV apparatuses 160₂ to 160₄.

The SAM 105₁ to 105₄ store logs of the purchase and/or usage of the secure container 104 mentioned above as usage log data 108.

The usage log data 108 is transmitted from the user home network 103 to the EMD service center 102 in response to for example a request from the EMD service center 102.

The EMD service center 102 determines (calculates) the charged content based on the usage log data 108 and performs settlement at a settlement organization 91 such as a bank via a payment gateway 90. By this, the money paid by a user of the user home network 103 to the settlement organization 91 is paid to the content provider 101 by the settlement processing by the EMD service center 102.

Further, the EMD service center 102 transmits a settlement report data 107 to the content provider 101 every predetermined period.

In the present embodiment, the EMD service center 102 has a certificate authority function, a key data management function, and a right clearing (profit distribution) function.

Namely, the EMD service center 102 plays the role as a second certificate authority with respect to a route certificate authority 92 constituting the highest authority manager at a neutral position (located below the route certificate authority 92) and certifies the legitimacy of the related public key data by attaching a signature using the secret key data of the EMD service center 102 to public key certificate data of public key data used for the verification processing of the signature data in the content provider 101 and the SAMs 105₁ to 105₄. Further, as mentioned before, one of the certificate authority functions of the EMD service center 102 is for the EMD service center 102 to register and authorize the usage control policy data 106 of the content provider 101.

Further, the EMD service center 102 has a key data management function for managing the key data, for example, the distribution key data $KD_1$ to $KD_6$.

Further, the EMD service center 102 has a right clearing (profit distribution) function of performing settlement with respect to the purchase and/or usage of content by a user based on a suggested retailer's price (SRP) described in the authorized usage control policy data 106 and the usage log data 108 input from the SAMs 105₁ to 105₄ and distributing the money paid by the user to the content provider 101.

Below, a detailed explanation will be made of components of the content provider 101.

[Content Provider 101]

Figure 2:
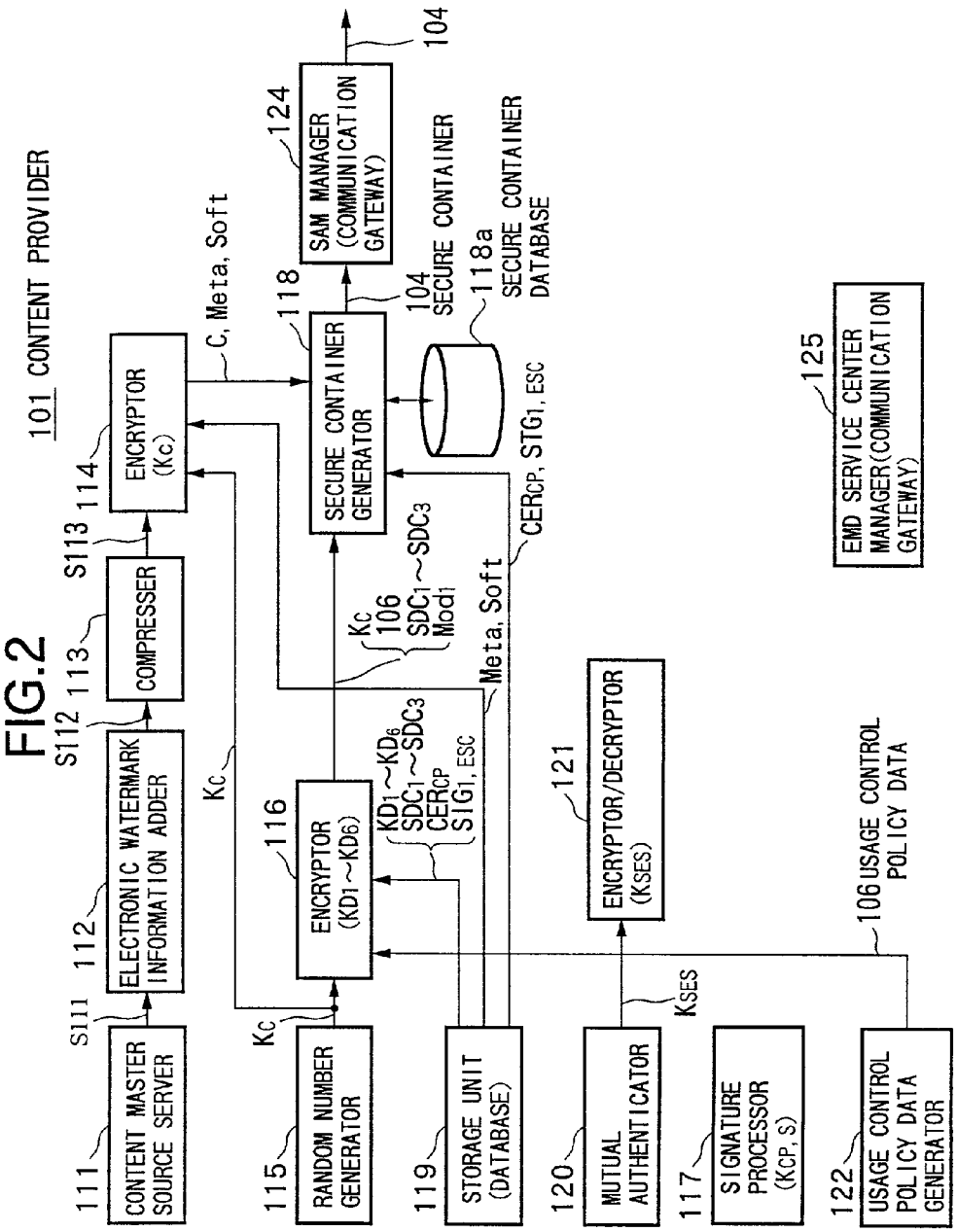
FIG. 2 is a functional block diagram of a content provider shown in FIG. 1 and a view of the flow of data concerning data transferred with a SAM of a user home network.

FIG. 2 is a functional block diagram of the content provider 101 and shows the flow of the data related to the data transferred with the SAMs 105₁ to 105₄ of the user home network 103.

Figure 3:
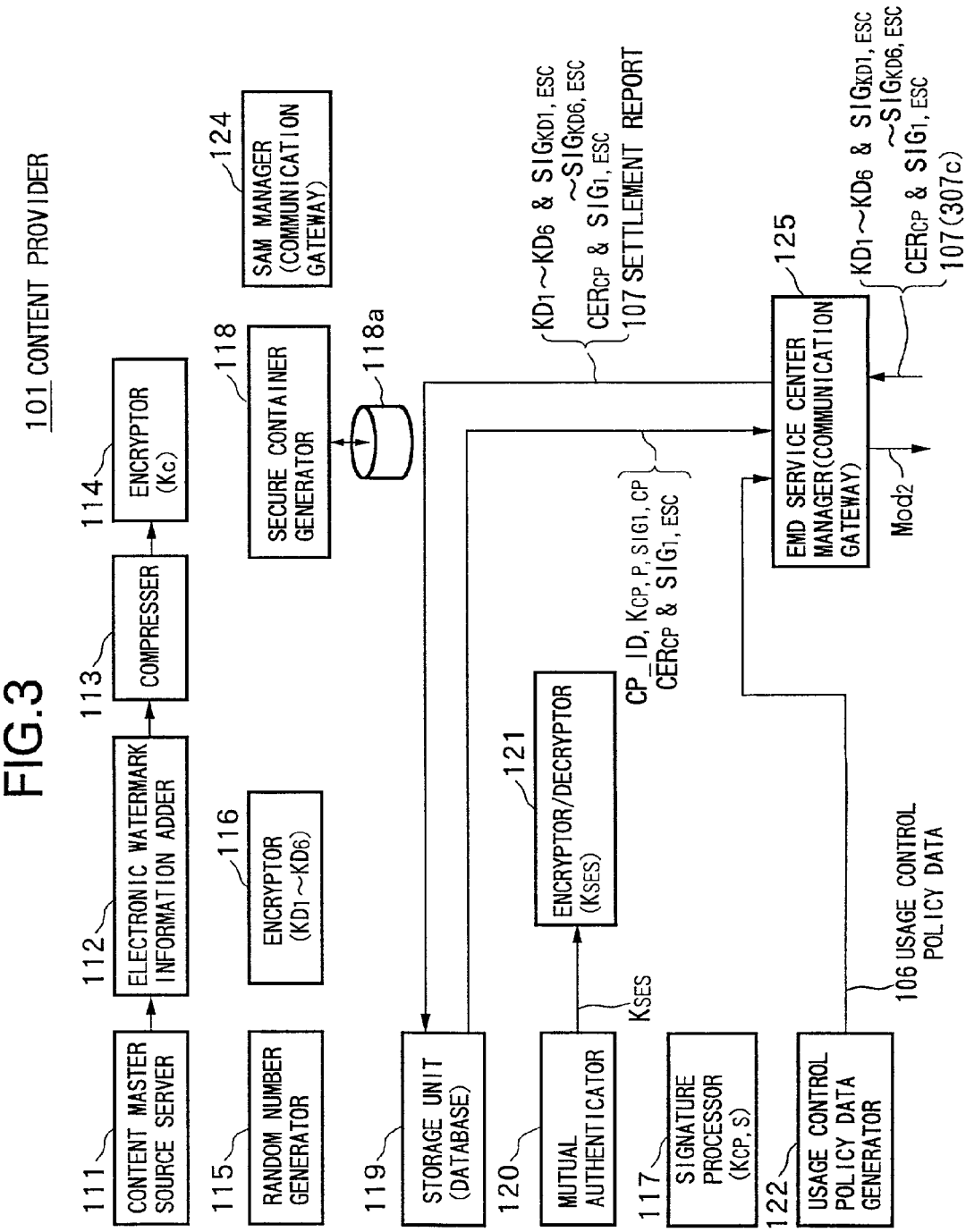
FIG. 3 is a functional block diagram of the content provider shown in FIG. 1 and a view of the flow of the data concerning the data transferred between the content provider and an EMD service center.

Further, in FIG. 3, the flow of the data related to the data transferred between the content provider 101 and the EMD service center 102 is shown.

Note that, in the figures starting from FIG. 3, the flow of the data input and output to and from the signature data processor and the encryptor/decryptor using session key data $K_{SES}$ is omitted.

As shown in FIG. 2 and FIG. 3, the content provider 101 has a content master source server 111, an electronic watermark information adder 112, a compressor 113, an encryptor 114, a random number generator 115, an encryptor 116, a signature processor 117, a secure container generator 118, a secure container database 118a, a storage unit 119, a mutual authenticator 120, an encryptor/decryptor 121, a usage control policy data generator 122, a SAM manager 124, and an EMD service center manager 125.

The content provider 101 registers for example public key data generated by itself and its own ID card and bank account number (account number for settlement) in the EMD service center 102 off-line before communicating with the EMD service center 102 and acquires its own identifier (identification number) CP_ID. Further, the content provider 101 receives public key data of the EMD service center 102 and public key data of the route certificate authority 92 from the EMD service center 102.

Below, an explanation will be made of functional blocks of the content provider 101 shown in FIG. 2 and FIG. 3.

The content master server 111 stores the content data of the master source of content to be provided to the user home network 103 and outputs content data S111 to be provided to the electronic watermark information adder 112.

The electronic watermark information adder 112 buries a source watermark Ws, a copy control watermark Wc, a user watermark Wu, etc. in the content data S111 to generate content data S112 and outputs the content data S112 to the compressor 113.

The source watermark Ws is information concerning the copyright such as the name of the owner of the copyright of the content data, ISRC code, authoring date, authoring apparatus ID (identification data), and destination of the distribution of the content. The copy control watermark Wc is information containing a copy prohibit bit for preventing copying through an analog interface. The user watermark Wu contains for example the identifier CP_ID of the content provider 101 for specifying a source of distribution and a destination of distribution of the secure container 104 and identifiers $SAM\_ID_1$ to $SAM\_ID_4$ of the SAMs $105_1$ to $105_4$ of the user home network 103.

Further, the electronic watermark information adder 112 buries the link use ID for searching of the content data by a search engine as electronic watermark information in the content data S111 if necessary.

In the present embodiment, preferably the information content and the burial position of each electronic watermark information are defined as the electronic watermark information management data. The electronic watermark information management data is managed in the EMD service center 102. The electronic watermark information management data is used when for example the network apparatus 160, and the AV apparatuses $160_2$ to $160_4$ in the user home network 103 verify the legitimacy of the electronic watermark information.

For example, in the user home network 103, based on the electronic watermark information management data, the burying of a false electronic watermark information can be detected with a high probability by deciding that the electronic watermark information is legitimate when both of the burial position of the electronic watermark information and the content of the buried electronic watermark information coincide.

The compressor 113 compresses the content data S112 by an audio compression method such as ATRAC3 (Adaptive Transform Acoustic Coding 3) (trademark) and outputs compressed content data S113 to the encryptor 114.

The encryptor 114 uses the content key data Kc as a common key, encrypts the content data S113 by a common key encryption method such as DES (Data Encryption Standard) or Triple DES to generate the content data C and outputs this to the secure container generator 118.

Further, the encryptor 114 encrypts A/V decompression software Soft and meta-data Meta by using the content key data Kc as the common key, then outputs the same to the secure container generator 117.

DES is an encryption method for processing 64 bits of a plain text as a block by using a 56-bit common key. The DES processing is comprised by a portion for scrambling the plain text to transform the same to encrypted text (data scrambler) and a portion for creating key (magnification key) data used in the data scrambler from the common key data (key processor). All algorithms of DES are disclosed, so the fundamental processing of the data scrambler will be briefly explained here.

First, 64 bits of the plain text are divided into an upper significant 32-bit $H_0$ and a lower significant 32-bit $L_0$. Using as input the 48-bit magnification key data $K_1$ supplied from the key processor and the lower significant 32-bit $L_0$, the output of an F function obtained by scrambling the lower significant 32-bit $L_0$ is calculated. The F function is comprised by two types of basic transformations of "substitution" for replacing the numerals by a predetermined rule and "transposition" for switching the bit positions by a predetermined rule. Next, an exclusive OR of the upper significant 32-bit $H_0$ and the output of the F function is calculated, and the result thereof is made $L_1$. Further, $L_0$ is made $H_1$.

Then, based on the upper significant 32-bit $H_0$ and the lower significant 32-bit $L_0$, the above processing is repeated 16 times. The thus obtained upper significant 32-bit $H_{18}$ and lower significant 32-bit $L_{18}$ are output as the encrypted text. The decryption is realized by performing the above procedure in the reverse direction by using the common key data used in the encryption.

The random number generator 115 generates a random number of predetermined number of bits and outputs the related random number as the content key data Kc to the encryptor 114 and the encryptor 116.

Note that it is also possible to generate the content key data Kc from the information concerning the music provided by the content data. The content key data Kc is updated for example every predetermined time.

The encryptor 116 receives as its inputs the distribution key data $KD_1$ to $KD_6$ of the corresponding period among the distribution key data $KD_1$ to $KD_6$ received from the EMD service center 102 and stored in the storage unit 119 as will be mentioned later, encrypts the content key data Kc, usage control policy data 106, SAM program download containers $SDC_1$ to $SDC_3$, and a signature certificate module $Mod_1$ shown in FIG. 4B by the DES or other common encryption method using the related distribution key data as a common key, then outputs them to the secure container generator 117.

In the signature certificate module $Mod_1$, as shown in FIG. 4B, signature data $SIG_{2,CP}$ to $SIG_{4,CP}$, a public key certificate $CER_{CP}$ of public key data $K_{CP,P}$ of the content provider 101 and signature data $SIG_{1,ESC}$ of the EMD service center 102 with respect to the related certificate $CER_{CP}$ are stored.

Further, the SAM program download containers $SDC_1$ to $SDC_3$ store download drivers used when downloading programs in the SAMs $105_1$ to $105_4$, a UCP-L (Label) R (Reader) indicating the syntax (grammar) of a usage control policy data (UCP) U106, and lock key data for locking or unlocking rewrite and erase operations of the storage units (flash ROMs) built in the SAMs $105_1$ to $105_4$ in units of blocks.

Note that the storage unit 119 is provided with various databases, for example, a database for storing public key certificate data, a database for storing distribution use data $KD_1$ to $KD_6$, and a database for storing the key file KF.

The signature processor 117 takes a hush value of the data to be signed and generates the signature data SIG thereof by using the secret key data $K_{CP,S}$ of the content provider 101.

Note that the "hush value" is generated by using the hush function. The hush function is a function for receiving as the input the data covered, compressing the related input data to data having a predetermined bit length, and outputting the same as a hush value. The hush function is characterized in that it is difficult to predict the input from the hush value (output), many bits of the hush value change when one bit of the data input to the hush function changes, and it is difficult to find input data having an identical hush value.

The secure container generator 118, as shown in FIG. 4A, generates the content file CF storing header data and the content data C, A/V decompression software Soft, and meta-data Meta input from the encryptor 114 and encrypted by the content key data Kc.

Here, the A/V decompression software Soft is the software used when decompressing the content file CF in the network apparatus 160, and the AV apparatuses $160_2$ to $160_4$ in the user home network 103 and is for example an ATRAC3 type decompression software.

Further, the secure container generator 118 generates a key file KF storing, as shown in FIG. 4B, the content key data Kc, usage control policy data (UCP) 106, SAM program download containers $SDC_1$ to $SDC_3$, and the signature certificate module $Mod_1$ encrypted by the distribution key data $KD_1$ to $KD_6$ of the corresponding period input from the encryptor 116.

Then, the secure container generator 118 generates a secure container 104 storing the content file CF and the key file KF shown in FIGS. 4A and 4B and the public key data $K_{CP}$ and the signature data $SIG_{1,ESC}$ of the content provider 101 shown in FIG. 4C, stores this in a secure container database 118a, and then outputs the same to the SAM manager 124 in response to a request from the user.

In this way, in the present embodiment, an in-band method storing the public key certificate $CER_{CP}$ of the public key data $K_{CP,P}$ of the content provider 101 in a secure container 104 and transmitting it to the user home network 103 is employed. Accordingly, it is not necessary for the user home network 103 to communicate with the EMD service center 102 for obtaining the public key certificate $CER_{CP}$.

Note that, in the present invention, it is also possible to employ an out-of-band method where the user home network 103 obtains the public key certificate $CER_{CP}$ from the EMD service center 102 without storing the public key certificate $CER_{CP}$ in the secure container 104.

The mutual authenticator 120 generates session key data (common key) $K_{SES}$ by mutual authentication between the EMD service center 102 and the user home network 103 when the content provider 101 transfer data on-line between the EMD service center 102 and the user home network 103. The session key data $K_{SES}$ is newly generated at each mutual authentication.

The encryptor/decryptor 121 encrypts the data to be transmitted by the content provider 101 to the EMD service center 102 and the user home network 103 on-line by using the session key data $K_{SES}$.

Further, the encryptor/decryptor 121 decrypts the data received by the content provider 101 from the EMD service center 102 and the user home network 103 on-line by using the session key data $K_{SES}$.

The usage control policy data generator 122 generates the usage control policy data 106 and outputs this to the encryptor 116.

The usage control policy data 106 is a descriptor defining the operation rules of the content data C and describes for example the suggested retailer's price SRP intended by the operator of the content provider 101 and the copying rules of the content data C therein.

The SAM manager 124 supplies the secure container 104 to the user home network 103 off-line and/or on-line.

The SAM manager 124 encrypts the secure container 104 by using the distribution key data $KD_1$ to $KD_6$ etc. and stores the same on a storage medium when distributing the secure container 104 to the user home network 103 off-line by using a ROM type storage medium such as a CD-ROM or DVD (digital versatile disc). Then, this storage medium is supplied to the user home network 103 off-line by sale or the like.

Figure 5:
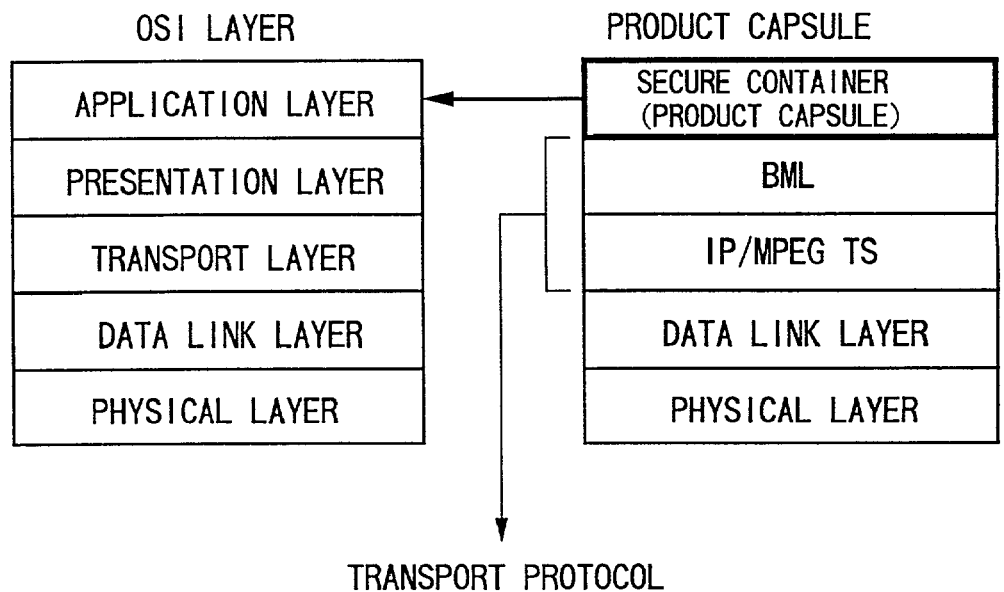
FIG. 5 is a view for explaining a correspondence between an OSI layer and a definition of the secure container of the present embodiment.

In the present embodiment, the secure container (product capsule) 104 is defined by the application layer in the OSI layer as shown in FIG. 5. Further, capsules corresponding to the presentation layer and the transport layer are separately defined from the secure container 104 as transport protocol for transporting the secure container. Accordingly, the secure container 104 can be defined without depending on the transport protocol. Namely, no matter what the mode, that is, on-line or off-line, of supplying the secure container 104 to the user home network 103, the container can be defined and generated according to a common rule.

For example, when supplying the secure container 104 by using the network, the secure container 104 is defined in a region of the content provider 101, and the presentation layer and the transport layer are considered as transport tools for transporting the secure container 104 to the user home network 103.

Further, in the off-line case, a ROM type storage medium is considered as a transport carrier for transporting the secure container 104 to the user home network 103.

Figure 6:
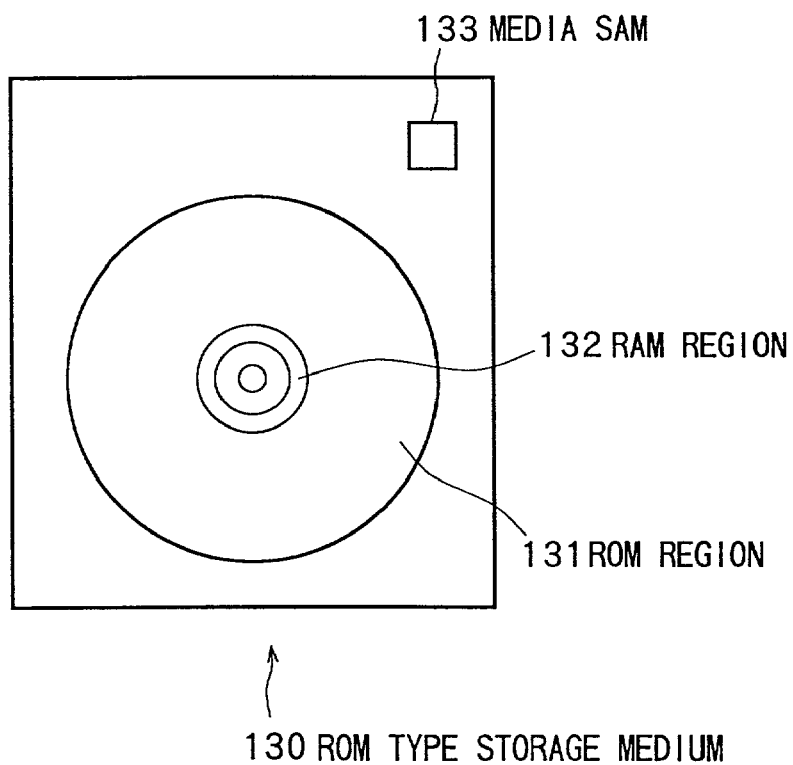
FIG. 6 is a view for explaining a ROM type storage medium.

FIG. 6 is a view for explaining a storage medium 130.

As shown in FIG. 6, each of the ROM type storage media 130 has a ROM region 131, a RAM region 132, and a media SAM 133.

The ROM region 131 stores the content file CF shown in FIG. 4A.

Further, the RAM region 132 stores signature data generated by using a MAC (message authentication code) function using as arguments the key file KF and public key certificate data $CER_{CP}$ shown in FIG. 4B and FIG. 4C and storage key data $K_{STR}$ having an inherent value in accordance with the type of the apparatus and data obtained by encrypting the related key file KF and public key certificate data $CER_{CP}$ by using media key data $K_{MED}$ having a value inherent in the storage media.

Further, the RAM region 132 stores a public key certificate revocation list for specifying the content provider 101 and SAMs $105_1$ to $105_5$ which became invalid due to for example an illegal action.

Further, the RAM region 132, as will be mentioned later, stores usage control status (UCS) data 166 generated when the purchase and/or usage mode of the content data C are determined in the SAMs $105_1$ to $105_4$ of the user home network 103 etc. By this, by the storage of the usage control status data 166 in the RAM region 132, the ROM type storage medium 130 having the purchase and/or usage mode determined therein is obtained.

The media SAM 133, for example, stores the media ID as the identifier of the ROM type storage medium 130 and the media key data $K_{MED}$.

The media SAM 133 has for example a mutual authentication function.

Further, the SAM manager 124 encrypts the secure container 104 in the encryptor/decryptor 121 by using the session key data $K_{SES}$ and then distributes the same via the network to the user home network 103 when distributing the secure container 104 to the user home network 103 on-line by using a network, digital broadcast, or the like.

In the present embodiment, as the SAM manager, EMD service center manager, and a content provider manager and a service provider manager mentioned later, use is made of for example a communication gateway having a tamper resistant structure making it difficult to monitor and tamper the internal processing content.

Here, for the distribution of the content data C from the content provider 101 to the user home network 103, use is made of the secure container 104 of the common mode storing the usage control policy data 106 in both of the case of distribution using a storage medium 130 as mentioned above and the case of distribution on-line by using a network. Accordingly, in the SAMs $105_1$ to $105_4$ of the user home network 103, in both of the off-line and on-line cases, right clearing based on the common usage control policy data 106 is possible.

Further, as mentioned above, in the present embodiment, the in-band method of enclosing the content data C encrypted by the content key data Kc and the content key data Kc for decrypting the related encryption in the secure container 104 is employed. In the in-band method, there is the advantage that it is not necessary to separately distribute the content key data Kc and the load of network communication can be reduced when it is desired to reproduce the content data C at an apparatus of the user home network 103. Further, the content key data Kc is encrypted by the distribution key data $KD_1$ to $KD_6$, but the distribution use public key data $KD_1$ to $KD_6$ are managed by the EMD service center 102 and have been distributed to the SAMs $105_1$ to $105_5$ of the user home network 103 in advance (when the SAMs $105_1$ to $105_4$ access to the EMD service center 102 the first time), therefore, in the user home network 103, the usage of the content data C off-line becomes possible without connecting with the EMD service center 102 on-line.

Note that, the present invention has the flexibility of enabling use of the out-of-band method of separately supplying the content data C and the content key data Kc to the user home network 103.

When receiving six months' worth of the distribution key data $KD_1$ to $KD_6$ and the corresponding signature data $SIG_{KD1,ESC}$ to $SIG_{KD6,ESC}$, the public key certificate $CER_{CP}$ containing the public key data $K_{CP,P}$ of the content provider 101 and the signature data $SIG_{1,ESC}$ thereof, and the settlement report data 107 from the EMD service center 102, the EMD service center manager 125 decrypts them in the encryptor/decryptor 121 by using the session key data $K_{SES}$, and then stores them in the storage unit 119.

The settlement report data 107 describes, for example, the content of the settlement concerning the content provider 101 performed with respect to the settlement organization 91 shown in FIG. 1 by the EMD service center 102.

Further, the EMD service center manager 125 transmits a global unique identifier Content_ID of the content data C to be provided, the public key data $K_{CP,P}$, and their signature data $SIG_{8,CP}$ to the EMD service center 102 and receives as its input public key certificate data $CER_{CP}$ of public key data $K_{CP,P}$ from the EMD service center 102.

Figure 7A:
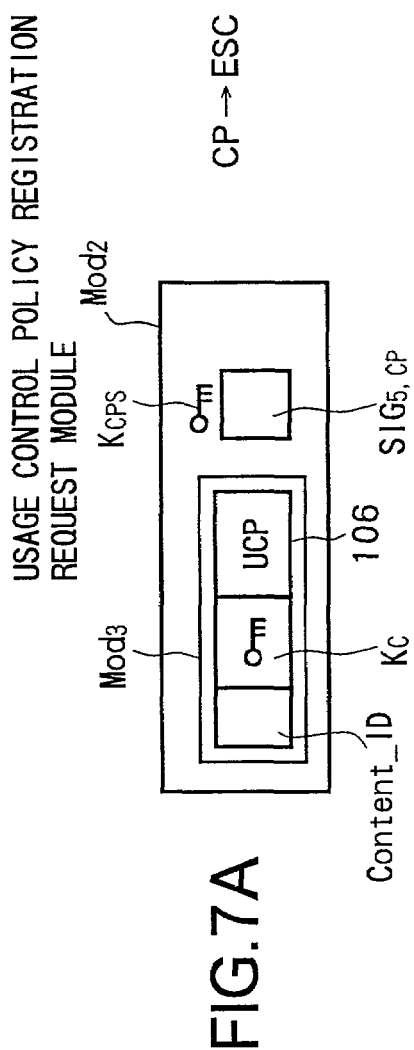

Further, the EMD service center manager 125 generates a module $Mod_3$ storing the global unique identifier Content_ID of the content data C to be provided, the content key data Kc, and the usage control policy data 106 therein and a usage control policy registration request use module $Mod_2$ storing signature data $SIG_{5,CP}$ thereof as shown in FIG. 7A when registering the usage control policy data 106 in the EMD service center 102, encrypts them in the encryptor/decryptor 121 by using the session key data $K_{SES}$, and then transmits the same via the network to the EMD service center 102. As the EMD service center manager 125, as mentioned before, use is made of for example a communication gateway having the tamper resistant structure making it difficult to monitor and tamper with the internal processing content.

Below, an explanation will be made of the flow of the processing in the content provider 101 by referring to FIG. 2 and FIG. 3.

Note that, as a prerequisite of the following processing, a related party of the content provider 101 performs processing for registration at the EMD service center 102 off-line by using for example its own ID card and bank account for the settlement processing and obtains a global unique identifier CP_ID. The global unique identifier CP_ID is stored in the storage unit 119.

Below, an explanation will be made of the processing when the content provider 101 requests public key certificate data $CER_{CP}$ for certifying the legitimacy of the public key data $K_{CP,S}$ corresponding to its own secret key data $K_{CP,S}$ to the EMD service center 102 by referring to FIG. 3 and FIG. 8.

Figure 8:
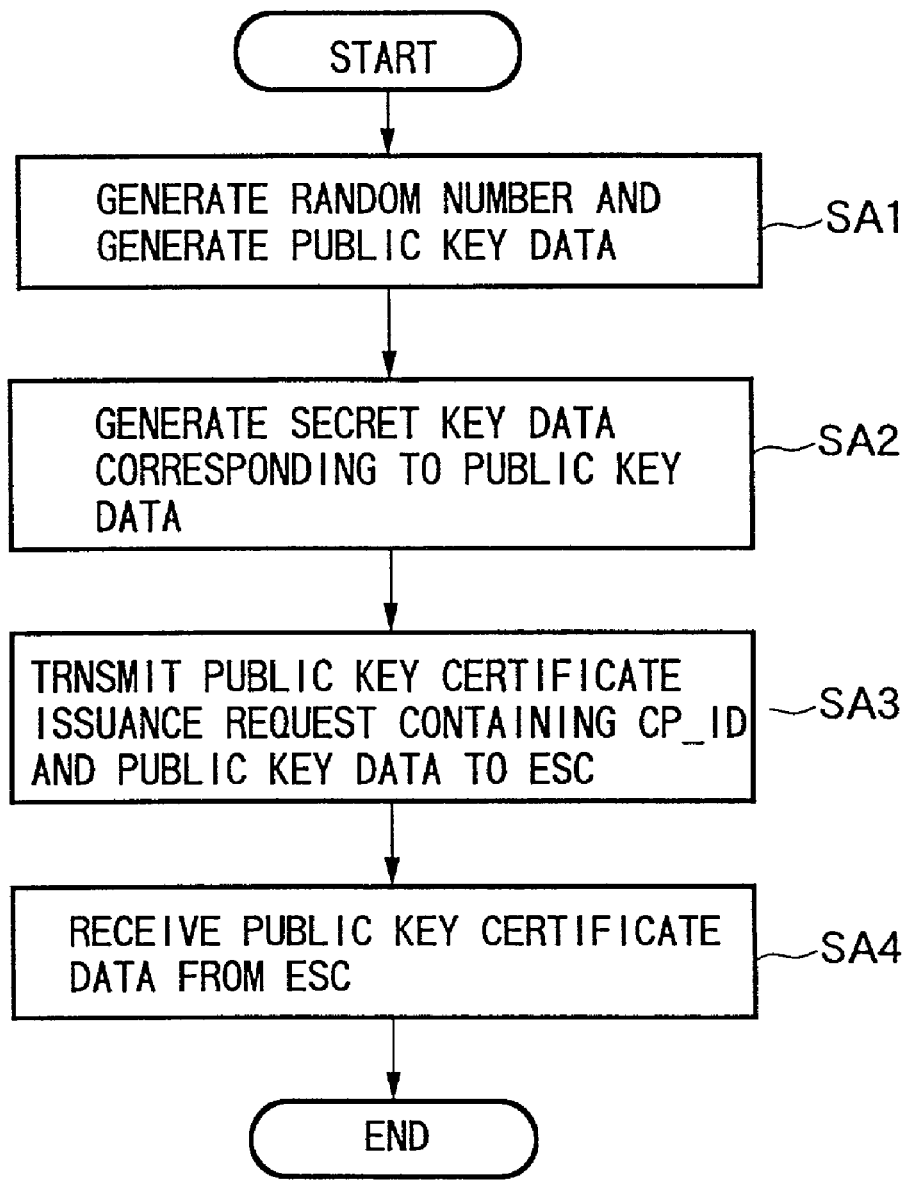
FIG. 8 is a flowchart of processing where the content provider requests public key certificate data for certifying legitimacy of public key data corresponding to its own secret key data to the EMD service center in the first embodiment.

FIG. 8 is a flowchart of the related processing.

Step SA1: The content provider 101 generates a random number by using a random number generator 115 configured by for example a true random number generator and generates the secret key data $K_{CP,S}$.

Step SA2: The content provider 101 generates public key data $K_{CP,P}$ corresponding to the secret key data $K_{CP,S}$ and stores the same in the storage unit 119.

Step SA3: The EMD service center manager 125 of the content provider 101 reads the identifier CP_ID of the content provider 101 and the public key data $K_{CP,P}$ from the storage unit 119.

Then, the EMD service center manager 125 transmits a public key certificate data issuance request containing the identifier CP_ID and the public key data $K_{CP,P}$ to the EMD service center 102.

Step SA4: The EMD service center manager 125 receives as its inputs the public key certificate data $CER_{CP}$ and signature data $SIG_{1,ESC}$ thereof from the EMD service center 102 in response to the related issuance request and writes the same into the storage unit 119.

Below, an explanation will be made of the processing for receiving the distribution key data from the EMD service center 102 by the content provider 101 by referring to FIG. 3.

Note that, as the prerequisite for the following processing, the content provider 101 must have already obtained the public key certificate data $CER_{CP}$ from the EMD service center 102.

The EMD service center manager 125 receives as its inputs six months' worth of the distribution key data $KD_1$ to $KD_3$ and their signature data $SIG_{KD1,ESC}$ to $SIG_{KD6,ESC}$ thereof from the EMD service center 102 and stores them in a predetermined database in the storage unit 119.

Then, in the signature processor 117, after the legitimacy of the signature data $SIG_{KD1,ESC}$ to $SIG_{KD6,ESC}$ stored in the storage unit 119 is confirmed, the distribution key data $KD_1$ to $KD_6$ stored in the storage unit 119 are handled as valid data.

Below, an explanation will be made of the processing when the content provider 101 transmits the secure container 104 to the SAM $105_1$ of the user home network 103 referring to FIG. 2 and FIG. 9.

Figure 9:
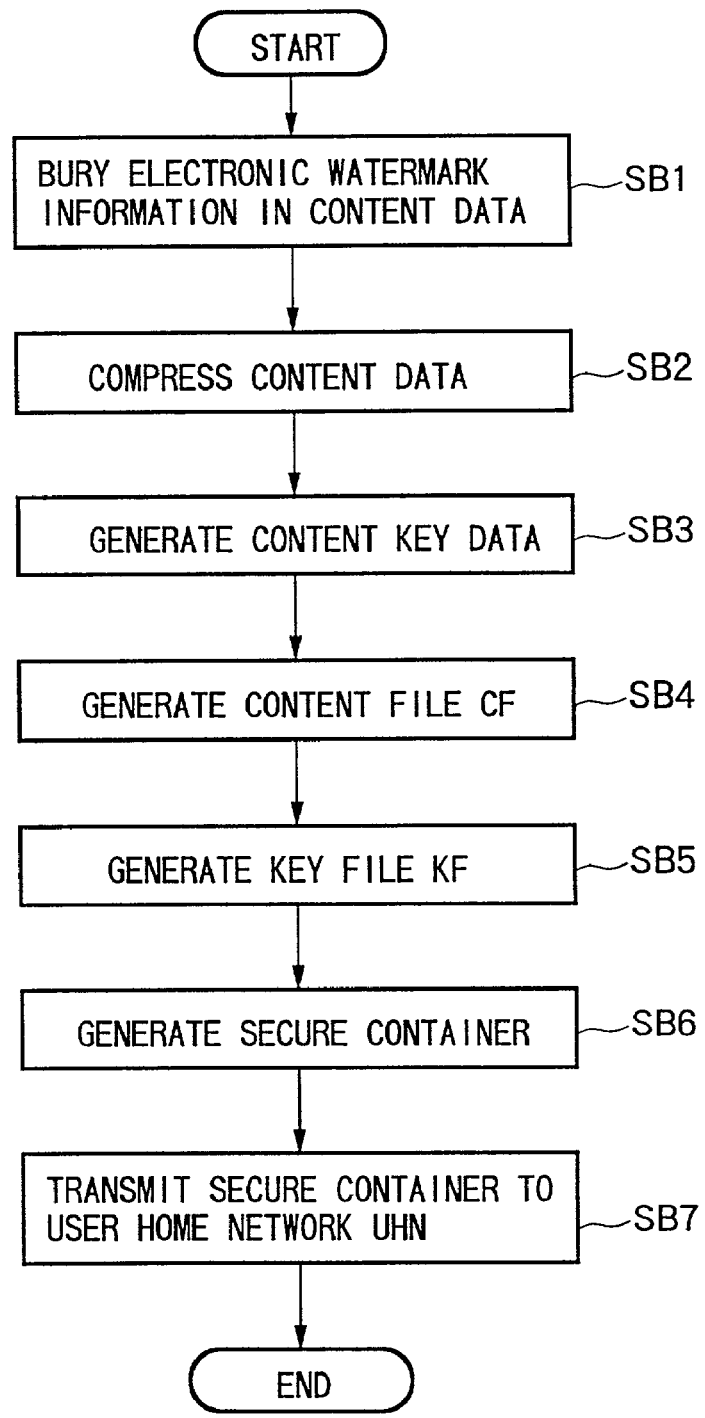
FIG. 9 is a flowchart of processing where the content provider transmits a secure container to a SAM of the user home network in the first embodiment.

FIG. 9 is a flowchart of the related processing.

Note that, in the following example, the case of transmitting the secure container 104 from the content provider 101 to the SAM $105_1$ is illustrated, but the same applies also to the case of transmitting the secure container 104 to the SAMs 105$_2$ to 105$_4$ except it is transmitted to the SAMs 105$_2$ to 105$_4$ via the SAM 105$_1$.

Step SB1: Content data S111 is read from the content master source server 111 and output to the electronic watermark information adder 112.

The electronic watermark information adder 112 buries the electronic watermark information in the content data S111 to generate content data S112 and outputs this to the compressor 113.

Step SB2: The compressor 113 compresses the content data S112 by for example the ATRAC3 method to generate content data S113 and outputs this to the encryptor 114.

Step SB3: The random number generator 115 generates a random number to generate the content key data Kc and outputs this to the encryptor 114.

Step SB4: The encryptor 114 encrypts the content data S113 and the meta-data Meta and A/V decompression software Soft read from the storage unit 119 by using the content key data Kc and outputs the same to the secure container generator 118. In this case, the meta-data Meta does not have to be encrypted.

Then, the secure container generator 118 generates the content file CF shown in FIG. 4A. Also, in the signature processor 117, the hush value of the content file CF is taken, and the signature data SIG$_{8,CP}$ is generated by using the secret key data K$_{CP, S}$.

Step SB5: The signature processor 117 takes the hush value with respect to each of the content data C, content key data Kc, and the usage control policy data 106 and generates the signature data SIG$_{2,CP}$, SIG$_{3,CP}$, and SIG$_{4,CP}$ indicating the legitimacy of the creator (provider) of the data by using the secret key data K$_{CP,S}$.

Further, the encryptor 116 encrypts the content key data Kc, usage control policy data 106, SAM program download containers SD$_1$ to SD$_3$, and signature certificate module Mod$_1$ shown in FIG. 4B by the distribution key data KD$_1$ to KD$_3$ of the corresponding period and outputs the same to the secure container generator 118.

Then, the secure container generator 118 generates the key file KF shown in FIG. 4B.

Further, the signature processor 117 takes the hush value of the key file KF and generates the signature data SIG$_{7,CP}$ by using the secret key data K$_{CP,S}$.

Step SB6: The secure container generator 118 generates the secure container 104 storing the content file CF and the signature data SIG$_{8,CP}$ thereof shown in FIG. 4A, the key file KF and the signature data SIG$_{7,CP}$ thereof shown in FIG. 4B, and the public key certificate data CER$_{CP}$ and the signature data SIG$_{1,ESC}$ thereof shown in FIG. 4C therein and stores this in the secure container database 118$a$.

Step SB7: The secure container generator 118 reads the secure container 104 to be provided to the user home network 103 in response to for example a request from the user from the secure container database 118$a$, encrypts the same in the encryptor/decryptor 121 by using the session key data K$_{SES}$ obtained by the mutual authentication between the mutual authenticator 120 and the SAM 105$_1$, and then transmits the same to the SAM 105$_1$ of the user home network 103 via the SAM manager 124.

Below, an explanation will be made of the processing in the case where the content provider 101 requests to the EMD service center 102 to register and authorize the usage control policy data 106 and the content key data Kc by referring to FIG. 3.

The processing for requesting authorization of the usage control policy data 106 and the content key data Kc is carried out for every content data C.

In this case, the signature processor 117 finds the hush value of the module Mod$_3$ comprised by the global unique identifier Content_ID of the content data C and the content key data Kc read from the storage unit 119 and the usage control policy data 106 input from the usage control policy data generator 122 and generates the signature data SIG$_{5,CP}$ by using the secret key data K$_{CP,S}$.

Then, it encrypts the right registration request use module Mod$_2$ shown in FIG. 7A in the encryptor/decryptor 121 by using the session key data K$_{SES}$ obtained by the mutual authentication between the mutual authenticator 120 and the EMD service center 102, then transmits it from the EMD service center manager 125 to the EMD service center 102.

In the present embodiment, the case where the content provider 101 does not receive the authorization certificate module certifying that the content provider 101 is authorized from the EMD service center 102 after the EMD service center 102 authorizes the usage control policy data 106 and the content key data Kc, that is, the case where the encryption is carried out in the content provider 101 by using the distribution key data KD$_1$ to KD$_6$ to generate the key file KF, is illustrated.

Figure 7B:
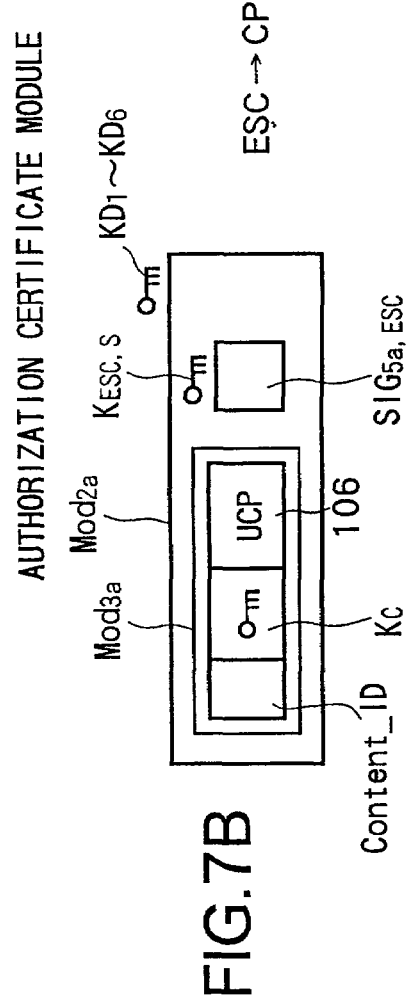
FIG. 7B is a view for explaining an authorization certificate module transmitted from the EMD service center to the content provider.

Note that in the present invention, it is also possible to transmit an authorization certificate module Mod$_{2a}$ shown in FIG. 7B encrypted by using the distribution key data KD$_1$ to KD$_6$ from the EMD service center 102 to the content provider 101 after authorization of the usage control policy data 106 and the content key data Kc in the EMD service center 102.

The authorization certificate module Mod$_{2a}$ stores a module Mod$_{3a}$ storing the global unique identifier Content_ID of the content data C, content key data Kc, and the usage control policy data 106 input from the usage control policy data generator 122 and signature data SIG$_{5a,ESC}$ of the module Mod$_{3a}$ using the secret key data K$_{ESC,S}$.

In this case, the content provider 101 stores the authorization certificate module Mod$_{2a}$ in for example the secure container 104 and distributes the same to the SAMs 105$_1$ to 105$_4$.

Note that, it is also possible that the EMD service center 102 generate six months' worth of the authorization certificate module Mod$_{2a}$ encrypted by using the distribution key data KD$_1$ to KD$_6$ corresponding to different months and transmit them to the content provider 101 together.

[EMD Service Center 102]

The EMD service center 102 has a certificate authority (CA) function, a key management function, and a right clearing (profit distribution) function.

Figure 10:
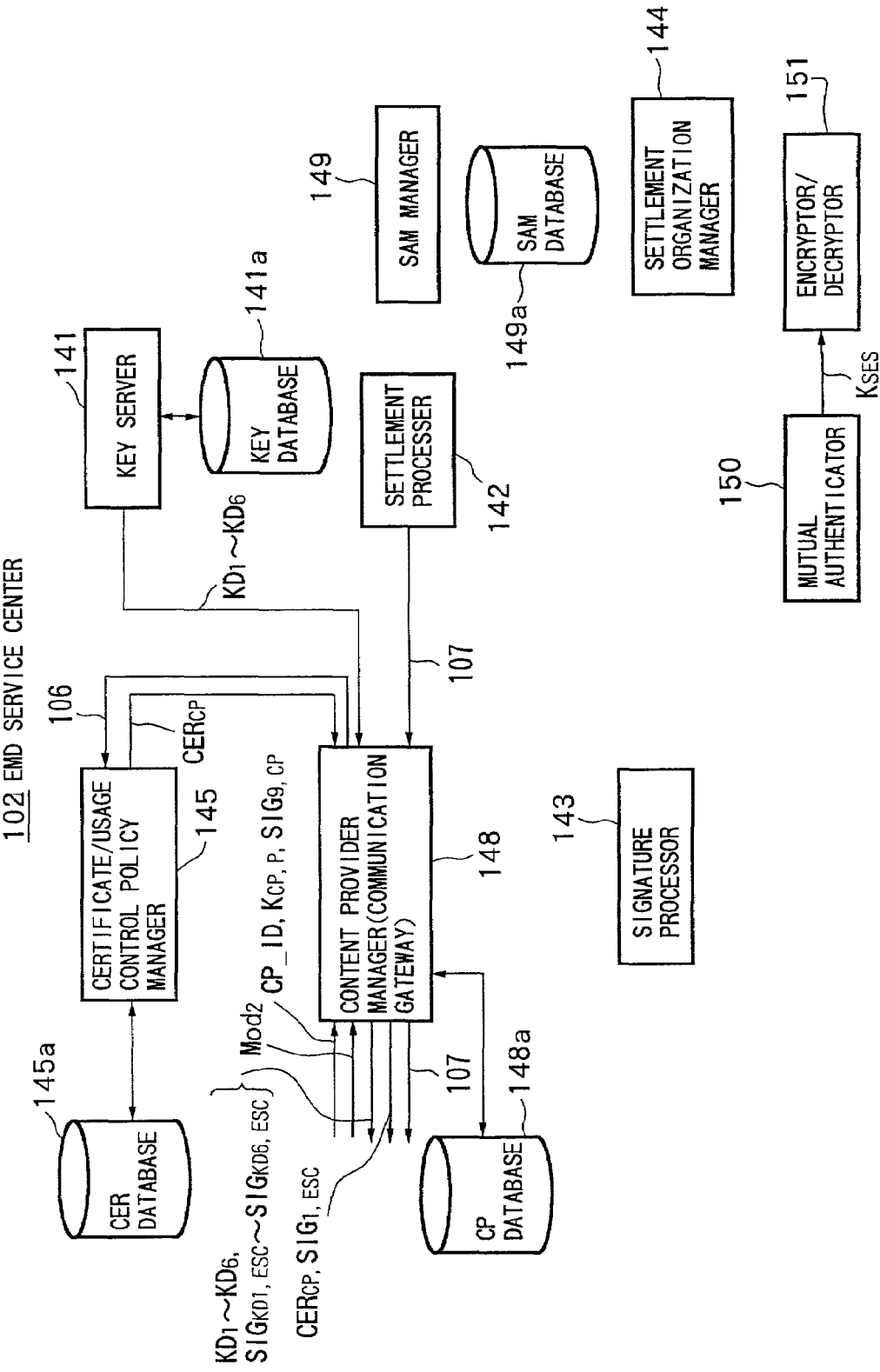
FIG. 10 is a functional block diagram of the EMD service center shown in FIG. 1 and a view of the flow of the data related to the data transferred with the content provider.

FIG. 10 is a view of the configuration of the functions of the EMD service center 102.

As shown in FIG. 10, the EMD service center 102 has a key server 141, a key database 141$a$, a settlement processor 142, a signature processor 143, a settlement organization manager 144, a certificate/usage control policy manager 145, a CER database 145$a$, a content provider manager 148, a CP database 148$a$, a SAM manager 149, a SAM database 149$a$, a mutual authenticator 150, and an encryptor/decryptor 151.

Note that, in FIG. 10, in the flow of the data among the functional blocks in the EMD service center 102, the flow of the data related to the data transferred with the content provider 101 is shown.

Figure 11:
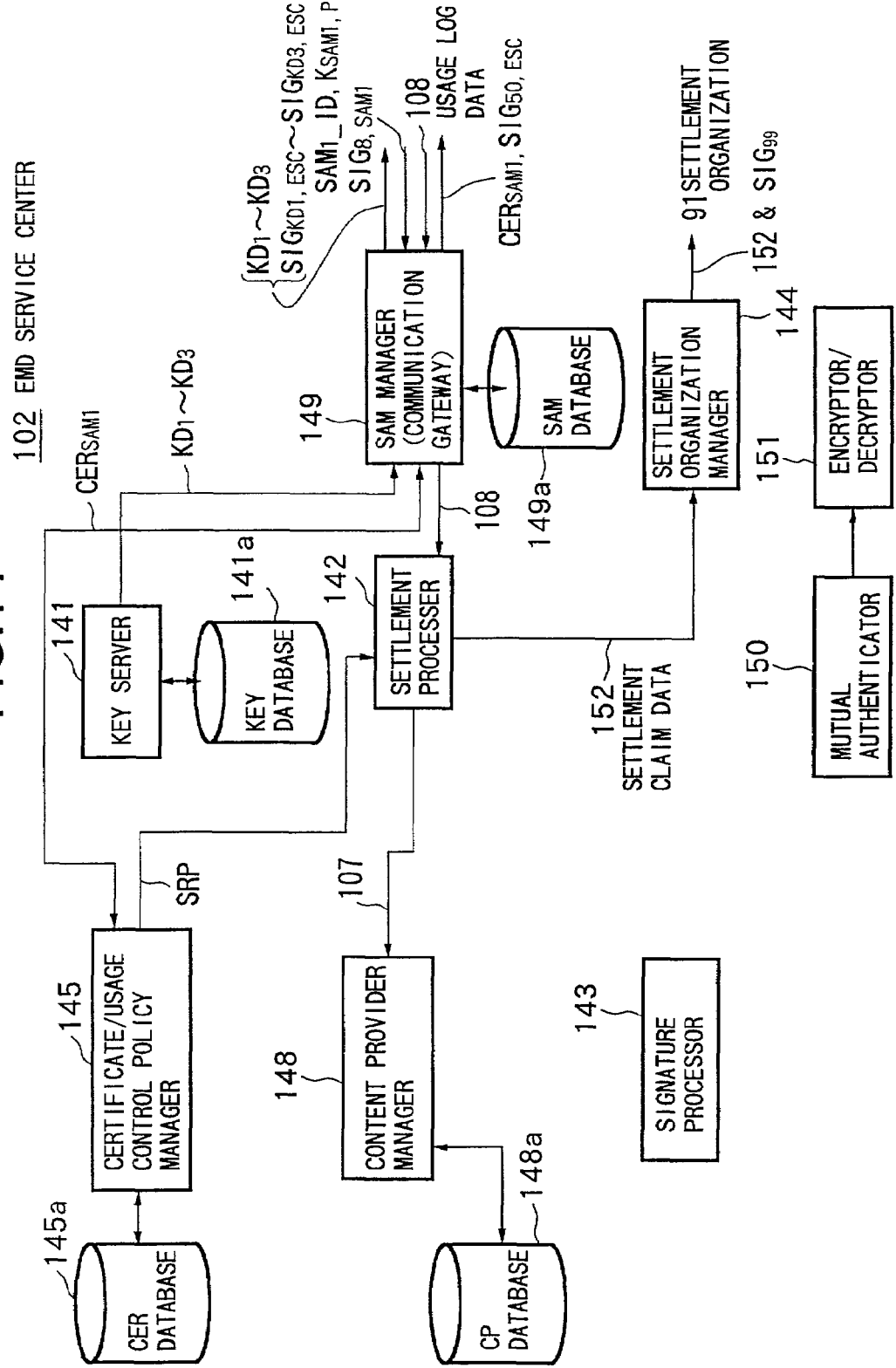
FIG. 11 is a functional block diagram of the EMD service center shown in FIG. 1 and a view of the flow of the data related to the data transferred between a SAM and a settlement organization shown in FIG. 1.

Further, in FIG. 11, in the flow of the data among the functional blocks in the EMD service center 102, the flow of the data related to the data transferred between the SAMs $105_1$ to $105_4$ and the settlement organization 91 shown in FIG. 1 is shown.

The key server 141 reads the distribution key data having the term of validity of one month stored in the key database 141a in response to a request and outputs the same to the content provider manager 148 and the SAM manager 149.

Further, it is comprised by a series of the key databases for storing the key data such as the storage key data $K_{STR}$, media key data $K_{MED}$, and MAC key data $K_{MAC}$ other than the key database 141a distribution key data KD.

The settlement processor 142 performs the settlement processing based on the usage log data 108 input from the SAMs $105_1$ to $105_4$, suggested retailer' price data SRP input from the certificate/usage control policy manager 145, and the sale price, generates the settlement report data 107 and a settlement claim data 152, outputs the settlement report data 107 to the content provider manager 148, and outputs the settlement claim data 152 to the settlement organization manager 144.

Note that, the settlement processor 142 monitors whether or not the transaction was conducted by an illegal dumping price based on the sale price.

Here, the usage log data 108 indicates the log of the purchase and the usage (reproduction, storing, transfer, etc.) of the secure container 104 in the user home network 103 and is used when determining the payment of the license fee stored to the secure container 104 in the settlement processor 142.

The usage log data 108 describes, for example, the identifier Content_ID of the content data C stored in the secure container 104, the identifier CP_ID of the content provider 101 distributing the secure container 104, the compression method of the content data C in the secure container 104, the identifier Media_ID of the storage medium storing the secure container 104, the identifier SAM_ID of the SAMs $105_1$ to $105_4$ receiving the distribution of the secure container 104, the USER_ID of the related SAMs $105_1$ to $105_4$, etc. Accordingly, when the EMD service center 102 must distribute money paid by the user of the user home network 103 to a party other than the owner of the content provider 101, for example, the license owner of for example the compression method or the storage medium, the EMD service center 102 determines the sum to be paid to each other party based on a distribution rate table determined in advance and generates the settlement report data 107 and the settlement claim data 152 in accordance with the related determination. The related distribution rate table is generated for example for every content data stored in the secure container 104.

Further, the settlement claim data 152 is authorized data enabling claim of payment of money to the settlement organization 91 and is generated for each individual owner of a right when for example the money paid by the user is distributed to a plurality of owners of rights.

Note that the settlement organization 91 sends a record of use of the related settlement organization to the EMD service center 102 when the settlement is finished. The EMD service center 102 notifies the content of the related record of use to the corresponding owner of a right.

The settlement organization manager 144 transmits the settlement claim data 152 generated by the settlement processor 142 via the payment gateway 90 shown in FIG. 1 to the settlement organization 91.

Note that, as will be mentioned later, it is also possible that the settlement organization manager 144 transmit the settlement claim data 152 to an owner of a right such as the content provider 101 and that the owner of the right itself performs the settlement at the settlement organization 91 by using the received settlement claim data 152.

Further, the settlement organization manager 144 takes the hush value of the settlement claim data 152 in the signature processor 143 and transmits signature data $SIG_{88}$ generated by using the secret key data $K_{ESC,S}$ together with the settlement claim data 152 to the settlement organization 91.

The certificate/usage control policy manager 145 reads the public key certificate data $CER_{CP}$ and public key certificate data $CER_{SAM1}$ to $CER_{SAM4}$ etc. registered and authorized in the CER database 145a and, at the same time, registers and authorizes the usage control policy data 106 and the content key data Kc etc. of the content provider 101 in the CER database 145a.

Note that, it is also possible that databases for storing the public key certificate data $CER_{SAM1}$ to $CER_{SAM4}$ the usage control policy data 106, and the content key data Kc be individually provided.

At this time, the certificate/usage control policy manager 145 takes the hush value of for example the usage control policy data 106 and the content key data Kc and generates the authorized public key certificate data having the signature data using the secret key data $K_{ESC,S}$ attached thereto.

The content provider manager 148 has the function of communicating with the content provider 101 and can access the CP database 148a for managing the identifier CP_ID etc. of the registered content provider 101.

The SAM manager 149 has the function of communicating with the SAMs $105_1$ to $105_4$ in the user home network 103 and can access the SAM database 149a storing the identifier SAM_ID of the registered SAM and the SAM registration list etc.

Below, the flow of the processing in the EMD service center 102 will be explained.

First, the flow of the processing when transmitting the distribution key data from the EMD service center 102 to the content provider 101 and the SAMs $105_1$ to $105_4$ in the user home network 103 will be explained while referring to FIG. 10 and FIG. 11.

As shown in FIG. 10, the key server 141 reads for example six months' worth of the distribution key data $KD_1$ to $KD_6$ from the key database 141a every predetermined period and outputs the same to the content provider manager 148.

Further, the signature processor 143 takes the hush value of each of the distribution key data $KD_1$ to $KD_6$, generates the signature data $SIG_{KD1,ESC}$ to $SIG_{KD6,ESC}$ corresponding to them, and outputs them to the content provider manager 148.

The content provider manager 148 encrypts these six months' worth of the distribution key data $KD_1$ to $KD_6$ and their signature data $SIG_{KD1,ESC}$ to $SIG_{KD6,ESC}$ by using the session key data $K_{SES}$ obtained by the mutual authentication between the mutual authenticator 150 and the mutual authenticator 120 shown in FIG. 3 and then transmits the same to the content provider 101.

Further, as shown in FIG. 11, the key server 141 reads for example three months' worth of the distribution key data $KD_1$ to $KD_3$ from the key database 141a for every predetermined period and outputs the same to the SAM manager 149.

Further, the signature processor 143 takes the hush value of each of the distribution key data $KD_1$ to $KD_3$, generates the signature data $SIG_{KD1,ESC}$ to $SIG_{KD3,ESC}$ corresponding to them by using the secret key data $K_{ESC,S}$ of the EMD service center 102, and outputs them to the SAM manager 149.

The SAM manager 149 encrypts these three months' worth of the distribution key data $KD_1$ to $KD_3$ and their signature data $SIG_{KD1,ESC}$ to $SIG_{KD3,ESC}$ by using the session key data $K_{SES}$ obtained by mutual authentication between the mutual authenticator 150 and the SAMs 105$_1$ to 105$_4$ and then transmits the same to the SAMs 105$_1$ to 105$_4$.

Below, an explanation will be made of the processing where the EMD service center 102 receives a request for issuance of public key certificate data $CER_{CP}$ from the content provider 101 by referring to FIG. 10 and FIG. 12.

Figure 12:
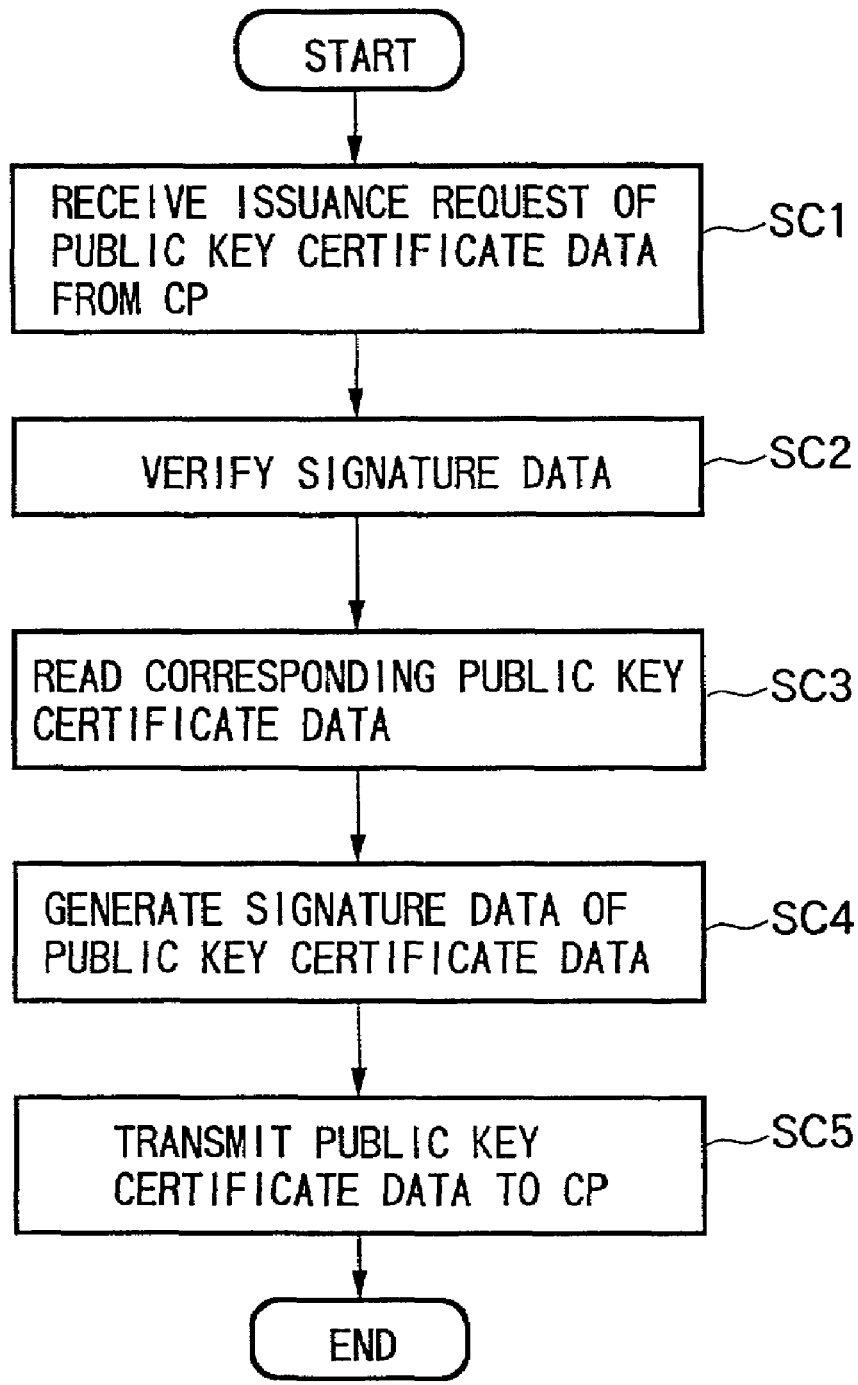
FIG. 12 is a flowchart of processing where the EMD service center receives a request for issuance of public key certificate data from the content provider in the first embodiment.

FIG. 12 is a flowchart of the related processing.

Step SC1: When receiving a request for issuance of public key certificate data containing the identifier CP_ID of the content provider 101, public key data $K_{CP,P}$, and signature data $SIG_{8,CP}$ from the content provider 101, the content provider manager 148 decrypts them by using the session key data $K_{SES}$ obtained by mutual authentication between the mutual authenticator 150 and the mutual authenticator 120 shown in FIG. 3.

Step SC2: After confirming the legitimacy of the related decrypted signature data $SIG_{8,CP}$ at the signature processor 143, it confirms whether or not the content provider 101 issuing the related public key certificate data issuance request is registered in the CP database 148a based on the identifier CP_ID and the public key data $K_{CP,P}$.

Step SC3: The certificate/usage control policy manager 145 reads the public key certificate data $CER_{CP}$ of the related content provider 101 from the CER database 145a and outputs the same to the content provider manager 148.

Step SC4: The signature processor 143 takes the hush value of the public key certificate data $CER_{CP}$, generates the signature data $SIG_{1,ESC}$ by using the secret key data $K_{ESC,S}$ of the EMD service center 102, and outputs this to the content provider manager 148.

Step SC5: The content provider manager 148 encrypts the public key certificate data $CER_{CF}$ and the signature data $SIG_{1,ESC}$ thereof by using the session key data $K_{SES}$ obtained by the mutual authentication between the mutual authenticator 150 and the mutual authenticator 120 shown in FIG. 3 and then transmits the same to the content provider 101.

Below, an explanation will be made of the processing where the EMD service center 102 receives a request for issuance of public key certificate data $CER_{CP}$ from the SAM 105$_1$ by referring to FIG. 11 and FIG. 13.

Figure 13:
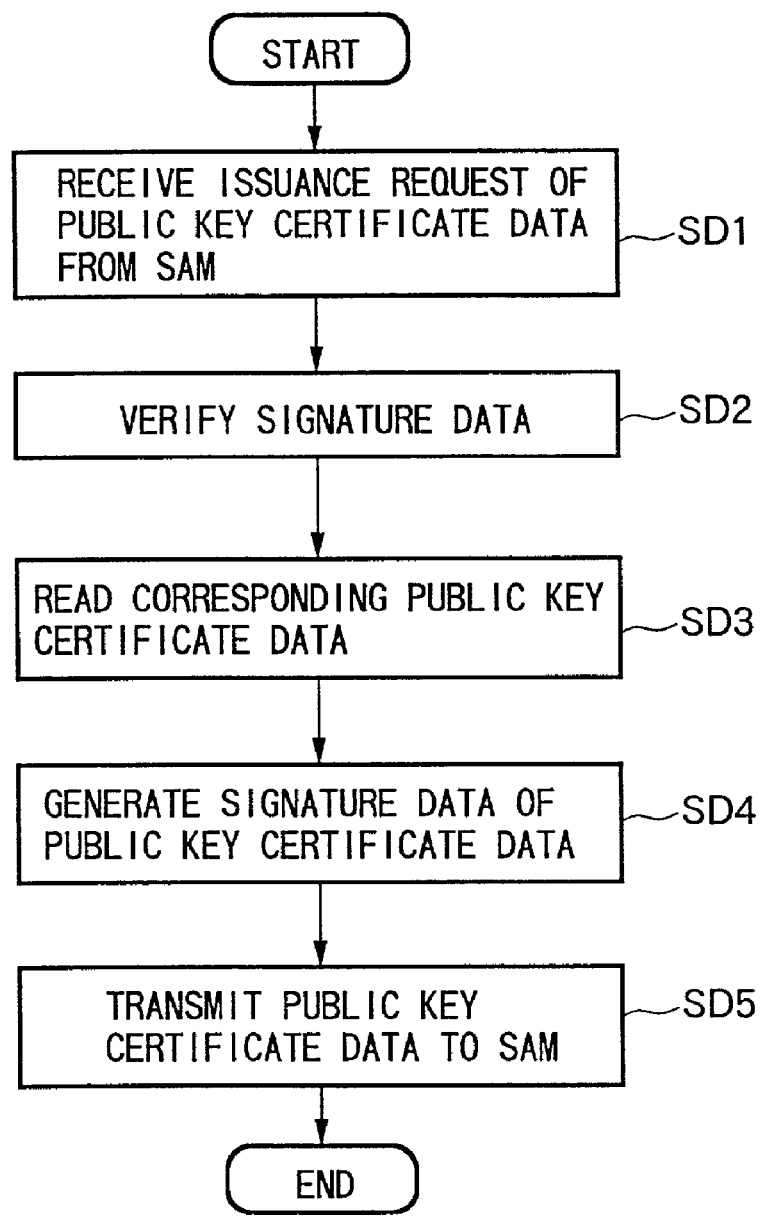
FIG. 13 is a flowchart of processing where the EMD service center receives a request for issuance of public key certificate data from a SAM in the first embodiment.

FIG. 13 is a flowchart of the related processing.

Step SD1: When receiving a request for issuance of public key certificate data containing the identifier SAM1_ID of the SAM 105$_1$, the public key data $K_{SAM1,P}$, and the signature data $SIG_{8,SAM1}$ from the SAM 105$_1$, the SAM manager 149 decrypts them by using the session key data $K_{SES}$ obtained by the mutual authentication between the mutual authenticator 150 and the SAM 105$_1$.

Step SD2: After confirming the legitimacy of the related decrypted signature data $SIG_{8,SAM1}$ at the signature processor 143, it is confirmed whether or not the SAM 105$_1$ issuing a request for issuance of the related public key certificate data is registered in the SAM database 149a based on the identifier SAM1_ID and the public key data $K_{SAM1,P}$.

Step SD3: The certificate/usage control policy manager 145 reads the public key certificate data $CER_{SAM1}$ of the related SAM 105$_1$ from the CER database 145a and outputs the same to the SAM manager 149.

Step SD4: The signature processor 143 takes the hush value of the public key certificate data $CER_{SAM1}$, generates signature data $SIG_{50,ESC}$ by using the secret key data $K_{ESC,S}$ of the EMD service center 102, and outputs this to the SAM manager 149.

Step SD5: The SAM manager 149 encrypts the public key certificate data $CER_{SAM1}$ and the signature data $SIG_{50,ESC}$ thereof by using the session key data $K_{SES}$ obtained by the mutual authentication between the mutual authenticator 150 and the SAM 105$_1$ and then transmits the same to the SAM 105$_1$.

Note that the processing where the SAMs 105$_2$ to 105$_4$ request public key certificate data is basically the same as the case of the SAM 105$_1$ mentioned above except the object is replaced by the SAMs 105$_2$ to 105$_4$.

Note that, in the present invention, the EMD service center 102 can generate the public key certificate data $CER_{SAM1}$ of the public key data $K_{SAM1,P}$ too at the time of shipping when for example storing the secret key data $K_{SAM1,S}$ and the public key data $K_{SAM1,P}$ of the SAM 105$_1$ in the storage unit of the SAM 105$_1$ at the time of shipping of the SAM 105$_1$.

At this time, it is also possible to store public key certificate data $CER_{SAM1}$ in the storage unit of the SAM 105$_1$ at the time of shipping.

Below, an explanation will be made of the processing where the EMD service center 102 receives a request for registration of the usage control policy data 106 and the content key data Kc from the content provider 101 by referring to FIG. 10 and FIG. 14.

Figure 14:
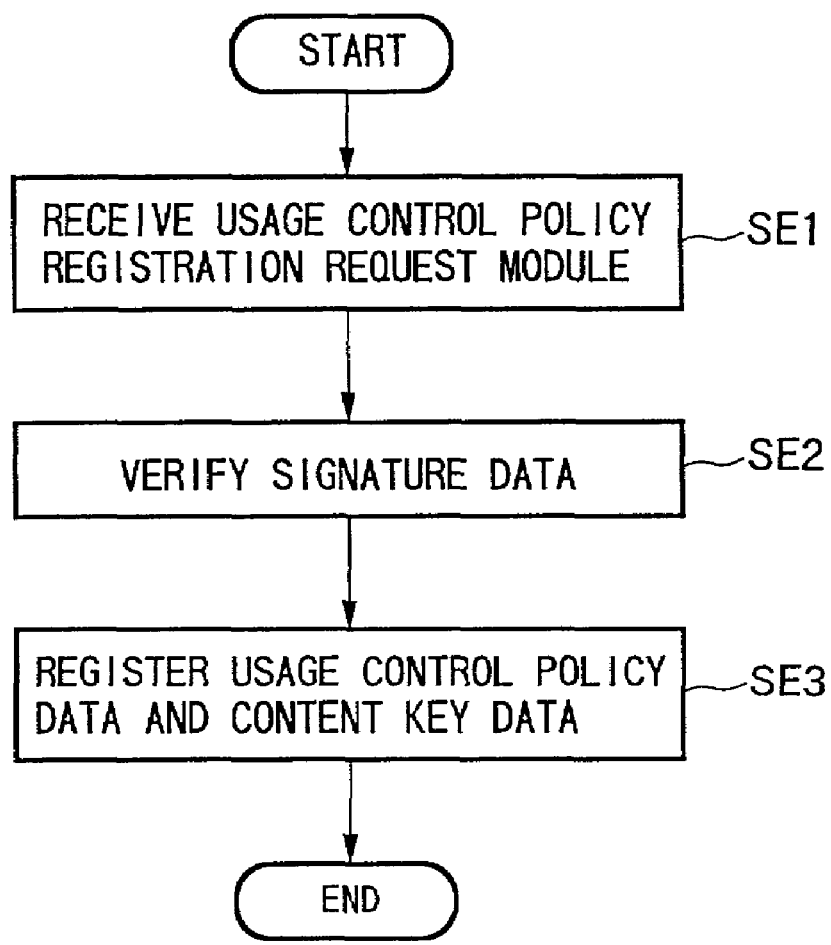
FIG. 14 is a flowchart of processing where the EMD service center receives a request for registration of usage control policy data and content key data from the content provider in the first embodiment.

FIG. 14 is a flowchart of the related processing.

Step SE1: When receiving the usage control policy registration request module Mod$_2$ shown in FIG. 7A from the content provider 101, the content provider manager 148 decrypts the usage control policy registration request module Mod$_2$ by using the session key data $K_{SES}$ obtained by the mutual authentication between the mutual authenticator 150 and the mutual authenticator 120 shown in FIG. 3.

Step SE2: The signature processor 143 verifies the legitimacy of the signature data $SIG_{5,CP}$ by using the public key data $K_{CP}$ read from the key database 141a.

Step SE3: The certificate/usage control policy manager 145 registers the usage control policy data 106 and the content key data Kc stored in the usage control policy registration request module Mod$_2$ in the CER database 145a.

Below, an explanation will be made of the processing where the settlement processing is carried out in the EMD service center 102 by referring to FIG. 11 and FIG. 15.

Figure 15:
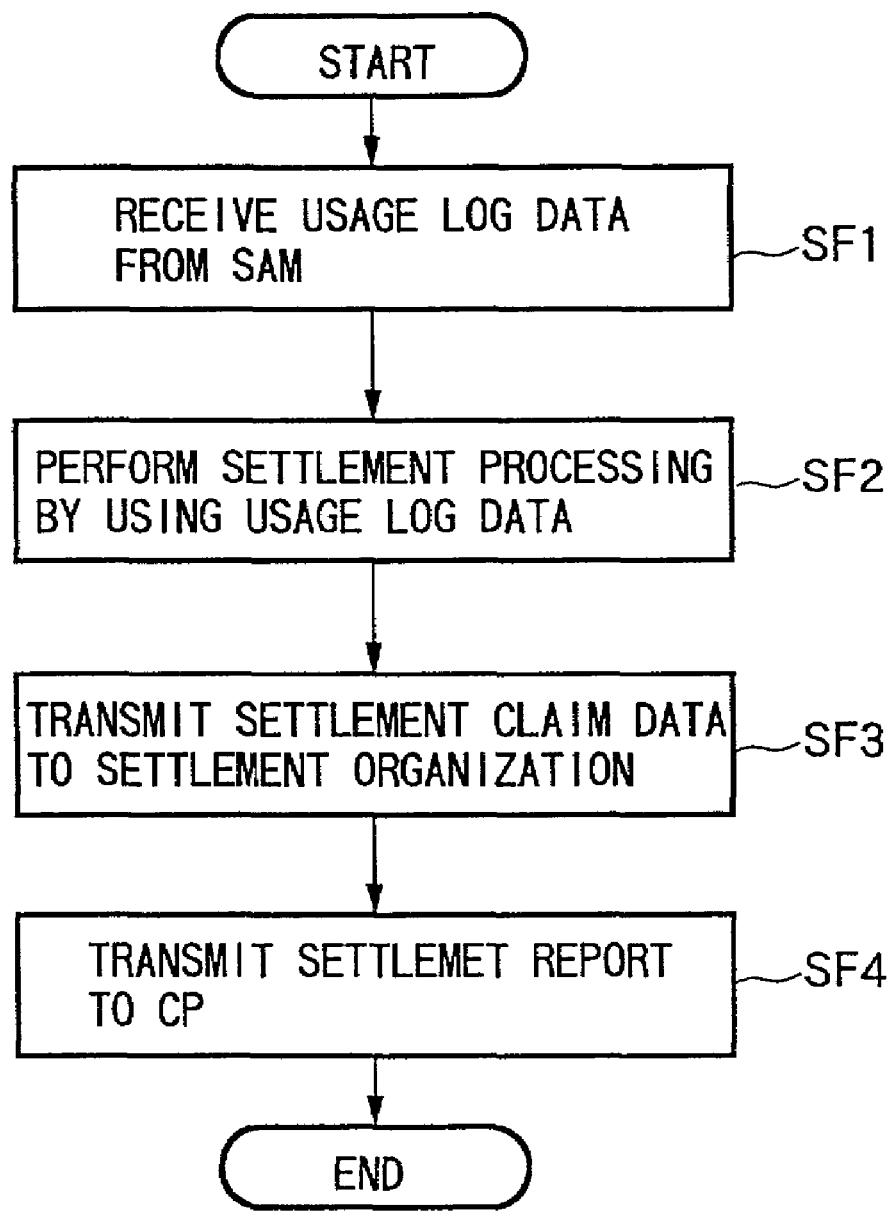
FIG. 15 is a flowchart of processing where the EMD service center performs settlement processing in the first embodiment.

FIG. 15 is a flowchart of the related processing.

Step SF1: When receiving as its input the user log data 108 and a signature data $SIG_{200,SAM1}$ thereof from for example the SAM 105$_1$ of the user home network 103, the SAM manager 149 decrypts the usage log data 108 and the signature data $SIG_{200,SAM1}$ by using the session key data $K_{SES}$ obtained by the mutual authentication between the mutual authenticator 150 and the SAM 105$_1$, verifies the signature data $SIG_{200,SAM1}$ by the public key data $K_{SAM1}$ of the SAM 105$_1$, and then outputs the same to the settlement processor 142.

Step SF2: The settlement processor 142 performs the settlement processing based on the usage log data 108 input from the SAM manager 149 and the suggested retailer' price data SRP and the sale price contained in the usage control policy data 106 read from the CER database 145a via the certificate/usage control policy manager 145 and generates the settlement claim data 152 and the settlement report data 107. Note that, the settlement claim data 152 and the settlement report data 107 can be generated whenever the usage log data 108 is input from the SAM too or can be generated for every predetermined period too.

Step SF3: The settlement processor 142 outputs the settlement claim data 152 to the settlement organization manager 144.

The settlement organization manager 144 transmits the settlement claim data 152 and the signature data $SIG_{88}$ thereof via the payment gateway 90 shown in FIG. 1 to the settlement organization 91 after the mutual authentication and the decryption by the session key data $K_{SES}$.

By this, money of the sum indicated in the settlement claim data 152 is paid to the content provider 101.

Note that, it is also possible for the EMD service center 102 to transmit the settlement claim data 152 to the content provider 101 and for the content provider 101 to claim money at the settlement organization 91 by using the settlement claim data 152.

Step SF4: The settlement processor 142 outputs the settlement report data 107 to the content provider manager 148.

The settlement report data 107, as mentioned above, describes for example the content of the settlement concerning the content provider 101 performed with respect to the settlement organization 91 shown in FIG. 1 by the EMD service center 102.

The content provider manager 148 encrypts the settlement report data 107 by using the session key data $K_{SES}$ obtained by the mutual authentication between the mutual authenticator 150 and the mutual authenticator 120 shown in FIG. 3 and then transmits the same to the content provider 101.

Further, it is also possible that the EMD service center 102 register (authorize) the usage control policy data 106 as mentioned above and then encrypt the authorization certificate module $Mod_{2a}$ shown in FIG. 7B by the distribution key data $KD_1$ to $KD_6$ and transmit the same from the EMD service center 102 to the content provider 101.

Further, the EMD service center 102 performs the processing at the time of shipment of the SAMs $105_1$ to $105_4$ and the registration processing of the SAM registration list other than the above. These processings will be explained later.

[User Home Network 103]

The user home network 103 has the network apparatus 160, and the A/V apparatuses $160_2$ to $160_4$ as shown in FIG. 1.

The network apparatus 160, includes the SAM $105_1$. Further, the AV apparatuses $160_2$ to $160_4$ include the SAMs $105_2$ to $105_4$.

The SAMs $105_1$ to $105_4$ are connected to each other via the bus 191, for example, the IEEE 1394 serial interface bus.

Note that, it is also possible that the AV apparatuses $160_2$ to $160_4$ have the network communication function or do not have the network communication function, but utilize the network communication function of the network apparatus $160_1$.

Further, it is also possible for the user home network 103 to have only the AP apparatus not having a network function.

Below, an explanation will be made of the network apparatus $160_1$.

Figure 16:
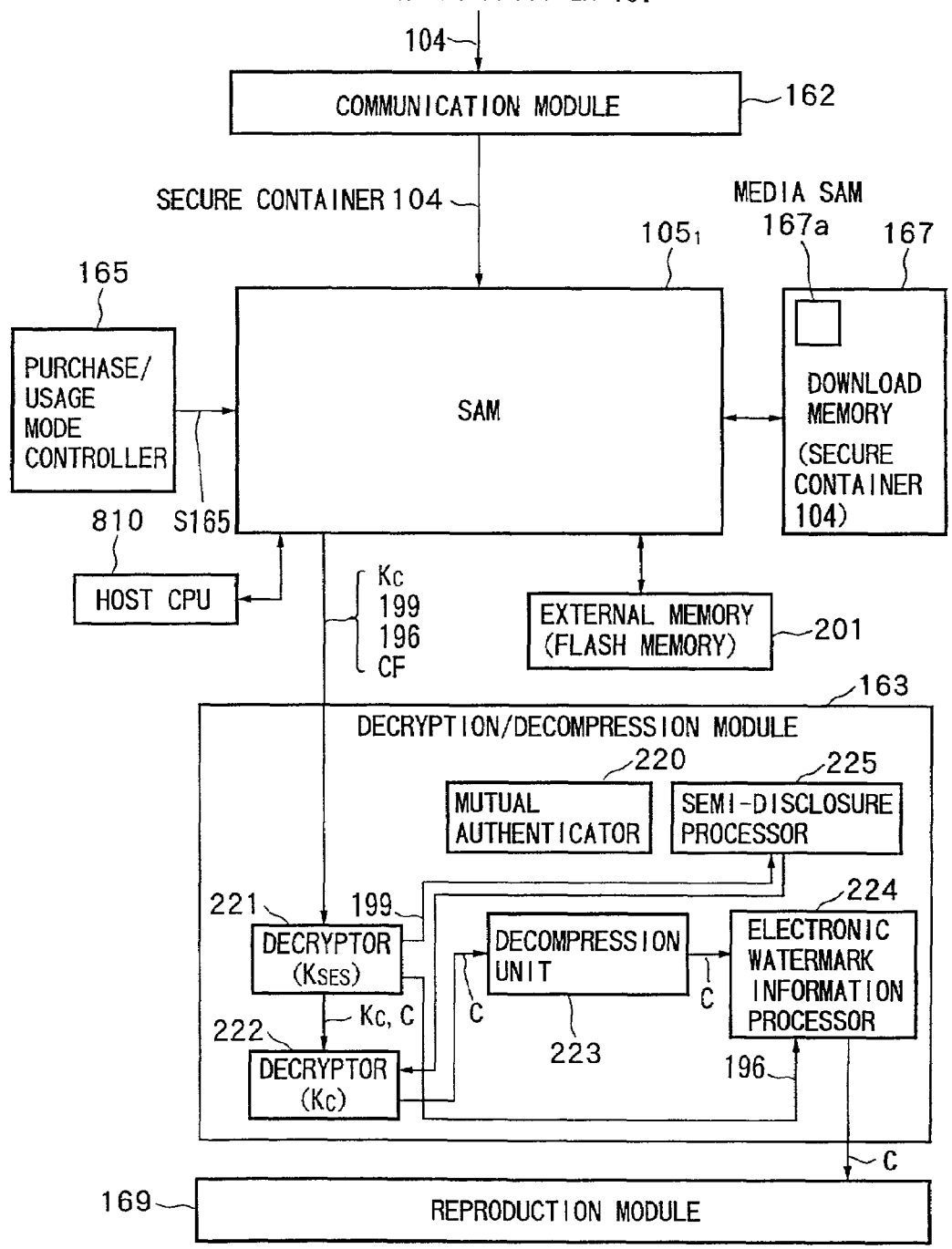
FIG. 16 is a view of the configuration of a network apparatus in the user home network shown in FIG. 1.

FIG. 16 is a view of the configuration of the network apparatus $160_1$.

As shown in FIG. 16, the network apparatus 160, has the SAM $105_1$, a communication module 162, a decryption/decompression module 163, a purchase/usage mode determination controller 165, a download memory 167, a reproduction module 169, and an external memory 201.

The SAMs $105_1$ to $105_4$ are modules for the charge processing in units of content and communicate with the EMD service center 102.

The SAMs $105_1$ to $105_4$, for example, are managed in specifications and versions by the EMD service center 102 and are licensed to manufactures of home apparatuses as black box charging modules for charging in units of content when desired to be mounted. For example, a manufacturer developing a home apparatus cannot learn the internal specifications of the ICs (integrated circuit) of the SAMs $105_1$ to $105_4$. The EMD service center 102 standardizes the interfaces etc. of the related ICs. These are mounted in the network apparatus 160, and the AV apparatuses $160_2$ to $160_4$ accordingly.

The SAMs $105_1$ to $105_4$ are hardware modules (IC modules etc.) with processing contents completely shut off from the outside and thereby having tamper resistance preventing the processing contents from being monitored or tampered with from the outside and preventing data stored in the inside in advance and the data being processed from being monitored and tampered from the outside.

When realizing the functions of the SAM $105_1$ to $105_4$ in the form of ICs, the ICs have secret memories and store secret programs and secret data therein. The SAMs are not limited to the physical mode of ICs. If the functions can be built into a portion of the apparatus, it is also possible to define that portion as a SAM.

Below, the functions of the SAM $105_1$ will be explained in detail.

Note that, the SAMs $105_2$ to $105_4$ basically have the same functions as those of the SAM $105_1$.

Figure 17:
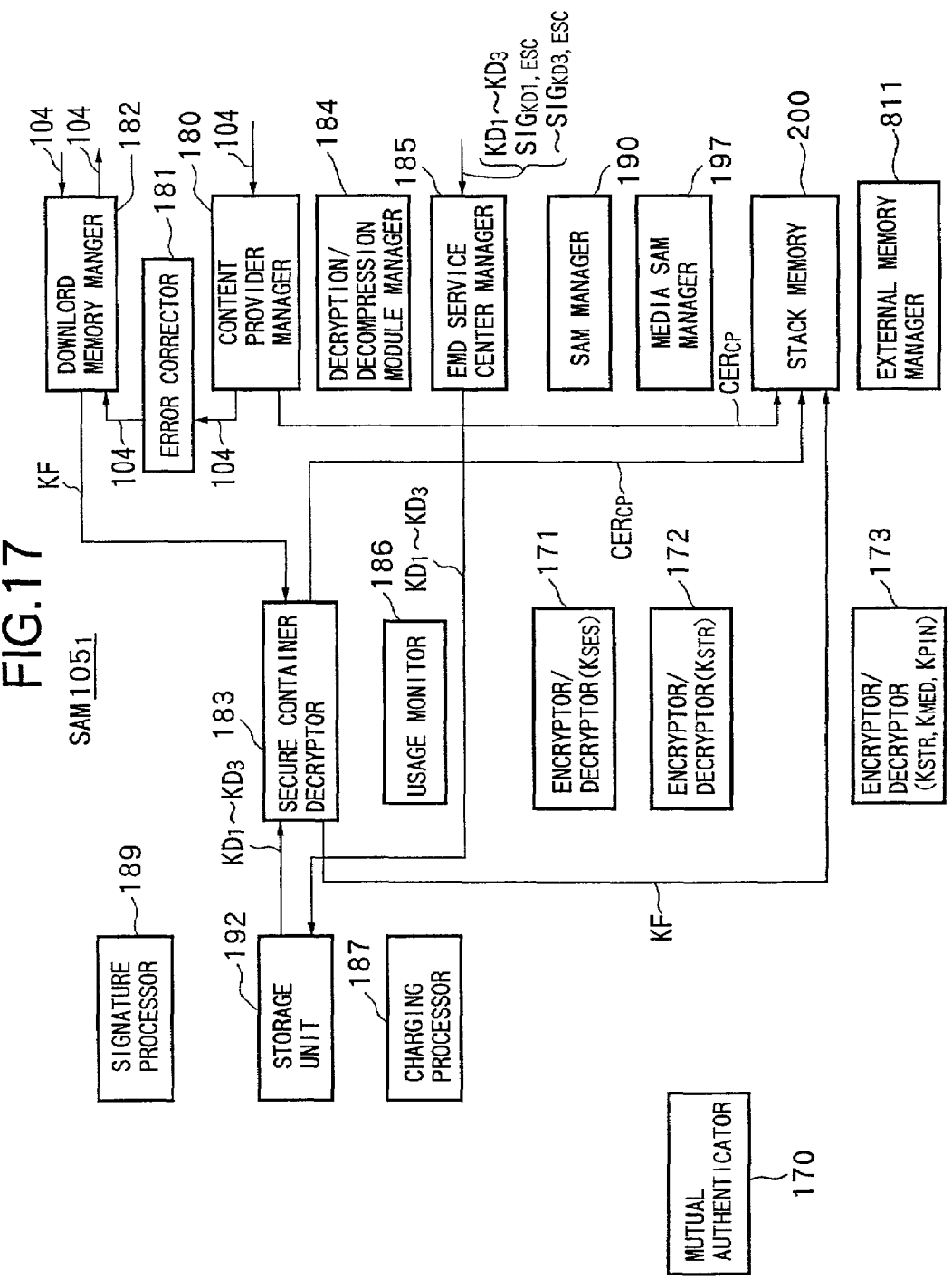
FIG. 17 is a functional block diagram of a SAM in the user home network shown in FIG. 1 and a view of the flow of the data up to decryption of the secure container received from the content provider.

FIG. 17 is a view of the configuration of the functions of the SAM $105_1$.

Note that, in FIG. 17, the flow of the data related to the processing for inputting the secure container 104 from the content provider 101 and decrypting the key file KF in the secure container 104 is shown.

As shown in FIG. 17, the SAM $105_1$ has a mutual authenticator 170, encryptor/decryptors 171, 172, and 173, a content provider manager 180, an error corrector 181, a download memory manager 182, a secure container decryptor 183, a decryption/decompression module manager 184, an EMD service center manager 185, a usage monitor 186, a charge processor 187, a signature processor 189, a SAM manager 190, a media SAM manager 197, a stack (work) memory 200, and an external memory manager 811.

Note that the AV apparatuses $160_2$ to $160_4$ do not have download memories 167, therefore there are no download memory managers 182 in the SAMs $105_2$ to $105_4$.

Note that, the predetermined functions of the SAM $105_1$ shown in FIG. 17 are realized by executing a secret program in for example a not illustrated CPU.

Further, the stack memory 200 stores the usage log data 108 and the SAM registration list after the following processings as shown in FIG. 18.

Here, the memory space of the external memory 201 cannot be seen from the outside (for example a host CPU 810) of the SAM $105_1$. Only the SAM $105_1$ can manage the access with respect to the storage region of an external memory 201.

As the external memory 201, use is made of for example a flash memory or a ferroelectric memory (FeRAM).

Further, as the stack memory 200, use is made of for example a SARAM. As shown in FIG. 19, the secure container 104, content key data Kc, usage control policy data (UCP) 106, a lock key data $K_{LOC}$ of a storage unit 192, the public key certificate $CER_{CP}$ of the content provider 101, the usage control status data (UCS) 166, the SAM program download containers SDC$_1$ to SDC$_3$, etc. are stored.

Below, an explanation will be made of the processing content of the functional blocks when inputting the secure container 104 from the content provider 101 among the functions of the SAM 105$_1$ by referring to FIG. 17.

When the SAM 105$_1$ transfers data on-line with the content provider 101 and the EMD service center 102, the mutual authenticator 170 performs the mutual authentication between the content provider 101 and the EMD service center 102 to generate the session key data (common key) K$_{SES}$ and outputs this to the encryptor/decryptor 171. The session key data K$_{SES}$ is newly generated whenever mutual authentication is carried out.

The encryptor/decryptor 171 encrypts and/or decrypts the data transferred with the content provider 101 and the EMD service center 102 by using the session key data K$_{SES}$ generated by the mutual authenticator 170.

The error corrector 181 corrects the error of the secure container 104 and outputs the result to the download memory manager 182.

Note that, it is also possible that the user home network 103 have the function of detecting whether or not the secure container 104 has been tampered with.

In the present embodiment, the case where the error corrector 181 was included in the SAM 105$_1$ was illustrated, but it is also possible to impart the function of the error corrector 181 to the outside of the SAM 105$_1$, for example the host CPU 810.

The download memory manager 182 encrypts the secure container 104 after the error correction by using the session contained K$_{SES}$ obtained by the mutual authentication after the mutual authentication between the mutual authenticator 170 and a media SAM 167a when the download memory 167 has the media SAM 167a having the mutual authentication function as shown in FIG. 16 and writes the same into the download memory 167 shown in FIG. 16. As the download memory 167, use is made of a nonvolatile semiconductor memory, for example, a memory stick.

Figure 20:
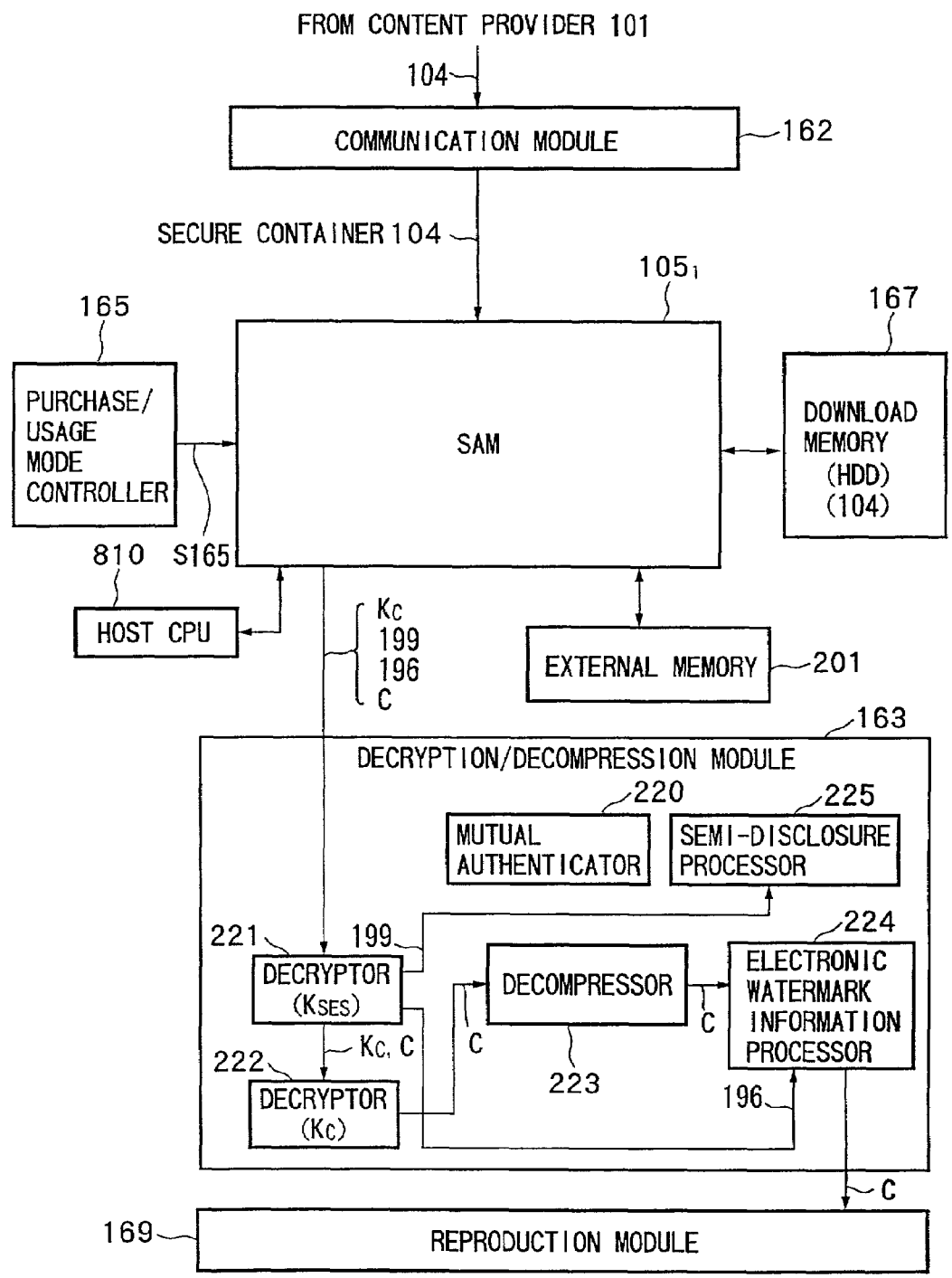
FIG. 20 is another view of the configuration of the network apparatus in the user home network shown in FIG. 1.

Note that, as shown in FIG. 20, when a memory not provided with a mutual authentication function such as an HDD (hard disk drive) is used as a download memory 211, the interior of the download memory 211 is not secure, therefore the content file CF is downloaded in the download memory 211, and the key file KF having the high secrecy is downloaded in the stack memory 200 shown in FIG. 17.

The secure container decryptor 183 decrypts the key file KF stored in the secure container 104 input from the download memory manager 182 by using the distribution key data KD$_1$ to KD$_3$ of the corresponding period read from the storage unit 192 and confirms the legitimacy of the signature data SIG$_{2,CP}$ to SIG$_{4,CP}$, that is, the legitimacy of the creator of the content data C, content key data Kc, and the usage control policy data 106 in the signature processor 189, and then writes the decrypted data into the stack memory 200.

The EMD service center manager 185 manages the communication with the EMD service center 102 shown in FIG. 1.

The signature processor 189 verifies the signature data in the secure container 104 by using the public key data K$_{ESC,P}$ of the EMD service center 102 read from the storage unit 192 and the public key data K$_{CP,P}$ of the content provider 101.

Figure 21:
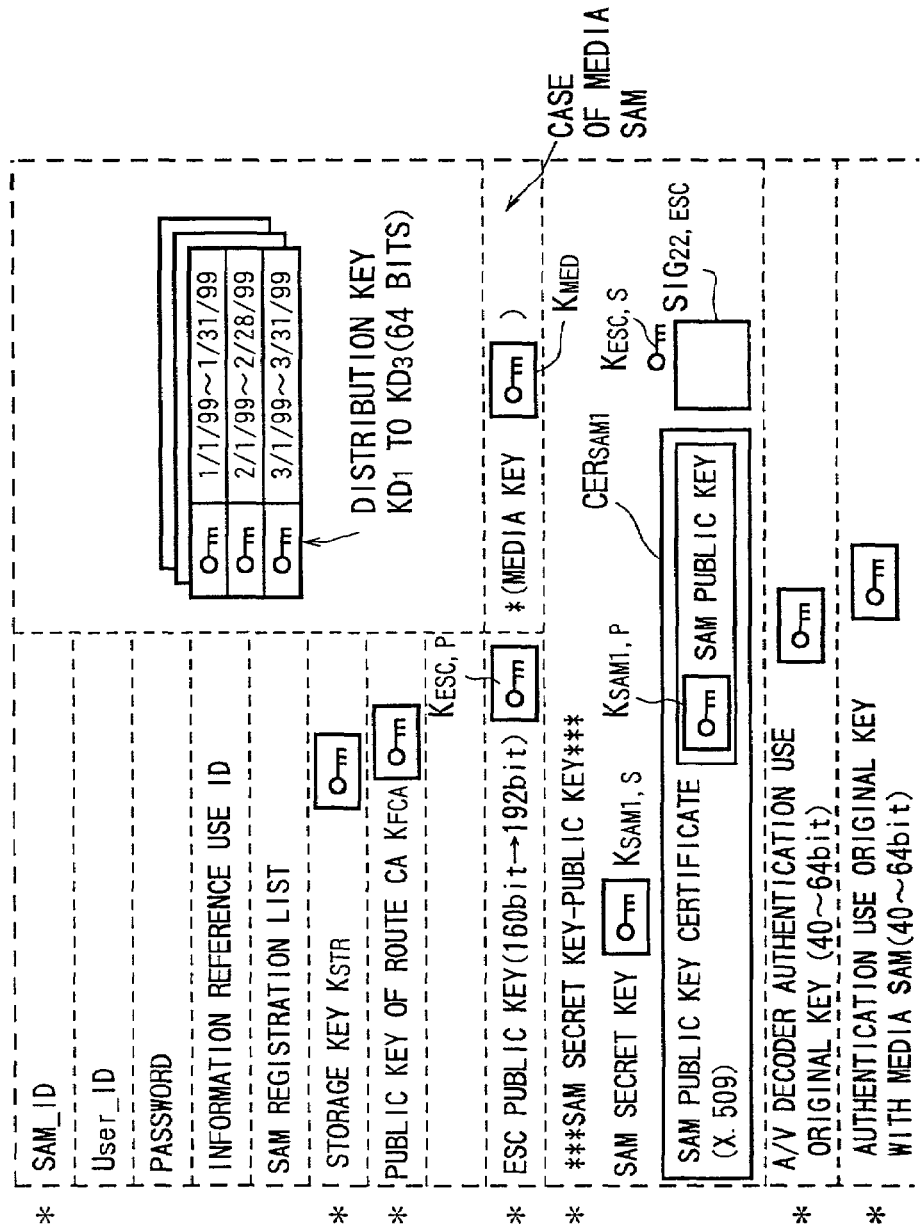
FIG. 21 is a view for explaining the data stored in a storage unit shown in FIG. 17.

The storage unit 192 stores, as secret data which cannot be read and rewritten from the outside of the SAM 105$_1$, as shown in FIG. 21, the distribution key data KD$_1$ to KD$_3$, SAM_ID, user ID, password, information reference use ID, SAM registration list, storage key data K$_{STR}$, public key data K$_{R-CA,P}$ of the route CA, public key data K$_{ESC,P}$ of the EMD service center 102, media key data K$_{MED}$, public key data K$_{ESC,P}$ of the EMD service center 102, secret key data K$_{ESC,P}$ of the SAM 105$_1$, public key certificate data K$_{SAM1,S}$ of the SAM 105$_1$, public key certificate data CER$_{SAM1}$ storing public key data K$_{SAM1,P}$ of the SAM 105$_1$ therein, signature data SIG$_{22}$ of the public key certificate CER$_{SEC}$ using the secret key data K$_{ESC,S}$ of the EMD service center 102, the original key data for the mutual authentication with the decryption/decompression module 163, and the original key data for the mutual authentication with the media SAM.

Further, the storage unit 192 stores a secret program for realizing at least part of the functions shown in FIG. 17.

As the storage unit 192, use is made of for example a flash-EEPROM (electrically erasable programmable RAM).

Below, an explanation will be made of the flow of the processing when inputting the secure container 104 from the content provider 101 in the flow of the processing of the SAM 105$_1$.

First, the flow of the processing in the SAM 105$_1$ when storing the distribution key data KD$_1$ to KD$_3$ received from the EMD service center 102 in the storage unit 192 will be explained by referring to FIG. 17.

In this case, first, the mutual authentication is carried out between the mutual authenticator 170 and the mutual authenticator 150 shown in FIG. 10.

Next, three months' worth of the distribution key data KD$_1$ to KD$_3$ encrypted by the session key data K$_{SES}$ obtained by the related mutual authentication and the signature data SIG$_{KD1,ESC}$ to SIG$_{KD3,ESC}$ thereof are written from the EMD service center 102 via the EMD service center manager 185 into the stack memory 811.

Next, the encryptor/decryptor 171 uses the session key data K$_{SES}$ to decrypt the distribution key data KD$_1$ to KD$_3$ and the signature data SIG$_{KD1,ESC}$ to SIG$_{KD3,ESC}$.

Next, the signature processor 189 confirms the legitimacy of the signature data SIG$_{KD1,ESC}$ to SIG$_{KD3,ESC}$ stored in the stack memory 811, then writes the distribution key data KD$_1$ to KD$_3$ into the storage unit 192.

Below, an explanation will be made of the flow of the processing in the SAM 105$_1$ when inputting the secure container 104 from the content provider 101 and decrypting the key file KF in the secure container 104 by referring to FIG. 17 and FIG. 22.

Figure 22:
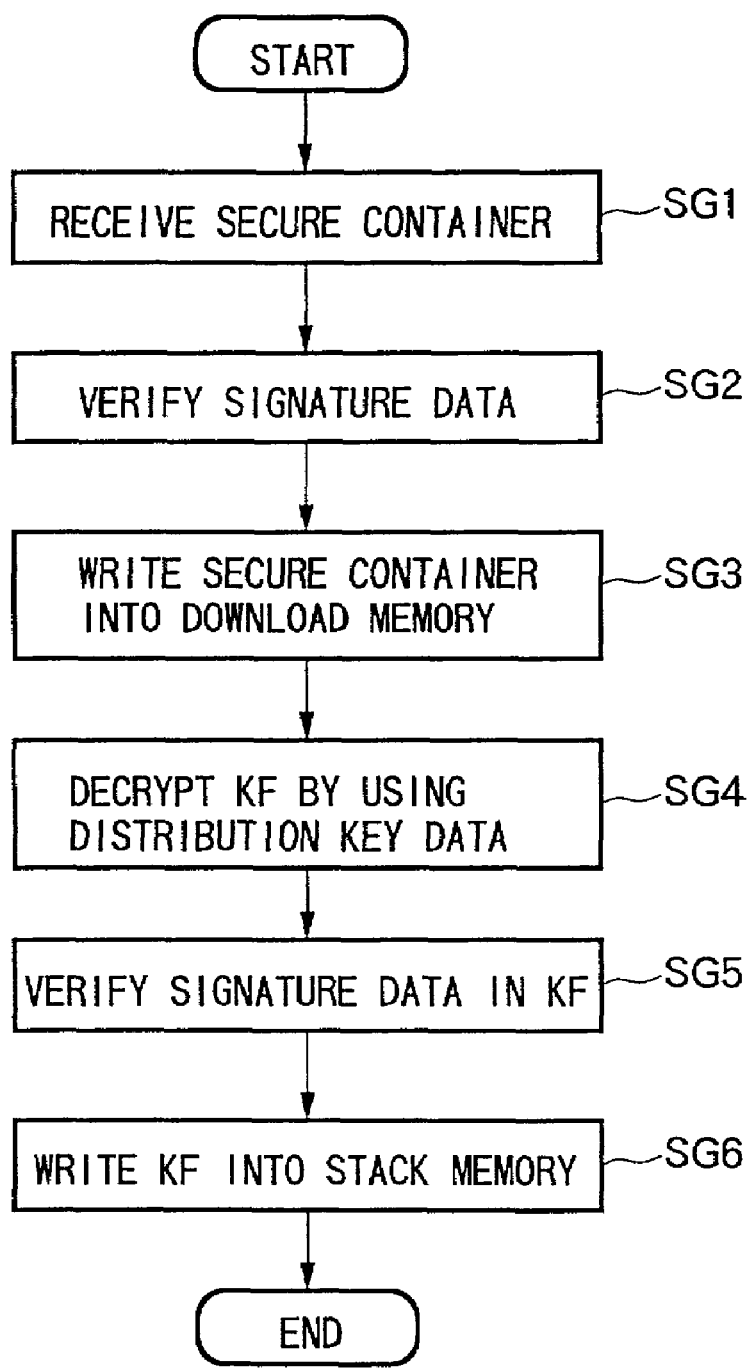
FIG. 22 is a flowchart of processing in a SAM when inputting the secure container from the content provider and decrypting a key file KF in the secure container in the first embodiment.

FIG. 22 is a flowchart of the related processing.

Step SG1: The mutual authentication is carried out between the mutual authenticator 170 of the SAM 105$_1$ shown in FIG. 17 and the mutual authenticator 120 shown in FIG. 2.

The encryptor/decryptor 171 decrypts the secure container 104 received from the content provider 101 via the content provider manager 180 by using the session key data K$_{SES}$ obtained by the related mutual authentication.

Step SG2: The signature processor 189 verifies the signature data SIG$_{1,ESC}$ shown in FIG. 4C and then confirms the legitimacy of the signature data SIG$_{8,CP}$ and SIG$_{7,CP}$ by using the public key data F$_{CP,P}$ of the content provider 101 stored in the public key certificate data CER$_{CP}$ shown in FIG. 4C.

When the legitimacy of the signature data SIG$_{8,CP}$ and SIG$_{7,CP}$ is confirmed, the content provider manager 180 outputs the secure container 104 to the error corrector 181.

The error corrector 181 corrects the error of the secure container 104 and then outputs the result to the download memory manager 182.

Step SG3: The download memory manager 182 performs the mutual authentication between the mutual authenticator 170 and the media SAM 167a shown in FIG. 16 and then writes the secure container 104 into the download memory 167.

Step SG4: The download memory manager 182 performs the mutual authentication between the mutual authenticator 170 and the media SAM 167a shown in FIG. 16 and then reads the key file KF shown in FIG. 4B stored in the secure container 104 from the download memory 167 and outputs the same to the secure container decryptor 183.

Then, the secure container decryptor 183 decrypts the key file KF by using the distribution key data $KD_1$ to $KD_3$ of the corresponding period input from the storage unit 192 and outputs the signature data $SIG_{1,ESC}$ and $SIG_{2,CP}$ to $SIG_{4,CP}$ stored in the signature/certificate module $Mod_1$ shown in FIG. 4B to the signature processor 189.

Step SG5: The signature processor 189 verifies the signature data $SIG_{1,ESC}$ shown in FIG. 4B and then verifies the signature data $SIG_{2,CP}$ to $SIG_{4,CP}$ by using the public key data $K_{ESC,P}$ stored in the public key certificate data $CER_{CP}$ shown in FIG. 4B. By this, the legitimacy of the creator of the content data C, content key data Kc, and the usage control policy data 106 is verified.

Step SG6: The secure container decryptor 183 writes the key file KF into the stack memory 200 when the legitimacy of the signature data $SIG_{2,CP}$ to $SIG_{4,CP}$ is confirmed.

Below, an explanation will be made of the processing content of the functional blocks related to the processing for using and/or purchasing the content data C downloaded in the download memory 167 by referring to FIG. 23.

The usage monitor 186 reads the usage control policy data 106 and the usage control status data 166 from the stack memory 200 and monitors so that the content is purchased and/or used within the range permitted by the related read usage control policy data 106 and usage control status data 166.

Here, the usage control policy data 106 has been stored in the key file KF shown in FIG. 4B stored in the stack memory 200 after decryption as explained by using FIG. 17.

Further, the usage control status data 166 is stored in the stack memory 200 when the purchase mode is determined by the user as will be mentioned later.

The charge processor 187 generates the usage log data 108 in response to a control signal S165 from the purchase/usage mode determination controller 165 shown in FIG. 16.

Here, the usage log data 108 describes the log of the purchase and usage modes of the secure container 104 by the user as mentioned before and is used when performing the settlement processing in accordance with the purchase of the secure container 104 and determining the payment of the license fee in the EMD service center 102.

Further, the charge processor 187 notifies the sale price or the suggested retailer' price data SRP read from the stack memory 200 to the user according to need.

Here, the sale price and the suggested retailer' price data SRP have been stored in the usage control policy data 106 of the key file KF shown in FIG. 4B stored in the stack memory 200 after decryption.

The charge processing by the charge processor 187 is carried out based on the content of the rights such as the license conditions indicated by the usage control policy data 106 and the usage control status data 166 under the monitoring of the usage monitor 186. Namely, the user purchases and uses the content within the range according to the related content of rights etc.

Further, the charge processor 187 generates the usage control status (UCS) data describing the purchase mode of the content by the user and writes this into the stack memory 200.

As the purchase modes of the content, there are for example a straight purchase without restriction as to reproduction by the purchaser and copying for the usage of the related purchaser and a reproduction charge charging whenever it is reproduced.

Here, the usage control status data 166 is generated when the user determines the purchase mode of the content, then is used for control so that the user uses the related content within the range permitted by the related determined purchase mode. The usage control status data 166 describes the ID of the content, the purchase mode, the price in accordance with the related purchase mode, the SAM_ID of the SAM with the purchase of the related content performed therefor, USER_ID of the purchasing user, etc.

Note that, where the determined purchase mode is the reproduction charge, for example, the usage control status data 166 is transmitted from the SAM 105₁ to the content provider 101 in real-time simultaneously with the purchase of the content data C, and the content provider 101 indicates to the EMD service center 102 to obtain the usage log data 108 at the SAM 105₁ within the predetermined period.

Further, where the determined purchase mode is a straight purchase, for example, the usage control status data 166 is transmitted in real-time to both of the content provider 101 and the EMD service center 102. In this way, in the present embodiment, in the both cases, the usage control status data 166 is transmitted in real-time to the content provider 101.

The EMD service center manager 185 transmits the usage log data 108 read from the external memory 201 via the external memory manager 811 to the EMD service center 102.

At this time, the EMD service center manager 185 generates the signature data $SIG_{200,SAM1}$ of the usage log data 108 by using the secret key data $K_{SAM1,S}$ in the signature processor 189 and transmits the signature data $SIG_{200,SAM1}$ together with the usage log data 108 to the EMD service center 102.

The usage log data 108 can be transmitted to the EMD service center 102 in response to for example a request from the EMD service center 102 or periodically or can be transmitted when the amount of the log information contained in the usage log data 108 becomes the predetermined amount or more. The related amount of information is determined in accordance with for example the storage capacity of the external memory 201.

The download memory manager 182 outputs the content data C read from the download memory 167, the content key data Kc read from the stack memory 200, and the user watermark data 196 input from the charge processor 187 to the decryption/decompression module manager 184 in the case where for example the reproduction operation of the content is carried out in response to a control signal S165 from the purchase mode determination controller 165 shown in FIG. 16.

Further, the decryption/decompression module manager 184 outputs the content file CF read from the download memory 167 and the content key data Kc and a semi-disclosure parameter data 199 read from the stack memory 200 to the decryption/decompression module manager 184 when performing a trial listening operation of the content in response to the control signal S165 from the purchase mode determination controller 165 shown in FIG. 16.

Here, the semi-disclosure parameter data 199 is described in the usage control policy data 106 and indicates the handling of the content in the trial listening mode. In the decryption/decompression module 163, it becomes possible to reproduce the encrypted content data C in the semi-disclosure state based on the semi-disclosure parameter data 199. As the procedure of the semi-disclosure, there is for example a procedure of designating the blocks to be decrypted and the blocks not to be decrypted by using the content key data Kc, limiting the reproduction function at the time of trial listening, or limiting a trial listening enable period by the semi-disclosure parameter data 199 by utilizing the fact that the decryption/decompression module 163 processes the data (signal) in units of predetermined blocks.

Below, an explanation will be made of the flow of the processing in the SAM $105_1$.

First, an explanation will be made of the flow of the processing up to when the purchase mode of the secure container 104 downloaded in the download memory 167 from the content provider 101 is determined by referring to FIG. 23 and FIG. 24.

Figure 24:
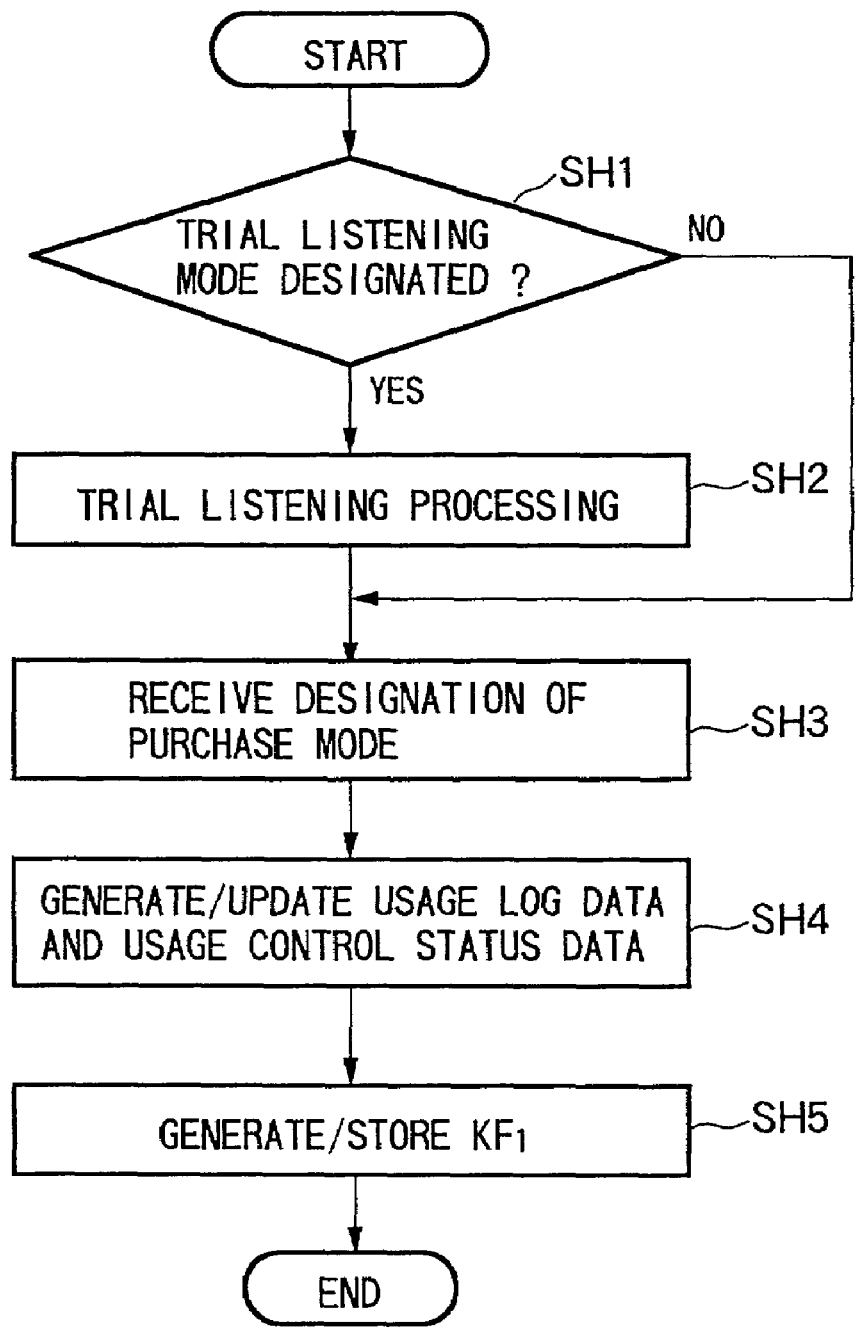
FIG. 24 is a flowchart of processing up to determination of a purchase mode of the secure container downloaded from the content provider in a download memory in the first embodiment.

FIG. 24 is a flowchart of the related processing.

Step SH1: In the charge processor 187, it is decided whether or not the control signal S165 indicating the trial listening mode was generated by the operation of the purchase/usage mode determination controller 165 shown in FIG. 16 by the user. When it is decided that it was generated, the processing of step SH2 is carried out, while when it was not so generated, the processing of step SH3 is carried out.

Step SH2: By the charge processor 187, for example, the content file CF stored in the download memory 167 is output via the decryption/decompression module manager 184 to the decryption/decompression module 163 shown in FIG. 16.

At this time, the mutual authentication between the mutual authenticator 170 and the media SAM 167a and the encryption and/or decryption by the session key data $K_{SES}$ and the mutual authentication between the mutual authenticator 170 and the mutual authenticator 220 and the encryption and/or decryption by the session key data $K_{SES}$ are carried out with respect to the content file CF.

The content file CF is decrypted at a decryptor 221 shown in FIG. 16 and then output to a decryptor 222.

Further, the content key data Kc and the semi-disclosure parameter data 199 read from the stack memory 200 are output to the decryption/decompression module 163 shown in FIG. 16. At this time, after the mutual authentication between the mutual authenticator 170 and the mutual authenticator 220, the encryption and decryption by the session key data $K_{SES}$ are carried out with respect to the content key data Kc and the semi-disclosure parameter data 199.

Next, the decrypted semi-disclosure parameter data 199 is output to a semi-disclosure processor 225, and the content data C is decrypted using the content key data Kc by the decryptor 222 by semi-disclosure under the control from the semi-disclosure processor 225.

Next, the content data C decrypted by semi-disclosure is decompressed at a decompression unit 223 and then output to an electronic watermark information processor 224.

Next, the user watermark data 196 is buried in the content data C in the electronic watermark information processor 224, then the content data C is reproduced at the reproduction module 169, and the audio in accordance with the content data C is output.

Step SH3: When the user determines the purchase mode by operating the purchase/usage mode determination controller 165, the control signal S165 indicating the related determined purchase mode is output to the charge processor 187.

Step SH4: In the charge processor 187, the usage log data 108 and the usage control status data 166 in accordance with the determined purchase mode are generated, the usage log data 108 is written into the external memory 201 via the external memory manager 811, and the usage control status data 166 is written into the stack memory 200.

Thereafter, in the usage monitor 186, control (monitoring) is carried out so that the content are purchased and used within the range permitted by the usage control status data 166.

Figure 29:
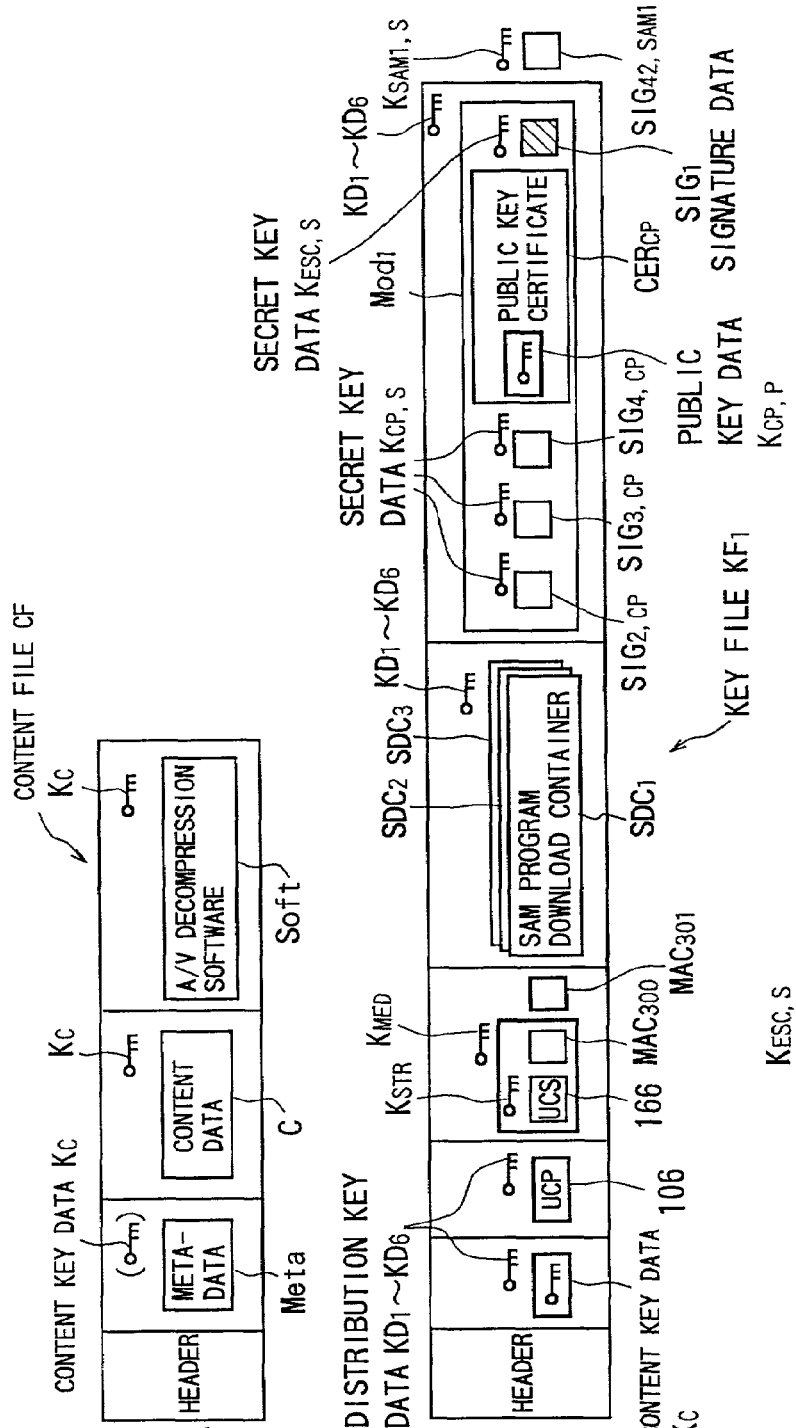
FIG. 29 is a view for explaining the format of a secure container with the purchase mode already determined.

Step SH5: The usage control status data 166 is added to the key file KF stored in the stack memory 200 to generate a new key file $KF_1$ having the purchase mode determined therein shown in FIG. 29B mentioned later. The key file $KF_1$ is stored in the stack memory 200.

As shown in FIG. 29B, the usage control status data 166 stored in the key file $KF_1$ has been encrypted by utilizing the CBC mode of the DES by using the storage key data $K_{STR}$. Further, the MAC value generated by using the related storage key data $K_{STR}$ as the MAC key data, that is, $MAC_{300}$, is added. Further, a module comprised by the usage control status data 166 and the $MAC_{300}$ is encrypted by utilizing CBC mode of the DES by using the media key data $K_{MED}$. Further, the MAC value generated by using the related media key data $K_{MED}$ as the MAC key data, that is, $MAC_{301}$, is added to the related module.

Below, an explanation will be made of the flow of the processing in the case where the content data C having the purchase mode already determined and stored in the download memory 167 is reproduced by referring to FIG. 23 and FIG. 25.

Figure 25:
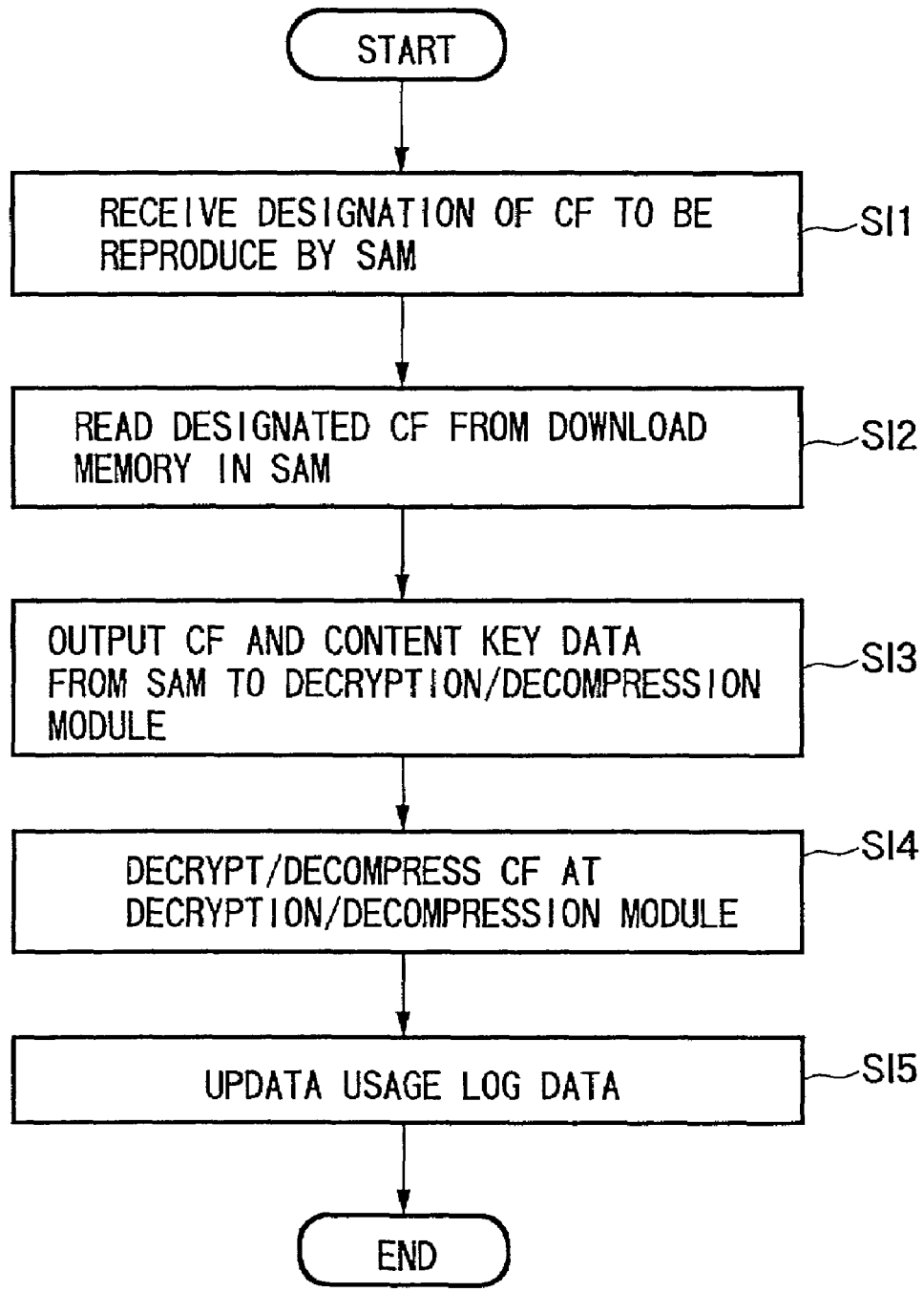
FIG. 25 is a flowchart of processing in the case of reproduction of content data with the purchase mode already determined stored in the download memory in the first embodiment.

FIG. 25 is a flowchart of the related processing.

Step SI1: The charge processor 187 receives as its input the control signal S165 designating the content to be reproduced in accordance with the operation by the user.

Step SI2: In the charge processor 187, the content file CF stored in the download memory 167 is read based on the control signal S165 under the monitoring of the usage monitor 186.

Step SI3: The related read content file CF is output to the decryption/decompression module 163 shown in FIG. 16. At this time, the mutual authentication is carried out between the mutual authenticator 170 shown in FIG. 23 and the mutual authenticator 220 of the decryption/decompression module 163 shown in FIG. 16.

Further, the content key data Kc read from the stack memory 200 is output to the decryption/decompression module 163.

Step SI4: The decryptor 222 of the decryption/decompression module 163 decrypts the content file CF using the content key data Kc and the decompression processing by the decompression unit 223 and reproduces the content data C at the reproduction module 169.

Step SI5: The charge processor 187 updates the usage log data 108 stored in the external memory 201 in response to the control signal S165.

The usage log data 108 is read from the external memory 201, and then passes through the mutual authentication and is transmitted via the EMD service center manager 185 together with the signature data SIG200,SAM1 to the EMD service center 102.

Figure 26:
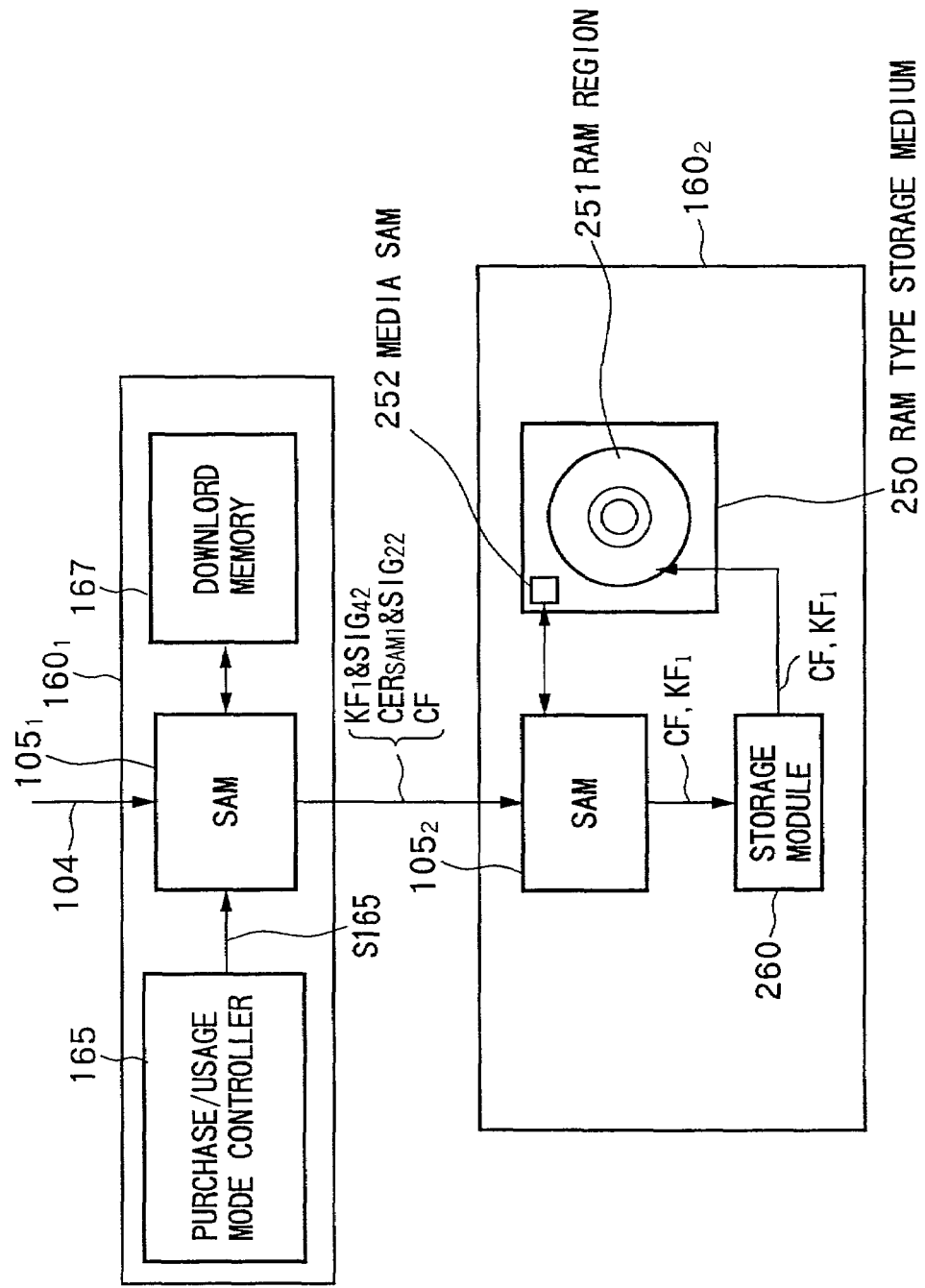
FIG. 26 is a view for explaining the flow of the processing in a SAM of the source of transfer when transferring a content file with the purchase mode already determined downloaded in the download memory of the network apparatus shown in FIG. 16 to a SAM of an AV apparatus.

Below, an explanation will be made of the flow of the processing in the SAM $105_1$ in a case where, as shown in FIG. 26, for example the content file CF having the purchase mode already determined and downloaded in the download memory 167 of the network apparatus 160₁ and the key file KF are transferred to the SAM 105₂ of the AV apparatus 160₂ via the bus 191 by referring to FIG. 27 and FIG. 28.

Figure 28:
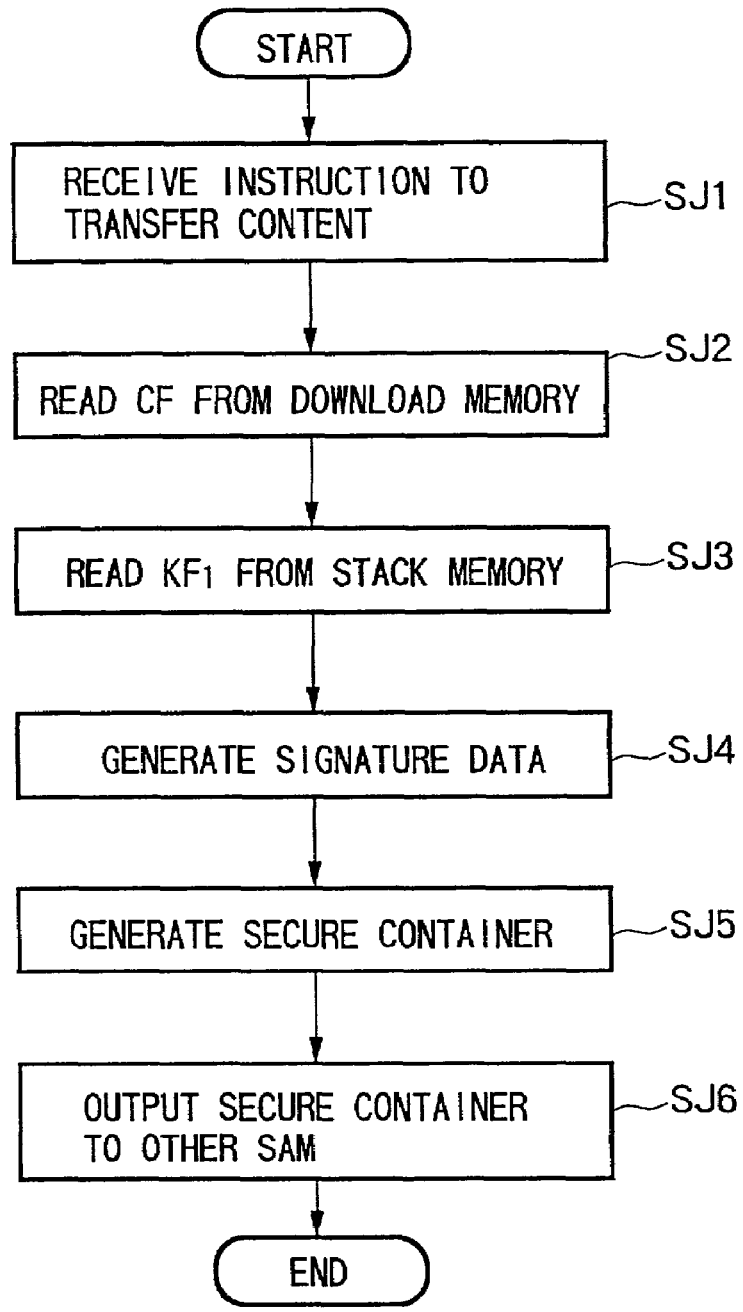
FIG. 28 is a flowchart of the processing in a SAM when transferring the content file and the key file with the purchase mode already determined therein downloaded in the download memory of the network apparatus to a SAM of another AV apparatus in the first embodiment.

FIG. 28 is a flowchart of the related processing.

Step SJ1: The user operates the purchase/usage mode determination controller 165 and indicates the transfer of the predetermined content stored in the download memory 167 to the AV apparatus 160₂, and the control signal S165 in accordance with the related operation is output to the charge processor 187.

By this, the charge processor 187 updates the usage log data 108 stored in the external memory 201 based on the control signal S165.

Step SJ2: The download memory manager 182 outputs the content file CF shown in FIG. 29A read from the download memory 167 to the SAM manager 190.

Step SJ3: The key file $KF_1$ shown in FIG. 29B read from the stack memory 200 is output to the signature processor 189 and the SAM manager 190.

Step SJ4: The signature processor 189 generates signature data $SIG_{42,SAM1}$ of the key file $KF_1$ read from the stack memory 200 and outputs this to the SAM manager 190.

Further, the SAM manager 190 reads public key certificate data $CER_{SAM1}$ shown in FIG. 29C and signature data $SIG_{22,ESC}$ thereof from the storage unit 192.

Step SJ5: The mutual authenticator 170 outputs the session key data $K_{SES}$ obtained by the mutual authentication with the SAM 105₂ to the encryptor/decryptor 171.

The SAM manager 190 generates a new secure container comprised by data shown in FIG. 29A, FIG. 29B, and FIG. 29C.

Step SJ6: The encryptor/decryptor 171 encrypts the data by using the session key data $K_{SES}$ and then output it to the SAM 105₂ of the AV apparatus 160₂ shown in FIG. 26.

At this time, parallel to the mutual authentication between the SAM 105₁ and the SAM 105₂, the mutual authentication of the bus 191 as the IEEE1394 serial bus is carried out.

Figure 30:
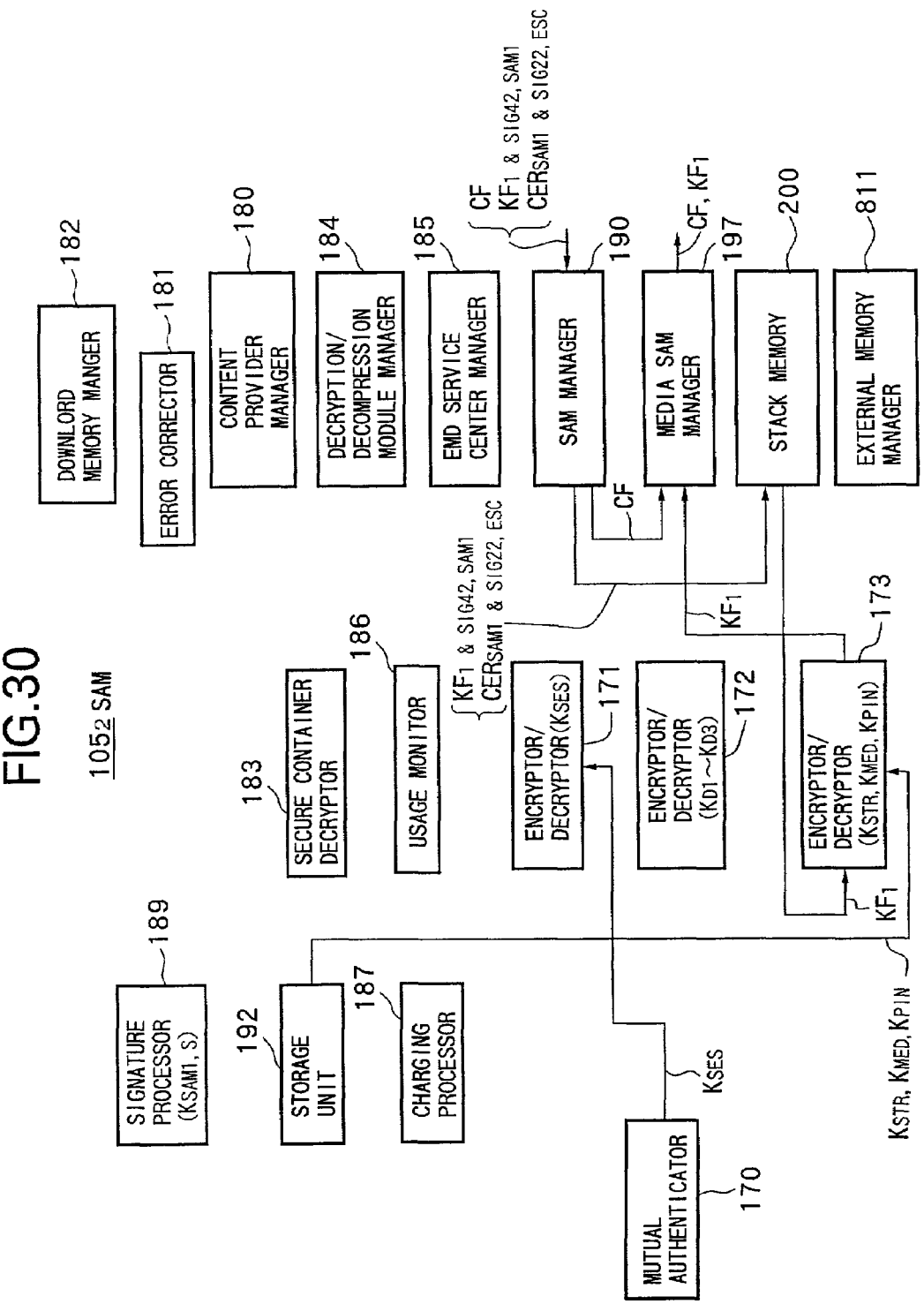
FIG. 30 is a view of the flow of the data when writing an input content file etc. into a RAM type or ROM type storage medium in the SAM of the source of transfer in the case shown in FIG. 26.

Below, as shown in FIG. 26, the flow of the processing in the SAM 105₂ when writing the content file CF etc. input from the SAM 105₁ into a storage media such as a RAM type will be explained by referring to FIG. 30 and FIG. 31.

Figure 31:
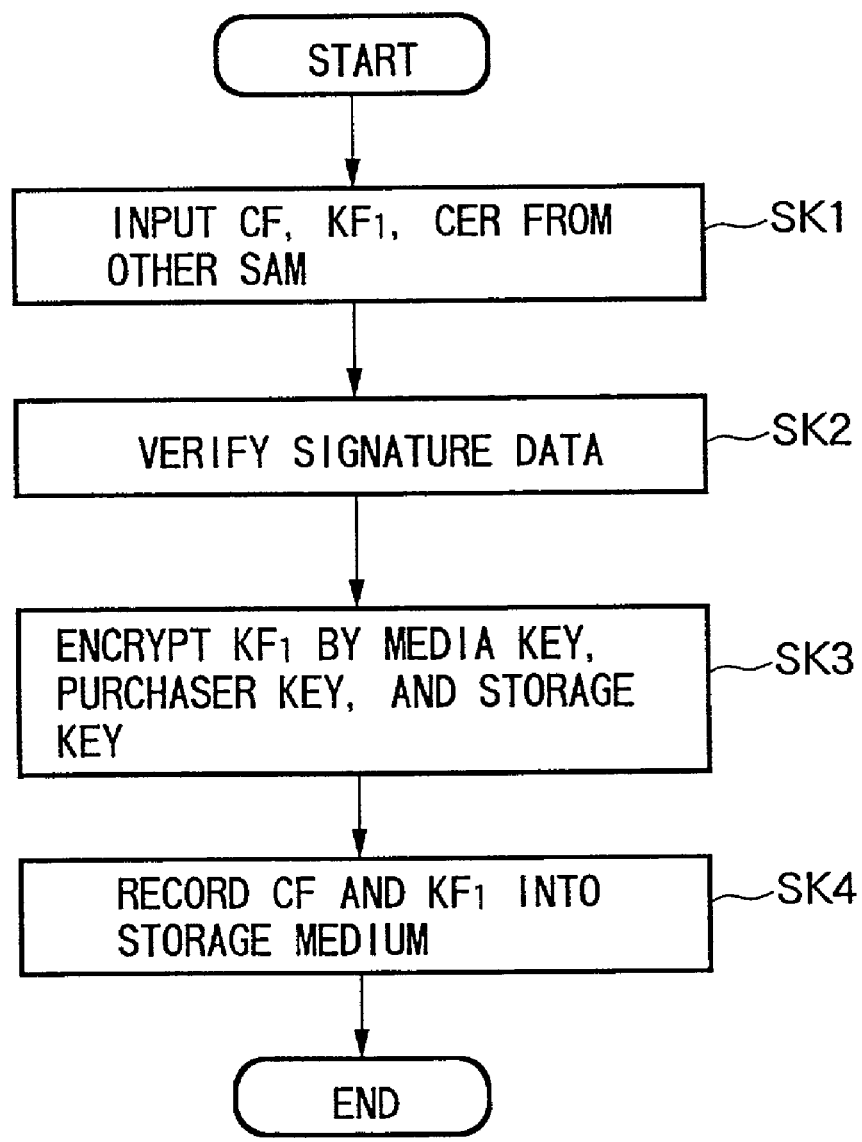
FIG. 31 is a flowchart of the processing in the SAM when writing a content file input from another SAM etc. into a storage medium of a RAM type or the like in the first embodiment.
Figure 32:
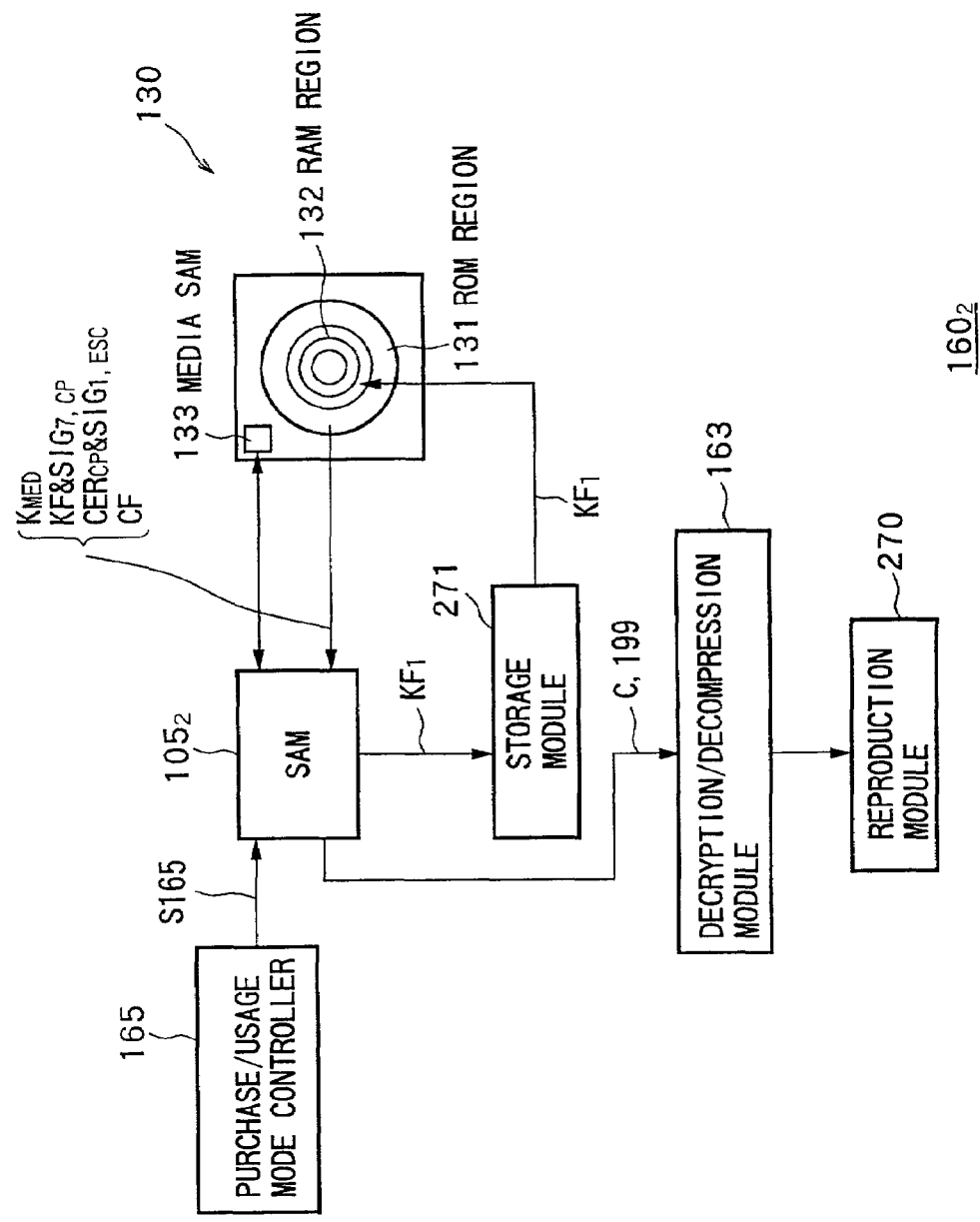
FIG. 32 is a view for explaining the flow of the processing when determining the purchase mode in an AV apparatus when the user home network receives off-line the distribution of the ROM type storage medium shown in FIG. 6 wherein the purchase mode of the content has not yet been determined.
Figure 33:
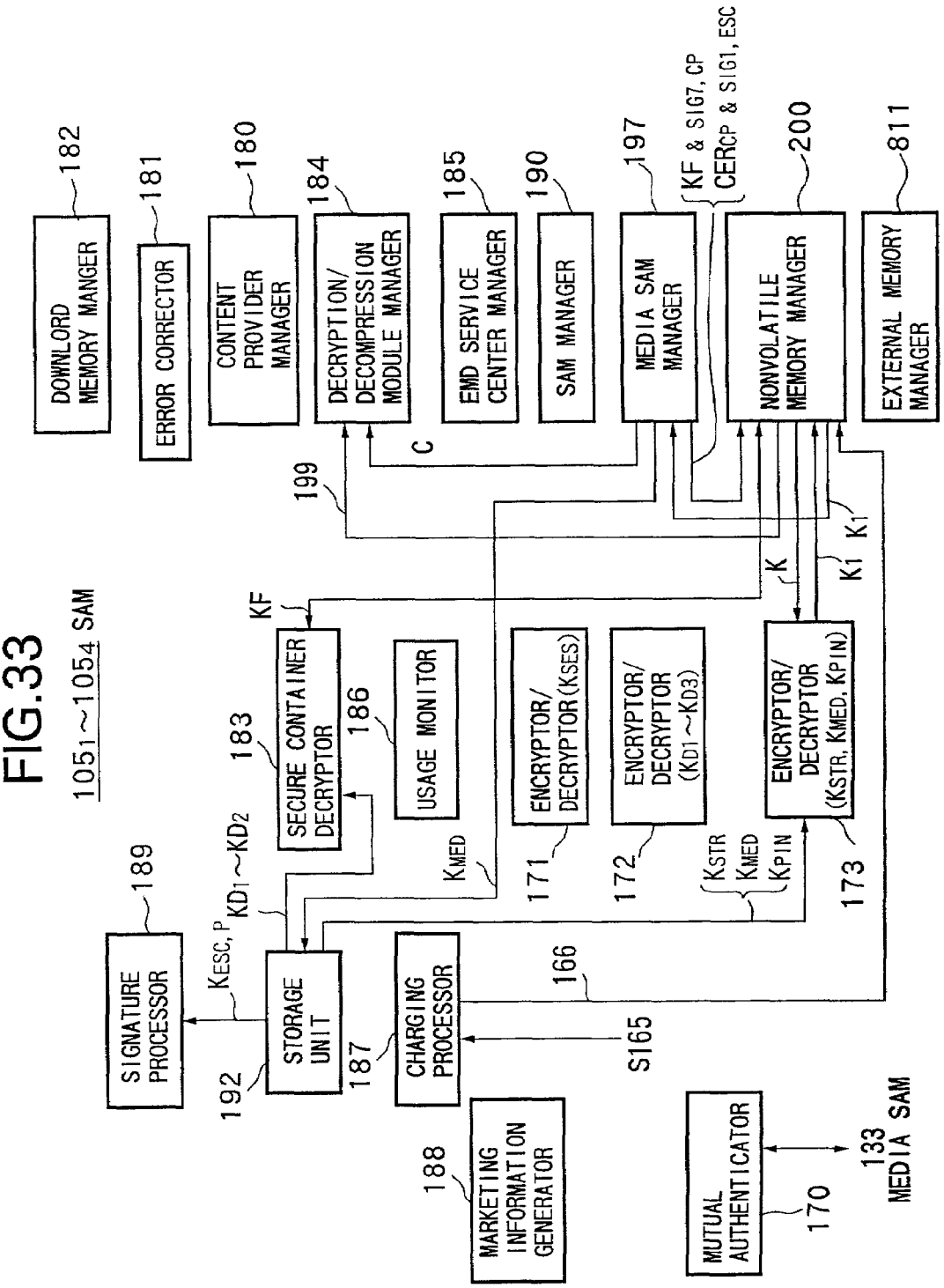
FIG. 33 is a view of the flow of the data in a SAM in the case shown in FIG. 32.
Figure 34:
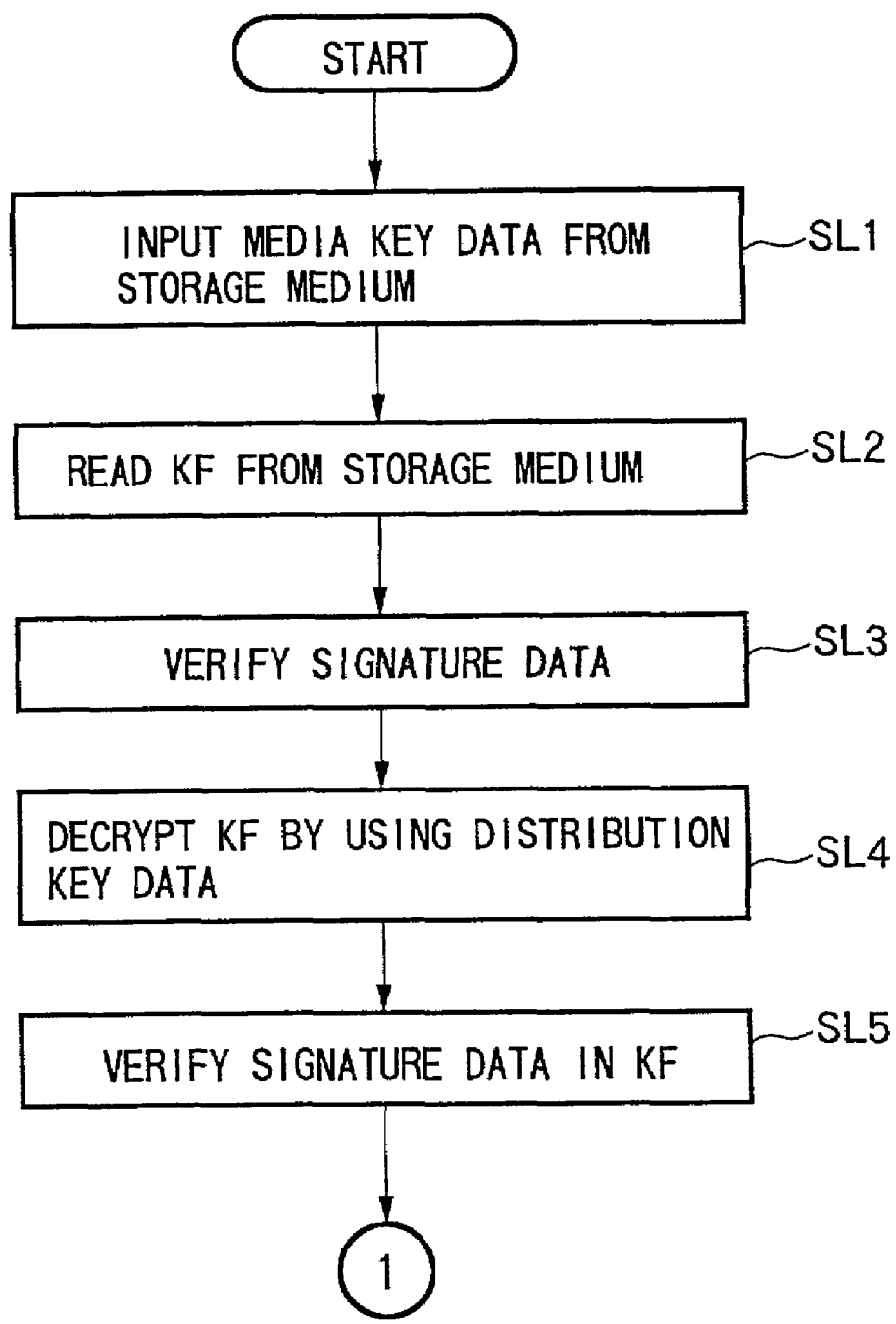
FIG. 34 is a flowchart of processing when determining the purchase mode in an AV apparatus when the user home network receives off-line the distribution of the ROM type storage medium shown in FIG. 5 wherein the purchase mode of the content has not yet been determined in the first embodiment.
Figure 35:
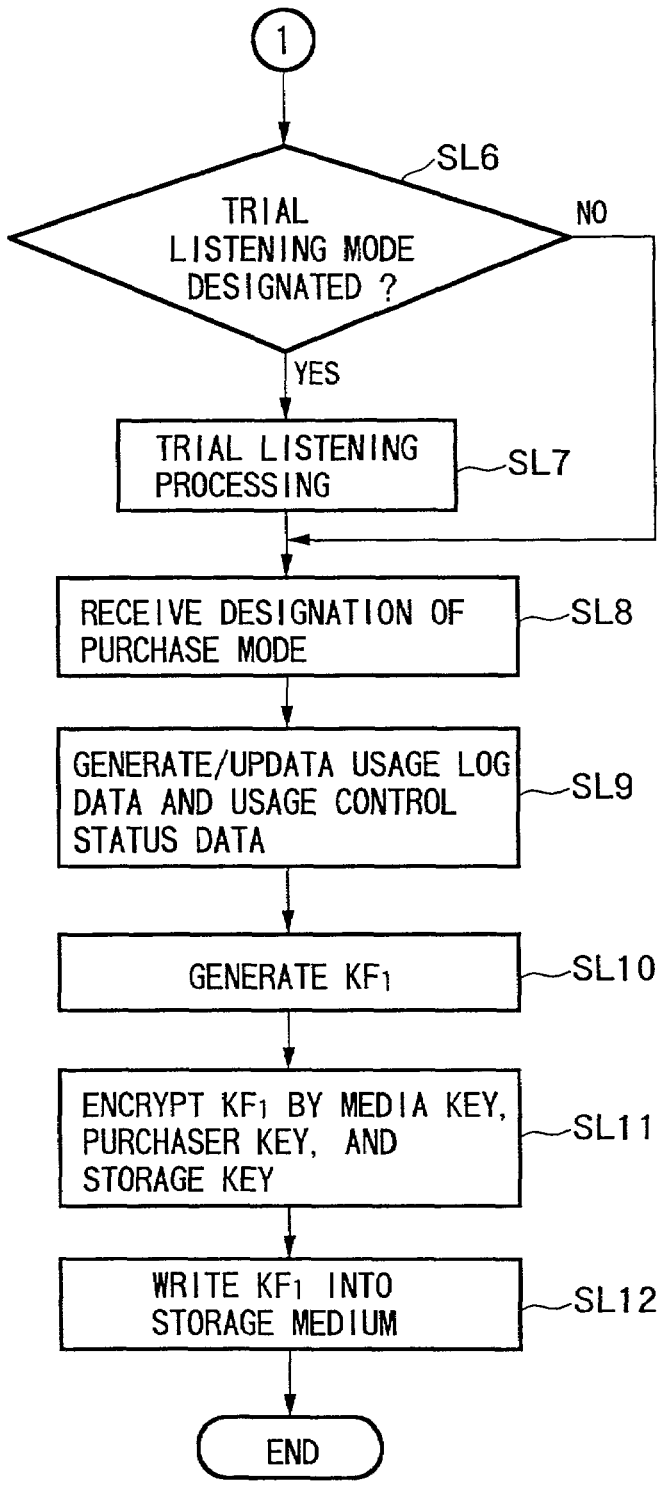
FIG. 35 is a flowchart continuing from the flowchart of FIG. 34.

FIG. 31 is a flowchart of the related processing.

Step SK1: The SAM manager 190 of the SAM 105₂ receives as its inputs the content file CF shown in FIG. 29A, key file $KF_1$, and the signature data $SIG_{42,SAM1}$ thereof shown in FIG. 29B and public key certificate data $CER_{SAM1}$ and the signature data $SIG_{22,ESC}$ thereof shown in FIG. 29C from the SAM 105₁ of the network apparatus 160₁ as shown in FIG. 26.

Then, the encryptor/decryptor 171 decrypts the content file CF, the key file $KF_1$ and the signature data $SIG_{42,SAM1}$ thereof, and the public key certificate data $CER_{SAM1}$ and the signature data $SIG_{22,ESC}$ thereof input by the SAM manager 190 by using the session key data $K_{SES}$ obtained by the mutual authentication between the mutual authenticator 170 and the mutual authenticator 170 of the SAM 105₁.

Next, the key file $KF_1$ and the signature data $SIG_{42,SAM1}$ thereof and public key certificate data $CER_{SAM1}$ and the signature data $SIG_{22,ESC}$ thereof decrypted by using the session key data $K_{SES}$ are written into the stack memory 200.

Step SK2: The signature processor 189 verifies the signature data $SIG_{22,ESC}$ read from the stack memory 200 by using the public key data $K_{ESC,P}$ read from the storage unit 192 and confirms the legitimacy of public key certificate data $CER_{SAM1}$.

Then, the signature processor 189 confirms the legitimacy of the signature data $SIG_{42,SAM1}$ by using the public key data $K_{SAM1,P}$ stored in the public key certificate data $CER_{SAM1}$ when confirming the legitimacy of the public key certificate data $CER_{SAM1}$.

Next, when the legitimacy of the signature data $SIG_{42,SAM1}$ that is the legitimacy of the creator of the key file $KF_1$, is confirmed, it reads the key file $KF_1$ shown in FIG. 29B from the stack memory 200 and outputs it to the encryptor/decryptor 173.

Note that, in the related example, the case where the creator of the key file $KF_1$ and the source of transmission were the same was explained, but when the creator of the key file KF1 and the source of transmission are different, the signature data of the creator and the signature data of the transmitter are generated with respect to the key file $KF_1$ and the legitimacy of both signature data is verified at the signature processor 189.

Step SK3: The encryptor/decryptor 173 sequentially encrypts the key file $KF_1$ by using the storage key data $K_{STR}$, media key data $K_{MED}$, and purchaser key data $K_{PIN}$ read from the storage unit 192 and outputs the same to the media SAM manager 197.

Figure 27:
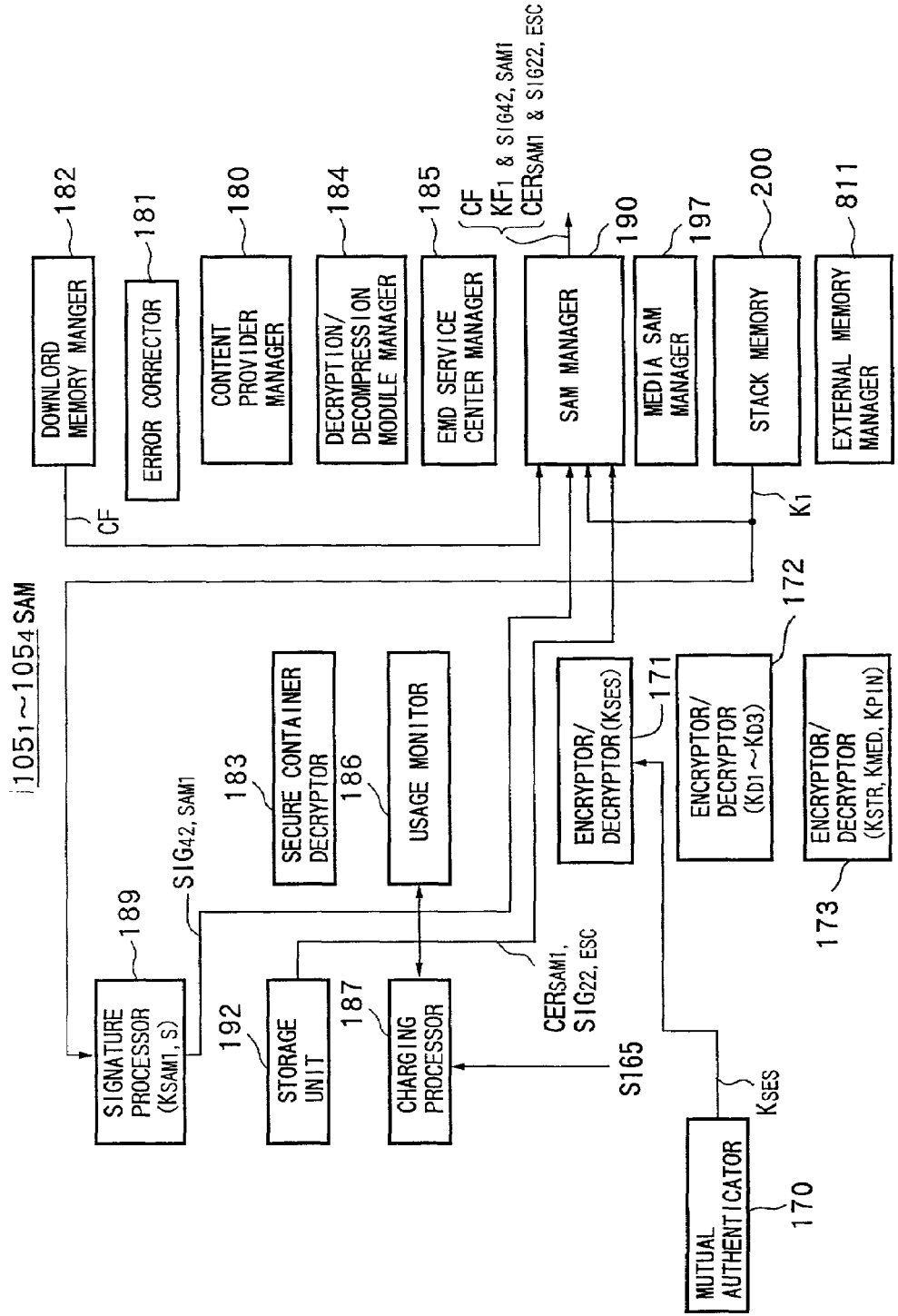
FIG. 27 is a view of the flow of the data in a SAM of the source of transfer in the case shown in FIG. 26.

Note that, the media key data $K_{MED}$ is stored in the storage unit 192 in advance by the mutual authentication between the mutual authenticator 170 shown in FIG. 27 and the media SAM 252 of the RAM type storage media 250 shown in FIG. 26.

Here, the storage key data $K_{STR}$ is the data determined in accordance with the type of the apparatus, for example, a SACD (super audio compact disc) or DVD (digital versatile disc) apparatus, CD-R apparatus, and MD (Mini Disc) apparatus (AV apparatus 160₂ in the related example) and is used for establishing a one-to-one correspondence between the types of the apparatuses and the types of the storage media. Note that the physical configurations of the disc media are the same between an SACD and a DVD, so there is a case where the storage and/or reproduction of the SACD storage media can be carried out by using a DVD apparatus. The storage key data $K_{STR}$ plays te role of preventing illicit copying in such a case.

Further, the media key data $K_{MED}$ is data unique to the storage medium (the RAM type storage medium 250 in the related example).

The media key data $K_{MED}$ is stored in the storage media (the RAM type storage media 250 shown in FIG. 26 in the related example) side and preferably performs the encryption and decryption using the media key data $K_{MED}$ in the media SAM of the storage media from the viewpoint of the security. At this time, the media key data $K_{MED}$ is stored in the related media SAM when the media SAM is mounted in the storage media, while is stored in for example a region in the RAM region out of the management of the host CPU 810 when the media SAM is not mounted in the storage media.

Note that, as in the present embodiment, it is also possible that the mutual authentication be carried out between the apparatus side SAM (SAM 105₂ in the related example) and the media SAM (media SAM 252 in the related example), the media key data $K_{MED}$ be transferred to the apparatus side SAM via the secure communication route, and the encryption and decryption using the media key data $K_{MED}$ be carried out in the apparatus side SAM.

In the present embodiment, the storage key data $K_{STR}$ and the media key data $K_{MED}$ are used for protecting the security of the level of the physical layer of the storage media.

Further, the purchaser key data $K_{PIN}$ is the data indicating the purchaser of the content file CF and is allocated to the related purchased user by the EMD service center 102 when the user purchases the content by for example a straight purchase. The purchaser key data $K_{PIN}$ is managed in the EMD service center 102.

Step SK4: The media SAM manager 197 outputs the content file CF input from the SAM manager 190 and the key file $KF_1$ input from the encryptor/decryptor 173 to the storage module 260 shown in FIG. 26.

Then, the storage module 260 writes the content file CF and key file $KF_1$ input from the media SAM manager 197 into the RAM region 251 of the RAM type storage media 250 shown in FIG. 26. In this case, it is also possible that the key file $KF_1$ be written into the media SAM 252.

Below, the flow of the processing when determining the purchase mode in the AV apparatus $160_2$ when a user home network 303 receives off-line the distribution of the ROM type storage medium 130 shown in FIG. 6 having the not yet determined purchase mode of the content will be explained by referring to FIG. 32, FIG. 33, FIG. 34, and FIG. 35.

Step SL1: The SAM $105_2$ of the AV apparatus $160_2$ first performs the mutual authentication between the mutual authenticator 170 shown in FIG. 33 and the media SAM 133 of the ROM type storage media 130 shown in FIG. 6 and then receives as its input the media key data $K_{MED}$ from the media SAM 133.

Note that, it is also possible that the related input not be carried out when the SAM $105_2$ holds the media key data $K_{MED}$ in advance.

Step SL2: The key file KF and signature data $SIG_{7,CP}$ thereof and the public key certificate data $CER_{CP}$ and signature data $SIG_{1,ESC}$ thereof shown in FIGS. 4B and 4C stored in the secure container 104 stored in the RAM region 132 of the ROM type storage media 130 are input via the media SAM manager 197 and are written into the stack memory 200.

Step SL3: The signature processor 189, after confirming the legitimacy of the signature data $SIG_{1,ESC}$, fetches the public key data $K_{CP,P}$ from public key certificate data $CER_{CP}$ and verifies the legitimacy of the signature data $SIG_{7,CP}$ that is, the legitimacy of the creator of the key file KF, by using this public key data $K_{CP,P}$.

Step SL4: When the legitimacy of the signature data $SIG_{7,CP}$ is confirmed at the signature processor 189, the key file KF is read from the stack memory 200 to the secure container decryptor 183.

Then, the secure container decryptor 183 decrypts the key file KF by using the distribution key data $KD_1$ to $KD_3$ of the corresponding period.

Step SL5: The signature processor 189, after confirming the legitimacy of a signature data $SIG_{1,ESC}M$ stored in the key file KF by using the public key data $K_{ESC,P}$ verifies the legitimacy of the signature data $SIG_{2,CP}$ to $SIG_{4,CP}$, that is, the legitimacy of the creator of the content data C, content key data Kc, and the usage control policy data 106, by using the public key data $K_{CP,P}$ stored in the public key certificate data $CER_{CP}$ in the key file KF.

Step SL6: The charge processor 187 decides whether or not a control signal S165 indicating the trial listening mode was generated by the operation of the purchase/usage mode determination controller 165 shown in FIG. 16 by the user, and where the generation is decided, the processing of step SL7 is carried out, and while where the generation is not decided, the processing of step SL8 is carried out.

Step SL7: After the mutual authentication between the mutual authenticator 170 shown in FIG. 33 and the decryption/decompression module 163 shown in FIG. 32, the decryption/decompression module manager 184 of the SAM $105_2$ outputs the content key data Kc stored in the stack memory 200, the semi-disclosure parameter data 199 stored in the usage control policy data 106, and the content data C read from the ROM region 131 of the ROM type storage media 130 to the decryption/decompression module 166 shown in FIG. 32. Next, the decryption/decompression module 163 decrypts the content data C in the semi-disclosure mode by using the content key data Kc and then decompresses it and outputs it to a reproduction module 270. Then, the reproduction medial 270 reproduces the content data C from the decryption/decompression module 163 in the trial listening mode.

Step SL8: The purchase mode of the content is determined by the purchase operation of the purchase mode determination controller 165 shown in FIG. 32 by the user, then the control signal S165 indicating the related determined purchase mode is input to the charge processor 187.

Step SL9: The charge processor 187 generates the usage control status data 166 in response to the control signal S165 and writes this into the stack memory 200.

Further, the charge processor 187 generates or updates the usage log data 108.

Step SL10: For example, a new key file $KF_1$ shown in FIG. 29B storing the usage control status data 166 in the key file KF shown in FIG. 4B is output from the stack memory 200 to the encryptor/decryptor 173.

Step SL11: The encryptor/decryptor 173 sequentially encrypts the key file $KF_1$ shown in FIG. 29B read from the stack memory 200 by using the storage key data $K_{STR}$, media key data $K_{MED}$, and the purchaser key data $K_{PIN}$ read from the storage unit 192 and outputs the same to the media SAM manager 197.

Step SL12: After the mutual authentication between the mutual authenticator 170 shown in FIG. 33 and the media SAM 133 shown in FIG. 32, the SAM manager 197 writes the key file $KF_1$ input from the encryptor/decryptor 173 via a storage module 271 shown in FIG. 32 into the RAM region 132 or the media SAM 133 of the ROM type storage media 130.

By this, the ROM type storage media 130 having the purchase mode determined is obtained.

At this time, the usage control status data 166 and the usage log data 108 generated by the charge processor 187 are read from the stack memory 200 and the external memory 201 at the predetermined timing and transmitted to the EMD service center 102.

Figure 36:
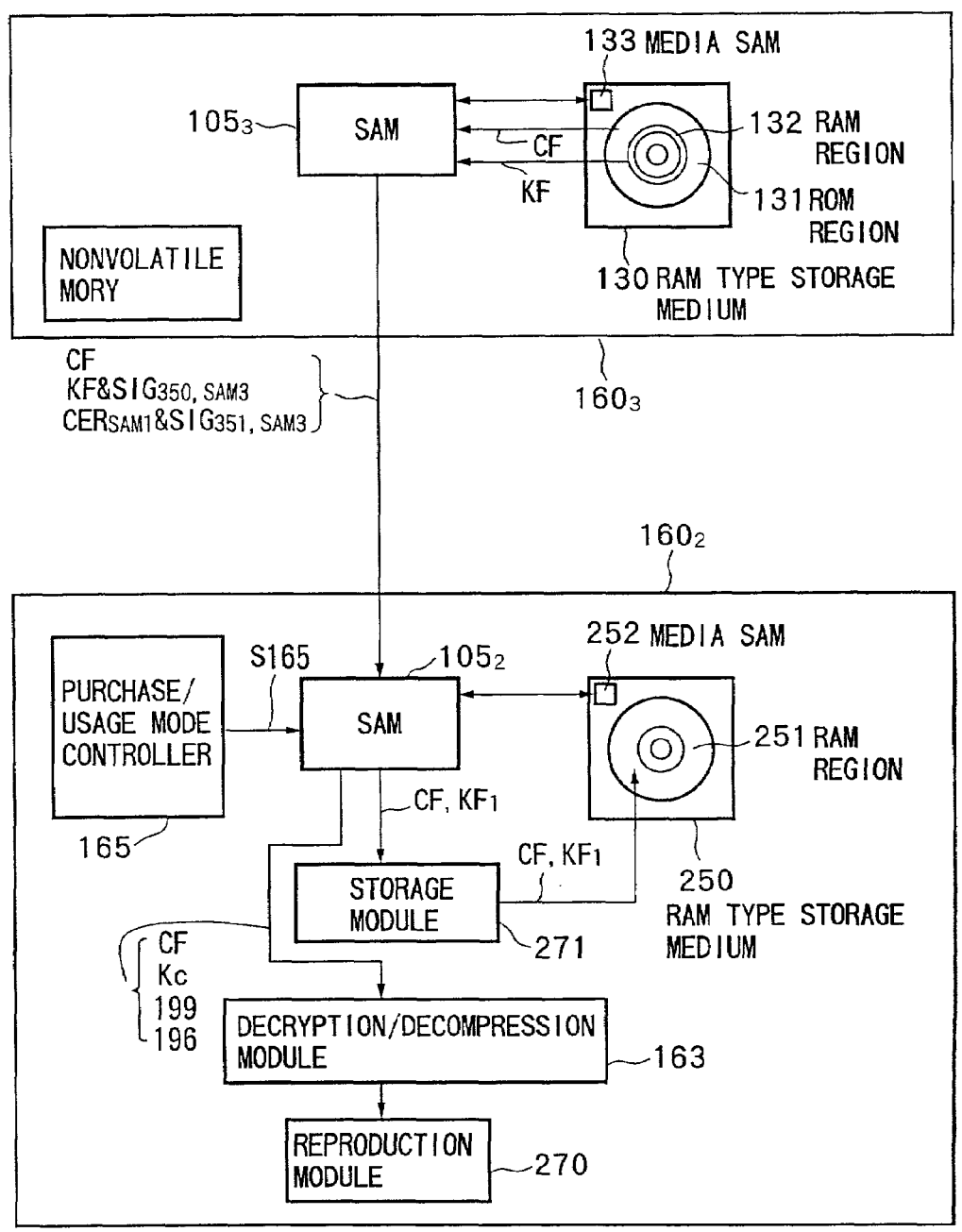
FIG. 36 is a view for explaining the flow of processing when reading a secure container from a ROM type storage medium wherein the purchase mode of the content has not yet been determined in an AV apparatus in the user home network, transferring this to another AV apparatus, and writing the same into a RAM type storage medium.

Below, as shown in FIG. 36, an explanation will be made of the flow of the processing when reading the secure container 104 from the ROM type storage media 130 having the not yet determined purchase mode in the AV apparatus $160_3$ and transferring the same to the AV apparatus $160_2$, determining the purchase mode at the AV apparatus $160_2$, and writing the same into RAM type storage media 250 by referring to FIG. 37 and FIG. 38.

Figure 37:
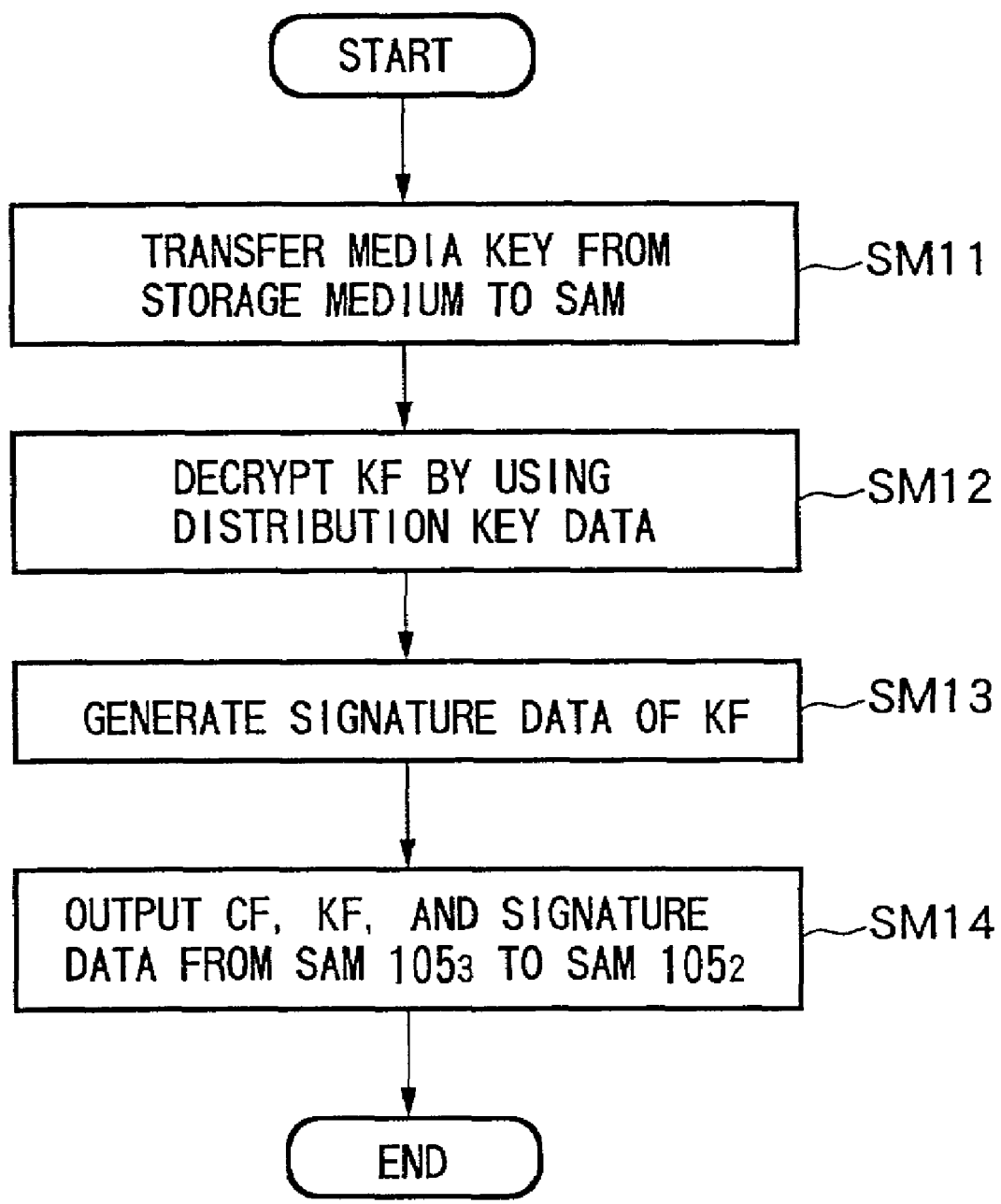
FIG. 37 is a flowchart of processing of a first AV apparatus when reading a secure container from a ROM type storage medium wherein the purchase mode of the content has not yet been determined in a first AV apparatus as shown in FIG. 36, transferring this to a second AV apparatus, determining the purchase mode in the second AV apparatus, and writing the same into a RAM type storage medium.

FIG. 37 is a flowchart of the related processing in the SAM $105_3$.

FIG. 38 is a flowchart of the related processing in the SAM $105_2$. Note that, the secure container 104 may be transferred from the ROM type storage media 130 to the RAM type storage media 250 between the network apparatus $160_1$ and any of the AV apparatuses $160_2$ to $160_4$ shown in FIG. 1.

Step SM11 (FIG. 37): The mutual authentication is carried out between the SAM $105_3$ of the AV apparatus $160_3$ and the media SAM 133 of the ROM type storage media 130, then a media key data $K_{MED1}$ of the ROM type storage media 130 is transferred to the SAM $105_3$.

At this time, similarly, the mutual authentication is carried out between the SAM $105_2$ of the AV apparatus $160_2$ and a media SAM 252 of the RAM type storage media 250, then a media key data $K_{MED2}$ of the RAM type storage media 250 is transferred to the SAM $105_2$.

Step SM12: The SAM $105_3$ sequentially decrypts the key file KF, the signature data $SIG_{7,CP}$, and the public key certificate data $CER_{CP}$ and the signature data $SIG_{1,SEC}$ thereof of FIGS. 4B and 4C read from the RAM region 132 in the encryptor/decryptor 172 shown in FIG. 40 by using the distribution key data $KD_1$ to $KD_3$ of the corresponding period.

Next, the content file CF decrypted in the encryptor/decryptor 172 is output to the encryptor/decryptor 171, encrypted by using the session key data $K_{SES}$ obtained by the mutual authentication between the SAM $105_3$ and $105_2$, and then output to the SAM manager 190.

Further, the key file KF decrypted in the encryptor/decryptor 172 is output to the encryptor/decryptor 171 and the signature processor 189.

Step SM13: The signature processor 189 generates the signature data $SIG_{350,SAM3}$ of the key file KF by using the secret key data $K_{SAM3,S}$ of the SAM $105_3$ and outputs this to the encryptor/decryptor 171.

Step SM14: The encryptor/decryptor 171 encrypts the public key certificate data $CER_{SAM3}$ of the SAM $105_3$ and the signature data $SIG_{351,ESC}$ thereof, the key file KF and the signature data $SIG_{350,SAM3}$ thereof read from the storage unit 192, and the content file CF shown in FIG. 4A read from the ROM region 131 of the ROM type storage media 130 by using the session key data $K_{SES}$ obtained by the mutual authentication between the SAM $105_3$ and $105_2$ and then outputs the same to the SAM $105_2$ of the AV apparatus $160_2$ via the SAM manager 190.

Step SN1 (FIG. 38): In the SAM $105_2$, as shown in FIG. 41, the content file CF input from the SAM $105_3$ via the SAM manager 190 is decrypted by using the session key data $K_{SES}$ in the encryptor/decryptor 171 and then written into a RAM region 251 of the RAM type storage media 250 via the media SAM manager 197.

Further, the key file KF and the signature data $SIG_{350,SAM3}$ thereof and the public key certificate data $CER_{SAM3}$ and the signature data $SIG_{351,ESC}$ thereof input from the SAM $105_3$ via the SAM manager 190 are written into the stack memory 200 and then decrypted by using the session key data $K_{SES}$ in the encryptor/decryptor 171.

Step SN2: The related decrypted signature data $SIG_{351,ESC}$ is verified in the signature processor 189. When the legitimacy thereof is confirmed, the legitimacy of the signature data $SIG_{350,SAM3}$ that is, the legitimacy of the source of transmission of the key file KF, is confirmed by using the public key data $K_{SAM3}$ stored in the public key certificate data $CER_{SAM3}$.

Then, when the legitimacy of the signature data $SIG_{350,SAM3}$ is confirmed, the key file KF is read from the stack memory 200 and output to the secure container decryptor 183.

Step SN3: The secure container decryptor 183 decrypts the key file KF by using the distribution key data $KD_1$ to $KD_3$ of the corresponding period and writes the related decrypted key file KF into the stack memory 200 after the predetermined signature verification.

Thereafter, the usage control policy data 106 stored in the key file KF already decrypted and stored in the stack memory 200 is output to the usage monitor 186. Then, the usage monitor 186 manages the purchase mode and the usage mode of the content based on the usage control policy data 106.

Step SN4: The charge processor 187 decides whether or not the control signal S165 indicating the trial listening mode is generated by the operation of the purchase/usage mode determination controller 165 of FIG. 16 by the user, performs the processing of step SN55 when it decides it is generated, and performs the processing of step SN6 when it is not generated.

Step SN5: When the trial listening mode is selected by the user, the content data C of the content file CF already decrypted by the session key data $K_{SES}$, the content key data Kc stored in the stack memory 200, the semi-disclosure parameter data 199, and the user watermark data 196 obtained from the usage control policy data 106 are output to the reproduction module 270 via the decryption/decompression module manager 184 shown in FIG. 36 after the mutual authentication. Then, the reproduction module 270 reproduces the content data C corresponding to the trial listening mode.

Step SN6: The purchase and/or usage mode of the content is determined by the operation of the purchase/usage determination controller 165 shown in FIG. 36 by the user, then the control signal S165 in accordance with the related determination is output to the charge processor 187.

Step SN7: The charge processor 187 generates the usage control status data 166 and the usage log data 108 in accordance with the determined purchase and/or usage mode and writes this into the stack memory 200 and the external memory 201.

Step SN8: For example, the key file $KF_1$ shown in FIG. 29B storing the usage control status data 166 read from the stack memory 200 is generated, then this is output to the encryptor/decryptor 173.

Step SN9: The encryptor/decryptor 173 sequentially encrypts the data by using the storage key data $K_{STR}$, media key data $K_{MED2}$, and the purchaser key data $K_{PIN}$ read from the storage unit 192 and outputs it to the media SAM manager 197.

Step SN10: The media SAM manager 197 writes the key file $KF_1$ into the RAM region 251 or the media SAM 252 of the RAM type storage media 250 by the storage module 271 shown in FIG. 36.

Further, the usage control status data 166 and the usage log data 108 are transmitted to the EMD service center 102 at the predetermined timing.

Below, an explanation will be made of the method of realization of the SAMs $105_1$ to $105_4$.

When realizing the functions of the SAMs $105_1$ to $105_4$ as hardware, by using an ASIC type CPU including a memory, data having a high degree of secrecy such as the security functional module for realizing the functions shown in FIG. 17, the program module for performing the right clearing of the content, and the key data are stored in that memory. A series of right clearing use program modules such as an encryption library module (public key code, common key code, random number generator, hush function), a program module for the usage control of the content, and a program module of the charge processing are mounted as for example software.

For example, a module such as the encryptor/decryptor 171 shown in FIG. 17 is installed as an IP core in the ASIC type CPU as hardware due to the problem of for example processing speed. Depending to the clock speed or performance of CPU code system etc., it is also possible to install the encryptor/decryptor 171 as software.

Further, as the storage unit 192 shown in FIG. 17, the program module for realizing the functions shown in FIG. 17, and the memory for storing the data, use is made of for example a nonvolatile memory (flash-ROM), while as the working memory, a high speed writable memory such as an SRAM is used. Note that, other than them, as the memory included in the SAMs $105_1$ to $105_4$, it is also possible to use a ferroelectric memory (FeRAM).

Further, the SAMs $105_1$ to $105_4$ include, other than the above, a clock function used for the verification of the date in the term of validity and the contract period etc. for the usage of the content.

As mentioned above, the SAMs $105_1$ to $105_4$ have tamper resistant structures shutting off the program module, data, and the processing content from the outside. In order to prevent the program and content of data having high secrecy stored in the memory inside the IC of the related SAM or the values of the group of registers and the encryption library related to the system configuration of the SAMs or the group of registers of the clock from being read and newly written via the bus of the host CPU of the apparatuses with the SAMs $105_1$ to $105_4$ mounted thereon, that is, in order to prevent the host CPU of the mounted apparatus from accessing the allocated address space, each SAM sets an address space not visible from the host CPU of the mounted apparatus side using an MMU (memory management unit) for managing the memory space on the CPU side.

Further, the SAMs $105_1$ to $105_4$ have structures durable also against X-rays or heats or other physical attack from the outside and further have structures whereby even if real-time debugging (reverse engineering) using a debugging tool (hardware ICE, software ICE) or the like is carried out, the processing content cannot be understood or whereby a debugging tool per se cannot be used after the manufacture of ICs.

The SAMs $105_1$ to $105_4$ themselves are usual ASIC type CPUs including memories in the hardware structure. Their functions depend on the software for operating the related CPUs, but they differ from the general ASIC type CPUs in the point that they have encryption functions and tamper resistant hardware structures.

When realizing all of the functions of the SAMs $105_1$ to $105_4$ by software, there is the case where the software processing is carried out by enclosing the same inside a module having tamper resistance and the case where they are achieved by software processing on the host CPU mounted on a usual set and contrivances made to make deciphering impossible at only the time of the related processing. The former is the same as the case where the encryption library module is stored in the memory not as an IP core, but as a usual software module and can be considered similar to the case where it is realized as hardware. On the other hand, the latter is referred to as tamper resistant software whereby even if the state of execution can be deciphered by an ICE (debugger), the sequence of execution of a task is scattered (in this case, the task is cut so that each cut task piece has meaning as a program, that is, there is no influence upon the lines before and after that) or the task per se is encrypted and can be realized in the same way as a task scheduler (MiniOS) aimed at one type of secure processing. The related task scheduler is buried in the target program.

Next, an explanation will be made of the decryption/decompression module 163 shown in FIG. 16.

As shown in FIG. 16, the decryption/decompression module 163 has the mutual authenticator 220, decryptor 221, decryptor 222, decompression unit 223, electronic watermark information processor 224, and semi-disclosure processor 225.

The mutual authenticator 220 performs the mutual authentication with the mutual authenticator 170 shown in FIG. 26 and generates the session key data $K_{SES}$ when the decryption/decompression module 163 receives as its input the data from the SAM $105_1$.

The decryptor 221 decrypts the content key data Kc, semi-disclosure parameter data 199, user watermark data 196, and content data C input from the SAM $105_1$ by using the session key data $K_{SES}$. Then, the decryptor 221 outputs the decrypted content key data Kc and the content data C to the decryptor 222, outputs the decrypted user watermark data 196 to the electronic watermark information processor 224, and outputs the semi-disclosure parameter data 199 to the semi-disclosure processor 225.

The decryptor 222 decrypts the content data C in the semi-disclosure state by using the content key data Kc under the control of the semi-disclosure processor 225 and outputs the decrypted content data C to the decompression unit 223.

The decompression unit 223 decompresses the decrypted content data C and outputs the same to the electronic watermark information processor 224.

The decompression unit 223 performs the decompression processing by using the A/V decompression software stored in the content file CF shown in FIG. 4A and performs the decompression processing by for example the ATRAC3 method.

The electronic watermark information processor 224 buries the user watermark in accordance with the decrypted user watermark data 196 in the decrypted content data C to generate new content data C. The electronic watermark information processor 224 outputs the related new content data C to the reproduction module 169.

In this way, the user watermark is buried at the decryption/decompression module 163 when reproducing the content data C.

Note that, in the present invention, it is also possible that the user watermark data 196 not be buried in the content data C.

The semi-disclosure processor 225 indicates the blocks not to be decrypted and the blocks to be decrypted in for example the content data C to the decryptor 222 based on the semi-disclosure parameter data 199.

Further, the semi-disclosure processor 225 performs control to for example limit the reproduction function at the time of trial listening or limit the possible listening period based on the semi-disclosure parameter data 199.

The reproduction module 169 performs the reproduction in accordance with the decrypted and decompressed content data C.

Next, an explanation will be made of the data format when transferring data with the signature data generated by using the secret key data attached thereto and public key certificate data among the content provider 101, EMD service center 102, and user home network 103.

FIG. 42A is a view for explaining the data format for the case where the data Data is transmitted from the content provider 101 to the SAM $105_1$ by the in-band method.

In this case, a module $Mod_{50}$ encrypted by the session key data $K_{SES}$ obtained by the mutual authentication between the content provider 101 and the SAM $105_1$ is transmitted from the content provider 101 to the SAM $105_1$.

The module $Mod_{50}$ stores a module $Mod_{51}$ and the signature data $SIG_{CP}$ based on the secret key data $K_{CP,S}$ thereof.

The module $Mod_{51}$ stores the public key certificate data $CER_{CP}$ storing the secret key data $K_{CP,P}$ of the content provider 101, the signature data $SIG_{ESC}$ obtained based on the secret key data $K_{ESC,S}$ with respect to the public key certificate data $CER_{CP}$, and the data Data to be transmitted.

In this way, by transmitting the module $Mod_{50}$ storing the public key certificate data $CER_{CP}$ from the content provider 101 to the SAM $105_1$, when verifying the signature data $SIG_{CP}$ at the SAM $105_1$, it becomes unnecessary to transmit the public key certificate data $CER_{CP}$ from the EMD service center 102 to the SAM $105_1$.

FIG. 42B and FIG. 42C are views for explaining the data format in the case of transmitting the data Data from the content provider 101 to the SAM $105_1$ by the out-of-band method.

In this case, a module $Mod_{52}$ shown in FIG. 42B encrypted by the session key data $K_{SES}$ obtained by the mutual authentication between the content provider 101 and the SAM $105_1$ is transmitted from the content provider 101 to the SAM $105_1$.

The module $Mod_{52}$ stores the data Data to be transmitted and the signature data $SIG_{CP}$ based on the secret key data $K_{CP,S}$ thereof.

Further, a module $Mod_{53}$ shown in FIG. 42C encrypted by the session key data $K_{SES}$ obtained by the mutual authentication between the EMD service center 102 and the SAM $105_1$ is transmitted from the EMD service center 102 to the SAM $105_1$.

The module $Mod_{53}$ stores the public key certificate data $CER_{CP}$ of the content provider 101 and the signature data $SIG_{ESC}$ based on the secret key data $K_{ESC,S}$ thereof.

FIG. 42D is a view for explaining the data format of the case where the data Data is transmitted from the SAM $105_1$ to the content provider 101 by the in-band method.

In this case, a module $Mod_{54}$ encrypted by the session key data $K_{SES}$ obtained by the mutual authentication between the content provider 101 and the SAM $105_1$ is transmitted from the SAM $105_1$ to the content provider 101.

The module $Mod_{54}$ stores a module $Mod_{55}$ and the signature data $SIG_{SAM1}$ based on the secret key data $K_{SAM1,S}$ thereof.

The module $Mod_{55}$ stores the public key certificate data $CER_{SAM1}$ storing the secret key data $K_{SAM1,P}$ of the SAM $105_1$, the signature data $SIG_{ESC}$ based on the secret key data $K_{ESC,S}$ with respect to public key certificate data $CER_{SAM1}$, and the data Data to be transmitted.

In this way, by transmitting the module $Mod_{55}$ storing the public key certificate data $CER_{SAM1}$ from the SAM $105_1$ to the content provider 101, when verifying the signature data $SIG_{SAM1}$ in the content provider 101, it becomes unnecessary to transmit the public key certificate data $CER_{SAM1}$ from the EMD service center 102 to the content provider 101.

FIG. 42E and FIG. 42F are views for explaining the data format when transmitting the data Data from the SAM $105_1$ to the content provider 101 by the out-of-band method.

In this case, a module $Mod_{56}$ shown in FIG. 42E encrypted by the session key data $K_{SES}$ obtained by the mutual authentication between the content provider 101 and the SAM $105_1$ is transmitted from the SAM $105_1$ to the content provider 101.

The module $Mod_{56}$ stores the data Data to be transmitted and the signature data $SIG_{SAM1}$ based on the secret key data $K_{SAM1,S}$ thereof.

Further, a module $Mod_{57}$ shown in FIG. 42F encrypted by a session key data $K_{SES}$ obtained by the mutual authentication between the EMD service center 102 and the content provider 101 is transmitted from the EMD service center 102 to the content provider 101.

The module $Mod_{57}$ stores the public key certificate data $CER_{SAM1}$ of the SAM $105_1$ and the signature data $SIG_{ESC}$ based on the secret key data $K_{ESC,S}$ thereof.

FIG. 43A is a view for explaining the data format when transmitting the data Data from the content provider 101 to the EMD service center 102 by the in-band method.

In this case, a module $Mod_{58}$ encrypted by the session key data $K_{SES}$ obtained by the mutual authentication between the content provider 101 and the EMD service center 102 is transmitted from the content provider 101 to the EMD service center 102.

The module $Mod_{58}$ stores a module $Mod_{59}$ and the signature data $SIG_{CP}$ based on the secret key data $K_{CP,S}$ thereof.

The module $Mod_{59}$ stores the public key certificate data $CER_{CP}$ storing the secret key data $K_{CP,P}$ of the content provider 101, the signature data $SIG_{ESC}$ based on the secret key data $K_{ESC,S}$ with respect to public key certificate data $CER_{CP}$, and the data Data to be transmitted.

FIG. 43B is a view for explaining the data format when transmitting the data Data from the content provider 101 to the EMD service center 102 by the out-of-band method.

In this case, a module $Mod_{60}$ shown in FIG. 43B encrypted by the session key data $K_{SES}$ obtained by the mutual authentication between the content provider 101 and the EMD service center 102 is transmitted from the content provider 101 to the EMD service center 102.

The module $Mod_{60}$ stores the data Data to be transmitted and the signature data $SIG_{CP}$ based on the secret key data $K_{CP,S}$ thereof.

At this time, the public key certificate data $CER_{CP}$ of the content provider 101 has been already registered in the EMD service center 102.

FIG. 43C is a view for explaining the data format when transmitting the data Data from the SAM $105_1$ to the EMD service center 102 by the in-band method.

In this case, a module $Mod_{61}$ encrypted by the session key data $K_{SES}$ obtained by the mutual authentication between the EMD service center 102 and the SAM $105_1$ is transmitted from the SAM $105_1$ to the EMD service center 102.

The module $Mod_{61}$ stores a module $Mod_{62}$ and the signature data $SIG_{SAM1}$ based on the secret key data $K_{SAM1,S}$ thereof.

The module $Mod_{62}$ stores the public key certificate data $CER_{SAM1}$ storing the secret key data $K_{SAM1,P}$ of the SAM $105_1$, the signature data $SIG_{ESC}$ based on the secret key data $K_{ESC,S}$ with respect to public key certificate data $CER_{SAM1}$, and the data Data to be transmitted.

FIG. 43D is a view for explaining the data format when transmitting the data Data from the SAM $105_1$ to the EMD service center 102 by the out-of-band method.

In this case, a module $Mod_{63}$ shown in FIG. 43D encrypted by the session key data $K_{SES}$ obtained by the mutual authentication between the EMD service center 102 and the SAM $105_1$ is transmitted from the SAM $105_1$ to the EMD service center 102.

The module $Mod_{63}$ stores the data Data to be transmitted and the signature data $SIG_{SAM1}$ based on the secret key data $K_{SAM1,S}$ thereof.

At this time, the public key certificate data $CER_{SAM1}$ of the SAM $105_1$ has been already registered in the EMD service center 102.

Below, an explanation will be made of the processing for registration at the EMD service center 102 at the time of shipping of the SAMs $105_1$ to $105_4$.

Note that, the processing for registration of the SAMs $105_1$ to $105_4$ is the same, so the processing for registration of the SAM $105_1$ will be explained below.

At the time of shipping of the SAM $105_1$, the key data shown below is initially registered in the storage unit 192 shown in FIG. 17 etc. via the SAM manager 149 by the key server 141 of the EMD service center 102 shown in FIG. 11.

Further, the SAM $105_1$ stores in the storage unit 192 etc., for example, at the time of shipping, the program etc. used when the SAM $105_1$ accesses the EMD service center 102 the first time.

Namely, the storage unit 192 stores, for example, the identifier SAM_ID of the SAM $105_1$ given the "*" on the left side in FIG. 21, the storage key data $K_{STR}$, the public key data $K_{R-CA}$ of the route certificate authority 2, the public key data $K_{ESC,P}$ of the EMD service center 102, the secret key data $K_{SAM1}$ of the SAM $105_1$, the public key certificate data $CER_{SAM1}$ and the signature data $SIG_{22,ESC}$ thereof, and the original key data for creating the authentication use key data between the decryption/decompression module 163 and the media SAM at the time of initial registration.

Note that, it is also possible to transmit the public key certificate data $CER_{SAM1}$ from the EMD service center 102 to the SAM $105_1$ when registering the same after the shipping of the SAM $105_1$.

Here, the public key data KR-CA of the route certificate authority 2 uses an RSA generally used in electronic business transactions over the Internet etc. and has a data length of for example 1024 bits. The public key data $K_{R-CA}$ is issued by the route certificate authority 2 shown in FIG. 1.

The public key data $K_{ESC,P}$ of the EMD service center 102 is generated by utilizing an elliptical curve code having a short data length and a strength equivalent to the RSA or more and has a data length of for example 160 bits. Note that when considering the strength of the encryption, desirably the public key data $K_{ESC,P}$ has 192 bits or more. Further, the EMD service center 102 registers the public key data $K_{ESC,P}$ in the route certificate authority 92.

Further, the route certificate authority 92 generates the public key certificate data $CER_{ESC}$ of the public key data $K_{ESC,P}$. The public key certificate data $CER_{ESC}$ storing the public key data $K_{ESC,P}$ is preferably stored in the storage unit 192 at the time of shipping of the SAM $105_1$. In this case, the public key certificate data $CER_{ESC}$ is signed by the secret key data $K_{ROOT,S}$ of the route certificate authority 92.

The EMD service center 102 generates a random number to generate the secret key data $K_{SAM1,S}$ of the SAM 1 and generates the public key data $K_{SAM1,P}$ forming the pair together with this.

Further, the EMD service center 102 is given the authentication of the route certificate authority 92, issues the public key certificate data $CER_{SAM1}$ of the public key data $K_{SAM1,P}$, and attaches the signature data to this by using its own secret key data $K_{ESC,S}$. Namely, the EMD service center 102 achieves the function of the second CA (certificate authority).

Further, the SAM $105_1$ is allocated a unique identifier SAM_ID under the management of the EMD service center 102 by the SAM manager 149 of the EMD service center 102 shown in FIG. 11. This is stored in the storage unit 192 of the SAM $105_1$ and, at the same time, stored also in the SAM database 149a shown in FIG. 11 and managed by the EMD service center 102.

Further, the SAM $105_1$ is connected to the EMD service center 102 by for example the user after shipping for the registration procedure. At the same time, the distribution use public key data $KD_1$ to $KD_3$ are transferred from the EMD service center 102 to the storage unit 192.

Namely, the user utilizing the SAM $105_1$ must perform the registration procedure at the EMD service center 102 before downloading the content. This registration procedure is performed off-line by for example mail by the user entering information identifying itself using for example a registration form attached when purchasing the apparatus with the SAM $105_1$ mounted thereon (in the related example, the network apparatus $160_1$).

The SAM $105_1$ cannot be used until the registration procedure is passed.

The EMD service center 102 issues the identifier USER_ID unique to the user in accordance with the registration procedure of the SAM $105_1$ by the user, manages the correspondence between the SAM_ID and the USER_ID in for example the SAM database 149a shown in FIG. 11, and utilizes the same at the time of charging.

Further, the EMD service center 102 allocates the information reference use identifier ID and the password used at the first time to the user of the SAM $105_1$ and notifies these to the user. The user can inquired about information for example the state of usage (usage log) of the content data up to the present at the EMD service center 102 by using the information reference use identifier ID and the password.

Further, the EMD service center 102 confirms the ID at the credit card company or the like and confirms the user off-line at the time of registration.

Next, as shown in FIG. 21, an explanation will be made of the procedure for storing the SAM registration list in the storage unit 192 inside the SAM $105_1$.

The SAM $105_1$ shown in FIG. 1 acquires the SAM registration list of the SAMs $105_1$ to $105_4$ present in its own system by utilizing a topology map generated when starting up the power of the apparatus connected to the bus 191 or connecting a new apparatus to the bus 191 when using for example an IEEE 1394 serial bus as the bus 191.

Figure 44:
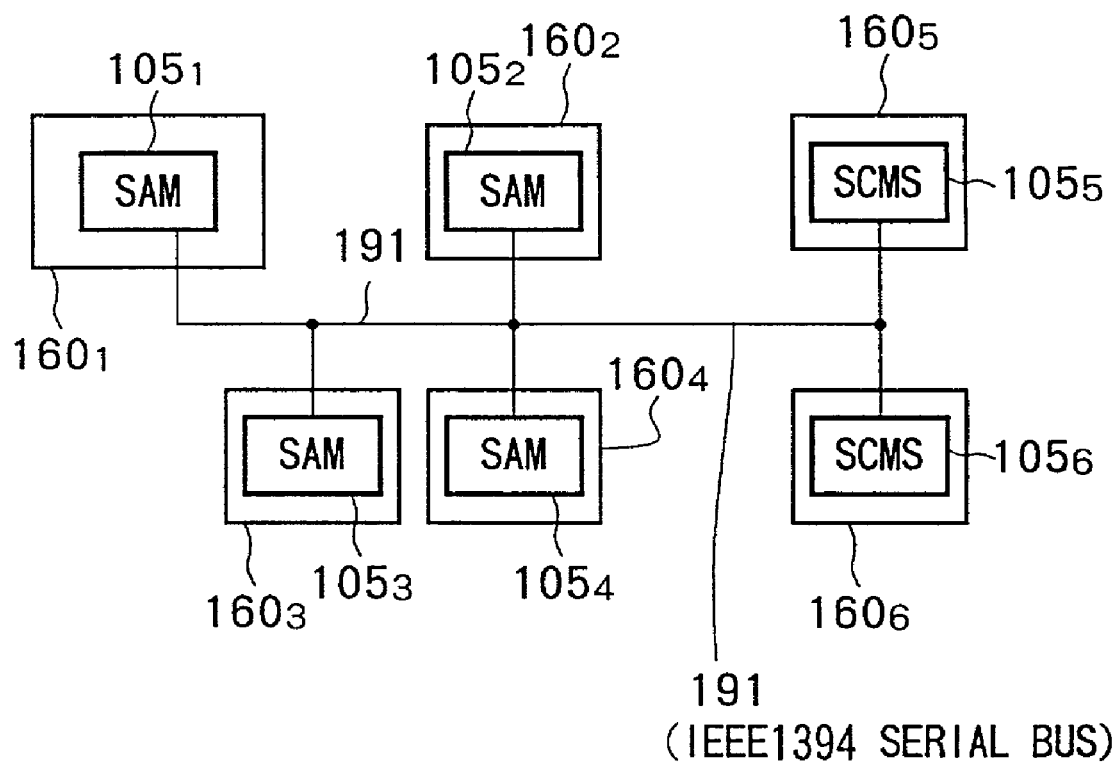
FIG. 44 is a view for explaining an example of a connection configuration of apparatuses to a bus.

Note that, the topology map generated in accordance with the IEEE 1394 serial bus, that is, the bus 191, is generated to cover the SAMs $105_1$ to $105_4$ and the SCMS processing circuits $105_5$ and $105_6$ when, for example, as shown in FIG. 44, in addition to the SAM $105_1$ to $105_4$, the SCMS processing circuits $105_5$ and $105_6$ of the AV apparatuses $160_5$ and $160_6$ are connected to the bus 191.

Accordingly, the SAM $105_1$ fetches the information for the SAMs $105_1$ to $105_4$ from the related topology map to generate the SAM registration list.

Figure 45:
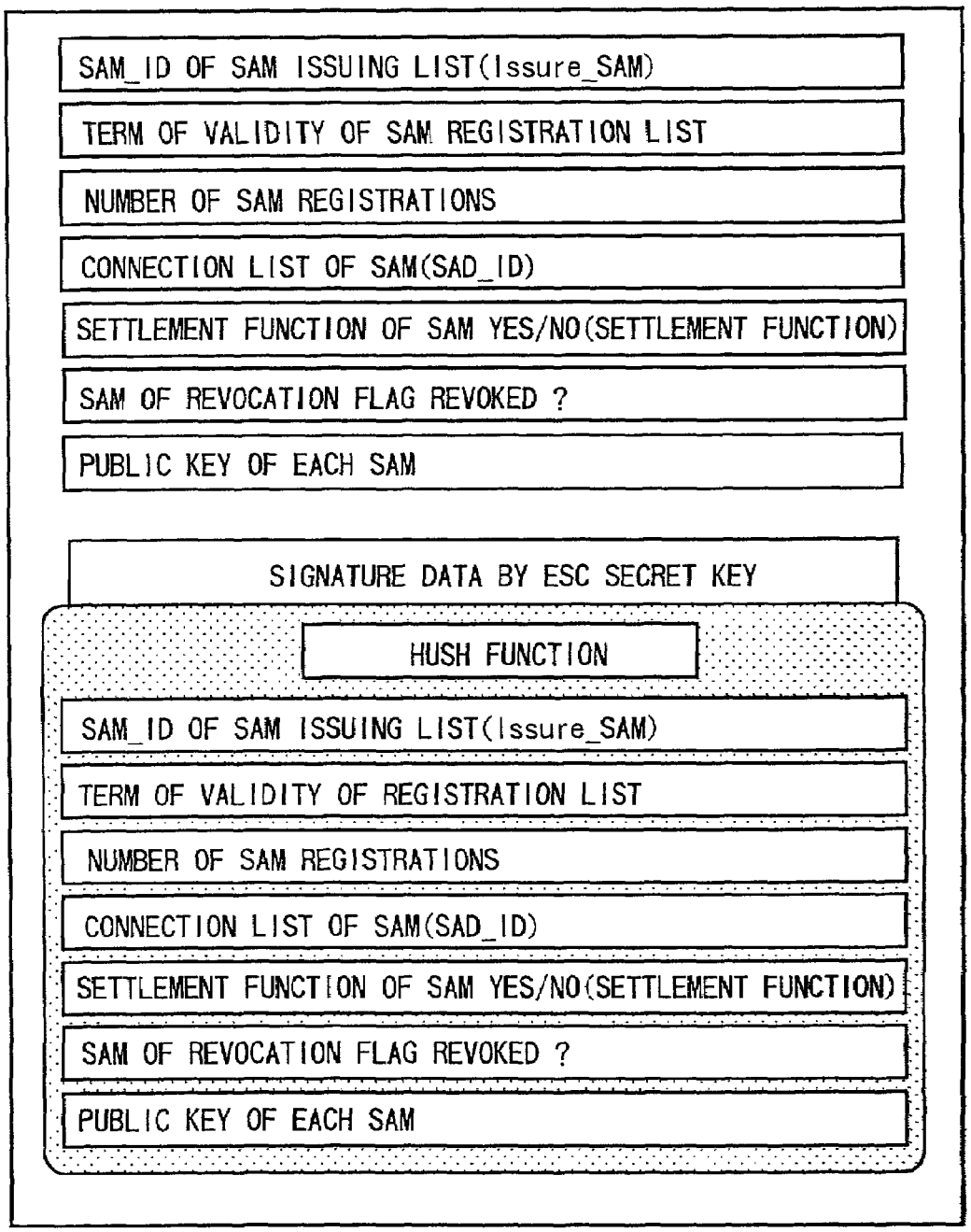
FIG. 45 is a view for explaining a data format of a SAM registration list.

The data format of the SAM registration list is shown in for example FIG. 45.

Then, the SAM $105_1$ registers the related SAM registration list in the EMD service center 102 and acquires a signature.

These processings are automatically carried out by the SAM $105_1$ by utilizing the session of the bus 191. An instruction for registration of the SAM registration list is issued to the EMD service center 102.

The EMD service center 102 confirms the term of validity when receiving the SAM registration list shown in FIG. 45 from the SAM $105_1$. Then, the EMD service center 102 sets up the corresponding portion by referring to the existence of the settlement function designated by the SAM $105_1$ at the time of registration. Further, the EMD service center 102 checks the revocation list and sets a revocation flag in the SAM registration list. The revocation list is the list of the SAMs for which usage is prohibited (invalidated) by the EMD service center 102 for the reason of for example illicit usage.

Further, the EMD service center 102 fetches the SAM registration list corresponding to the SAM 105$_1$ at the time of settlement and confirms if the SAM described therein is contained in the revocation list. Further, the EMD service center 102 attaches a signature to the SAM registration list.

Note that the SAM revocation list is generated covering only the SAMs of the identical system (connected to the identical bus 191) and that the validity and invalidity of the related SAM are indicated by the revocation flag corresponding to each SAM.

Below, an explanation will be made of the overall operation of the content provider 101 shown in FIG. 1.

Figure 46:
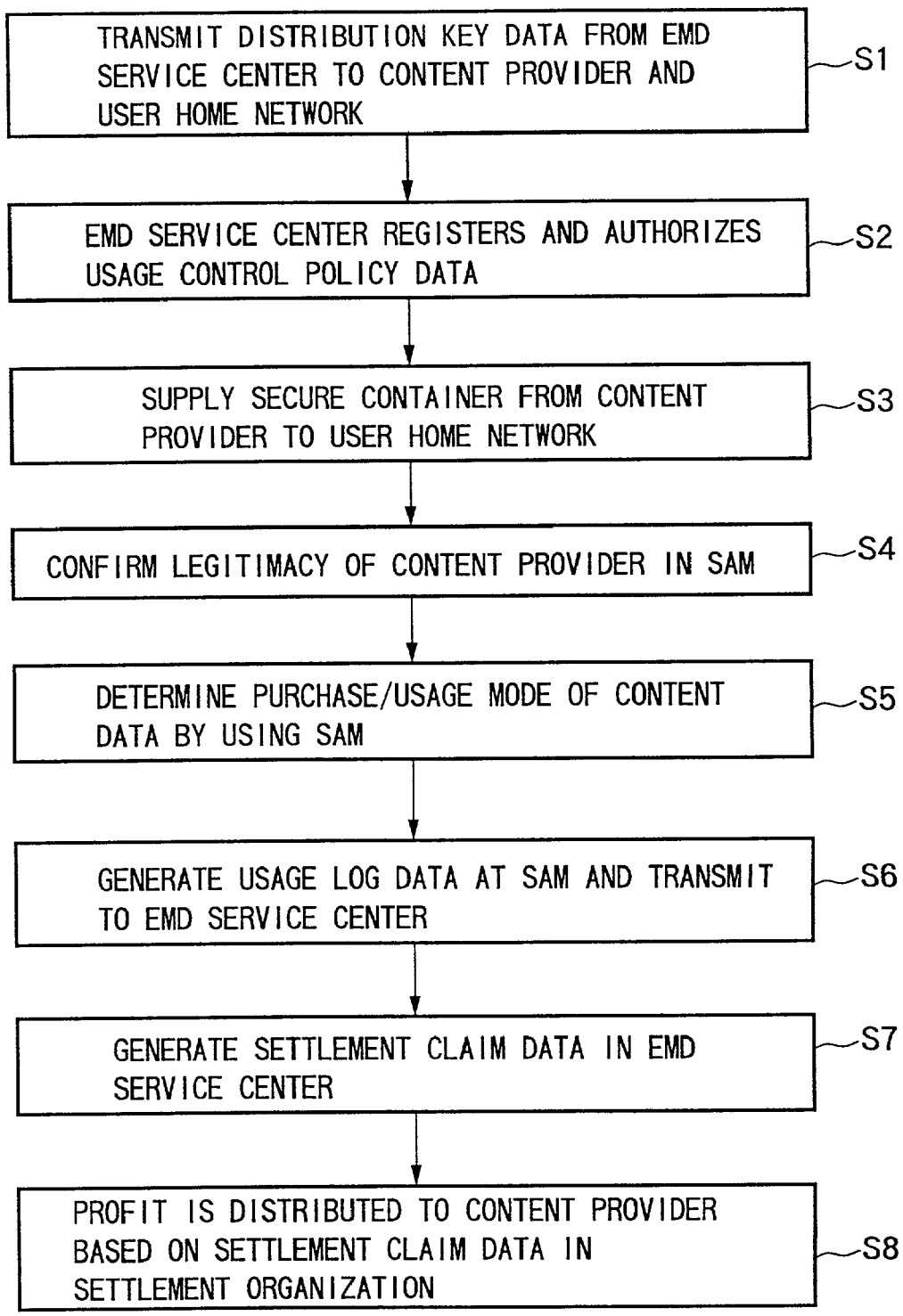
FIG. 46 is a flowchart of the overall operation of the content provider shown in FIG. 1.

FIG. 46 is a flowchart of the overall operation of the content provider 101.

Step S1: The EMD service center 102 transmits the public key certificate data CER$_{CP}$ of the public key data K$_{CP}$ of the content provider 101 to the content provider 101 after the content provider 101 passes through the predetermined registration processing.

Further, the EMD service center 102 transmits the certificate CER$_{CP1}$ to CER$_{CP4}$ of the public key data K$_{SAM1,P}$ to K$_{SAM4,P}$ of the SAMs 105$_1$ to 105$_4$ to the SAMs 105$_1$ to 105$_4$ after the SAMs 105$_1$ to 105$_4$ pass through the predetermined registration processing.

Further, the EMD service center 102 transmits six months' worth of the distribution key data KD$_1$ to KD$_6$ each having a term of validity of one month to the content provider 101 after the mutual authentication and transmits three months' worth of the distribution key data KD$_1$ to KD$_3$ to the user home network 103.

In this way, the EMD system 100 distributes the distribution key data KD$_1$ to KD$_3$ to the SAMs 105$_1$ to 105$_4$ in advance, therefore, even in the case where the SAMs 105$_1$ to 105$_4$ are off-line from the EMD service center 102, the secure container 104 distributed from the content provider 101 can be decrypted and purchased and used in the SAMs 105$_1$ to 105$_4$. In this case, the log of the related purchase and/or usage is described in the usage log data 108. The usage log data 108 is automatically transmitted to the EMD service center 102 when the SAMs 105$_1$ to 105$_4$ and the EMD service center 102 are connected. Therefore, the settlement processing in the EMD service center 102 can be reliably carried out. Note that the SAMs for which the usage log data 108 cannot be collected by the EMD service center 102 in a predetermined period are invalidated by the revocation list.

Note that the usage control status data 166 is transmitted from the SAMs 105$_1$ to 105$_4$ to the EMD service center 102 in real-time in principle.

Step S2: The content provider 101 transmits the right registration request module Mod$_2$ shown in FIG. 7A to the EMD service center 102 after the mutual authentication.

Then, the EMD service center 102 registers and authorizes the usage control policy data 106 and the content key data Kc after the predetermined signature verification.

Step S3: The content provider 101 performs the encryption by using the distribution key data KD$_1$ to KD$_6$ of the corresponding period etc., generates the content file CF and the key file KF shown in FIGS. 4A and 4B, and distributes the secure container 104 storing them and public key certificate data CER$_{CP}$ shown in FIG. 4C to the user home network 103 on-line and/or off-line.

Step S4: The SAMs 105$_1$ to 105$_4$ of the user home network 103 decrypt the secure container 104 by using the distribution key data KD$_1$ to KD$_3$ of the corresponding period etc., verify the signature etc. for verifying the legitimacy of the creator and the transmitter of the secure container 104, and confirm whether or not the secure container 104 was transmitted from a legitimate content provider 101.

Step S5: The SAMs 105$_1$ to 105$_4$ determine the purchase and/or usage mode based on the control signal S165 in accordance with the operation of the purchase/usage mode determination controller 165 shown in FIG. 16 by the user.

Figure 23:
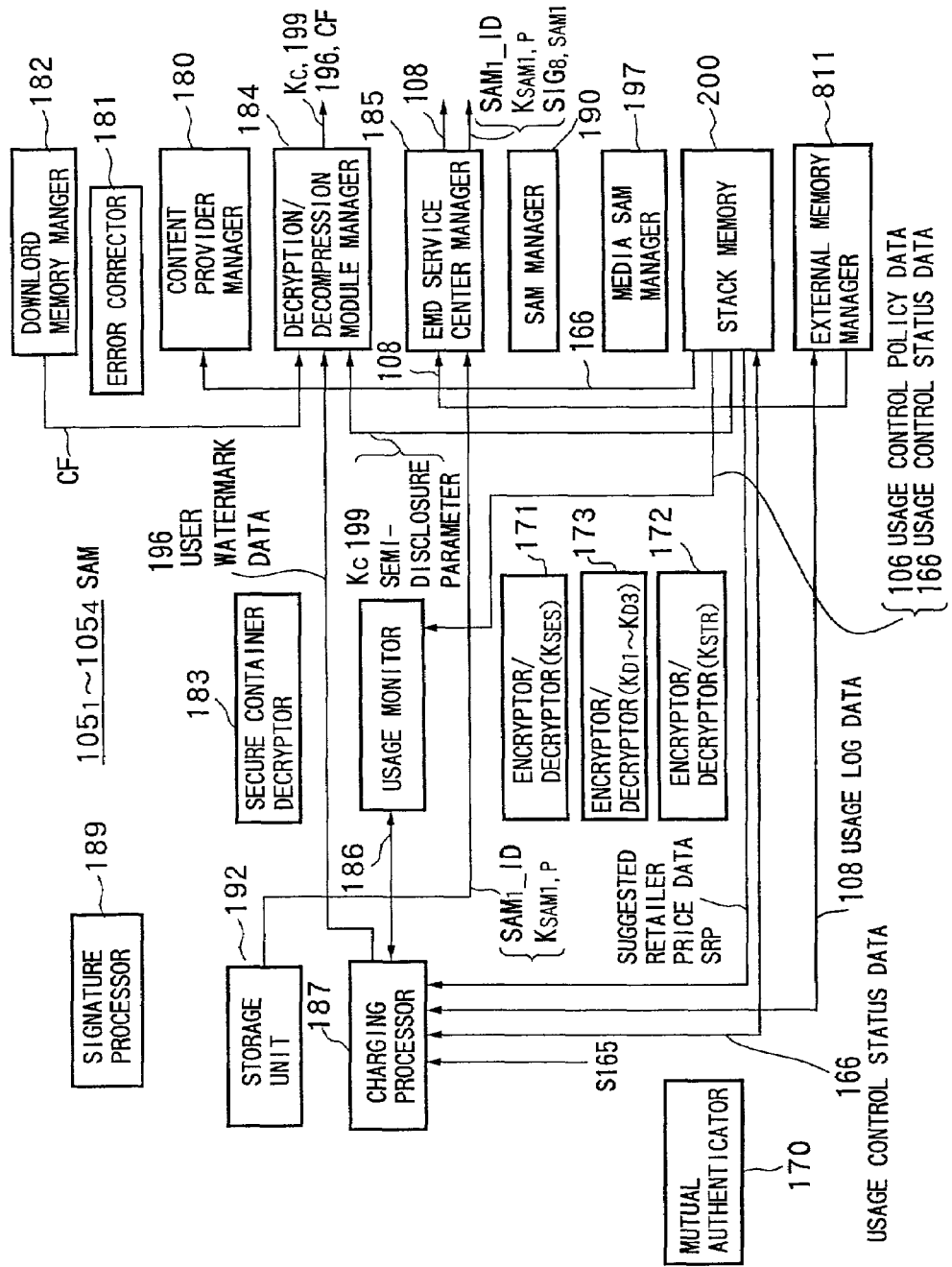
FIG. 23 is a functional block diagram of a SAM in the user home network shown in FIG. 1 and a view of the flow of the data related to the processing of using and purchasing the content data.

At this time, the usage monitor 186 shown in FIG. 23 manages the purchase and/or usage mode of the content file CF by the user based on the usage control policy data 106 stored in the secure container 104.

Step S6: The charge processor 187 shown in FIG. 23 of each of the SAMs 105$_1$ to 105$_4$ generate the usage log data 108 and the usage control status data 166 describing the operation of the settlement of the purchase and/or usage mode by the user based on the control signal S165 and transmits the same to the EMD service center 102.

Step S7: The EMD service center 102 performs the settlement processing based on the usage log data 108 in the settlement processor 142 shown in FIG. 11 and generates the settlement claim data 152 and the settlement report data 107. The EMD service center 102 transmits the settlement claim data 152 and the signature data SIG$_{88}$ thereof via the payment gateway 90 shown in FIG. 1 to the settlement organization 91. Further, the EMD service center 102 transmits the settlement report data 107 to the content provider 101.

Step S8: The settlement organization 91 verifies the signature data SIG$_{88}$, then distributes the money paid by the user to the owner of the content provider 101 based on the settlement claim data 152.

Figure 4:
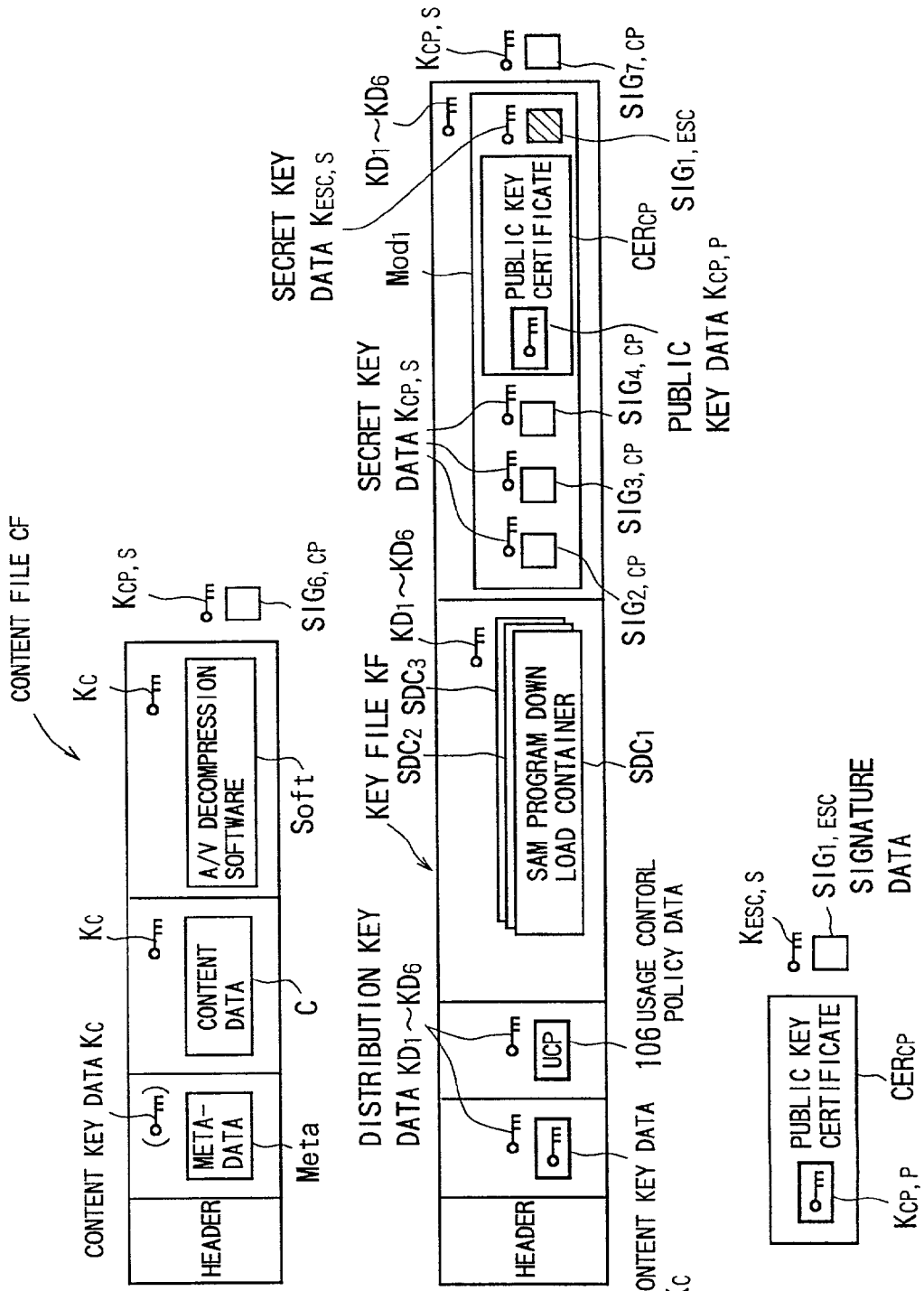
FIG. 4 is a view for explaining a format of a secure container transmitted from the content provider shown in FIG. 1 to a SAM.

As explained above, the EMD system 100 distributes the secure container 104 of the mode shown in FIG. 4 from the content provider 101 to the user home network 103 and performs the processing for the key file KF in the secure container 104 in the SAMs 105$_1$ to 105$_4$.

Further, the content key data Kc and the usage control policy data 106 stored in the key file KF are encrypted by using the distribution key data KD$_1$ to KD$_3$ and are decrypted inside only the SAMs 105$_1$ to 105$_4$ holding the distribution key data KD$_1$ to KD$_3$. Then, the SAMs 105$_1$ to 105$_4$ determine the purchase mode and the usage mode of the content data C based on the handling content of the content data C described in the usage control policy data 106 which a module having tamper resistance.

Accordingly, according to the EMD system 100, the purchase and usage of the content data C in the user home network 103 can be reliably carried out based on the content of the usage control policy data 106 generated by the related parties of the content provider 101.

Further, the EMD system 100 enables common right clearing of the content data C in the SAMs 105$_1$ to 105$_4$ both on-line and off-line by distributing the content data C from the content provider 101 to the user home network 103 by using the secure container 104 in both cases.

Further, the EMD system 100 enables use of common right clearing rules when purchasing, using, storing, and transferring the content data C in the network apparatus 160$_1$ and the AV apparatuses 160$_2$ to 160$_4$ in the user home network 103 by performing processing always based on the usage control policy data 106.

FIRST MODIFICATION OF FIRST EMBODIMENT

In the above embodiment, as shown in FIG. 4B, the case where the key file KF was encrypted by using the distribution key data KD in the content provider 101 and where the key file KF was decrypted by using the distribution key data KD in the SAMs $105_1$ to $105_4$ was illustrated, but the encryption of the key file KF using the distribution key data KD is not always necessary when the secure container 104 is directly supplied from the content provider 101 to the SAMs $105_1$ to $105_4$ as shown in FIG. 1.

In this way, the encryption of the key file KF by using the distribution key data KD exhibits a large effect when suppressing illegal action by the service provider by giving the distribution key data KD to only the content provider and the user home network when supplying content data from the content provider to the user home network via the service provider as in the second embodiment mentioned later.

Note that in the case of the first embodiment as well, the encryption of the key file KF by using the distribution key data KD is effective in the point of improving the ability to suppress illicit usage of the content data.

Further, in the above embodiment, the case where the suggested retailer' price data SRP was stored in the usage control policy data 106 in the key file KF shown in FIG. 4B was illustrated, but it is also possible to store the suggested retailer' price data SRP (price tag data) other than the key file KF in the secure container 104. In this case, the signature data generated by using the secret key data $K_{CP}$ is attached to the suggested retailer' price data SRP.

SECOND MODIFICATION OF FIRST EMBODIMENT

Figure 47:
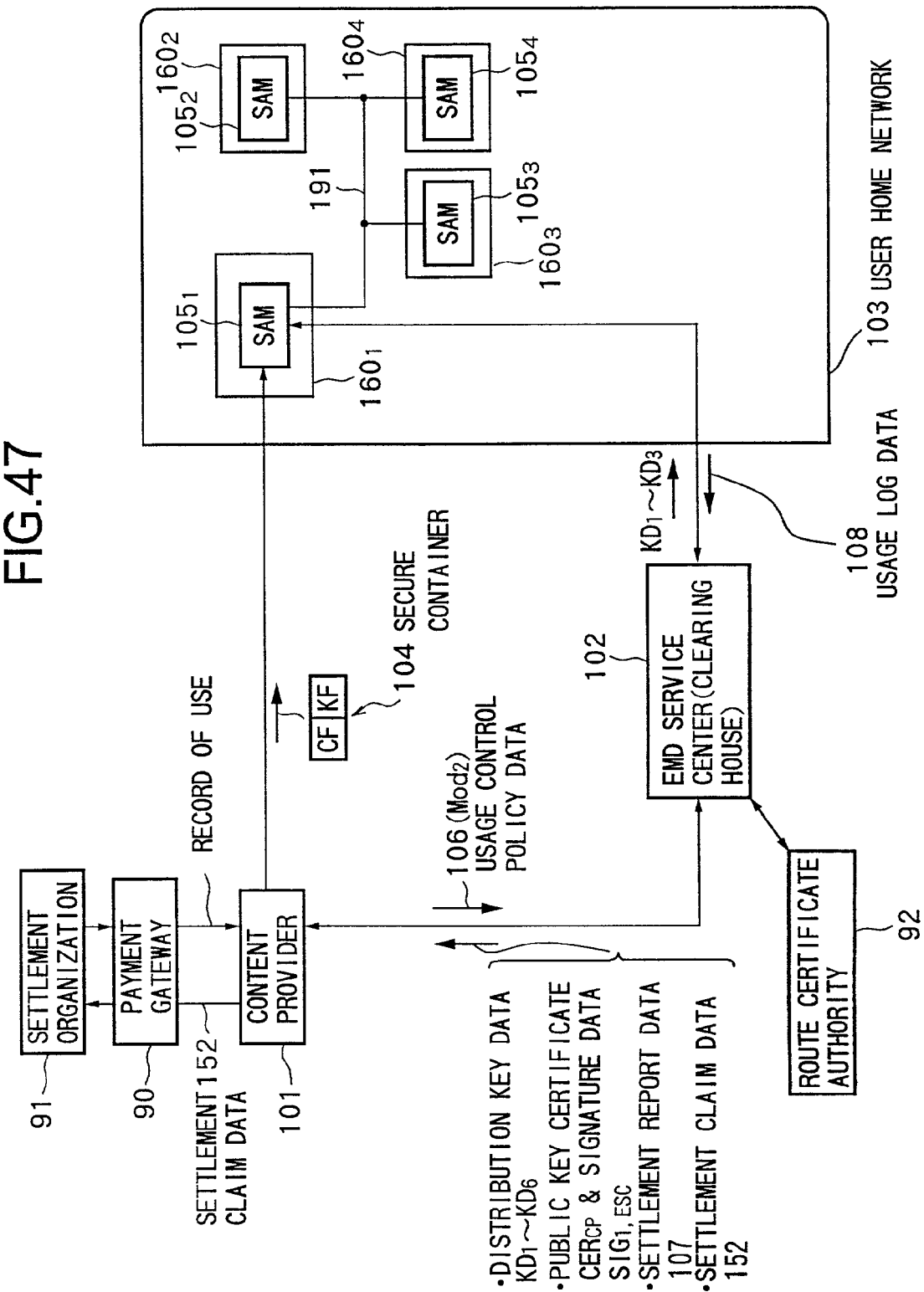
FIG. 47 is a view for explaining a second modification of the first embodiment of the present invention.

In the first embodiment, as shown in FIG. 1, the case where the EMD service center 102 performs the settlement processing in the settlement organization 91 via the payment gateway 90 by using the settlement claim data 152 generated by an apparatus itself was illustrated, but it is also possible to transmit for example the settlement claim data 152 from the EMD service center 102 to the content provider 101 as shown in FIG. 47 and have the content provider 101 itself perform the settlement processing with respect to the settlement organization 91 via the payment gateway 90 by using the settlement claim data 152.

THIRD MODIFICATION OF FIRST EMBODIMENT

In the above first embodiment, the case where the secure container 104 was supplied from the single content provider 101 to the SAMs $105_1$ to $105_4$ of the user home network 103 was illustrated, but it is also possible to supply secure containers 104a and 104b from two or more content providers 101a and 101b to the SAMs $105_1$ to $105_4$.

Figure 48:
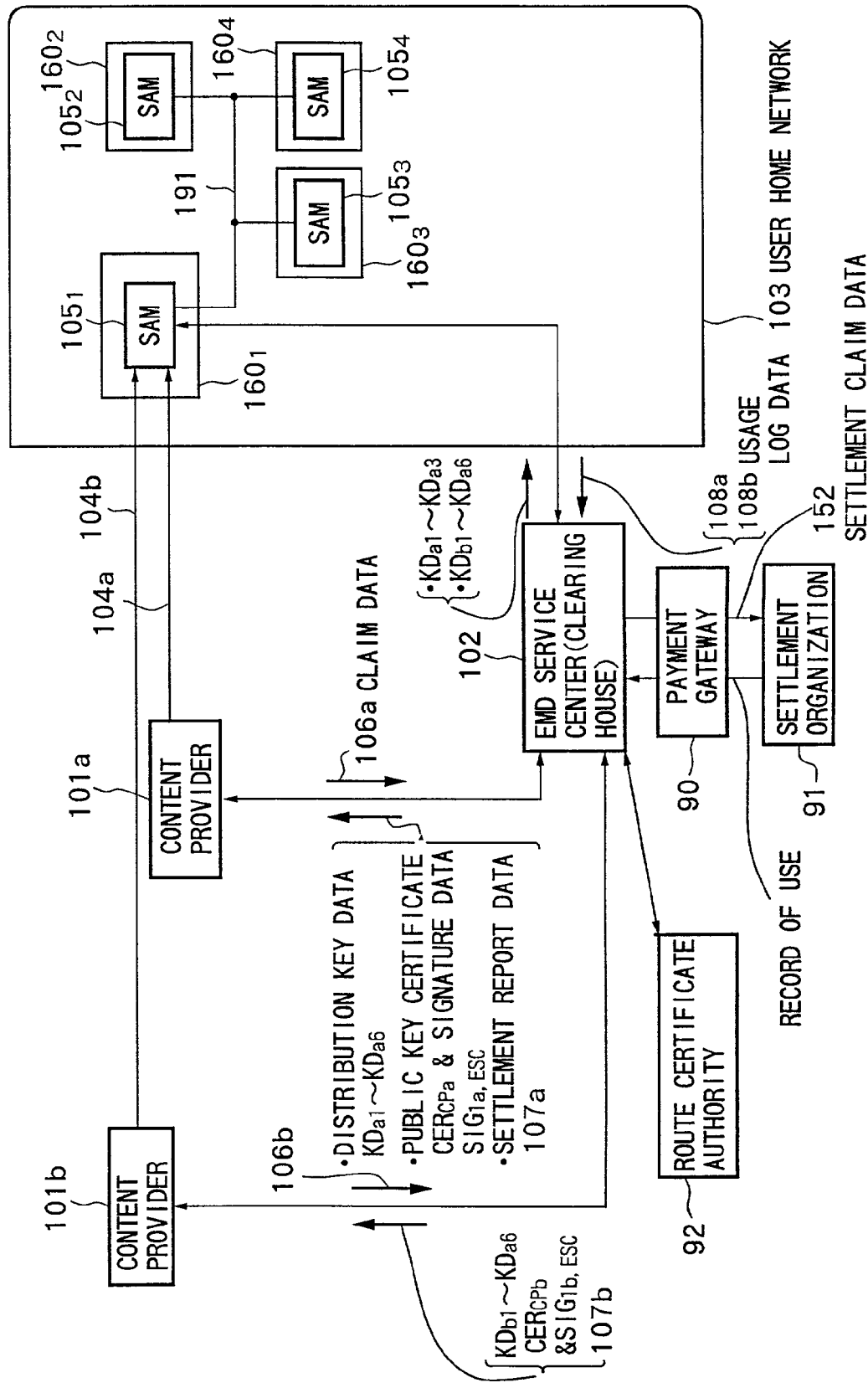
FIG. 48 is a view for explaining a third modification of the first embodiment of the present invention.

FIG. 48 is a view of the configuration of the EMD system according to a third modification of the first embodiment where the content providers 101a and 101b are used.

In this case, the EMD service center 102 distributes six months worth of distribution key data $KD_{a1}$ to $KD_{a6}$ and $KD_{b1}$ to $KD_{b6}$ to the content providers 101a and 101b.

Further, the EMD service center 102 distributes three months' worth of the distribution key data $KD_{a1}$ to $KD_{a3}$ and $KD_{b1}$ to $KD_{b3}$ to the SAMs $105_1$ to $105_4$.

Further, the content provider 101a supplies the secure container 104a storing a content file CFa encrypted by using a unique content key data Kca and a key file KFa encrypting the content key data Kca and a usage control policy data 106a etc. by using the distribution key data $KD_{a1}$ to $KD_{a6}$ of the corresponding period to the SAMs $105_1$ to $105_4$ on-line and/or off-line.

At this time, as the identifier of the key file, use is made of the global unique identifier Content_ID distributed by the EMD service center 102. The content data is centrally managed by the EMD service center 102.

Further, the content provider 101b supplies the secure container 104b storing a content file CFb encrypted by using unique content key data Kcb and a key file KFb encrypting the content key data Kcb and usage control policy data 106b etc. by using the distribution key data $KD_{b1}$ to $KD_{b6}$ of the corresponding period to the SAMs $105_1$ to $105_4$ on-line and/or off-line.

The SAMs $105_1$ to $105_4$ decrypt the secure container 104a by using the distribution key data $KD_{a1}$ to $KD_{a3}$ of the corresponding period, determine the purchase mode of the content after the predetermined signature verification processing etc., and transmit usage log data 108a and usage control status data 166a generated in accordance with the related determined purchase mode and usage mode to the EMD service center 102.

Further, the SAMs $105_1$ to $105_4$ decrypt the secure container 104b by using the distribution key data $KD_{b1}$ to $KD_{b3}$ of the corresponding period, determine the purchase mode of the content after the predetermined signature verification processing etc., and transmit usage log data 108b and usage control status data 166b generated in accordance with the related determined purchase mode and usage mode to the EMD service center 102.

The EMD service center 102 generates settlement claim data 152a for the content provider 101a based on the usage log data 108a and performs the settlement processing with respect to the settlement organization 91 by using this.

Further, the EMD service center 102 generates settlement claim data 152b for the content provider 101b based on the usage log data 108b and performs the settlement processing with respect to the settlement organization 91 by using this.

Further, the EMD service center 102 performs the authorization by registering the usage control policy data 106a and 106b. At this time, the EMD service center 102 distributes the global unique identifier Content_ID with respect to the key files KFa and KFb corresponding to the usage control policy data 106a and 106b.

Further, the EMD service center 102 issues public key certificate data $CER_{CP}a$ and $CER_{CP}b$ of the content providers 101a and 101b and attaches its own signature data $SIG_{1b,ESC}$ and $SIG_{1a,ESC}$ to them to certify the legitimacy.

SECOND EMBODIMENT

In the above embodiment, the case where the content data was directly distributed from the content provider 101 to the SAMs $105_1$ to $105_4$ of the user home network 103 was illustrated, but in the present embodiment, an explanation will be made of the case of distributing the content data provided by the content provider to the SAM of the user home network via the service provider.

Figure 49:
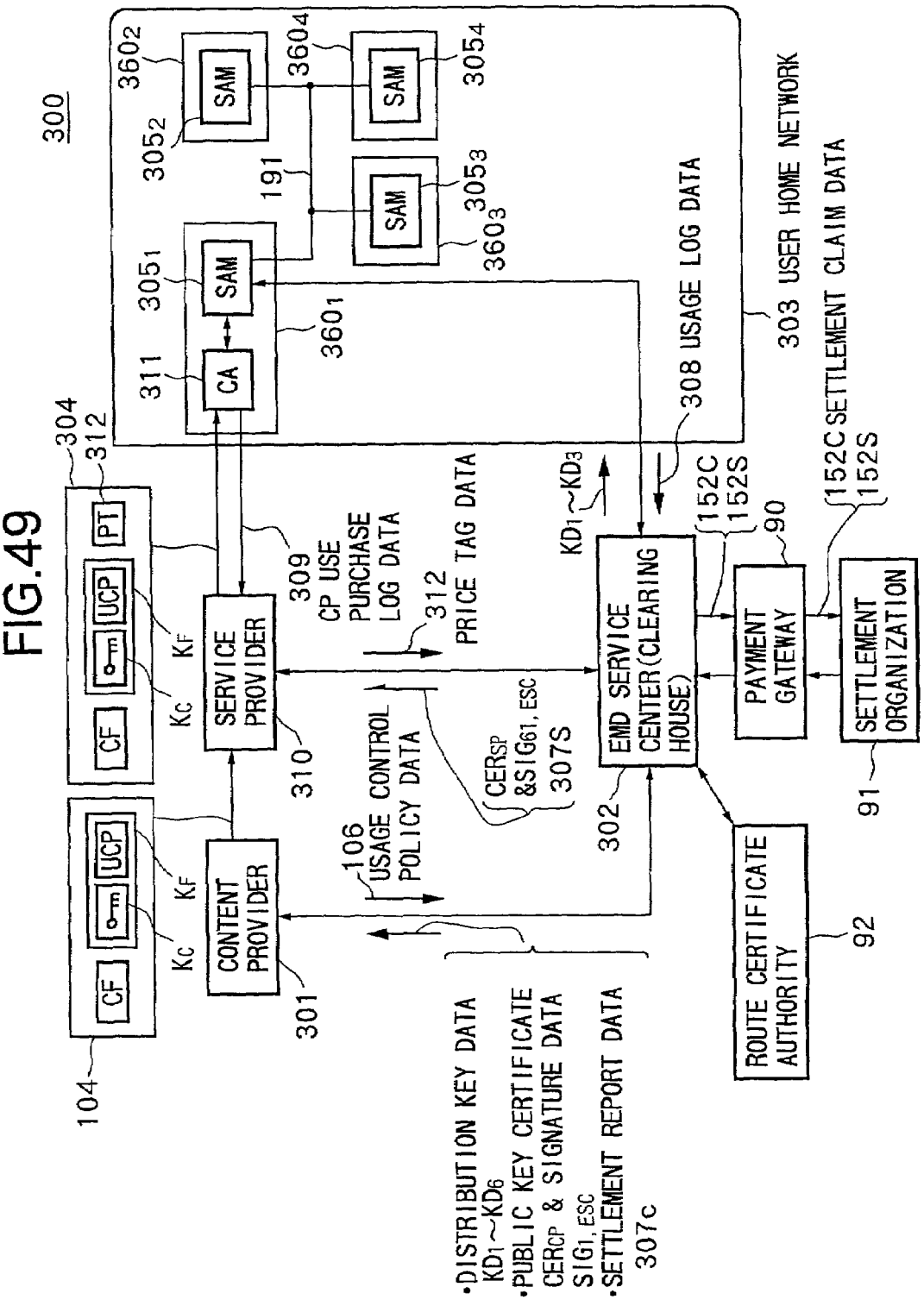
FIG. 49 is a view of the overall configuration of the EMD system of a second embodiment of the present invention.

FIG. 49 is a view of the configuration of an EMD system 300 of the present embodiment.

As shown in FIG. 49, the EMD system 300 has a content provider 301, an EMD service center 302, a user home network 303, a service provider 310, a payment gateway 90, and a settlement organization 91.

The content provider 301, EMD service center 302, SAMs $105_1$ to $105_4$, and service provider 310 correspond to the data providing apparatus, management apparatus, data processing apparatus, and data distribution apparatus of the present invention.

The content provider 301 is the same as the content provider 101 of the first embodiment except for the point that it supplies the content data to the service provider 310.

Further, the EMD service center 302 is the same as the EMD service center 102 of the first embodiment except for the point that the authentication function, key data management function, and right clearing function are provided also with respect to the service provider 310 in addition to the content provider 101 and SAMs $505_1$ to $505_4$.

Further, the user home network 303 has a network apparatus 360, and AV apparatuses $360_2$ to $360_4$. The network apparatus $360_1$ includes a SAM $305_1$ and a CA module 311, while the AV apparatuses $360_2$ to $360_4$ include the SAMs $305_2$ to $305_4$.

Here, the SAMs $305_1$ to $305_4$ are the same as the SAMs $105_1$ to $105_4$ of the first embodiment except for the point that they receive the distribution of a secure container 304 from the service provider 310 and the point that they perform the verification processing of the signature data and the preparation of an SP use purchase log data (data distribution apparatus use purchase log data) 309 for the service provider 310 in addition to the content provider 301.

First, a brief explanation will be made of the EMD system 300.

In the EMD system 300, the content provider 301 transmits the usage control policy (UCP) data 106 similar to that of the first embodiment mentioned before indicating the content of the right such as the license conditions of the content data C of the content to be provided by itself to the authority manager having a high reliability, that is, the EMD service center 302. The usage control policy data 106 is registered in the EMD service center 302 and authorized (certified).

Further, the content provider 301 encrypts the content data C by the content key data Kc to generate the content file CF. Further, the content provider 301 encrypts the content key data Kc and the usage control policy data 106 by using the distribution key data $KD_1$ to $KD_6$ of the corresponding period distributed from the EMD service center 302 to generate the key file KF storing them. Then, the content provider 301 supplies the secure container 104 storing the content file CF, key file KF, and its own signature data to the service provider 310 by using the Internet or other network, a digital broadcast, storage medium, or an informal protocol or off-line or the like.

When receiving the secure container 104 from the content provider 301, the service provider 310 verifies the signature data and confirms if the secure container 104 was generated by a legitimate content provider 301 and the legitimacy of the sender.

Next, the service provider 310 generates price tag data (PT) 312 indicating the price obtained by adding the price of its service to the price (SRP) with respect to the content intended by the content provider 301 notified for example off-line.

Then, the service provider 310 generates the secure container 304 storing the content file CF and key file KF fetched from the secure container 104, the price tag data 312, and the signature data by its own secret key data $K_{SP,S}$ with respect to them.

At this time, the key file KF is encrypted by the distribution key data $KD_1$ to $KD_6$, and the service provider 310 does not hold the related distribution key data $KD_1$ to $KD_6$, therefore the service provider 310 cannot view or rewrite the content of the key file KF.

Further, the EMD service center 302 registers and authorizes the price tag data 312.

The service provider 310 distributes the secure container 304 to the user home network 303 on-line and/or off-line.

At this time, in the off-line case, the secure container 304 is supplied to the SAMs $305_1$ to $305_4$ as it is. On the other hand, in the on-line case, the mutual authentication is carried out between the service provider 310 and the CA module 311, the secure container 304 is encrypted by using the session key data $K_{SES}$ in the service provider 310 and transmitted, and the secure container 304 received at the CA module 311 is decrypted by using the session key data $K_{SES}$ and then transferred to the SAMs $305_1$ to $305_4$.

Next, the SAMs $305_1$ to $305_4$ decrypt the secure container 304 by using the distribution key data $KD_1$ to $KD_3$ of the corresponding period distributed from the EMD service center 302, then perform the verification processing of the signature data.

The secure container 304 supplied to the SAMs $305_1$ to $305_4$ is reproduced and stored in the storage medium after the purchase and/or usage mode is determined in accordance with the operation of the user in the network apparatus $360_1$ and the AV apparatuses $360_2$ to $360_4$.

The SAMs $305_1$ to $305_4$ store the log of the purchase and/or usage of the secure container 304 as the usage log data 308.

The usage log data (log data or the management apparatus use log data) 308 is transmitted from the user home network 303 to the EMD service center 302 in response to for example a request from the EMD service center 302.

The EMD service center 302 determines (calculates) the charge content for each of the content provider 301 and the service provider 310 based on the usage log data 308 and performs the settlement at the settlement organization 91 such as the bank via the payment gateway 90 based on the results. By this, the money paid by the user of the user home network 103 is distributed to the content provider 101 and the service provider 310 by the settlement processing by the EMD service center 102.

In the present embodiment, in the same way as the first embodiment, by providing the content data C of digital by encapsulation, value can be imparted to the digital content itself by separating the conventional digital content, which had been closely attached to the storage medium, from the storage medium.

Here, the secure container is the most basic product capsule when selling the content data C (product) no matter which distribution channel (delivery channel) it is provided over. Specifically, the secure container is a product capsule containing the encryption information for the charging, the signature data for verifying the legitimacy of the content of the content data C, the legitimacy of the party preparing the content data, and the legitimacy of the distributor of the content data, and information relating to the copyright such as the information concerning the electronic watermark information to be buried in the content data.

Further, in the present embodiment, the EMD service center 302 has the certificate authority function, key data management function, and the right clearing (profit distribution) function.

Namely, the EMD service center 302 plays the role of the second certificate authority with respect to the highest authority manager at the neutral position, that is, the route certificate authority 92, and certifies the legitimacy of the related public key data by attaching the signature based on the secret key data of the EMD service center 302 to public key certificate data of public key data to be used for the verification processing of the signature data in the content provider 301, service provider 310, and the SAMs $305_1$ to $305_4$. Further, as mentioned before, the registration and authorization of the usage control policy data 106 of the content provider 301 and the price tag data 312 of the service provider 310 are achieved by the certificate authority function of the EMD service center 302.

Further, the EMD service center 302 has a key data management function for managing for example the key data of the distribution key data $KD_1$ to $KD_6$.

Further, the EMD service center 302 has a right clearing (profit distribution) function of performing settlement with respect to the purchase and/or usage of the content by the user of the user home network 303 based on the usage control policy data 106 registered by the content provider 301, the usage log data 308 input from the SAMs $305_1$ to $305_4$, and the price tag data 312 registered by the service provider 310 and distributing and paying the money paid by the user to the content provider 301 and the service provider 310.

Below, the components of the content provider 301 will be explained in detail.

[Content Provider 301]

Figure 50:
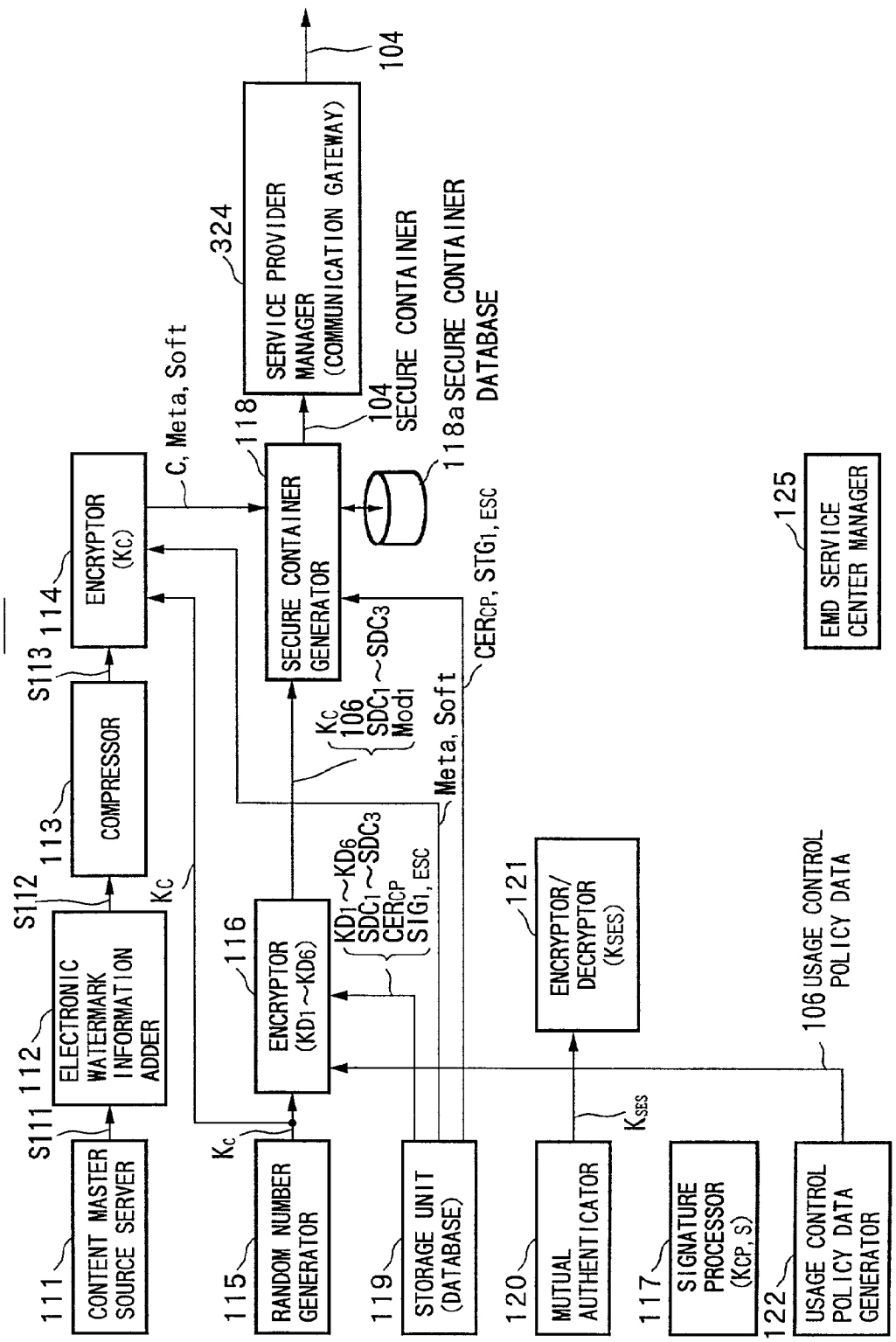
FIG. 50 is a functional block diagram of the content provider shown in FIG. 49 and a view of the flow of the data related to the secure container transmitted to a service provider.

FIG. 50 is a functional block diagram of the content provider 301 and shows the flow of the data related to the data transferred with the service provider 310.

As shown in FIG. 50, the content provider 301 has a content master source server 111, electronic watermark information adder 112, compressor 113, encryptor 114, random number generator 115, encryptor 116, signature processor 117, secure container generator 118, secure container database 118a, storage unit 119, mutual authenticator 120, encryptor/decryptor 121, usage control policy data generator 122, EMD service center manager 125, and service provider manager 324.

In FIG. 50, components given the same references as those of FIG. 2 are the same as the components of the same references explained in the first embodiment by referring to FIG. 2 and FIG. 3.

Namely, the content provider 301 has a configuration providing the service provider manager 324 in place of the SAM manager 124 shown in FIG. 2.

The service provider manager 324 provides the secure container 104 input from the secure container generator 118 to the service provider 310 shown in FIG. 49 off-line and/or on-line. The secure container 104, in the same way as the first embodiment, stores the content file CF and the signature data $SIG_{8,CP}$ thereof, the key file KF and the signature data $SIG_{7,CP}$ thereof, and the public key certificate data $CER_{CP}$ and the signature data $SIG_{1,ESC}$ thereof shown in FIG. 4A, FIG. 4B and FIG. 4C.

When distributing the secure container 104 to the service provider 310 on-line, the service provider manager 324 encrypts the secure container 104 by using the session key data $K_{SES}$ in the encryptor/decryptor 121 and then distributes the same via the network to the service provider 310.

Further, the flow of the data in the content provider 101 shown in FIG. 3 similarly applies also to the service provider 310.

[Service Provider 310]

The service provider 310 distributes the secure container 304 storing the content file CF and key file KF in the secure container 104 provided from the content provider 301 and the price tag data 312 generated by itself to the network apparatus 360, and the AV apparatuses $360_2$ to $360_4$ of the user home network 303 on-line and/or off-line.

The service modes of the distribution of content by the service provider 310 may be roughly classified into an independent service and a linked service.

An independent service is for example a service exclusively for download for individually distributing the content. Further, a linked service is a service for distributing content linked to a program and CM (advertisement). For example, content such as the theme song and insertion song of a drama is stored in the stream of the drama program. The user can purchase content such as the theme song and insertion song in the stream when watching the drama program.

Figure 51:
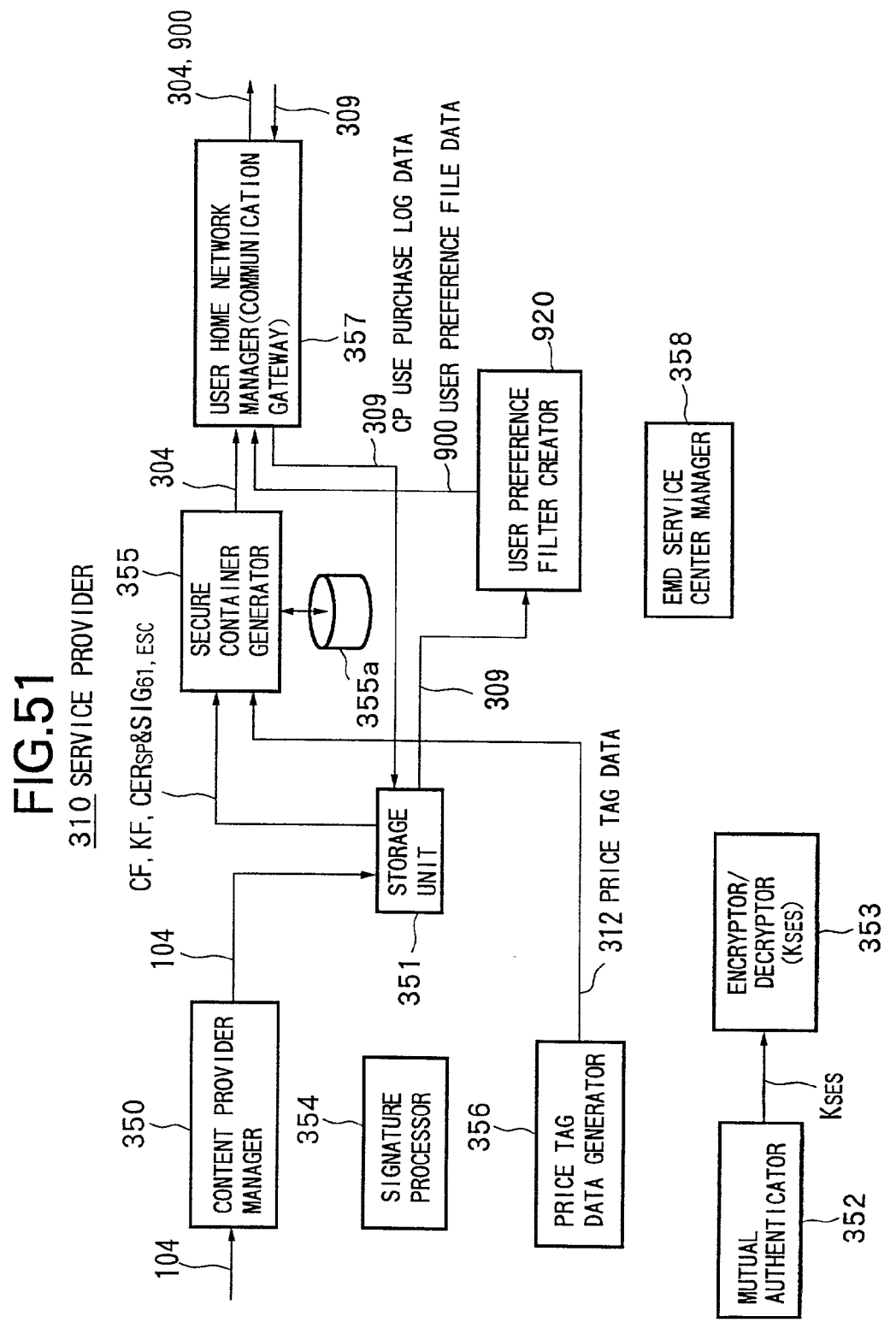

FIG. 51 is a functional block diagram of the service provider 310.

Note that, in FIG. 51, the flow of the data when supplying the secure container 304 in accordance with the secure container 104 supplied from the content provider 301 to the user home network 303 is shown.

As shown in FIG. 51, the service provider 310 has a content provider manager 350, a storage unit 351, a mutual authenticator 352, an encryptor/decryptor 353, a signature processor 354, a secure container generator 355, a secure container database 355a, a price tag data generator 356, a user home network manager 357, an EMD service center manager 358, and a user preference filter creator 920.

Below, an explanation will be made of the flow of the processing in the service provider 310 when creating the secure container 304 from the secure container 104 supplied from the content provider 301 and distributing this to the user home network 303 by referring to FIG. 51 and FIG. 52.

Figure 52:
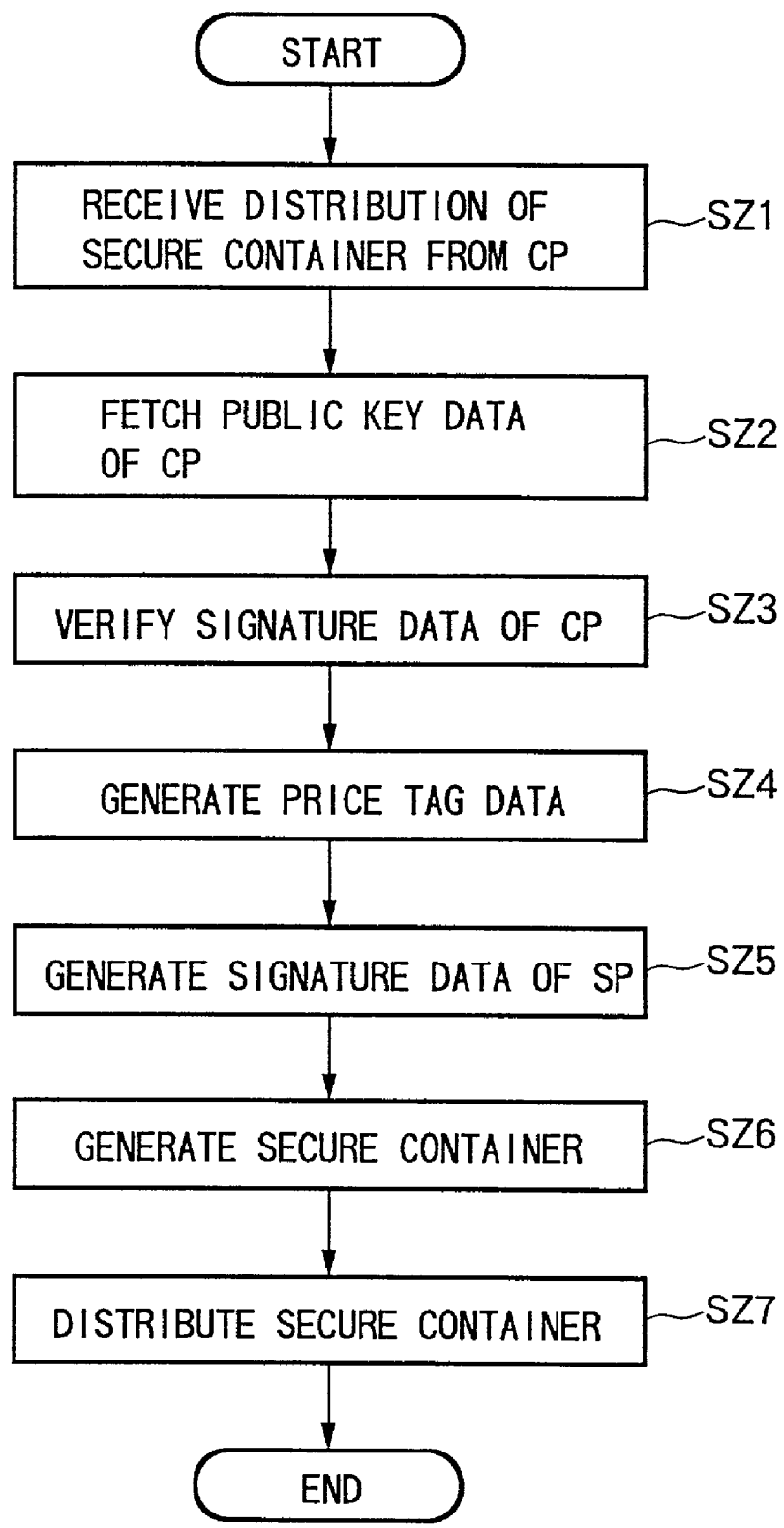
FIG. 52 is a flowchart of the processing of the service provider when preparing a secure container from a secure container supplied from the content provider and distributing this to the user home network in the second embodiment.

FIG. 52 is a flowchart of the related processing.

Step SZ1: The content provider manager 350 receives the supply of the secure container 104 shown in FIG. 4 from the content provider 301 on-line and/or off-line and writes the secure container 104 into the storage unit 351.

At this time, the content provider manager 350 decrypts the secure container 104 in the encryptor/decryptor 353 by using the session key data $K_{SES}$ obtained by the mutual authentication between the mutual authenticator 120 shown in FIG. 50 and the mutual authenticator 352 shown in FIG. 51 in the on-line case and then writes the same into the storage unit 351.

Step SZ2: The signature processor 354 verifies the signature data $SIG_{1,ESC}$ shown in FIG. 4C of the secure container 104 stored in the storage unit 351 by using the public key data $K_{ESC,P}$ of the EMD service center 302 read from the storage unit 351 and, after the legitimacy thereof is confirmed, fetches the public key data $K_{CP,P}$ from public key certificate data $CER_{CP}$ shown in FIG. 4C.

Step SZ3: The signature processor 354 verifies the signature data $SIG_{8,CP}$ and $SIG_{7,CP}$ shown in FIG. 4A and FIG. 4B of the secure container 104 stored in the storage unit 351 by using the related fetched public key data $K_{CP,P}$.

Step SZ4: The price tag data generator 356 generates the price tag data 312 indicating the price obtained by adding the price of its own service to the price with respect to the content requested by the content provider 301 notified from for example the content provider 301 off-line and outputs this to the secure container generator 355.

Step SZ5: The signature processor 354 takes the hush values of the content file CF, key file KF, and price tag data 312, generates signature data $SIG_{62,SP}$, $SIG_{63,SP}$, and $SIG_{64,SP}$ by using a secret key data $K_{SP,P}$ of the service provider 310, and outputs the result to the secure container generator 355.

Step SZ6: The secure container generator 355 generates the secure container 304 storing the content file CF and the signature data $SIG_{62,SP}$ thereof, the key file KF and the signature data $SIG_{63,ESC}$ thereof, the price tag data 312 and the signature data $SIG_{64,SP}$ thereof, and the public key certificate data $CER_{SP}$ and the signature data $SIG_{61,ESC}$ thereof shown in FIG. 53A to FIG. 53D and stores the same in the secure container database 355a. Then, the secure container generator 355 reads the secure container 304 in response to a request from the user home network 303 from the secure container database 355a and outputs the same to the user home network manager 357.

At this time, the secure container 304 may be a composite container storing a plurality of content files CF and a plurality of key files KF corresponding to them too. For example, it is also possible to store a plurality of content files CF concerning music, a video clip, a lyric card, liner notes, and a jacket in a single secure container 304. It is also possible that these plurality of content files CF etc. be stored in the secure container 304 with a directory structure.

Further, when the secure container 304 is transmitted by a digital broadcast, an MHEG (Multimedia and Hypermedia Information Coding Experts Group) protocol is used, while when it is transmitted by the Internet, an XML/SMIL/HTML (Hyper Text Markup Language) protocol is used.

At this time, the content file CF and the key file KF are centrally managed by the content provider 301 and do not depend on the protocol for transmitting the secure container 304. Namely, the content file CF and the key file KF are stored in the secure container 304 by tunneling the MHEG and HTML protocols.

Step SZ7: The user home network manager 357 supplies the secure container 304 to the user home network 303 off-line and/or on-line.

When distributing the secure container 304 to the network apparatus 360, of the user home network 303 on-line, the user home network manager 357 encrypts the secure container 304 by using the session key data $K_{SES}$ in the encryptor/decryptor 352 after the mutual authentication and then distributes the same via the network to the network apparatus $360_1$.

Note that, when broadcasting the secure container 304 via for example a satellite, the user home network manager 357 encrypts the secure container 304 by using scramble key data $K_{SCR}$ or the like. Further, the scramble key data $K_{SCR}$ is encrypted by using work key data $K_W$, while the work key data $K_W$ is encrypted by using master key data $K_M$.

Then, the user home network manager 357 transmits the scramble key data $K_{SCR}$ and the work key data $K_W$ together with the secure container 304 to the user home network 303 via the satellite.

Further, for example it stores the master key data $K_M$ in an IC card or the like and distributes the same to the user home network 303 off-line.

Further, when receiving the SP use purchase log data 309 concerning the content data C distributed by the related service provider 310 from the user home network 303, the user home network manager 357 writes this into the storage unit 351.

The service provider 310 refers to the SP use purchase log data 309 when determining the service content in the future. Further, the user preference filter creator 920 analyzes the preference of the users of the SAMs $305_1$ to $305_4$ transmitting the related SP use purchase log data 309 based on the SP use purchase log data 309 to generate anuser preference filter data 900 and transmits this via the user home network manager 357 to the CA module 311 of the user home network 303.

Figure 54:
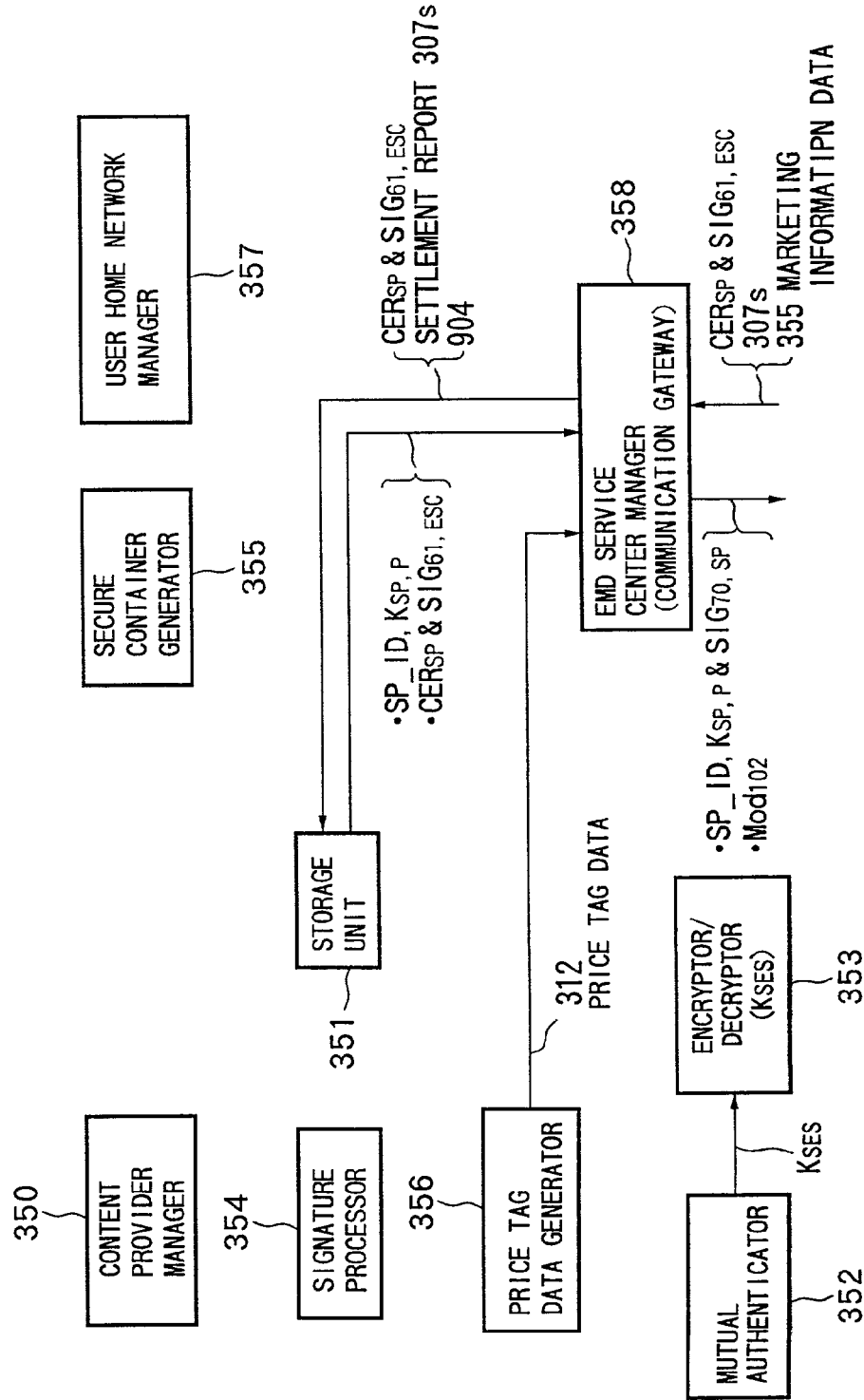
FIG. 54 is a functional block diagram of the service provider shown in FIG. 49 and a view of the flow of the data transferred with the EMD service center.

In FIG. 54, the flow of the data relating to the communication with the EMD service center 302 in the service provider 310 is shown.

Note that, as the prerequisite of the following processing, the related party of the service provider 310 performs processing for registration at the EMD service center 302 off-line by using for example its own ID card and bank account for the settlement processing and acquires the global unique identifier SP_ID. The identifier SP_ID is stored in the storage unit 351.

First, an explanation will be made of the processing when the service provider 310 requests the public key certificate data $CER_{SP}$ for certifying the legitimacy of the public key data $K_{SP,S}$ corresponding to its own secret key data $K_{SP,S}$ to the EMD service center 302 by referring to FIG. 54.

First, the service provider 310 generates a random number by using the true random number generator to generate the secret key data $K_{SP,S}$, generates the public key data $K_{SP,S}$ corresponding to the related secret key data $K_{SP,S}$ and stores the same in the storage unit 351.

The identifiers SP_ID and the public key data $K_{SP,P}$ of the EMD service center manager 358 and the service provider 310 are read from the storage unit 351.

Then, the EMD service center manager 358 transmits the identifier SP_ID and the public key data $K_{SP,P}$ to the EMD service center 302.

Then, the EMD service center manager 348 receives as its inputs the public key certificate data $CER_{SP}$ and the signature data $SIG_{61,ESC}$ thereof from the EMD service center 302 in accordance with the related registration and writes the same into the storage unit 351.

Next, an explanation will be made of the processing of the case where the service provider 310 registers the price tag data 312 in the EMD service center 302 and authorizes the same by referring to FIG. 54.

In this case, the signature processor 354 finds the hush value of a module $Mod_{103}$ storing the price tag data 312 generated by the price tag data generator 356 and the global unique identifier Content_ID read from the storage unit 351 and generates the signature data $SIG_{80,SP}$ by using the secret key data $K_{SP,S}$.

Further, it reads the public key certificate data $CER_{SP}$ and the signature data $SIG_{61,ESC}$ thereof from the storage unit 351.

Figure 55:
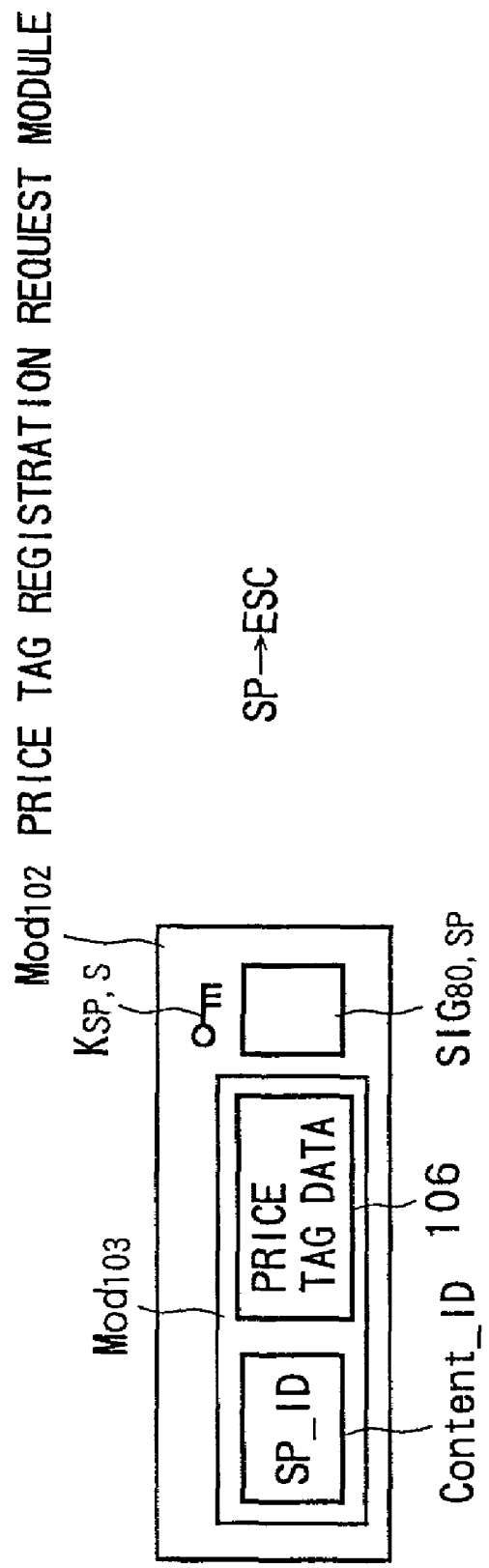
FIG. 55 is a view for explaining the format of a price tag registration request use module transmitted from the service provider to the EMD service center.

Then, the encryptor/decryptor 353 encrypts a price tag registration request use module $Mod_{102}$ shown in FIG. 55 by using the session key data $K_{SES}$ obtained by the mutual authentication between the mutual authenticator 352 and the EMD service center 302, then transmits it from the EMD service center manager 358 to the EMD service center 302.

Note that, it is also possible that the global unique identifier SP_ID of the service provider 310 be stored in the module $Mod_{103}$.

Further, the EMD service center manager 358 writes settlement report data 307s received from the EMD service center 302 into the storage unit 351.

Further, the EMD service center manager 358 stores marketing information data 904 received from the EMD service center 302 in the storage unit 351.

The marketing information data 904 is used as a reference when the service provider 310 determines the content data C to be distributed from then on.

[EMD Service Center 302]

The EMD service center 302 plays a role as the certificate authority (CA), key management authority, and right clearing authority as mentioned before.

Figure 56:
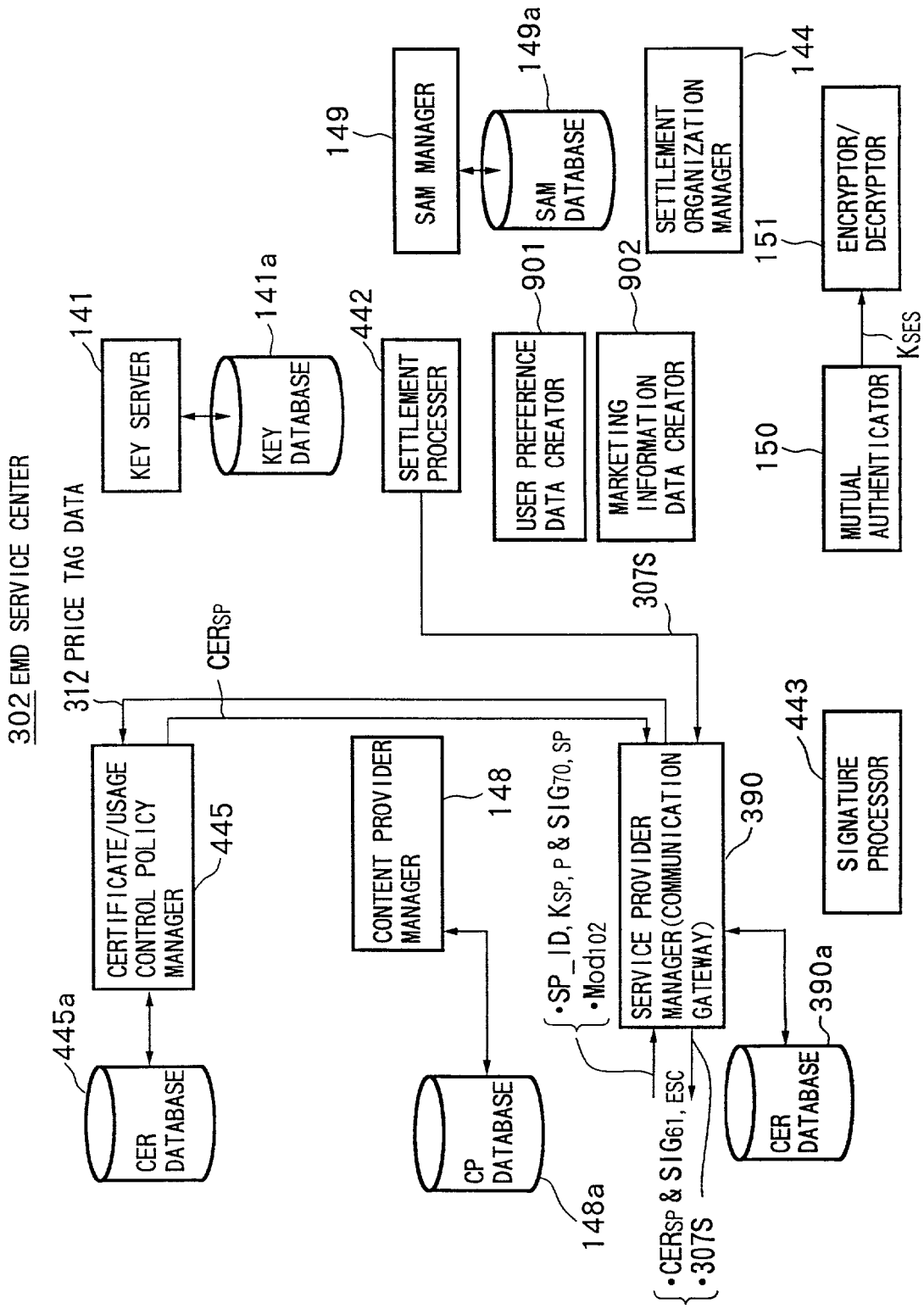
FIG. 56 is a functional block diagram of the EMD service center shown in FIG. 49 and a view of the flow of the data related to the data transferred with the service provider.

FIG. 56 is a view of the configuration of the EMD service center 302.

As shown in FIG. 56, the EMD service center 302 has a key server 141, key database 141a, a settlement processor 442, a signature processor 443, a settlement organization manager 144, a certificate usage control policy manager 445, a CER database 445a, a content provider manager 148, a CP database 148a, a SAM manager 149, a SAM database 149a, a mutual authenticator 150, an encryptor/decryptor 151, a service provider manager 390, an SP database 390a, a user preference filter creator 901, and a marketing information data creator 902.

In FIG. 56, the functional blocks given the same references as those of FIG. 10 and FIG. 11 have substantially the same functions as those of the functional blocks having the same references explained in the first embodiment.

Below, an explanation will be made of the functional blocks given new references in FIG. 56.

Note that, in FIG. 56, the flow of the data related to the data transferred between the EMD service center 302 and the service provider 310 in the flow of the data among the functional blocks in the EMD service center 302 is shown.

Figure 57:
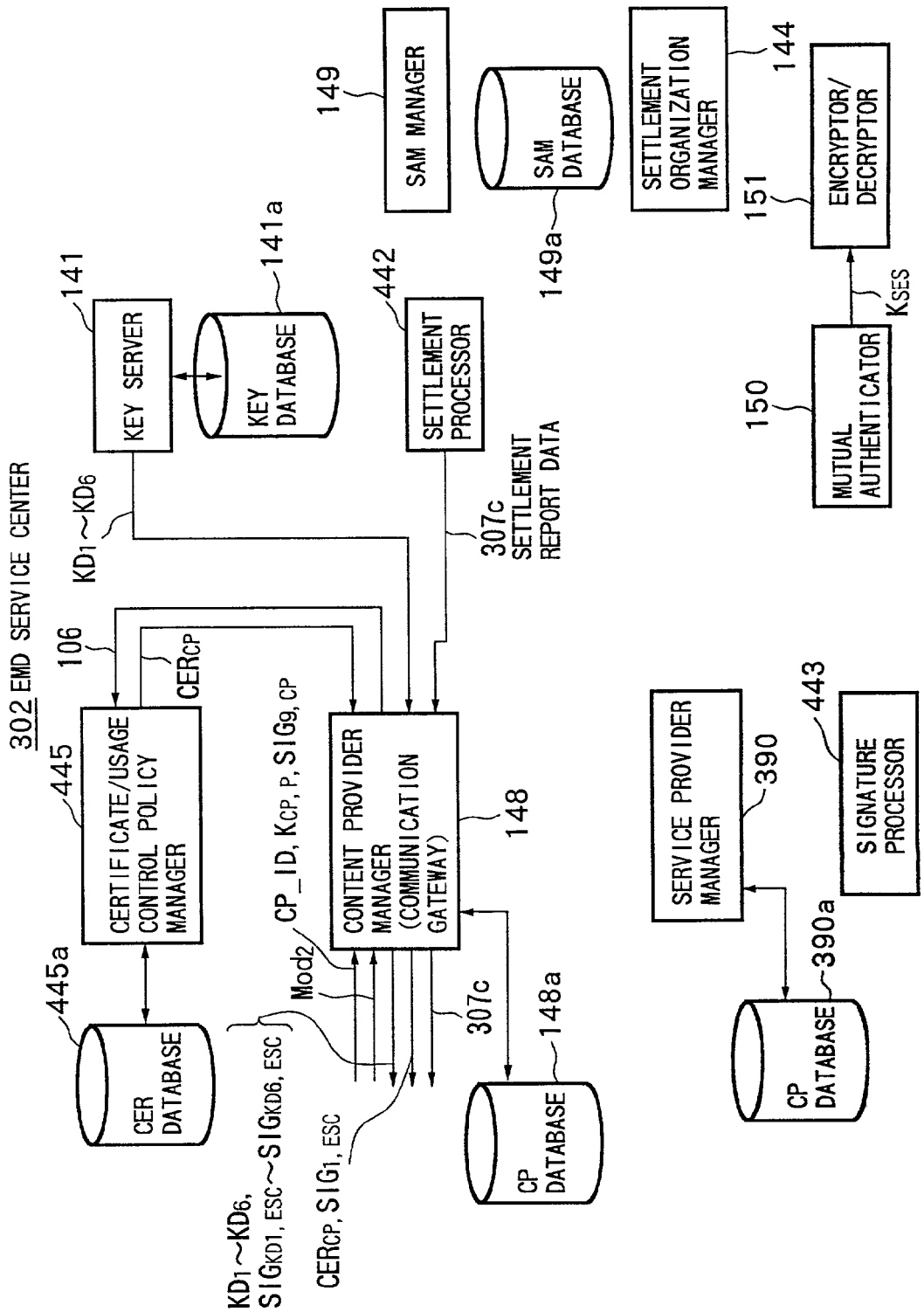
FIG. 57 is a functional block diagram of the EMD service center shown in FIG. 49 and a view of the flow of the data related to the data transferred with the content provider.

Further, in FIG. 57, the flow of the data related to the data transferred between the EMD service center 302 and the content provider 301 in the flow of the data among the functional blocks in the EMD service center 302 is shown.

Figure 58:
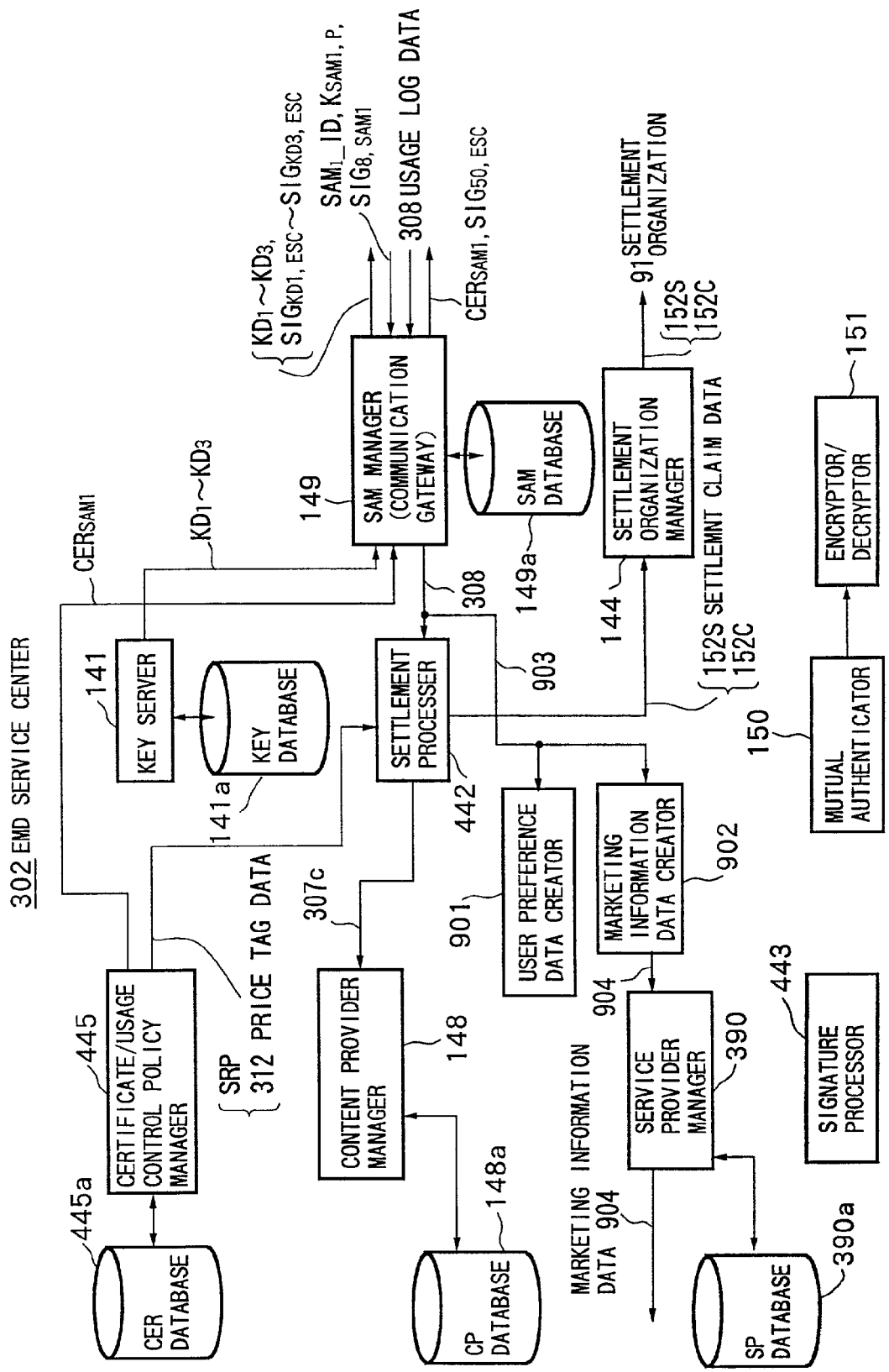
FIG. 58 is a functional block diagram of the EMD service center shown in FIG. 49 and a view of the flow of the data related to the data transferred with the SAM.

Further, in FIG. 58, the flow of the data related to the data transferred between the EMD service center 302 and the SAMs $305_1$ to $305_4$ shown in FIG. 49 and the settlement organization 91 in the flow of the data among the functional blocks in the EMD service center 302 is shown.

The settlement processor 442 performs the settlement processing based on the usage log data 308 input from the SAMs $305_1$ to $305_4$ and the suggested retailer' price data SPR and the price tag data 312 input from the certificate usage control policy manager 445 as shown in FIG. 58. Note that, at this time, the settlement processor 442 monitors the existence of dumping etc. by the service provider 310.

The settlement processor 442 generates settlement report data 307c and settlement claim data 152c for the content provider 301 as shown in FIG. 58 by the settlement processing and outputs them to the content provider manager 148 and the settlement organization manager 144.

Further, by the settlement processing, as shown in FIG. 56 and FIG. 58, it generates the settlement report data 307s and settlement claim data 152s for the service provider 310 and outputs them to the service provider manager 390 and the settlement organization manager 144.

Here, the settlement claim data 152c and 152s are authorized data enabling claim of payment of money to the settlement organization 91 based on the related data.

Here, the usage log data 308 is used when determining the payment of the license fee related to the secure container 304 in the same way as the usage log data 108 explained in the first embodiment. The usage log data 308, for example, as shown in FIG. 59, describes the identifier Content_ID of the content data C stored in the secure container 304, the identifier CP_ID of the content provider 301 providing the content data C stored in the secure container 304, the identifier SP_ID of the service provider 310 distributing the secure container 304, the signal original data of the content data C, the compression method of the content data C in the secure container 304, the identifier Media_ID of the storage medium storing the secure container 304, the identifier SAM_ID of the SAMs $305_1$ to $305_4$ receiving the distribution of the secure container 304, and the USER_ID of the user of the related SAMs $105_1$ to $105_4$. Accordingly, in a case where the money paid by the user of the user home network 303 must be distributed to the license owners of for example the compression method and the storage medium other than the owners of the content provider 301 and the service provider 310, the EMD service center 302 determines the sum of money to be paid to the other parties based on the distribution rate table determined in advance and generates the settlement report data and settlement claim data in accordance with the related determination.

The certificate usage control policy manager 445 reads the public key certificate data $CER_{CP}$, public key certificate data $CER_{SP}$, public key certificate data $CER_{SAM1}$ to $CER_{SAM2}$, etc. registered and authorized in the CER database 445a and registers and authorizes the usage control policy data 106 and content key data Kc of the content provider 301 and the price tag data 312 of the service provider 310 etc. in the CER database 445a.

At this time, the certificate usage control policy manager 445 takes the hush values of the usage control policy data 106, content key data Kc, price tag data 312, etc., attaches the signature data using the secret key data $K_{ESC,S}$, and thereby generates the authorized public key certificate data.

The content provider manager 148 has the function of communicating with the content provider 101 and can access the CP database 148a for managing the registered identifier CP_ID etc. of the content provider 101.

The user preference filter creator 901 generates user preference filter data 903 for selecting the content data C in accordance with the preference of the users of the SAMs $305_1$ to $305_4$ transmitting the related usage log data 308 based on the usage log data 308 and transmits the user preference filter data 903 to the SAMs $305_1$ to $305_4$ transmitting the related usage log data 308 via the SAM manager 149.

The marketing information data creator 902 generates the marketing information data 904 indicating the state of purchase etc. of the entire content data C distributed to the user home network 103 by for example a plurality of service providers 310 based on the usage log data 308 and transmits this via the service provider manager 390 to the service provider 310. The service provider 310 determines the content of the service to be provided from then on with the marketing information data 904 as a reference.

Below, an explanation will be made of the flow of the processing in the EMD service center 302.

The transmission of the distribution key data $KD_1$ to $KD_6$ from the EMD service center 302 to the content provider 301 and the transmission of the distribution key data $KD_1$ to $KD_3$ from the EMD service center 302 to the SAMs $305_1$ to $305_4$ are carried out in the same way as the case of the first embodiment.

Further, the processing in the case where the EMD service center 302 receives a request for issuance of public key certificate data from the content provider 301 is carried out in the same way as the case of the first embodiment except for the point that the certificate usage control policy manager 445 performs the registration with respect to the CER database 445a.

Below, an explanation will be made of the processing in the case where the EMD service center 302 receives a request for issuance of public key certificate data from the service provider 310 by referring to FIG. 56 and FIG. 60.

Figure 60:
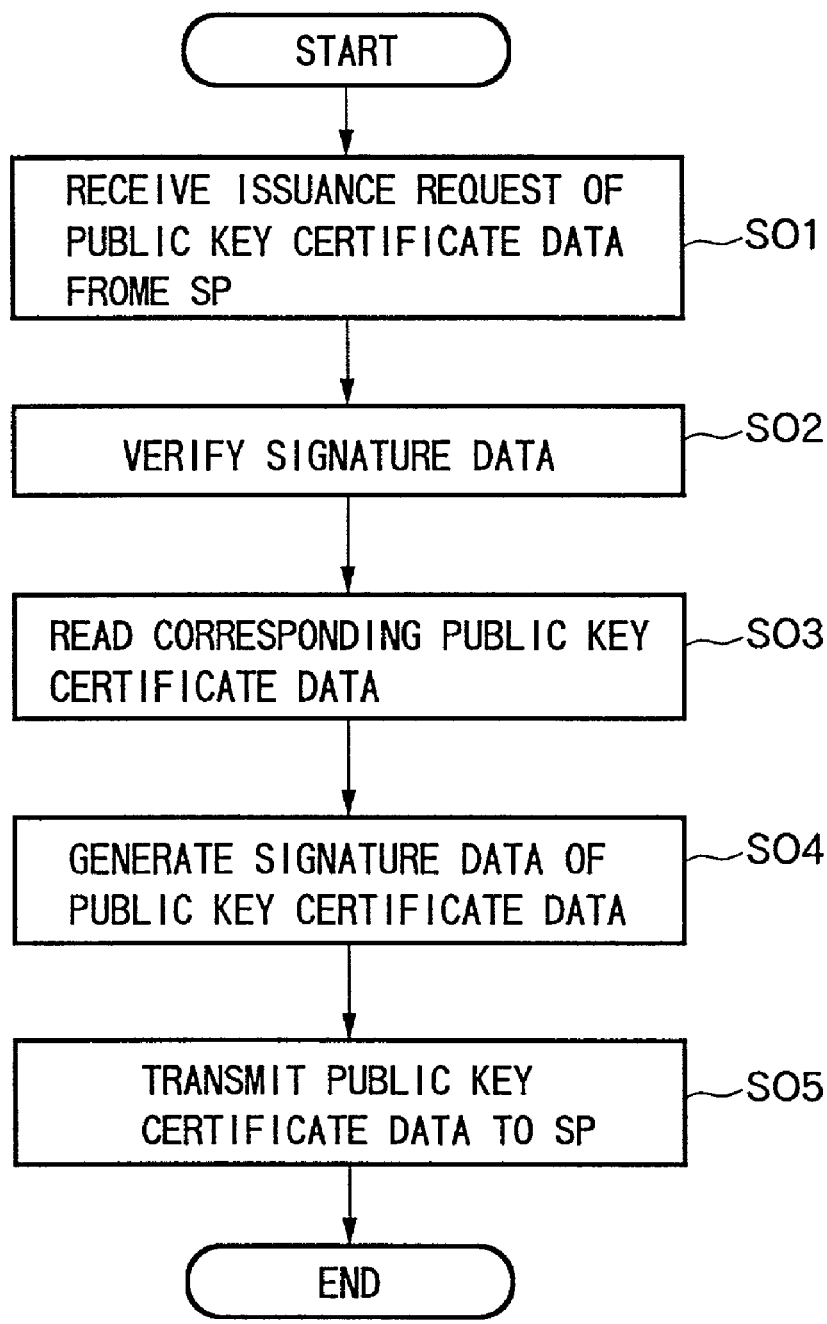
FIG. 60 is a flowchart of processing when the EMD service center receives a request for issuance of public key certificate data from the service provider in the second embodiment.

FIG. 60 is a flowchart of the related processing.

Step S01: When receiving a request for registration of public key certificate data containing the identifier SP_ID, public key data $K_{SP,P}$, and signature data $SIG_{70,SP}$ of the service provider 310 given by the EMD service center 302 in advance from the service provider 310, the service provider manager 390 decrypts them by using the session key data $K_{SES}$ obtained by the mutual authentication between the mutual authenticator 150 and the mutual authenticator 352 shown in FIG. 51.

Step S02: After confirming the legitimacy of the related decrypted signature data $SIG_{70,SP}$ at the signature processor 443, it is confirmed whether or not the service provider 310 issuing a request for issuance of the related public key certificate data is registered in the SP database 390a based on the identifier SP_ID and the public key data $K_{SP,P}$.

Step S03: The certificate usage control policy manager 445 reads the public key certificate data $CER_{SP}$ of the related service provider 310 from the CER database 445a and outputs the same to the service provider manager 390.

Step S04: The signature processor 443 takes the hush value of the public key certificate data $CER_{SP}$, generates the signature data $SIG_{61,ESC}$ by using the secret key data $K_{ESC,S}$ of the EMD service center 302, and outputs this to the service provider manager 390.

Step S05: The service provider manager 390 encrypts the public key certificate data $CER_{SP}$ and the signature data $SIG_{61,ESC}$ thereof by using the session key data $K_{SES}$ obtained by the mutual authentication between the mutual authenticator 150 and the mutual authenticator 352 shown in FIG. 51 and then transmits the same to the service provider 310.

Note that, the processing where the EMD service center 302 receives a request for issuance of public key certificate data from the SAMs $105_1$ to $105_4$ is similar to the first embodiment.

Further, also the processing where the EMD service center 302 receives the request for registration of the usage control policy data 106 from the content provider 301 is similar to that of the first embodiment.

Next, an explanation will be made of the processing where the EMD service center 302 receives the request for registration of the price tag data 312 from the service provider 310 by referring to FIG. 56 and FIG. 61.

Figure 61:
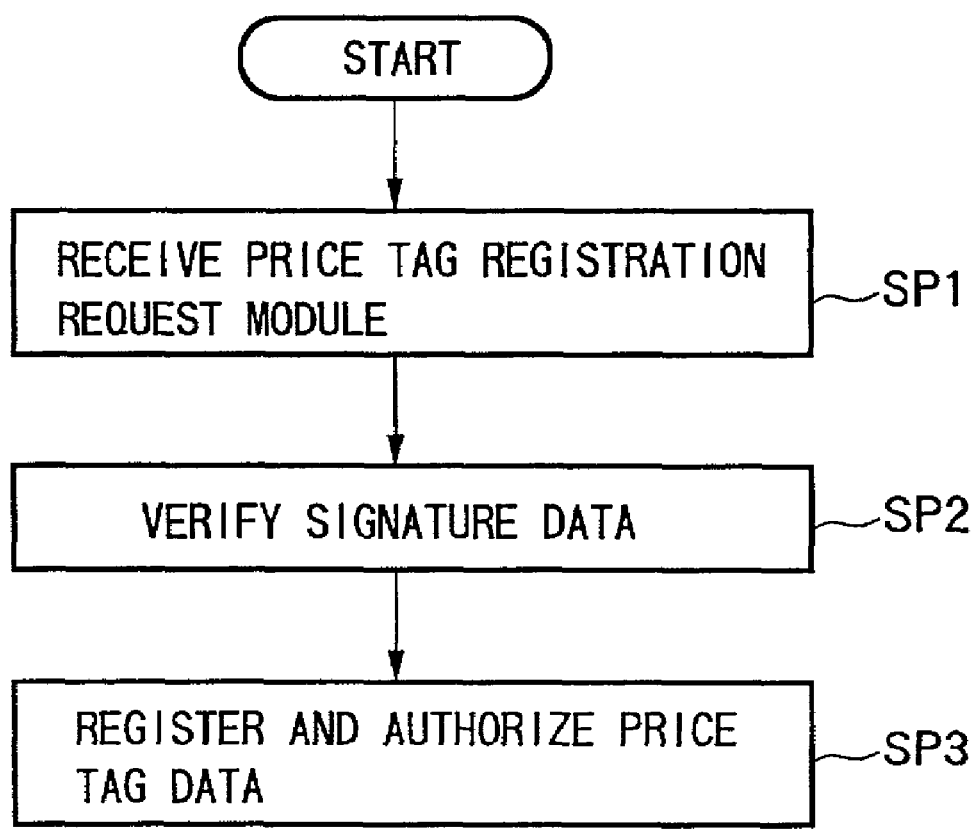
FIG. 61 is a flowchart of processing when the EMD service center receives a request for registration of price tag data from the service provider in the second embodiment.

FIG. 61 is a flowchart of the related processing.

Step SP1: When the service provider manager 390 receives the price tag registration request module $Mod_{102}$ shown in FIG. 55 from the service provider 310, it decrypts the price tag registration request module $Mod_{102}$ by using the session key data $K_{SES}$ obtained by the mutual authentication between the mutual authenticator 150 and the mutual authenticator 352 shown in FIG. 51.

Step SP2: The legitimacy of the signature data $SIG_{80,SP}$ stored in the related decrypted price tag registration request module $Mod_{102}$ is confirmed in the signature processor 443.

Step SP3: The certificate usage control policy manager 445 registers and authorizes the price tag data 312 stored in the price tag registration request module $Mod_{102}$ in the CER database 445a.

Next, an explanation will be made of the processing where the settlement is carried out in the EMD service center 302 by referring to FIG. 58 and FIG. 62.

Figure 62:
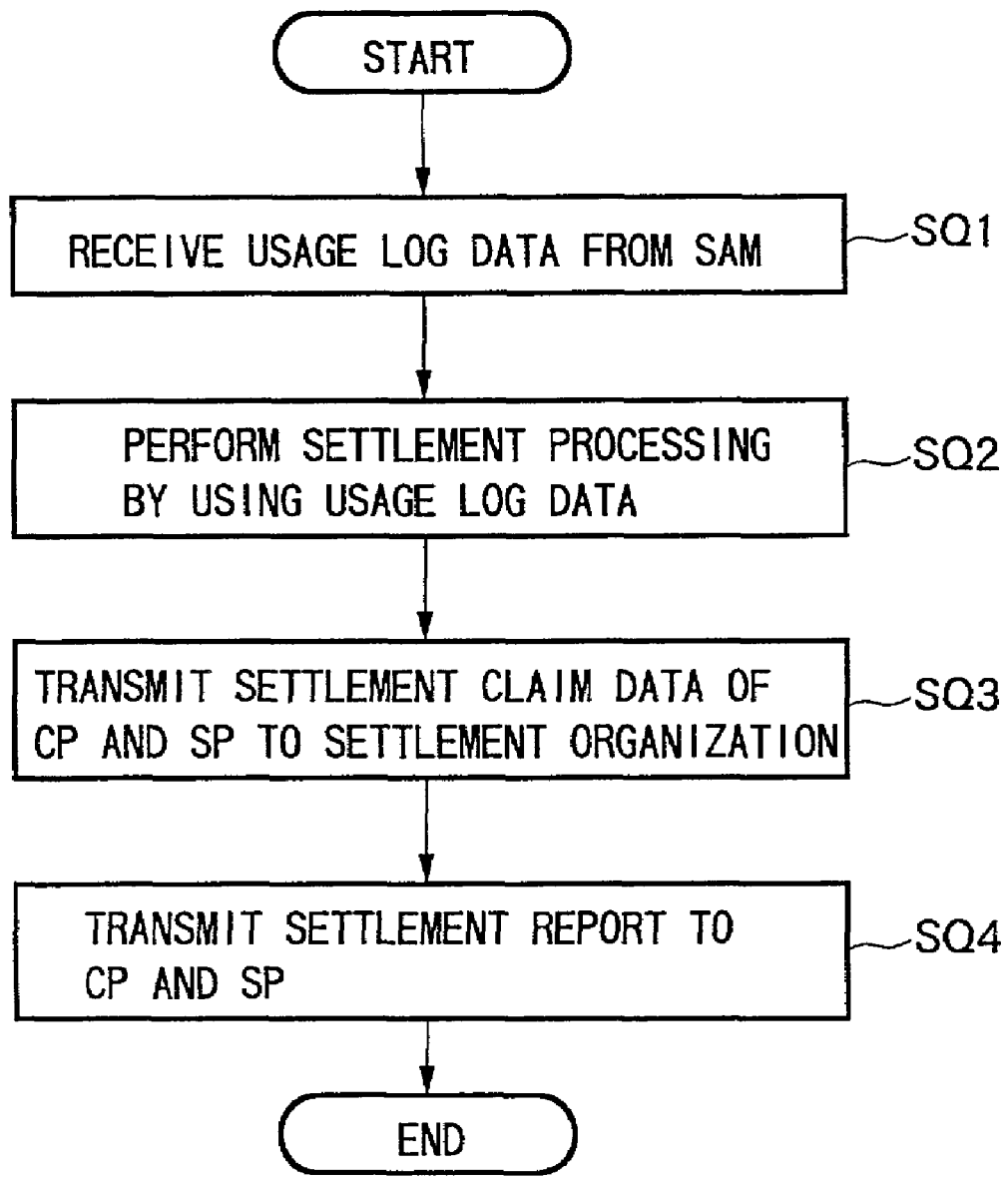
FIG. 62 is a flowchart of processing when the EMD service center performs settlement in the second embodiment.

FIG. 62 is a flowchart of the related processing.

Step SQ1: When receiving as its inputs the usage log data 308 and signature data $SIG_{205,SAM1}$ thereof from for example the SAM $305_1$ of the user home network 303, the SAM manager 149 decrypts the usage log data 308 and the signature data $SIG_{205,SAM1}$ by using the session key data $K_{SES}$ obtained by the mutual authentication between the mutual authenticator 150 and the SAMs $305_1$ to $305_4$, verifies the signature data $SIG_{205,SAM1}$ by using the public key data $K_{SAM1,P}$ of the SAM $305_1$, and then outputs the same to the settlement processor 442.

Step SQ2: The settlement processor 442 performs the settlement processing based on the usage log data 308 input from the SAM $305_1$ and the suggested retailer' price data SRP and the price tag data 312 input from the certificate usage control policy manager 445.

The settlement processor 442 generates the settlement report data 307c and the settlement claim data 152c for the content provider 301 and the settlement report data 307s and the settlement claim data 152s for the service provider 310 as shown in FIG. 58 by the settlement processing.

Note that, it is also possible that the settlement processing by the settlement processor 442 be carried out whenever the usage log data 308 is input, and for every predetermined period.

Step SQ3: As shown in FIG. 56 and FIG. 58, the settlement claim data 152c and 152s for the content provider 301 and the service provider 310 are generated and output to the settlement organization manager 144.

The settlement organization manager 144 performs the mutual authentication of the settlement claim data 152c and 152s and the signature data generated for them by using the secret key data $K_{ESC,S}$ and the decryption by the session key data $K_{SES}$ and then transmits the same to the settlement organization 91 via the payment gateway 90 shown in FIG. 49.

By this, the money of the sum indicated in the settlement claim data 152c is paid to the content provider 301, and the money of the sum indicated in the settlement claim data 152s is paid to the service provider 310.

Note that, it is also possible for the EMD service center 302 to transmit the settlement claim data 152c and 152s to the content provider 301 and the service provider 310. In this case, the content provider 301 and the service provider 310 claim the money to the settlement organization 91 based on the related received settlement claim data 152c and 152s.

Step SQ4: The settlement report data S307c and S307s for the content provider 301 and the service provider 310 are output via the content provider manager 148 and the service provider manager 390 to the content provider 301 and the service provider 310.

The EMD service center 302 performs the processing at the time of shipping of the SAMs $305_1$ to $305_4$ and the registration processing of the SAM registration list in the same way as the EMD service center 102 of the first embodiment other than the above.

[User Home Network 303]

The user home network 303 has the network apparatus 3601 and the A/V apparatuses $360_2$ to $360_4$ as shown in FIG. 49.

The network apparatus $360_1$ includes the CA module 311 and the SAM $305_1$. Further, the A/V apparatuses $360_2$ to $360_4$ include the SAMs $305_2$ to $305_4$.

The SAMs $305_2$ to $305_4$ are connected to each other via the bus 191, for example, a IEEE serial interface bus.

Note that it is also possible that the AV apparatuses $360_2$ to $360_4$ have a network communication function or do not have a network communication function, but utilize the network communication function of the network apparatus 360, via the bus 191.

Further, it is also possible that the user home network 303 have only AV apparatuses not having the network function.

Below, an explanation will be made of the network apparatus $360_1$.

Figure 63:
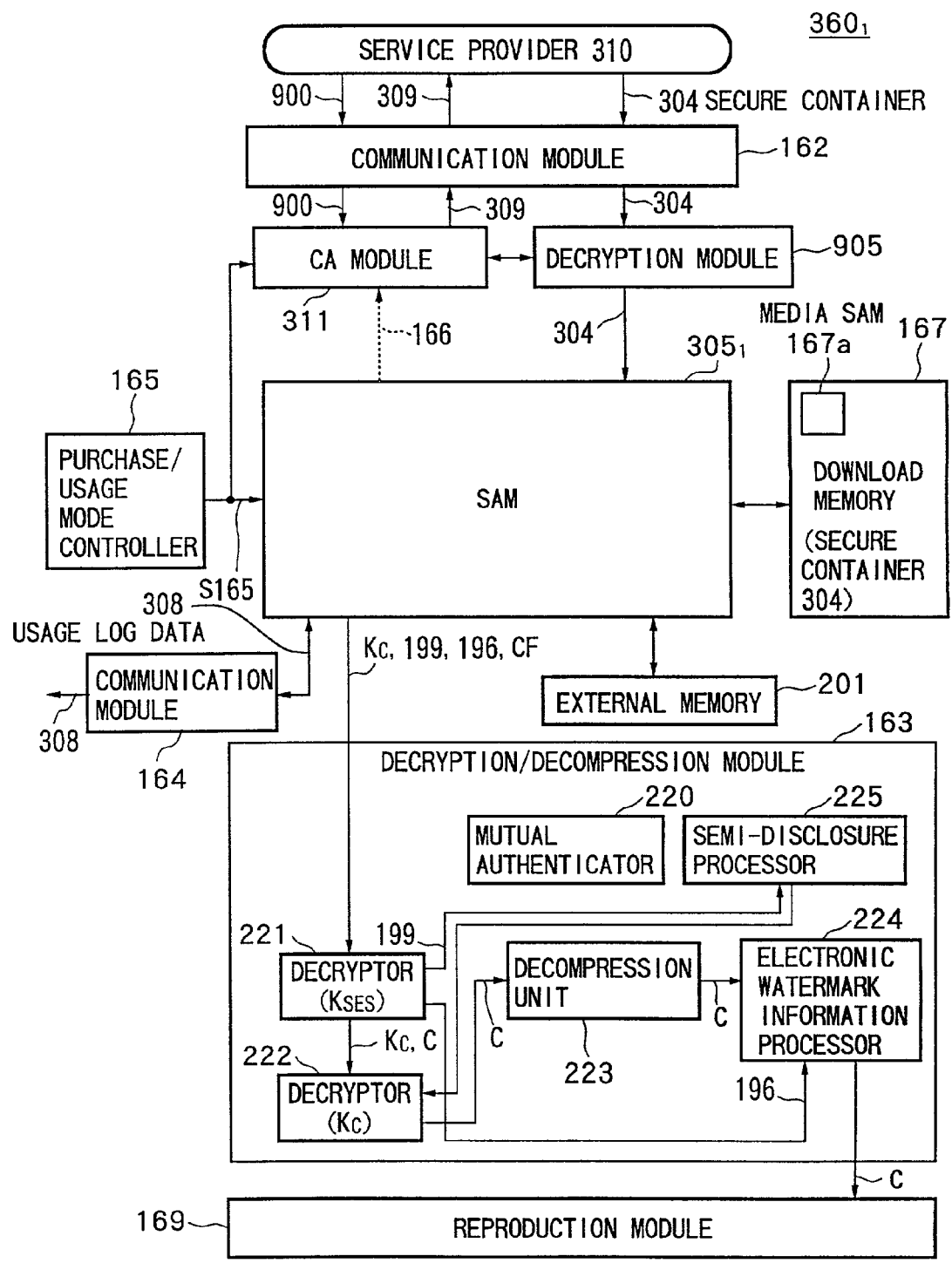
FIG. 63 is a view of the configuration of the network apparatus shown in FIG. 49.

FIG. 63 is a view of the configuration of the network apparatus $360_1$.

As shown in FIG. 63, the network apparatus 360, has a communication module 162, a CA module 311, a decryption module 905, a SAM $305_1$, a decryption/decompression module 163, a purchase/usage mode determination controller 165, a download memory 167, a reproduction module 169, and an external memory 201.

In FIG. 63, components given the same references as those of FIG. 16 are the same as the components of the same references explained in the first embodiment.

The communication module 162 performs the communication processing with the service provider 310.

Specifically, the communication module 162 outputs the secure container 304 received from the service provider 310 by a satellite broadcast or the like to the decryption module 905. Further, the communication module 162 outputs the user preference filter data 900 receiving the SP use purchase log data 309 via a telephone line or the like at the service provider 310 to the CA module 311 and, at the same time, transmits the SP use purchase log data 309 input from the CA module 311 to the service provider 310 via a telephone line or the like.

Figure 64:
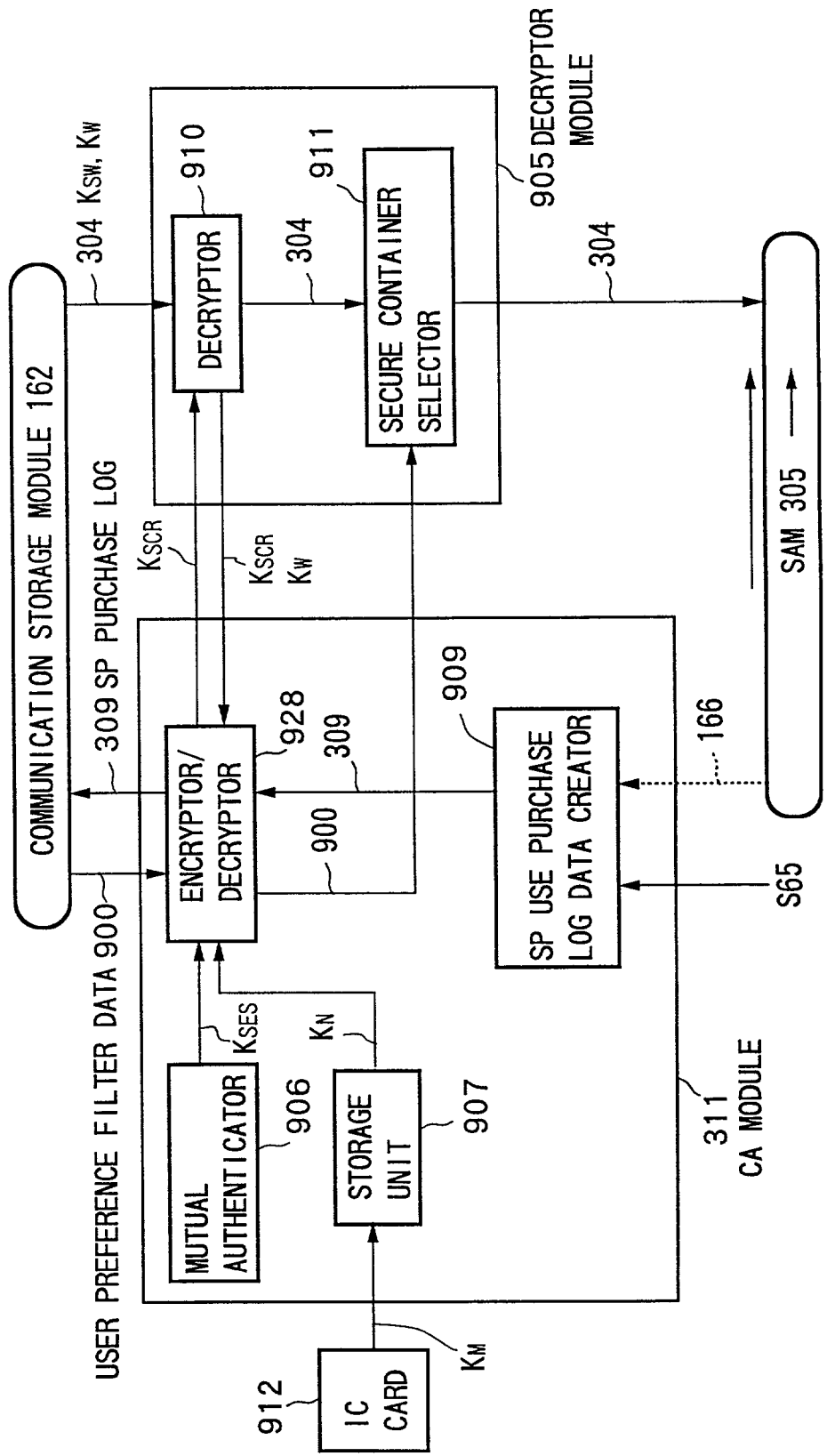
FIG. 64 is a functional block diagram of a CA module shown in FIG. 63.

FIG. 64 is a functional block diagram of the CA module 311 and the decryption module 905.

As shown in FIG. 64, the CA module 311 has a mutual authenticator 906, a storage unit 907, an encryptor/decryptor 908, and an SP use purchase log data creator 909.

When transferring data between the CA module 311 and the service provider 310 via the telephone line, the mutual authenticator 906 performs the mutual authentication with the service provider 310 to generate the session key data $K_{SES}$ and outputs this to the encryptor/decryptor 908.

The storage unit 907 stores the master key data $K_M$ supplied from the service provider 310 off-line by using an IC card 912 etc. after for example a contract is established between the service provider 310 and the user.

The encryptor/decryptor 908 receives as its inputs the encrypted scramble key data $K_{SCR}$ and work key data $K_W$ from a decryptor 910 of the decryption module 905 and decrypts the work key data $K_W$ by using the master key data $K_M$ read from the storage unit 907. Then, the encryptor/decryptor 908 decrypts the scramble key data $K_{SCR}$ by using the related decrypted work key data $K_W$ and outputs the related decrypted scramble key data $K_{SCR}$ to the decryptor 910.

Further, the encryptor/decryptor 908 decrypts the user preference filter data 900 received by the communication module 162 from the service provider 310 via a telephone line or the like by using the session key data $K_{SES}$ from the mutual authenticator 906 and outputs the same to a secure container selector 911 of the decryption module 905.

Further, the encryptor/decryptor 908 decrypts the SP use purchase log data 309 input from the SP use purchase log data creator 909 by using the session key data $K_{SES}$ from the mutual authenticator 906 and transmits the same via the communication module 162 to the service provider 310.

The SP use purchase log data creator 909 generates the SP use purchase log data 309 indicating the purchase log of the content data C inherent in the service provider 310 based on the control signal S165 in accordance with the purchase operation of the content data C by the user by using the purchase/usage mode determination controller 165 shown in FIG. 63 or the usage control status data 166 from the SAM $305_1$ and outputs this to the encryptor/decryptor 908.

The SP use purchase log data 309 contains for example the information to be collected from the user concerning the distribution service by the service provider 310, monthly base fee (network rent), contract (update) information, and the purchase log information.

Note that, the CA module 311 communicates with a charge database, a customer management database, and a marketing information database of the service provider 310 when the service provider 310 has the charge function. In this case, the CA module 311 transmits the charge data for the distribution service of the content data to the service provider 310.

The decryption module 905 has the decryptor 910 and the secure container selector 911.

The decryptor 910 receives as its inputs the encrypted secure container 304, scramble key data $K_{SCR}$, and the work key data $K_W$ from the communication module 162.

Then, the decryptor 910 outputs the encrypted scramble key data $K_{SCR}$ and work key data $K_W$ to the encryptor/decryptor 908 of the CA module 311 and receives as its input the decrypted scramble key data $K_{SCR}$ from the encryptor/decryptor 908.

Then, the decryptor 910 decrypts the encrypted secure container 304 by using the scramble key data $K_{SCR}$ and then outputs the same to the secure container selector 911.

Note that, when the secure container 304 is transmitted from the service provider 310 by the MPEG2 Transport Stream system, for example, the decryptor 910 fetches the scramble key data $K_{SCR}$ from an ECM (Entitlement Control Message) in a TS packet and fetches the work key data $K_W$ from an EMM (Entitlement Management Message).

The ECM, other than the above, contains for example program attribute information for every channel. Further, the EMM, other than this, contains individual trial listening contract information different for every user (auditor) etc.

The secure container selector 911 filters the secure container 304 input from the decryptor 910 by using the user preference filter data 900 input from the CA module 311, selects the secure container 304 in accordance with the preference of the user, and outputs the same to the SAM $305_1$.

Next, an explanation will be made of the SAM $305_1$.

Note that, the SAM $305_1$ has basically the same function and structure as the SAM $105_1$ of the first embodiment mentioned before by using FIG. 17 to FIG. 41 except it performs the processing concerning the service provider 310 in addition to the content provider 310, for example, it performs the signature verification processing for the service provider 310.

Further, the SAMs $305_2$ to $305_4$ basically have the same functions as those of the SAM $305_1$.

Namely, the SAMs $305_1$ to $305_4$ are modules for performing the charge processing in units of content and communicate with the EMD service center 302.

Below, the functions of the SAM $305_1$ will be explained in detail.

Figure 65:
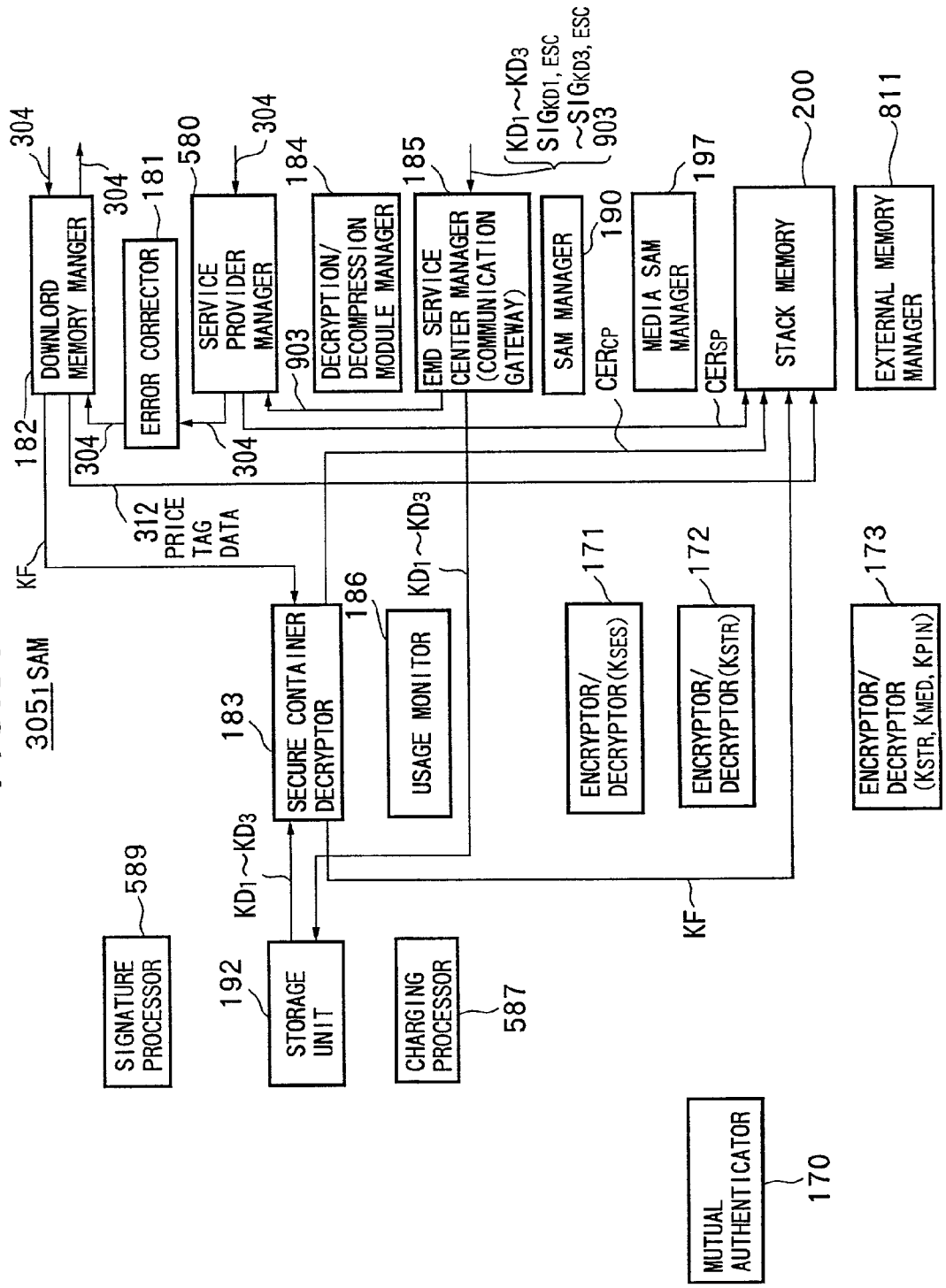
FIG. 65 is a functional block diagram of the SAM shown in FIG. 63 and a view of the flow of the data from the input of the secure container to the decryption of the same.

FIG. 65 is a view of the configuration of the SAM $305_1$.

Note that, in FIG. 65, the flow of the data related to the processing of receiving as the input the secure container 304 from the service provider 310 and decrypting the key file KF in the secure container 304 is shown.

As shown in FIG. 65, the SAM $305_1$ has a mutual authenticator 170, encryptor/decryptors 171, 172, and 173, error corrector 181, download memory manager 182, secure container decryptor 183, decryption/decompression module manager 184, EMD service center manager 185, usage monitor 186, signature processor 189, SAM manager 190, storage unit 192, media SAM manager 197, stack memory 200, service provider manager 580, charge processor 587, signature processor 598, and external memory manager 811.

Note that, the predetermined functions of the SAM $305_1$ shown in FIG. 65 are realized by executing a secret program in the CPU in the same way as the case of the SAM $105_1$.

In FIG. 65, functional blocks given the same references as those of FIG. 17 are the same as the functional blocks having the same references explained in the first embodiment.

Further, the external memory 201 shown in FIG. 63 stores the usage log data 308 and the SAM registration list after the processing explained in the first embodiment and the processing mentioned later.

Further, the stack memory 200, as shown in FIG. 66, stores the content key data Kc, usage control policy data (UCP) 106, lock key data $K_{LOC}$ of the storage unit 192, public key certificate data $CER_{CP}$ of the content provider 301, public key certificate data $CER_{SP}$ of the service provider 310, usage control status data (UCS) 366, SAM program download containers $SDC_1$ to $SFDC_3$, price tag data 312, etc.

Below, an explanation will be made of the functional blocks newly given references in FIG. 65 among the functional blocks of the SAM $305_1$.

The signature processor 589 verifies the signature data in the secure container 304 by using the public key data $K_{ESC,P}$ of the EMD service center 302, public key data $K_{CP,P}$ of the content provider 301, and the public key data $K_{SP,P}$ of the service provider 310 read from the storage unit 192 or the stack memory 200.

Figure 67:
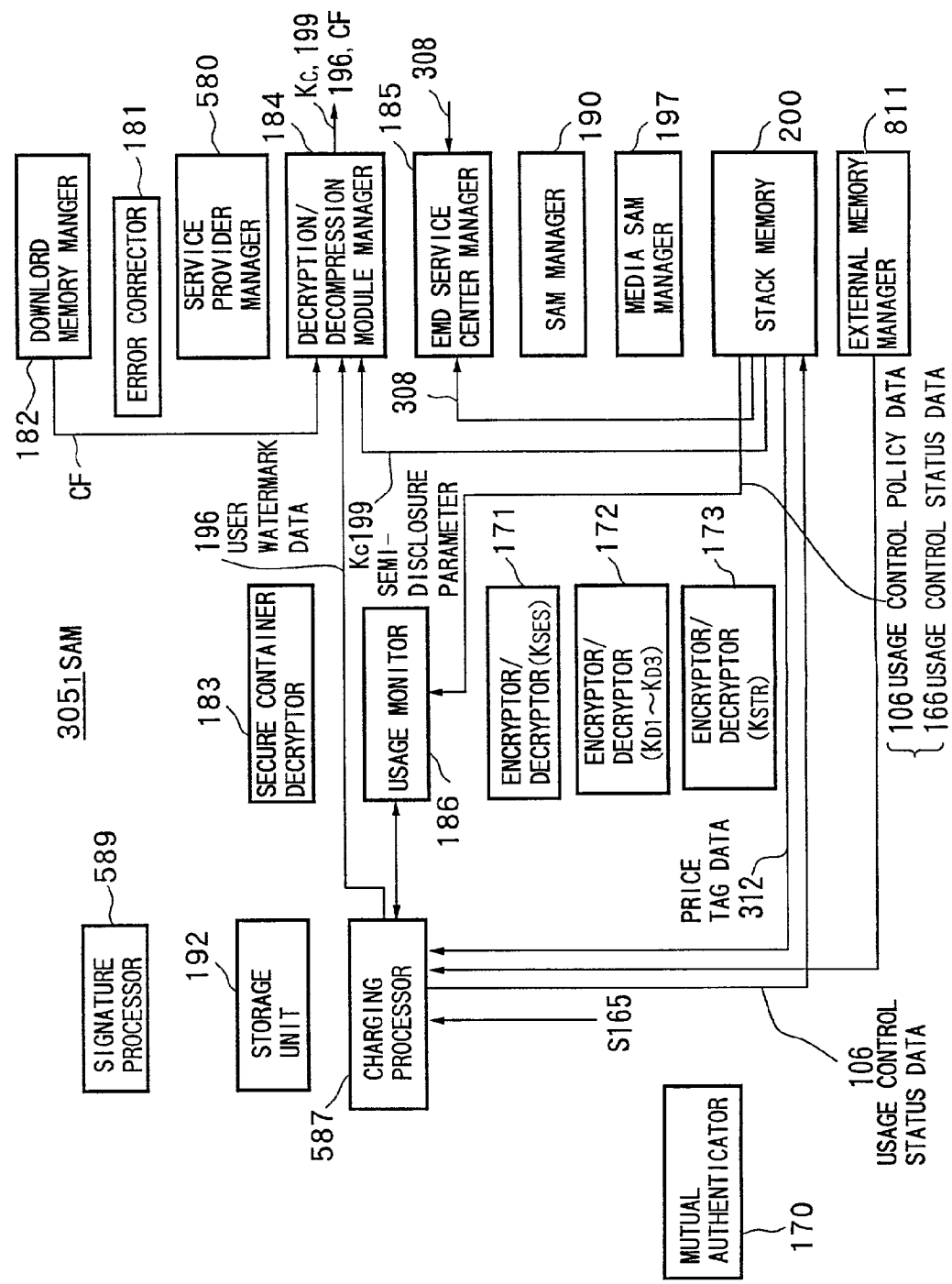
FIG. 67 is a functional block diagram of the SAM shown in FIG. 63 and a view of the flow of the data when determining the purchase and/or usage mode of the content etc.

The charge processor 587 performs the charge processing in accordance with the purchase and/or usage mode of the content by the user based on the control signal S165 from the purchase/usage mode determination controller 165 shown in FIG. 63 and the price tag data 312 read from the stack memory 200 as shown in FIG. 67.

The charge processing by the charge processor 587 is carried out based on the content of the right such as the license conditions indicated by the usage control policy data 106 and the usage control status data 166 under the monitoring of the usage monitor 186. Namely, the user can purchase and use the content within the range according to the related content of the right etc.

Further, the charge processor 587 generates the usage log data 308 in the charge processing and writes this into the external memory 201 via the external memory manager 811.

Here, the usage log data 308 is used when determining the payment of the license fee related to the secure container 304 in the EMD service center 302 in the same way as the usage log data 108 of the first embodiment.

Further, the charge processor 587 generates the usage control status (UCS) data 166 describing the purchase and/or usage mode of the content by the user based on the control signal S165 and writes this into the external memory 201 via the external memory manager 811.

As the purchase modes of the content, there are for example a straight purchase without restriction as to reproduction by the purchaser and copying for the usage of the related purchaser and a reproduction charge charging whenever it is reproduced.

Here, the usage control status data 166 is generated when the user determines the purchase mode of the content, then is used for control so that the user uses the related content within the range permitted by the related determined purchase mode. The usage control status data 166 describes the ID of the content, the purchase mode, the straight purchase price, the SAM_ID of the SAM with the purchase of the related content performed therefor, USER_ID of the purchasing user, etc.

Note that, when the determined purchase mode is the reproduction charge, for example, the usage control status data 166 is transmitted from the SAM $305_1$ to the service provider 310 in real-time, and the service provider 310 indicates to the EMD service center 302 to take the usage log data 108 from the SAM $105_1$.

Further, when the determined purchase mode is a straight purchase, for example, the usage control status data 166 is transmitted to the service provider 310 and the EMD service center 302 in real-time.

Further, the SAM $305_1$ outputs the user preference filter data 903 received by the EMD service center manager 185 from the EMD service center 302 to the service provider manager 580. Then, the service provider manager 580 filters the secure container 304 input from the decryption module 905 shown in FIG. 63 based on the user preference filter data 903, selects the secure container 304 in accordance with the preference of the user, and outputs the related selected secure container 304 to the error corrector 181. By this, the SAM $305_1$ can perform the processing for selection of the content data C based on the preference of the related user obtained from the state of purchase of the content data C by the related user covering all service providers 310 contracted with the user of the related SAM $305_1$.

Below, the flow of the processing in the SAM $305_1$ will be explained.

The flow of the processing when storing the distribution key data $KD_1$ to $KD_3$ received from the EMD service center 302 in the storage unit 192 is similar to that of the case of the SAM $105_1$ mentioned before.

Below, an explanation will be made of the flow of the processing in the SAM $305_1$ when receiving as its input the secure container 304 from the service provider 310 and decrypting the key file KF in the secure container 304 by referring to FIG. 65 and FIG. 68.

Figure 68:
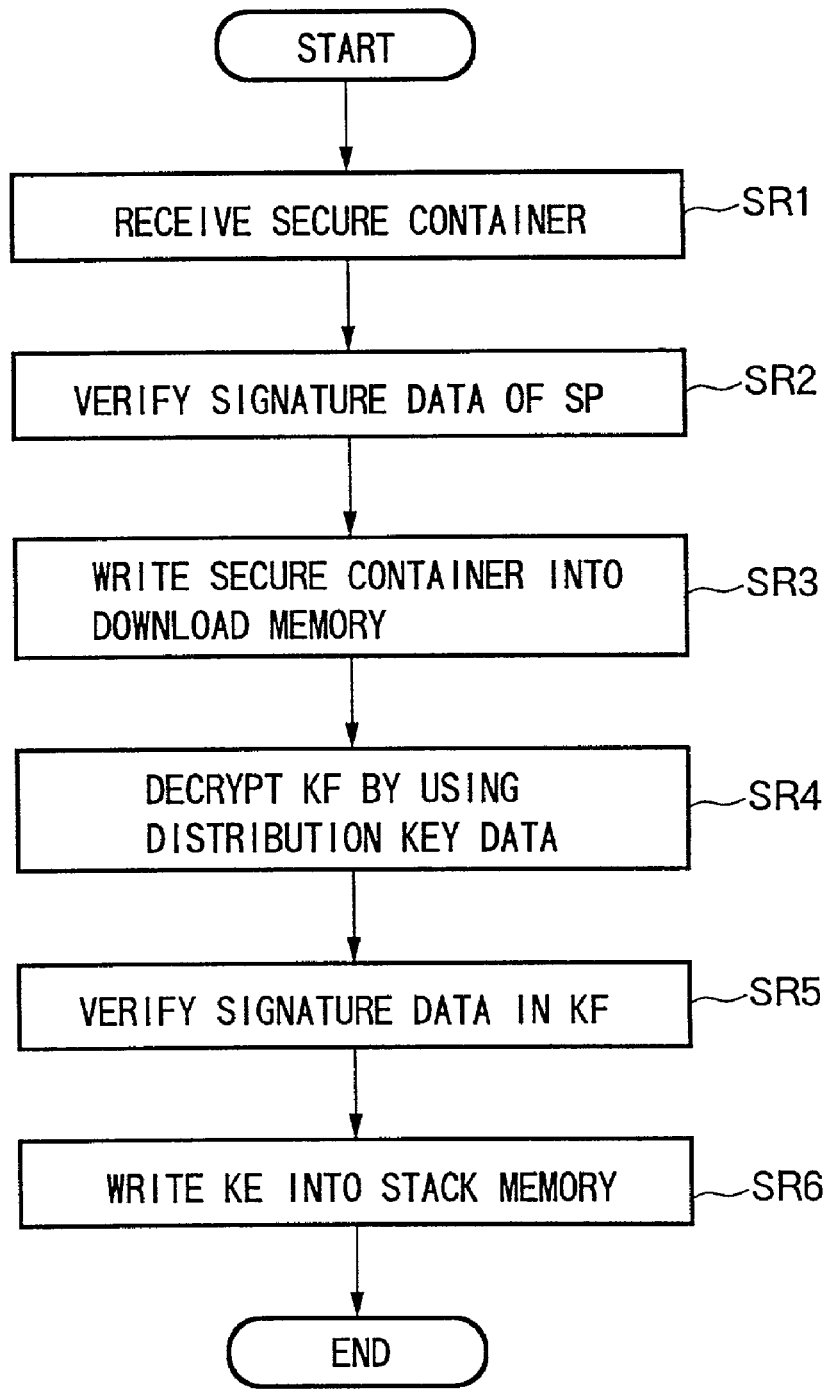
FIG. 68 is a flowchart of processing of the SAM when inputting a secure container from the service provider and decrypting the key file in the secure container in the second embodiment.

FIG. 68 is a flowchart of the related processing.

Step SR1: The mutual authentication is carried out between the mutual authenticator 170 and the mutual authenticator 352 of the service provider 310 shown in FIG. 51.

The encryptor/decryptor 171 decrypts the secure container 304 shown in FIG. 53A to FIG. 53D received from the service provider 310 via the service provider manager 580 by using the session key data $K_{SES}$ obtained by the related mutual authentication.

Step SR2: The signature processor 589 verifies the signature data $SIG_{61,ESC}$ shown in FIG. 53D and then confirms the legitimacy of the signature data $SIG_{62,SP}$, $SIG_{63,SP}$, and $SIG_{64,SP}$ by using the public key data $_{KSP,P}$ of the service provider 310 stored in the public key certificate data $CER_{SP}$ shown in FIG. 53D.

When the legitimacy of the signature data $SIG_{62,SP}$, $SIG_{63,SP}$, and $SIG_{64,SP}$ is confirmed, the service provider manager 580 outputs the secure container 304 to the error corrector 181.

The error corrector 181 corrects the error of the secure container 304 and then outputs the result to the download memory manager 182.

Step SR3: The download memory manager 182 performs the mutual authentication between the mutual authenticator 170 and the media SAM 167a shown in FIG. 63 and then writes the secure container 304 into the download memory 167.

Step SR4: The download memory manager 182 performs the mutual authentication between the mutual authenticator 170 and the media SAM 167a shown in FIG. 63 and then reads the key file KF shown in FIG. 53B stored in the secure container 304 and outputs the same to the secure container decryptor 183.

Then, the secure container decryptor 183 decrypts the key file KF by using the distribution key data $KD_1$ to $KD_3$ of the corresponding period input from the storage unit 192.

Step SR5: The secure container decryptor 183 outputs the signature data $SIG_{1,ESC}$ and $SIG_{2,CP}$ to $SIG_{4,CP}$ stored in the signature certificate module $Mod_1$ shown in FIG. 53B to the signature processor 589.

The signature processor 589 verifies the signature data $SIG_{1,ESC}$ shown in FIG. 53B and then verifies the signature data $SIG_{2,CP}$ to $SIG_{4,CP}$ by using the public key data $K_{CP,P}$ stored in public key certificate data $CER_{CP}$.

Step SR6: The secure container decryptor 183 writes the key file KF into the stack memory 200 when the legitimacy of the signature data $SIG_{2,CP}$ to $SIG_{4,CP}$ is confirmed.

Below, an explanation will be made of the flow of the processing until the purchase mode of the secure container 304 downloaded from the service provider 310 on the download memory 167 is determined by referring to FIG. 67 and FIG. 69.

Figure 69:
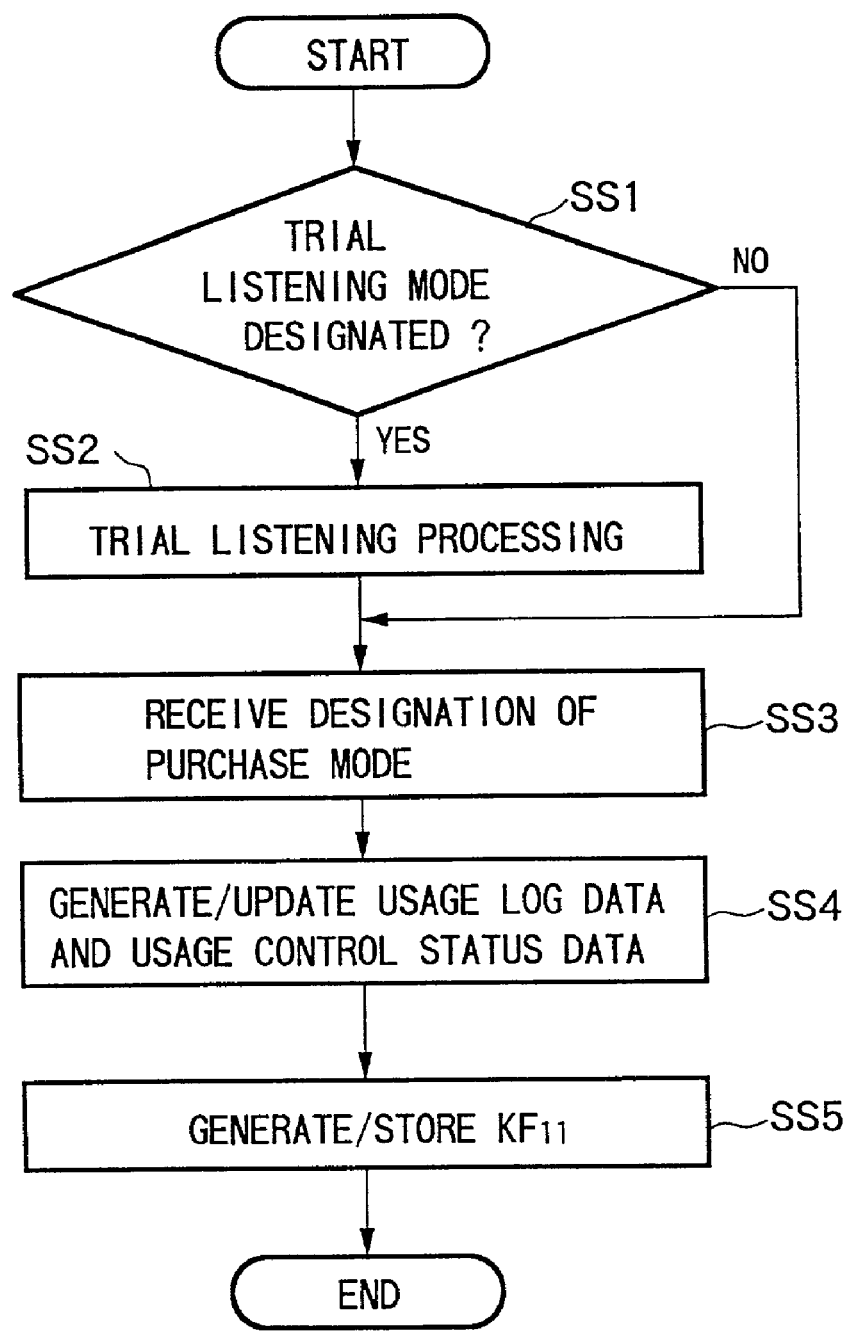
FIG. 69 is a flowchart of processing of the SAM up to the determination of the purchase mode of the secure container downloaded in the download memory from the service provider in the second embodiment.

FIG. 69 is a flowchart of the related processing.

Step SS1: The charge processor 587 decides by the operation of the purchase/usage mode determination controller 165 shown in FIG. 63 by the user whether or not the control signal S165 indicating the trial listening mode was input. Where it decides it was input, it executes the processing of step SS2, while when it decides it was not input, executes the processing of step SS3.

Step SS2: For example, the content file CF stored in the download memory 167 is output to the decryption/decompression module 163 shown in FIG. 63 via the decryption/decompression module manager 184.

At this time, with respect to the content file CF, the mutual authentication between the mutual authenticator 170 and the media SAM 167a, the encryption and/or decryption by the session key data $K_{SES}$, the mutual authentication between the mutual authenticator 170 and the mutual authenticator 220, and the encryption and/or decryption by the session key data $K_{SES}$ are carried out.

The content file CF is decrypted in the decryptor 221 shown in FIG. 63 and then output to the decryptor 222.

Further, the content key data Kc and semi-disclosure parameter data 199 read from the stack memory 200 are output to the decryption/decompression module 163 shown in FIG. 63. At this time, after the mutual authentication between the mutual authenticator 170 and the mutual authenticator 220, the encryption and decryption by the session key data $K_{SES}$ are carried out with respect to the content key data Kc and the semi-disclosure parameter data 199.

Next, the decrypted semi-disclosure parameter data 199 is output to the semi-disclosure processor 225, and the decryption of the content data C using the content key data Kc by the decryptor 222 is carried out by semi-disclosure under the control from the semi-disclosure processor 225.

Next, the content data C decrypted by semi-disclosure is decompressed at the decompression unit 223 and then output to the electronic watermark information processor 224.

Next, he user watermark data 196 is buried in the content data C in the electronic watermark information processor 224, then the content data C is reproduced at the reproduction module 169, and the audio in accordance with the content data C is output.

Step SS3: When the user trying out the content determines the purchase mode by operating the purchase/usage mode determination controller 165, the control signal S165 indicating the related determined purchase mode is output to the charge processor 187.

Step SS4: The charge processor 187 generates the usage log data 308 and the usage control status data 166 in accordance with the determined purchase mode, writes the usage log data 308 into the external memory 201 via the external memory manager 811, and writes the usage control status data 166 into the stack memory 200.

Below, the usage monitor 186 performs control (monitor) so that the purchase and usage of the content are carried out within the range permitted by the usage control status data 166.

Step SS5: The usage control status data 166 is added to the key file KF stored in the stack memory 200, and a new key file $KF_{11}$ shown in FIG. 71 having the determined purchase mode is generated. The key file $KF_{11}$ is stored in the stack memory 200.

Figure 71:
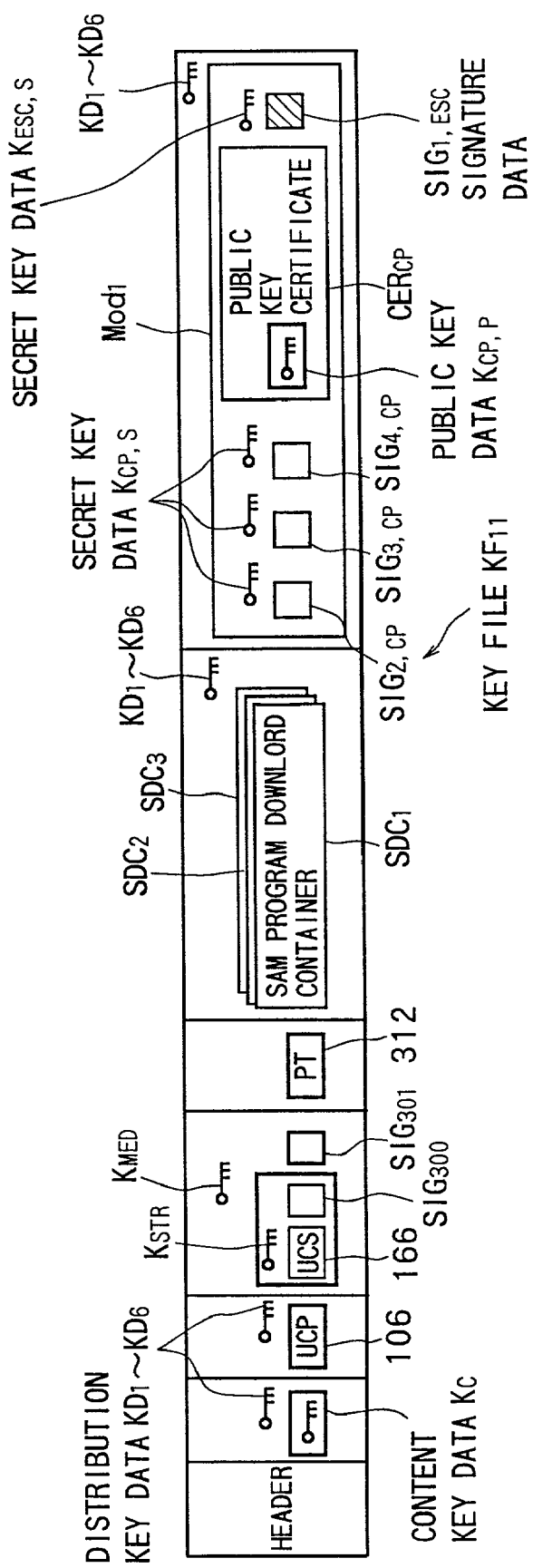
FIG. 71 is a view for explaining the mode of the key file after the purchase mode is determined.

As shown in FIG. 71, the usage control status data 166 stored in the key file KF1 is encrypted by utilizing the CBC mode of the DES by using the session key data $K_{STR}$. Further, the MAC value generated by using the related storage key data $K_{STR}$ as the MAC key data, that is, the $MAC_{300}$, is attached. Further, the module comprised by the usage control status data 166 and the $MAC_{300}$ is been encrypted by utilizing the CBC mode of DES by using the media key data $K_{MED}$. Further, a MAC value generated by using the related media key data $K_{MED}$ as the MAC key data, that is, the $MAC_{301}$, is attached to the related module.

Next, an explanation will be made of the flow of the processing in the case where the content data C having the purchase mode already determined stored in the download memory 167 is reproduced by referring to FIG. 67 and FIG. 70.

Figure 70:
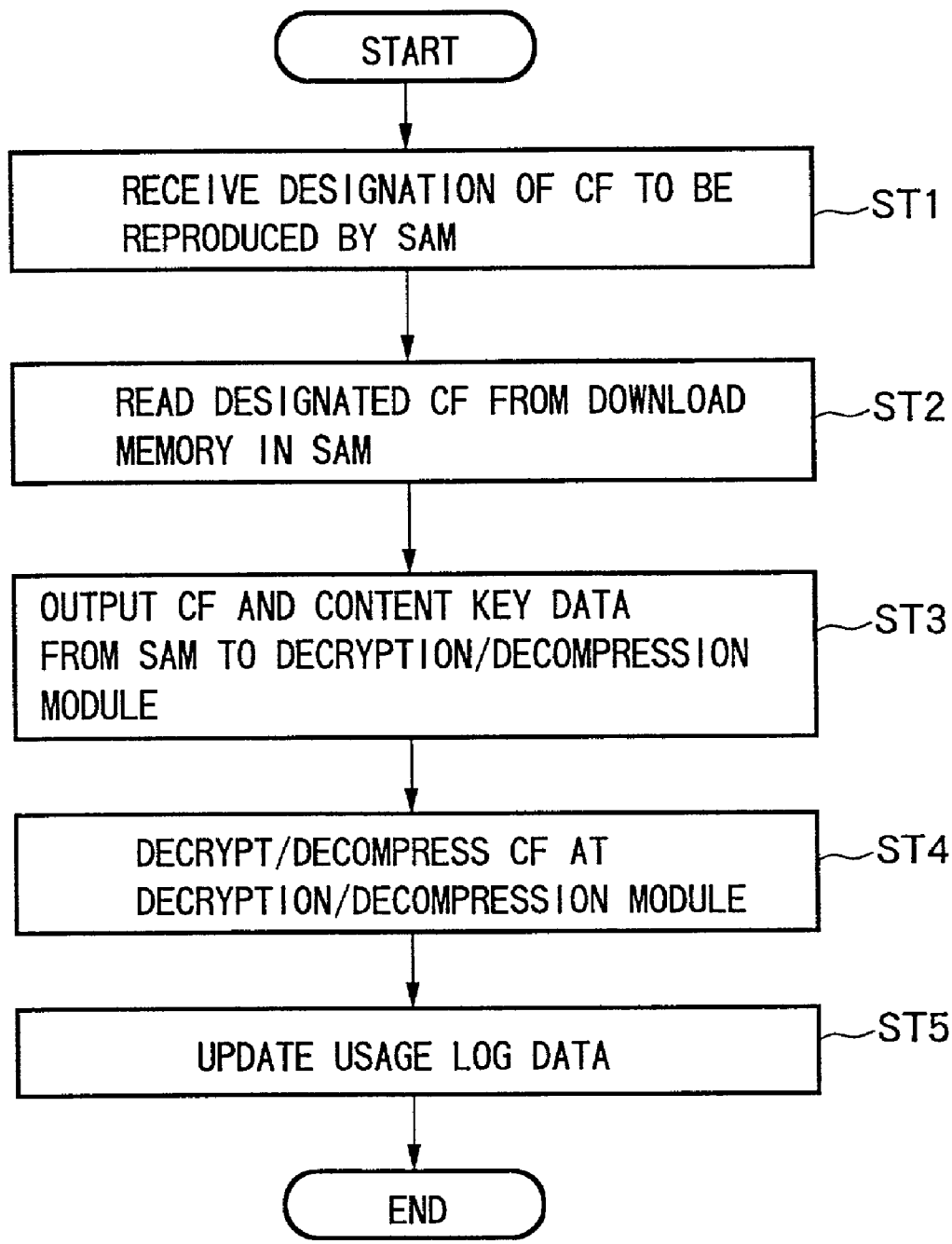
FIG. 70 is a flowchart of processing when reproducing content data having the purchase mode already determined stored in the download memory.

FIG. 70 is a flowchart of the related processing.

Step ST1: For example, in accordance with the operation by the user, the designation of the content to be reproduced is received at the SAM.

Step ST2: Under the monitoring of the usage monitor 186, the content file CF stored in the download memory 167 is read based on the control signal S165.

Step ST3: The related read content file CF is output to the decryption/decompression module 163 shown in FIG. 63.

Further, the content key data Kc read from the stack memory 200 is output to the decryption/decompression module 163.

Step ST4: The decryptor 222 of the decryption/decompression module 163 decrypts the content file CF using the content key data Kc and the decompression processing by the decompression unit 223 and reproduces the content data C at the reproduction module 169.

Step ST5: The charge processor 587 updates the usage log data 308 in accordance with the control signal S165.

The usage log data 308 is transmitted together with the signature data $SIG_{205,SAM1}$ generated by using the secret key data $_{KSAM1,S}$ to the EMD service center 302 via the EMD service center manager 185 at the predetermined timing.

Figure 72:
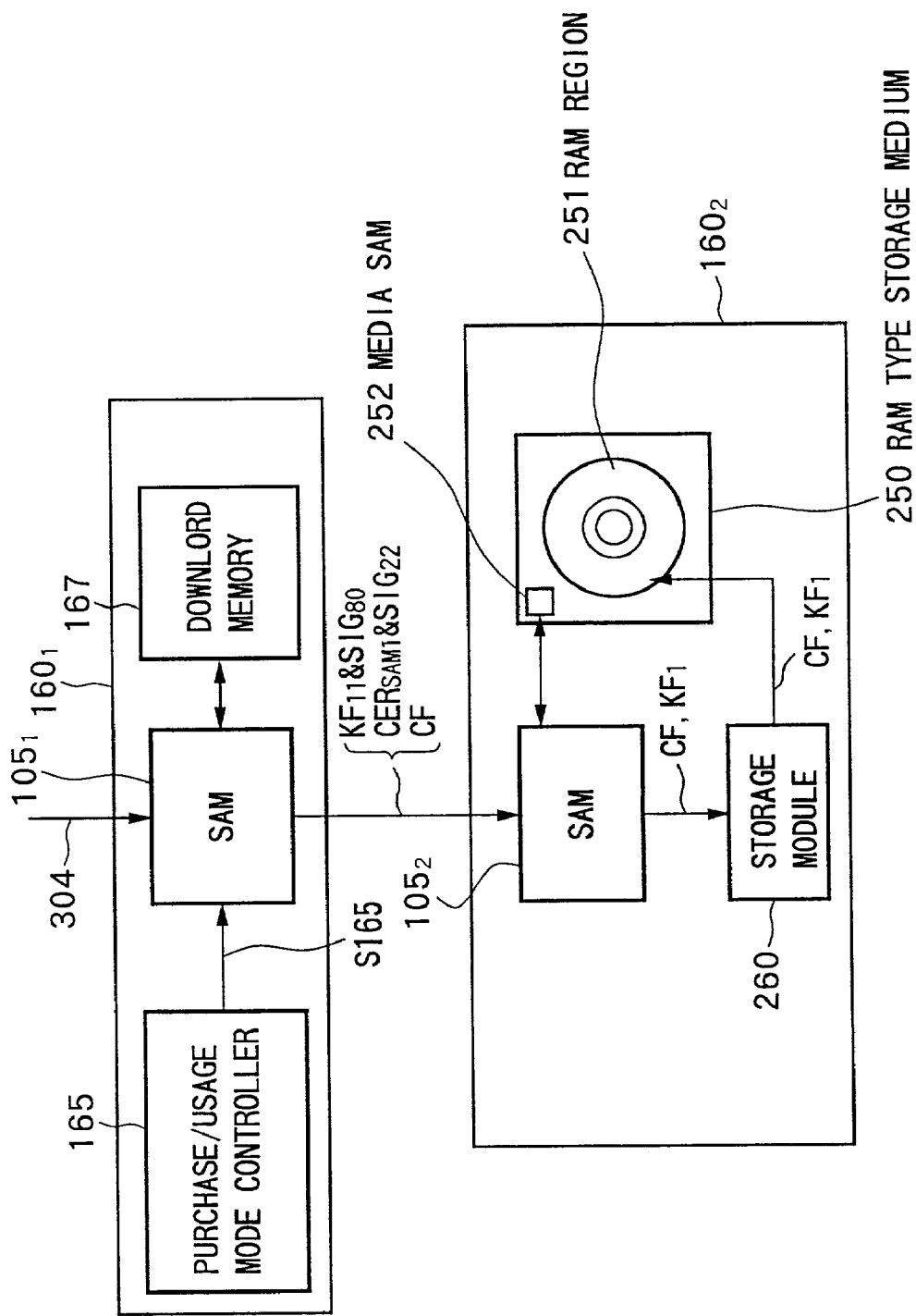
FIG. 72 is a view for explaining the flow of the processing in the SAM of the source of transfer when transferring the content file having the purchase mode already determined downloaded in the download memory of the network apparatus shown in FIG. 63 to the SAM of the AV apparatus.
Figure 73:
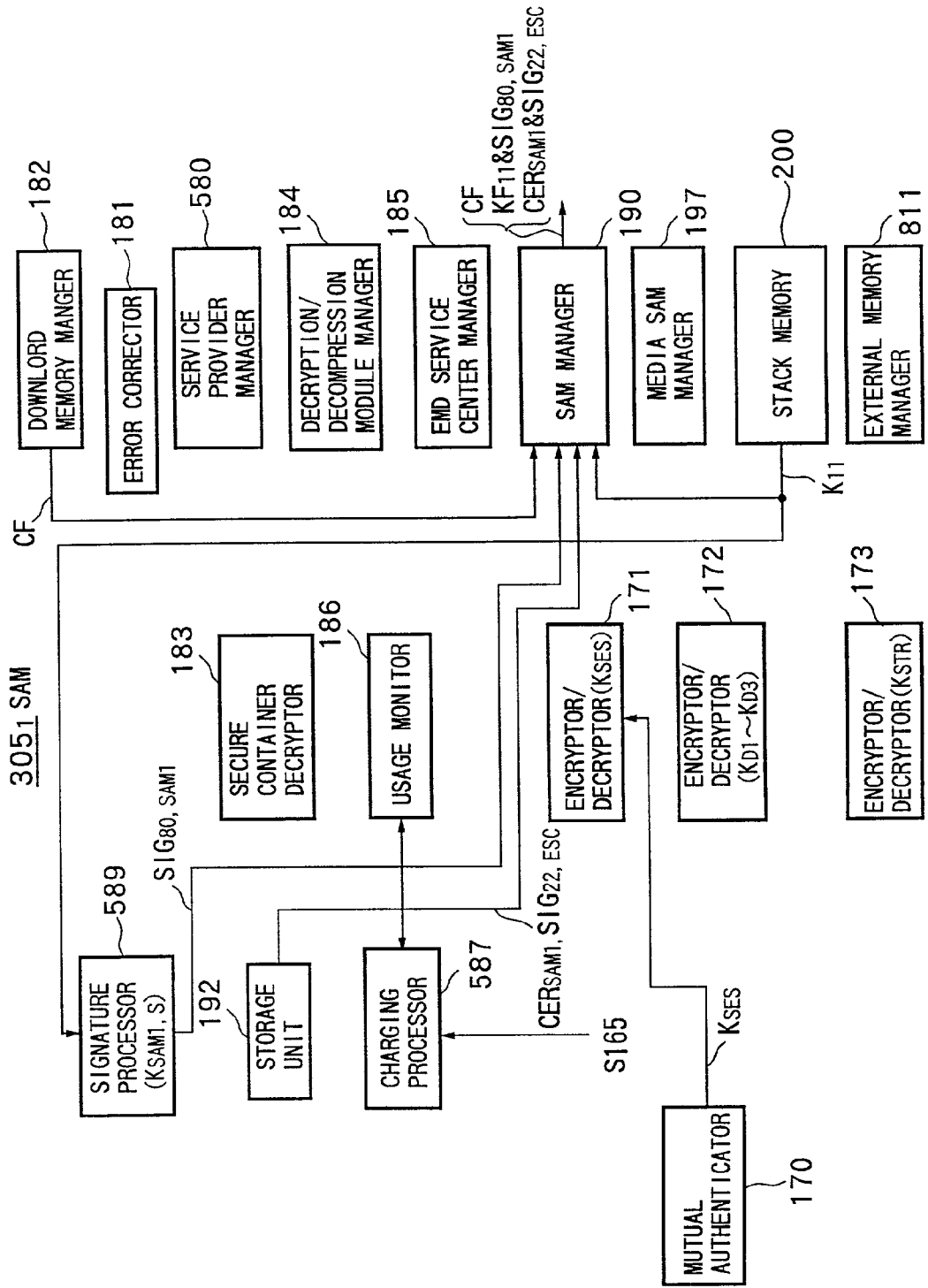
FIG. 73 is a view of the flow of the data in the SAM of the source of transfer in the case shown in FIG. 72.
Figure 74:
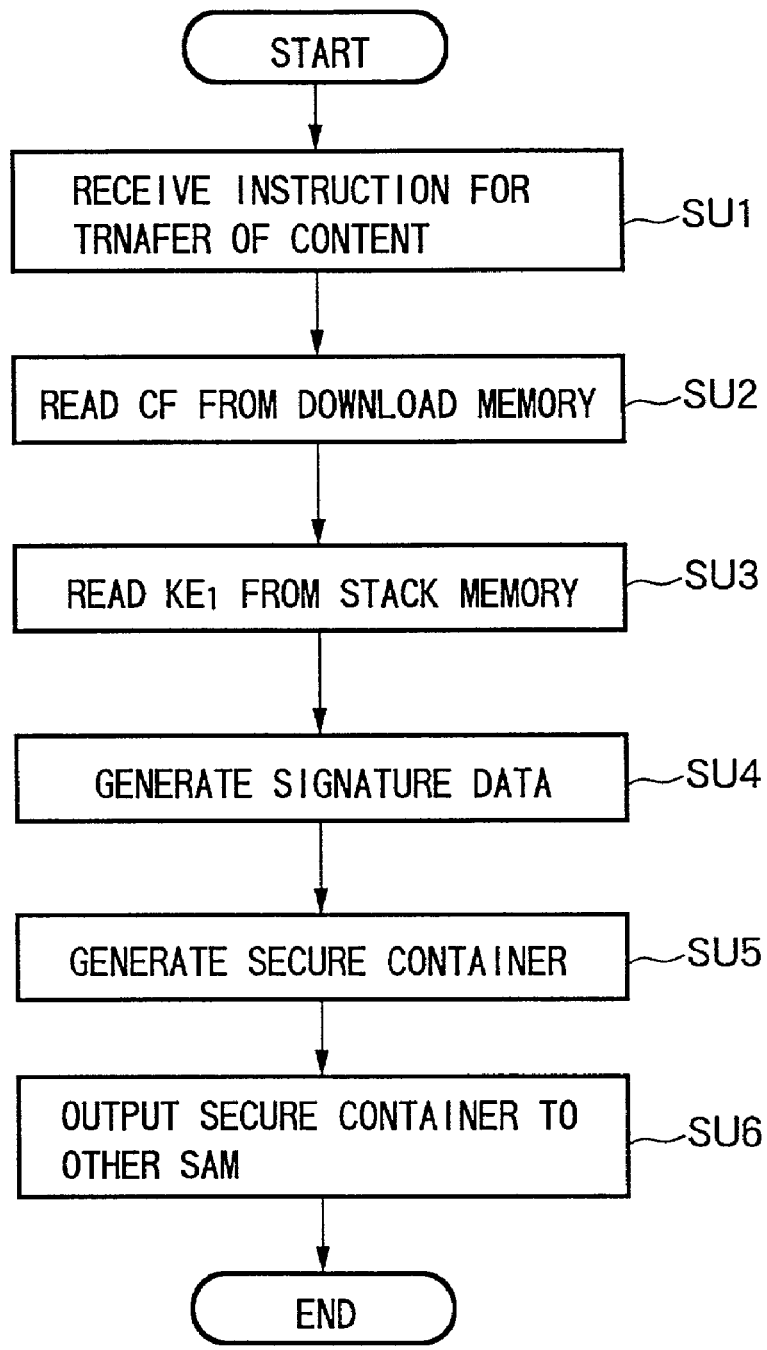
FIG. 74 is a flowchart of processing of the SAM of the source of transfer in a case when transferring for example the content file having the purchase mode already determined downloaded in the download memory of the network apparatus to the SAM of the AV apparatus as shown in FIG. 72.

Below, an explanation will be made of the flow of the processing in the SAM $305_1$ in the case of, as shown in FIG. 72, transferring for example the content file CF having the purchase mode already determined and downloaded in the download memory 167 of the network apparatus 3601 to the SAM $305_2$ of the AV apparatus 3602 via the bus 191 by referring to FIG. 73 and FIG. 74.

Step SU1: The user operates the purchase/usage mode determination controller 165 and indicates to this to transfer the predetermined content stored in the download memory 167 to the AP apparatus $360_2$ and outputs the control signal S165 in response to the related operation to the charge processor 587.

By this, the charge processor 587 updates the usage log data 308 stored in the stack memory 200 based on the control signal S165.

Step SU2: The download memory manager 182 outputs the content file CF shown in FIG. 75A read from the download memory 167 to the SAM manager 190.

Step SU3: The key file $KF_{11}$ having the purchase mode already determined shown in FIG. 75B read from the stack memory 200 is output to the signature processor 589 and the SAM manager 190.

Step SU4: The signature processor 589 generates the signature data $SIG_{80,SAM1}$ of the key file $KF_{11}$ and outputs this to the SAM manager 190.

Step SU5: The SAM manager 190 reads the public key certificate data $CER_{SAM1}$ shown in FIG. 75C and the signature data $SIG_{22,ESC}$ thereof from the storage unit 192.

Further, the mutual authenticator 170 outputs the session key data $K_{SES}$ obtained by performing the mutual authentication with the SAM 305$_2$ to the encryptor/decryptor 171.

Figure 75:
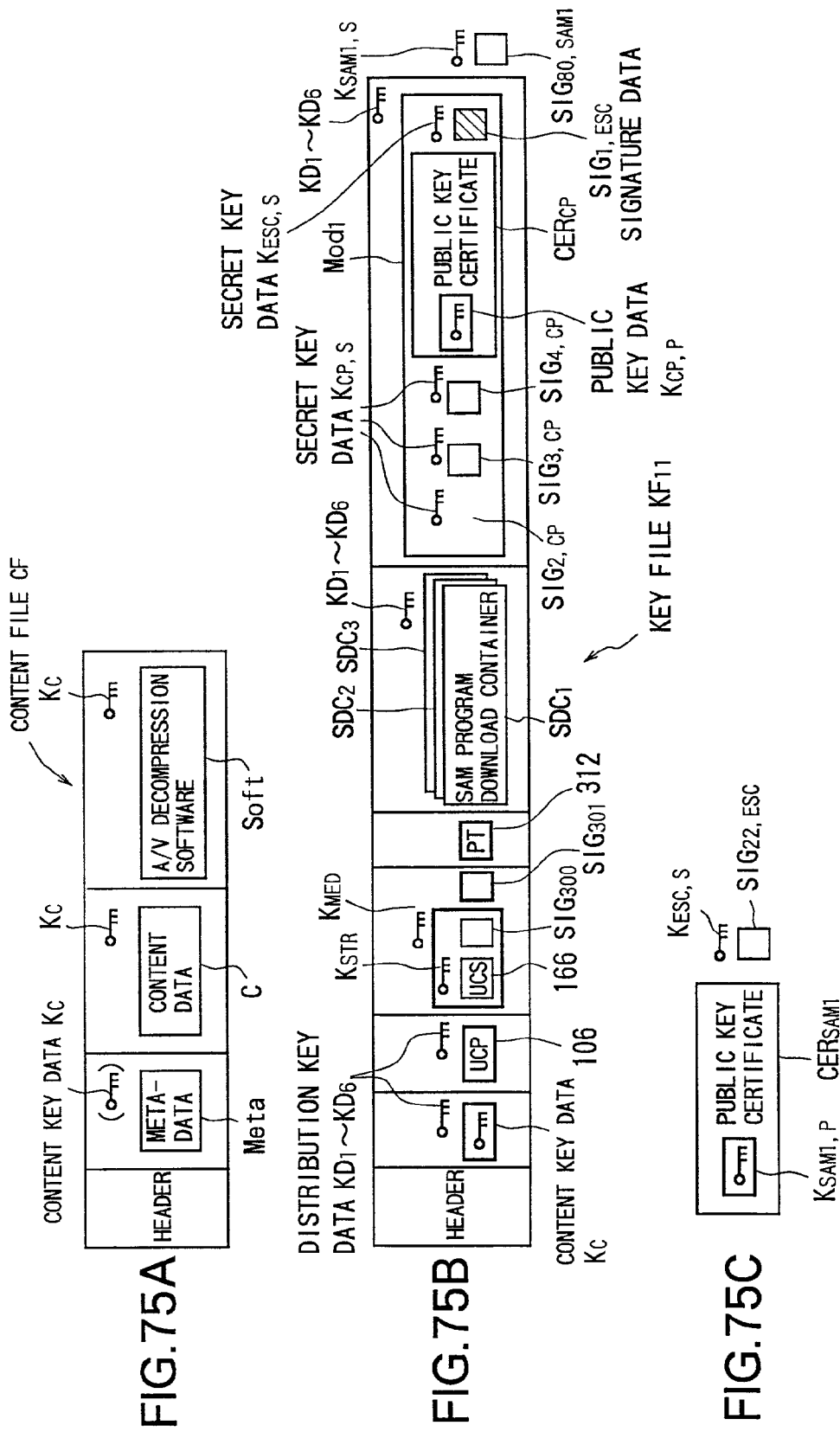
FIG. 75 is a view for explaining the format of the secure container having the purchase mode already determined to be transferred to the SAM of the AV apparatus from the SAM of the network apparatus.

The SAM manager 190 generates the secure container comprised by the data shown in FIGS. 75A, 75B, and 75C.

Step SU6: The encryptor/decryptor 171 encrypts and generates the related secure container by using the session key data $K_{SES}$ and outputs it to the SAM 305$_2$ of the AV apparatus 360$_2$ shown in FIG. 73.

Figure 76:
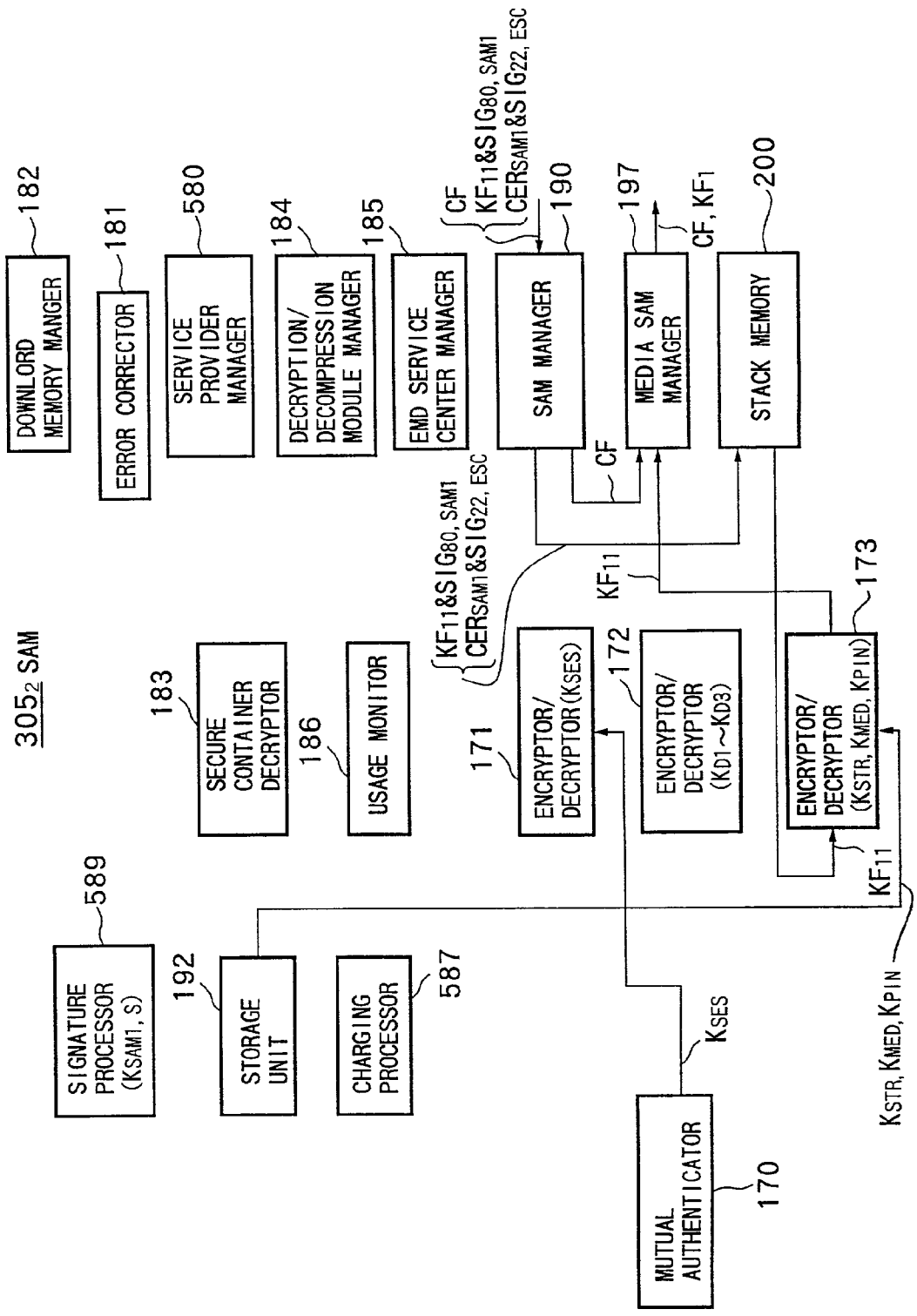
FIG. 76 is a view of the flow of the data in the SAM of the destination of transfer in the case shown in FIG. 72.

Below, an explanation will be made of the flow of the processing in the SAM 305$_2$ when writing the content file CF etc. input from the SAM 305$_1$ into a RAM type storage medium or the like by referring to FIG. 76 and FIG. 77.

Figure 77:
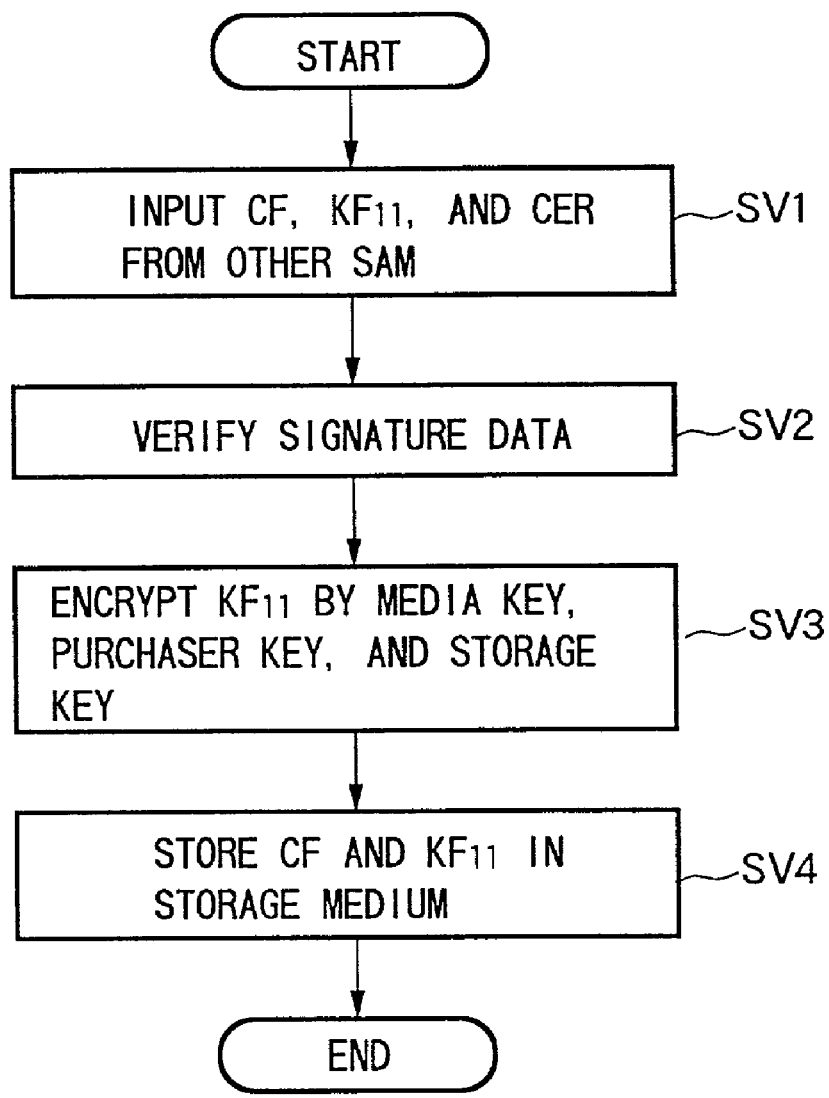
FIG. 77 is a flowchart of the processing of the SAM when writing a content file input from the other SAM etc. into a storage medium of the RAM type etc.

FIG. 77 is a flowchart of the related processing.

Step SV1: The SAM manager 190 of the SAM 305$_2$ receives as its inputs the content file CF shown in FIG. 75A, the key file $KF_{11}$ and the signature data $SIG_{80,SAM1}$ thereof shown in FIG. 75B, and the public key certificate data $CER_{SAM1}$ and the signature data $SIG_{22,ESC}$ thereof shown in FIG. 75C from the SAM 305$_1$ of the network apparatus 360$_1$ as shown in FIG. 76.

Then, the encryptor/decryptor 171 decrypts the content file CF, the key file $KF_{11}$ and the signature data $SIG_{80,SAM1}$ thereof, the public key certificate data $CER_{SAM1}$ and the signature data $SIG_{22}$, ESC thereof received by the SAM manager 190 as inputs by using the session key data $K_{SES}$ obtained by the mutual authentication between the mutual authenticator 170 and the mutual authenticator 170 of the SAM 305$_1$.

Next, the content file CF decrypted by using the session key data $K_{SES}$ is output to the media SAM manager 197.

Further, the key file $KF_{11}$ and the signature data $SIG_{80,SAM1}$ thereof and the public key certificate data $CER_{SAM1}$ and the signature data $SIG_{22,ESC}$ thereof decrypted by using the session key data $K_{SES}$ are written into the stack memory 200.

Step SV2: The signature processor 589 verifies the signature data $SIG_{22,ESC}$ read from the stack memory 200 by using the public key data $K_{ESC,P}$ read from the storage unit 192 and confirms the legitimacy of the public key certificate data $CER_{SAM1}$.

Then, the signature processor 589 confirms the legitimacy of the signature data $SIG_{80,SAM1}$ by using the public key data $K_{SAM1,P}$ stored in the public key certificate data $CER_{SAM1}$ when confirming the legitimacy of the public key certificate data $CER_{SAM1}$.

Step SV3: When the legitimacy of the signature data $SIG_{80,SAM1}$ is confirmed, the key file $KF_{11}$ shown in FIG. 75B is read from the stack memory 200 and output to the encryptor/decryptor 173.

Then, the encryptor/decryptor 173 sequentially encrypts the key file $KF_{11}$ by using the storage key data $K_{STR}$, media key data $K_{MED}$, and the purchaser key data $K_{PIN}$ read from the storage unit 192 and outputs the same to the media SAM manager 197.

Step SV4: The media SAM manager 197 outputs the content file CF input from the SAM manager 190 and the key file $KF_{11}$ input from the encryptor/decryptor 173 to the storage module 260 shown in FIG. 72.

Then, the storage module 260 writes the content file CF and the key file $KF_{11}$ input from the media SAM manager 197 into the RAM region 251 of the RAM type storage media 250 shown in FIG. 72.

Note that, in the processing in the SAM 305$_1$, the flow of the processing in the AV apparatus 360$_2$ when determining the purchase mode of a ROM type storage medium having the not yet determined purchase mode of the content and the flow of the processing when reading the secure container 304 from a ROM type storage medium having the not yet determined purchase mode in the AV apparatus 360$_3$ and transferring this to the AV apparatus 360$_2$ and writing the same into the RAM type storage medium are the same as the case of the SAM 105$_1$ of the first embodiment except the point that the verification of the signature data using the secret key data of the service provider 310 is carried out and the point that the price tag data 312 is stored in the key file having the purchase mode determined.

Next, an explanation will be made of the overall operation of the EMD system 300 shown in FIG. 49.

Figure 78:
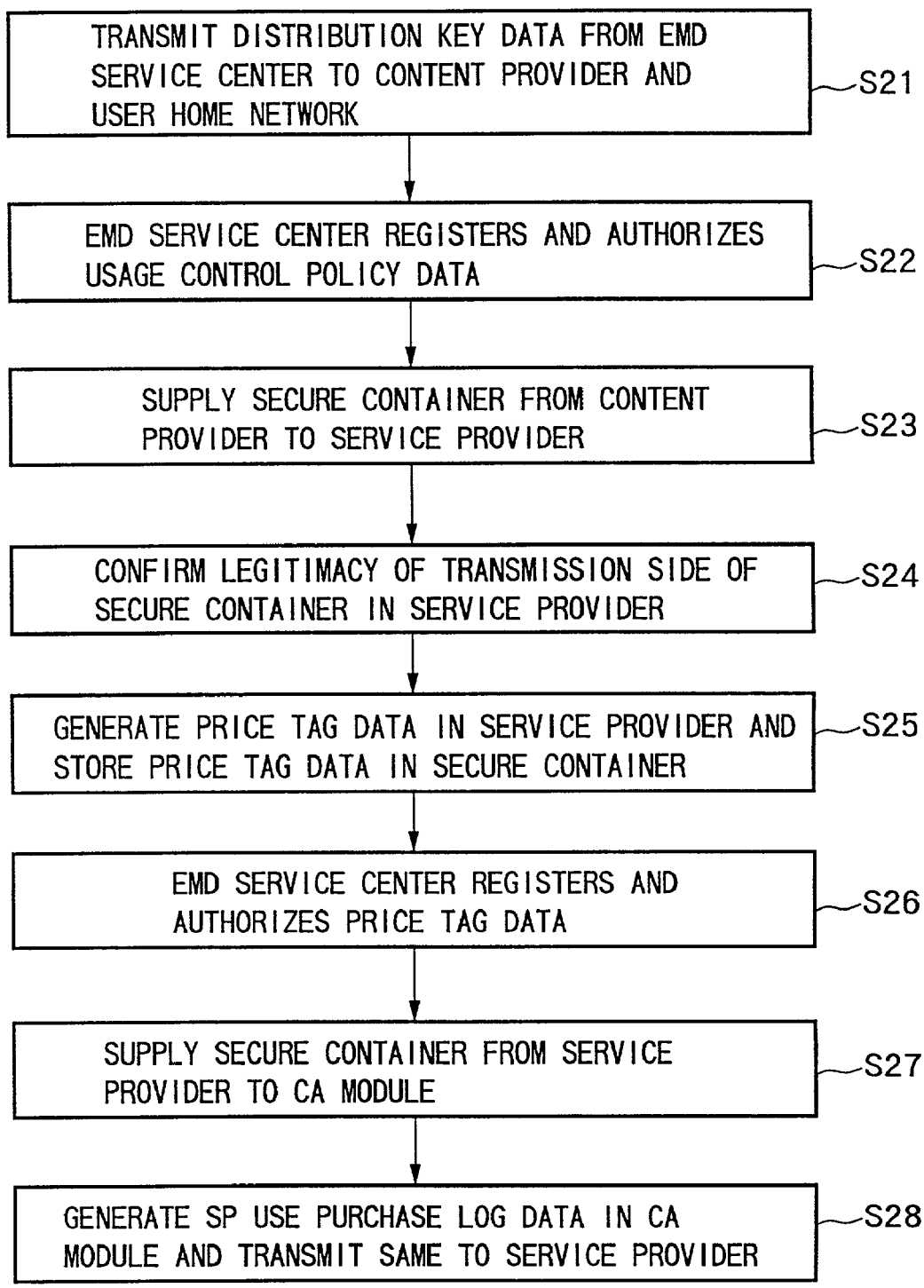
FIG. 78 is a flowchart of the overall operation of the EMD system shown in FIG. 49.
Figure 79:
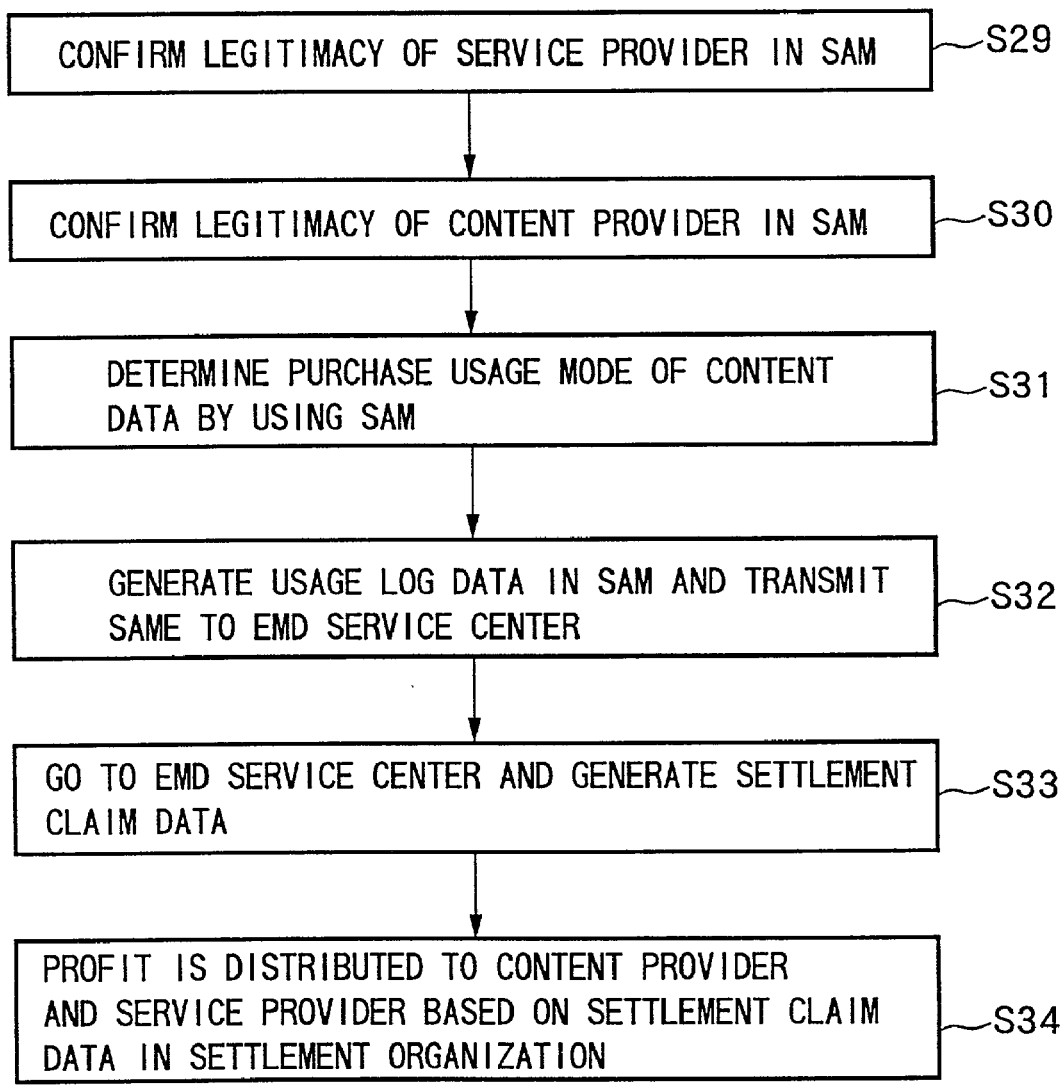
FIG. 79 is a flowchart of the overall operation of the EMD system shown in FIG. 49.

FIG. 78 and FIG. 79 are flowcharts of the overall operation of the EMD system 300.

Here, an explanation will be made by illustrating the case where the secure container 304 is transmitted from the service provider 310 to the user home network 303 on-line.

Note that, as the prerequisite of the following processing, it is assumed that the content provider 301, service provider 310, and SAMs 305$_1$ to 305$_4$ have already been registered at the EMD service center 302.

Step S21: The EMD service center 302 transmits the certificate $CER_{CP}$ of the public key data $K_{CP,P}$ of the content provider 301 together with its own signature data $SIG_{1,ESC}$ to the content provider 301.

Further, the EMD service center 302 transmits the certificate $CER_{SP}$ of the public key data $K_{SP,P}$ of the content provider 301 together with its own signature data $SIG_{61,ESC}$ to the service provider 310.

Further, the EMD service center 302 transmits six months' worth of the distribution key data $KD_1$ to $KD_6$ each having a term of validity of one month to the content provider 301 and transmits three months' worth of the distribution key data $KD_1$ to $KD_3$ to the SAMs 305$_1$ to 305$_4$ of the user home network 303.

Step S22: The content provider 301 transmits the right registration request module $Mod_2$ shown in FIG. 7A to the EMD service center 302.

Then, the EMD service center 302 registers and authorizes (certifies) the usage control policy data 106 and content key data Kc after the predetermined signature verification.

Step S23: The content provider 301 supplies the secure container 104 storing the data shown in FIG. 4A, FIG. 4B, and FIG. 4C to the service provider 310 after the processing for preparation of the signature data and the encryption processing using the distribution key data $KD_1$ to $KD_3$ of the corresponding period etc.

Step S24: The service provider 310 verifies the signature data $SIG_{1,ESC}$ shown in FIG. 4C and then verifies the signature data $SIG_{8,CP}$ and $SIG_{7,CP}$ shown in FIGS. 4A and 4B by using the public key data $K_{CP,P}$ stored in the public key certificate data $CER_{CP}$ to confirm if the secure container 104 was transmitted from a legitimate content provider 301.

Step S25: The service provider 310 generates the price tag data 312 and generates the secure container 304 shown in FIG. 53 storing the price tag data 312.

Step S26: The service provider 310 transmits the price tag registration request module $Mod_{102}$ shown in FIG. 55 to the EMD service center 302.

Then, the EMD service center 302 registers and authorizes the price tag data 312 after the predetermined signature verification.

Step S27: The service provider 310 transmits the secure container 304 generated at step S25 on-line or off-line to the decryption module 905 of the network apparatus 360, shown in FIG. 63 in response to the request from for example the CA module 311 of the user home network 303.

Step S28: The CA module 311 generates the SP use purchase log data 309 and transmits this to the service provider 310 at the predetermined timing.

Step S29: Each of the SAMs $305_1$ to $305_4$, after verifying the signature data $SIG_{61,ESC}$ shown in FIG. 53D, verifies the signature data $SIG_{62,SP}$, $SIG_{63,SP}$, and $SIG_{64,SP}$ shown in FIGS. 53A, 53B, and 53C by using the public key data $K_{SP,P}$ stored in the public key certificate data $CER_{SP}$ to confirm if the secure container 304 is transmitted from a legitimate service provider 310.

Step S30: Each of the SAMs $305_1$ to $305_4$ decrypts the key file KF shown in FIG. 53B by using the distribution key data $KD_1$ to $KD_3$. Then, each of the SAMs $305_1$ to $305_4$, after verifying the signature data $SIG_{1,ESC}$ shown in FIG. 53B, verifies the signature data $SIG_2$, $SIG_{3,CP}$, and $SIG_{4,CP}$ shown in FIG. 53B by using the public key data $K_{CP,P}$ stored in the public key certificate data $CER_{CP}$ to confirm if the content data C, content key data Kc, and usage control policy data 106 were generated by a legitimate content provider 301.

Step S31: The user operates the purchase/usage mode determination controller 165 of FIG. 63 to determine the purchase and/or usage mode of the content.

Step S32: Based on the control signal S165 generated at step S31, the SAMs $305_1$ to $305_4$ generate the usage log data 308 of the secure container 304.

The usage log data 308 and the signature data $SIG_{205,SAM1}$ thereof are transmitted from the SAMs $305_1$ to $305_4$ to the EMD service center 302.

The EMD service center 302 determines (calculates) the charge content for each of the content provider 301 and the service provider 310 based on the usage log data 308 and generates the settlement claim data 152c and 152s based on the result thereof.

The EMD service center 302 transmits the settlement claim data 152c and 152s together with its own signature data to the settlement organization 91 via the payment gateway 90. By this, the money paid by the user of the user home network 303 to the settlement organization 91 is distributed to the owners of the content provider 301 and the service provider 310.

As explained above, the EMD system 300 distributes the secure container 104 of the format shown in FIG. 4 from the content provider 301 to the service provider 310 and distributes the secure container 304 storing the content file CF and key file KF in the secure container 104 as they are from the service provider 310 to the user home network 303 and performs the processing for the key file KF in the SAMs $305_1$ to $305_4$.

Also, the content key data Kc and usage control policy data 106 stored in the key file KF are encrypted by using the distribution key data $KD_1$ to $KD_3$ and decrypted in only the SAMs $305_1$ to $305_4$ holding the distribution key data $KD_1$ to $KD_3$. The SAMs $305_1$ to $305_4$ are modules having tamper resistance. The purchase mode and the usage mode of the content data C are determined based on the handling content of the content data C described in the usage control policy data 106.

Accordingly, according to the EMD system 300, the purchase and usage of the content data C in the user home network 303 can be reliably performed based on the content of the usage control policy data 106 generated by the related parties of the content provider 101 regardless of the processing in the service provider 310. Namely, according to the EMD system 300, it is possible to prevent the usage control policy data 106 from not being able to be managed by the service provider 310.

For this reason, according to the EMD system 300, even in a case where the content data C is distributed to the user home network 303 via a plurality of service providers 310 of different series, the right clearing for the related content data C in the user home network 303 can be performed based on the common usage control policy data 106 generated by the content provider 301.

Further, the EMD system 300 enables common right clearing of the content data C in the SAMs $305_1$ to $305_4$ both on-line and off-line by distributing the content data C from the content provider 301 to the user home network 103 by using the secure container 304 in both cases.

Further, the EMD system 300 enables use of common right clearing rules when purchasing, using, storing, and transferring the content data C in the network apparatus 360, and the AV apparatuses $360_2$ to $360_4$ in the user home network 303 by performing processing always based on the usage control policy data 106.

Further, according to the EMD system 300, since the EMD service center 302 has an authentication function, key data management function, and right clearing (profit distribution) function, the money paid by the user accompanied with the usage of the content is reliably distributed to the owners of the content provider 301 and the EMD service center 302 according to the ratio determined in advance.

Further, according to the EMD system 300, the usage control policy data 106 for the same content file CF supplied by the same content provider 301 is supplied as it is to the SAMs $305_1$ to $305_4$ regardless of the service mode of the service provider 310. Accordingly, the SAMs $305_1$ to $305_4$ can use the content file according to the intention of the content provider 301 based on the usage control policy data 106.

Namely, according to the EMD system 300, when the service using the content and the user use the content, the rights and profit of the owner of the content provider 301 can be reliably protected by technical means without depending on an inspection organization 725 as in the conventional case.

FIRST MODIFICATION OF SECOND EMBODIMENT

Figure 80:
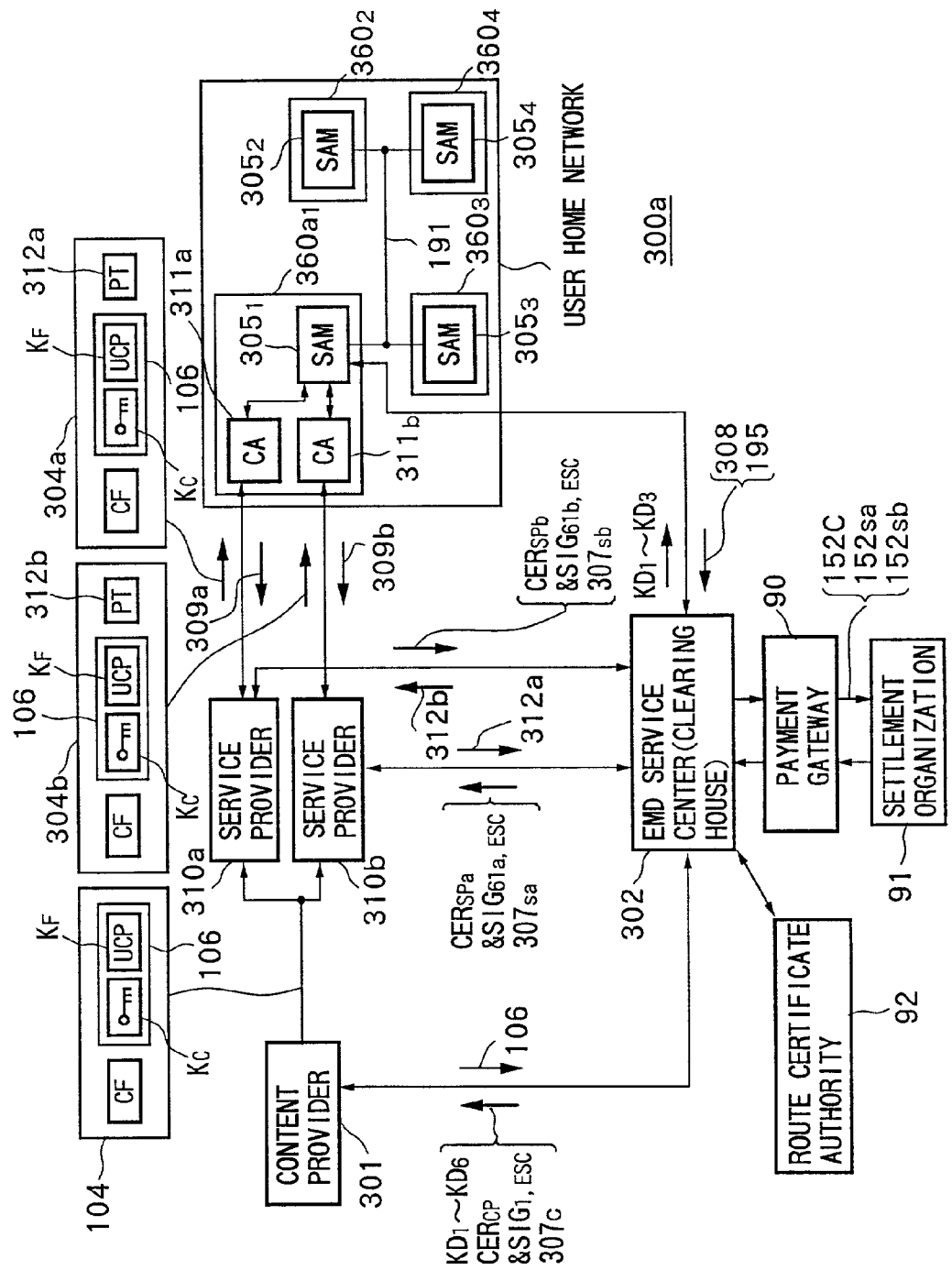
FIG. 80 is a view of the configuration of an EMD system using two service providers according to a first modification of the second embodiment of the present invention.

FIG. 80 is a view of the configuration of an EMD system 300a using two service providers according to a first modification of the second embodiment.

In FIG. 80, components given the same references as those of FIG. 49 are the same as the components having the same references explained in the second embodiment.

As shown in FIG. 80, the EMD system 300a supplies the same secure container 104 from the content provider 301 to the service providers 310a and 310b.

The service provider 310a provides the service of providing for example a drama program as content. This service generates a secure container 304a storing the content data C related to the related drama program and price tag data 312a uniquely generated for the related content data C and distributes this to the network apparatus $360_1$.

Further, the service provider 310b provides for example a karaoke service. This service generates a secure container 304b storing the content data C related to the related karaoke service and price tag data 312b uniquely generated for the related content data C and distributes this to the network apparatus 3601.

Figure 53:
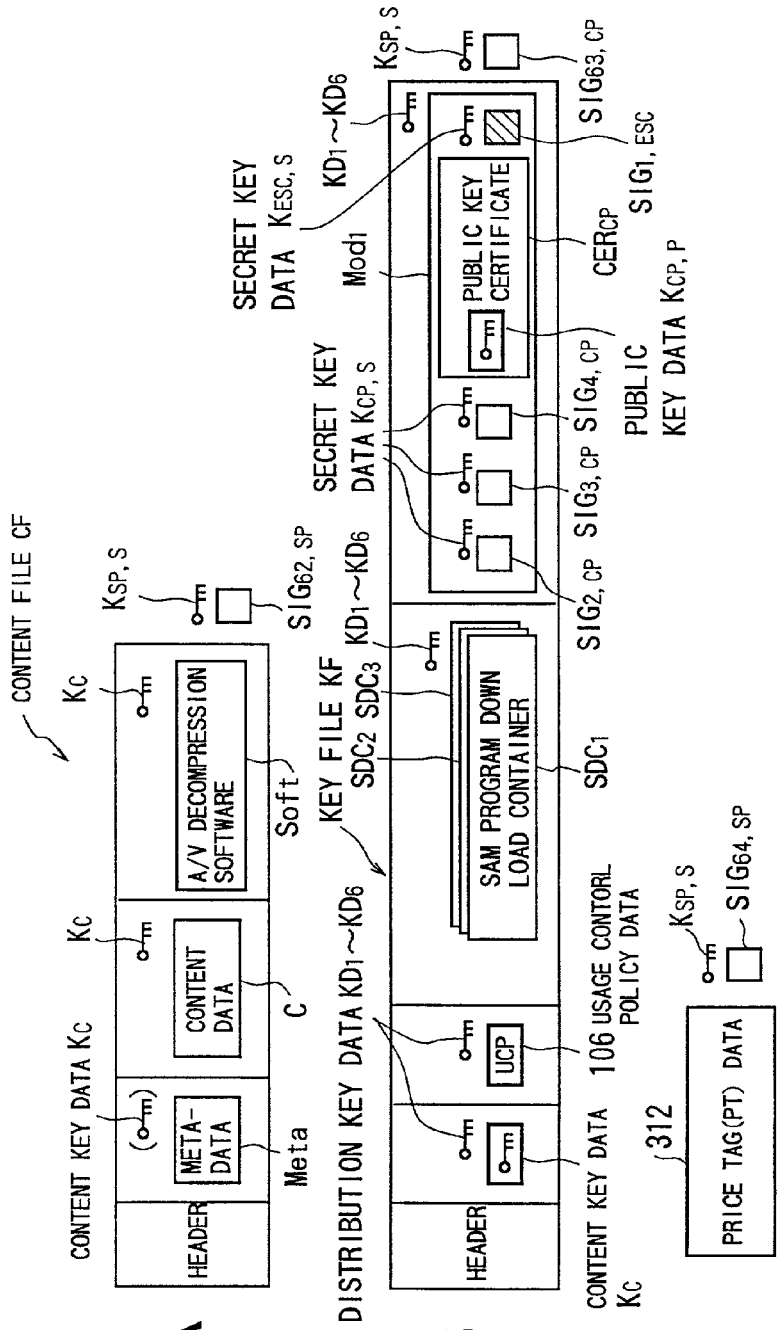
FIG. 53 is a view for explaining the mode of the secure container transmitted from the service provider shown in FIG. 49 to the user home network.

Here, the formats of the secure containers 304a and 304b are the same as that of the secure container 304 explained by using FIG. 53.

A network apparatus $360a_1$ is provided with CA modules 311a and 311b corresponding to the service providers 310a and 310b.

The CA modules 311a and 311b receive the distribution of the secure containers 304a and 304b from the service providers 310a and 310b in response to their own requests.

Next, the CA modules 311a and 311b generate SP use purchase log data 309a and 309b in accordance with the distributed secure containers 304a and 304b and transmit them to the service providers 310a and 310b.

Further, the CA modules 311a and 311b decrypt the secure containers 304a and 304b by the session key data $K_{SES}$ and then output the same to the SAMs $305_1$ to $305_4$.

Next, the SAMs $305_1$ to $305_4$ decrypt the key files KF in the secure containers 304a and 304b by using the common distribution key data $KD_1$ to $KD_3$, perform the processing concerning the purchase and/or usage of the content in accordance with the operation from the user based on the common usage control policy data 106, and generate the usage log data 308 in accordance with that Then, the usage log data 308 is transmitted from the SAMs $305_1$ to $305_4$ to the EMD service center 302.

The EMD service center 302, based on the usage log data 308, determines (calculates) the charge content for each of the content provider 301 and the service providers 310a and 310b and generates the settlement claim data 152c, 152sa, and 152sb corresponding to them based on the results thereof.

The EMD service center 302 transmits the settlement claim data 152c, 152sa, and 152sb to the settlement organization 91 via the payment gateway 90. By this, the money paid by the user of the user home network 303 to the settlement organization 91 is distributed to the owners of the content provider 301 and the service providers 310a and 310b.

As mentioned above, according to the EMD system 300b, when supplying the same content file CF to the service providers 310a and 310b, the usage control policy data 106 for the related content file CF is encrypted by the distribution key data $KD_1$ to $KD_6$ and supplied to the service providers 310a and 310b, and the service providers 310a and 310b distribute the secure containers 304a and 304b storing the encrypted usage control policy data 106 as it is to the user home network. For this reason, the SAMs $305_1$ to $305_4$ in the user home network can perform right clearing based on the common usage control policy data 106 no matter from which of the service providers 310a or 310b the content file CF is distributed.

Note that, in the first modification, the case where two service providers were used was illustrated, but in the present invention, any number of the service provider may be used.

SECOND MODIFICATION OF SECOND EMBODIMENT

Figure 81:
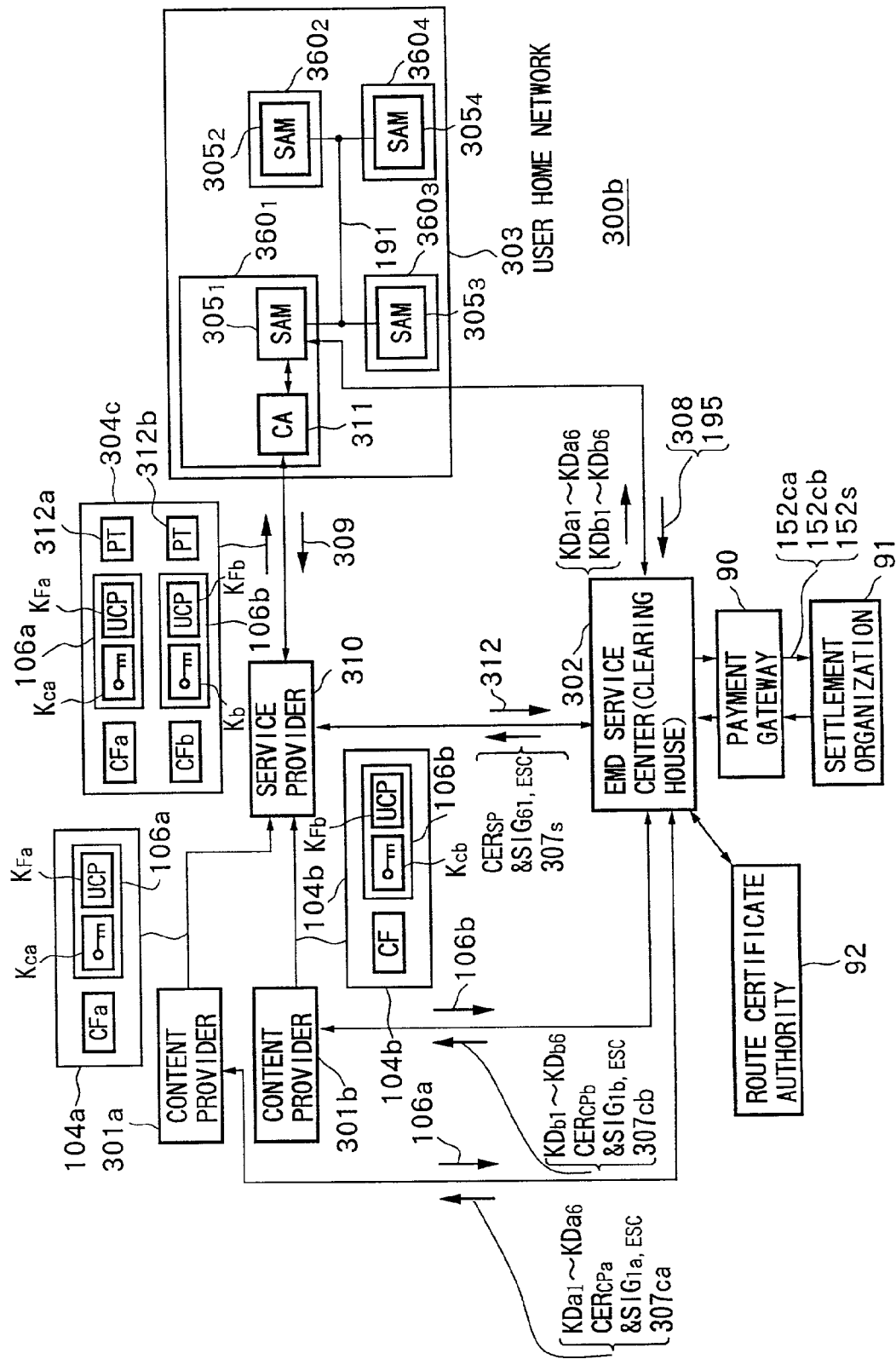
FIG. 81 is a view of the configuration of an EMD system using a plurality of content providers according to a second modification of the second embodiment of the present invention.

FIG. 81 is a view of the configuration of an EMD system 300b using a plurality of content providers according to a second modification of the second embodiment.

In FIG. 81, components given the same references as those of FIG. 49 are the same as the components having the same references explained in the second embodiment.

As shown in FIG. 81, the EMD system 300b supplies the secure containers 104a and 104b from content providers 301a and 301b to the service provider 310.

The service provider 310 provides the service by using the content supplied by for example the content providers 301a and 301b, generates the price tag data 312a for the secure container 104a and the price tag data 312b for the secure container 104b, and generates a secure container 304c storing them.

As shown in FIG. 81, the secure container 304c stores the content data CFa, CFb, key files KFa and KFb, price tag data 312a and 312b, and signature data based on the secret key data $K_{CP,S}$ of the service provider 310 for each of them.

The secure container 304c is received at the CA module 311 of the network apparatus 3601 of the user home network 303 and then processed at the SAMs $305_1$ to $305_4$.

The SAMs $305_1$ to $305_4$ decrypt the key file KFa by using the distribution key data $KDa_1$ to $KDa_3$, perform the processing concerning the purchase and/or usage in accordance with the operation from the user for the content file CFa based on the usage control policy data 106a, and describe the log thereof in the usage log data 308.

Further, the SAMs $305_1$ to $305_4$ decrypt the key file KFb by using distribution key data $KDb_1$ to $KDb_3$, perform the processing concerning the purchase and/or usage in accordance with the operation from the user for the content file CFb based on the usage control policy data 106b, and describe the log thereof in the usage log data 308.

Then, the usage log data 308 is transmitted from the SAMs $305_1$ to $305_4$ to the EMD service center 302.

The EMD service center 302 determines (calculates) the charge content for each of the content providers 301a and 301b and the service provider 310 based on the usage log data 308 and generates settlement claim data 152ca, 152cb, and 152s corresponding to them based on the results thereof.

The EMD service center 302 transmits the settlement claim data 152ca, 152cb, and 152s via the payment gateway 90 to the settlement organization 91 and distributes the money paid by the user of the user home network 303 to the settlement organization 91 to the owners of the content providers 301a and 301b and the service provider 310 by this.

As mentioned above, according to the EMD system 300b, as the usage control policy data 106a and 106b of the content files CFa and CFb stored in the secure container 304, those generated by the content providers 301a and 301b are used as they are, therefore, the SAMs $305_1$ to $305_4$ reliably carry out the right clearing for the content files CFa and CFb based on the usage control policy data 106a and 106b according to the intention of the content providers 301a and 301b.

Note that, in the second modification shown in FIG. 81, the case where two content providers were used was illustrated, but any number of the content providers may be used.

Further, there may be a plurality of both of the content providers and service providers.

THIRD MODIFICATION OF SECOND EMBODIMENT

Figure 82:
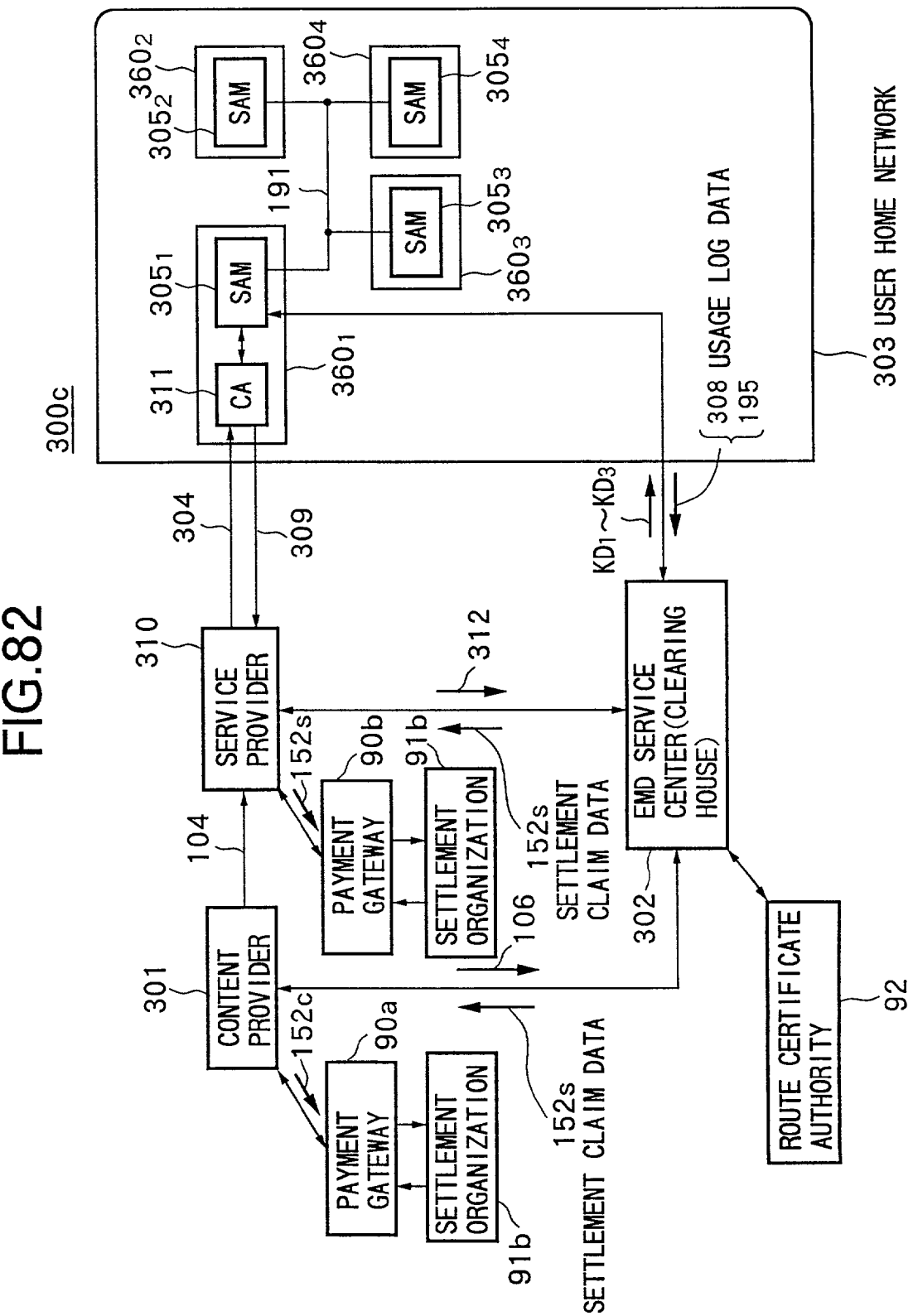
FIG. 82 is a view of the configuration of an EMD system according to a third modification of the second embodiment of the present invention.

FIG. 82 is a view of the configuration of the EMD system according to a third modification of the second embodiment.

In the second embodiment, the case where the EMD service center 302 performed the settlement of the content provider 301 and the service provider 310 with respect to the settlement organization 91 was illustrated, but in the present invention, for example, as shown in FIG. 82, it is also possible that the settlement claim data 152c for the content provider 301 and the settlement claim data 152s for the service provider 310 be generated based on the usage log data 308 in the EMD service center 302 and that they be transmitted to the content provider 301 and the service provider 310.

In this case, the content provider 301 performs the settlement at a settlement organization 91a via a payment gateway 90a by using the settlement claim data 152c. Further, the service provider 310 performs the settlement at a settlement organization 91b via a payment gateway 90b by using the settlement claim data 152s.

FOURTH MODIFICATION OF SECOND EMBODIMENT

Figure 83:
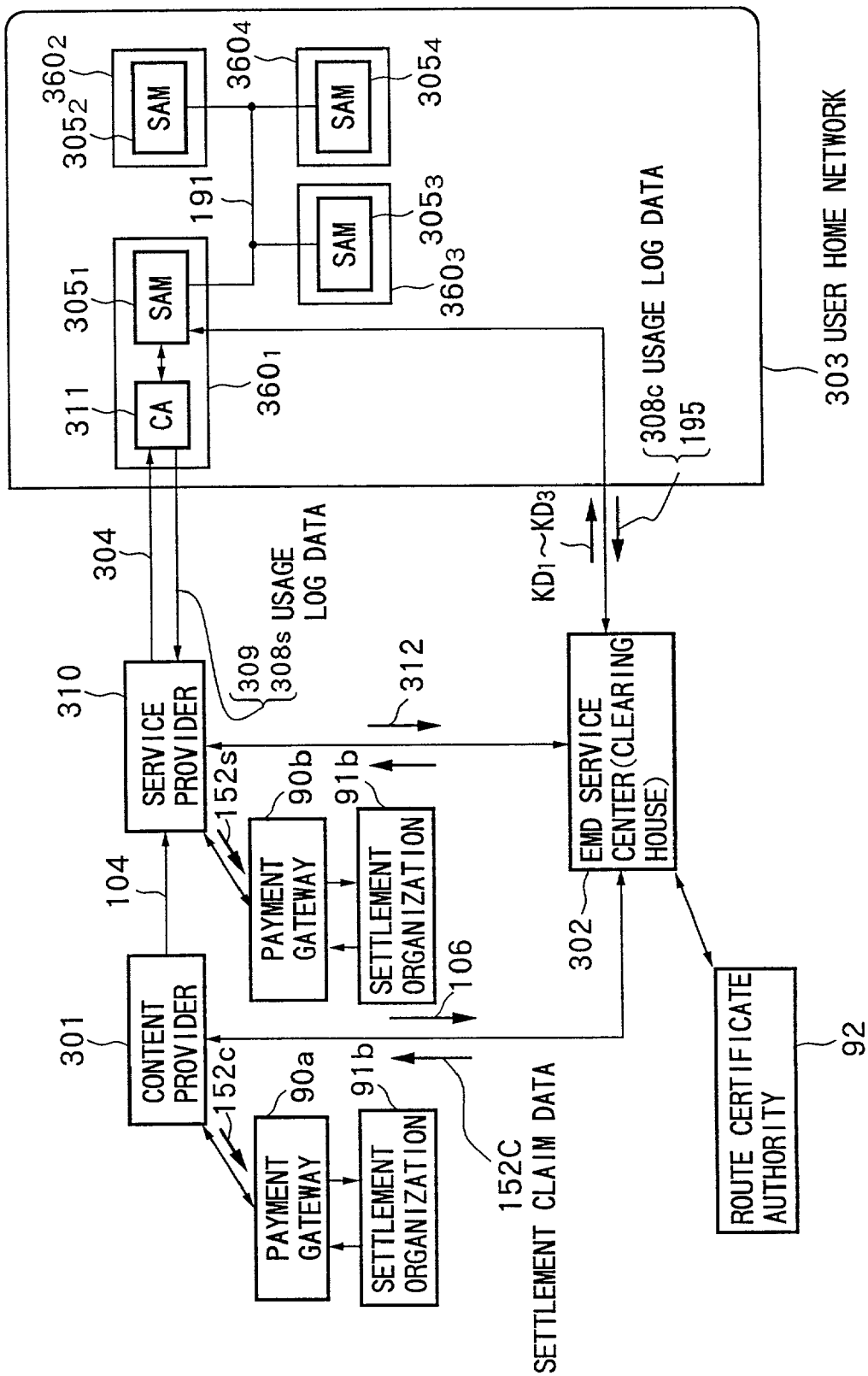
FIG. 83 is a view of the configuration of an EMD system according to a fourth modification of the second embodiment of the present invention.

FIG. 83 is a view of the configuration of the EMD system according to a fourth modification of the second embodiment.

In the second embodiment, the case where the service provider 310 did not have a charging function as in for example the current Internet was illustrated, but where the service provider 310 has a charging function as in the current digital broadcasting, the CA module 311 generates a usage log data 308s with respect to the service of the service provider 310 concerning the secure container 304 and transmits it to the service provider 310.

Then, the service provider 310 performs the charge processing based on the usage log data 308s to generate the settlement claim data 152s and performs the settlement at the settlement organization 91b via the payment gateway 90b by using this.

On the other hand, the SAMs $305_1$ to $305_4$ generate usage log data 308c with respect to the right clearing of the content provider 301 concerning the secure container 304 and transmit them to the EMD service center 302.

The EMD service center 302 generates the settlement claim data 152c based on the usage log data 308c and transmits this to the content provider 301.

The content provider 301 performs the settlement at the settlement organization 91a via the payment gateway 90a by using the settlement claim data 152c.

FIFTH MODIFICATION OF SECOND EMBODIMENT

In the embodiment, as shown in FIG. 49, the case where the user preference filter data 903 was generated based on the usage log data 308 received from the SAM $305_1$ etc. in the user preference filter creator 901 of the EMD service center 302 was illustrated, but it is also possible that for example the usage control status data 166 generated at the usage monitor 186 such as the SAM $305_1$ shown in FIG. 67 be transmitted to the EMD service center 302 in real-time and that the user preference filter data 903 be generated based on the usage control status data 166 in the SP use purchase log data 309.

SIXTH MODIFICATION OF SECOND EMBODIMENT

The content provider 301, the service provider 310, and the SAMs $305_1$ to $305_4$ can register their secret key data $K_{CP,S}$, $K_{SP,S}$, and $K_{SAM1,S}$ to $K_{SAM4,S}$ in the EMD service center 302 too other than their public key data $K_{CP,P}$, $K_{SP,P}$, and $K_{SAM1,P}$ to $K_{SAM4,P}$.

By doing this, it becomes possible for the EMD service center 302 to tap communication concerned in the communication between the content provider 301 and the service provider 310, the communication between the service provider 310 and the SAMs $305_1$ to $305_4$, and the communication among the SAMs $305_1$ to $305_4$ in the user home network 303 by using the secret key data $K_{CP,S}$, $K_{SP,S}$, and $K_{SAM1,S}$ to $K_{SAM4,S}$ in response to demands from the nation or the police organization at the time of an emergency.

Further, it is also possible that the secret key data $K_{SAM1,S}$ to $K_{SAM4,S}$ be generated for the SAMs $305_1$ to $305_4$ by the EMD service center 302 at the time of shipping and that they be stored in the SAMs $305_1$ to $305_4$ and, at the same time, held (registered) by the EMD service center 302.

SEVENTH MODIFICATION OF SECOND EMBODIMENT

In the above embodiment, the case where public key certificate data $CER_{CP}$, $CER_{SP}$, and $CER_{SAM1}$ to $CER_{SAM4}$ were acquired from the EMD service center 302 in advance when the content provider 301, service provider 310, and SAMs $305_1$ to $305_4$ communicated with respect to each other and were transmitted to the destination of communication by the in-band method was illustrated, but in the present invention, various modes can be employed as the mode of transmission of public key certificate data to the destination of communication.

For example, it is also possible that the public key certificate data $CER_{CP}$, $CER_{SP}$, and $CER_{SAM1}$ to $CER_{SAM4}$ be acquired from the EMD service center 302 in advance when the content provider 301, service provider 310, and the SAM $305_1$ to $305_4$ communicate with respect to each other and be transmitted to the destination of communication by the in-band method preceding the related communication.

Further, it is also possible for the content provider 301, the service provider 310, and the SAM $305_1$ to $305_4$ to acquire the public key certificate data $CER_{CP}$, $CER_{SP}$ and $CER_{SAM1}$ to $CER_{SAM4}$ from the EMD service center 302 at the time of communication.

Figure 84:
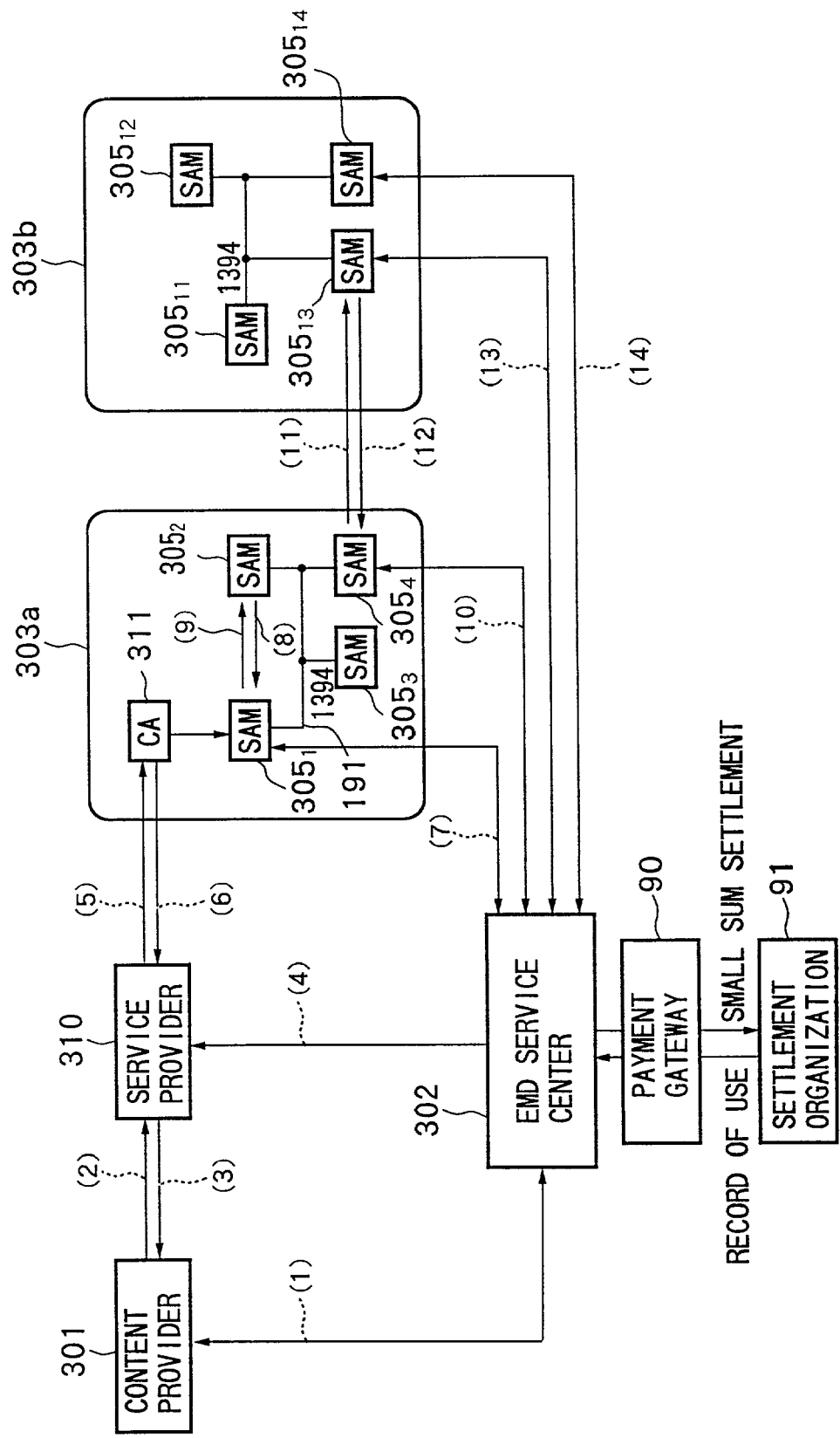
FIG. 84 is a view for explaining the mode of a route of acquisition of public key certificate data.

FIG. 84 is a view for explaining the mode of the route of acquiring the public key certificate data.

Note that, in FIG. 84, components given the same references as those of FIG. 49 are the same as the components having the same references. Further, a user home network 303a is the same as the user home network 303 mentioned before. In a user home network 303b, SAMs $305_{11}$ to $305_{14}$ are connected via a bus 191, that is, an IEEE 1394 serial bus.

When the content provider 301 acquires the public key certificate data $CER_{SP}$ of the service provider 310, there are for example a case where the public key certificate data $CER_{SP}$ is transmitted from the service provider 310 to the content provider 301 preceding the communication ((3) in FIG. 84) and a case where the content provider 301 orders the public key certificate data $CER_{SP}$ from the EMD service center 302 ((1) in FIG. 84).

Further, when the service provider 310 acquires the public key certificate data $CER_{CP}$ of the content provider 301, there are for example a case where the public key certificate data $CER_{CP}$ is transmitted from the content provider 301 to the service provider 310 preceding the communication ((2) in FIG. 84) and a case where the service provider 310 orders the public key certificate data $CER_{CP}$ from the EMD service center 302 ((4) in FIG. 84).

Further, when the service provider 310 acquires the public key certificate data $CER_{SAM1}$ to $CER_{SAM4}$ of the SAMs $305_1$ to $305_4$, there are for example a case where the public key certificate data $CER_{SAM1}$ to $CER_{SAM4}$ are transmitted from the SAMs $305_1$ to $305_4$ to the service provider 310 preceding the communication ((6) in FIG. 84) and a case where the service provider 310 orders the public key certificate data $CER_{SAM1}$ to $CER_{SAM4}$ from the EMD service center 302 ((4) in FIG. 84).

Further, when the SAMs $305_1$ to $305_4$ acquire the public key certificate data $CER_{SP}$ of the service provider 310, there are for example a case where the public key certificate data $CER_{SP}$ is transmitted from the service provider 310 to the SAMs $305_1$ to $305_4$ preceding the communication ((5) in FIG. 84) and a case where the SAMs $305_1$ to $305_4$ order the public key certificate data $CER_{SP}$ from the EMD service center 302 ((7) in FIG. 84, etc.).

Further, when the SAM $305_1$ acquires the public key certificate data $CER_{SAM2}$ of the SAM $305_2$, there are for example a case where the public key certificate data $CER_{SAM2}$ is transmitted from the SAM $305_2$ to the SAM $305_1$ preceding the communication ((8) in FIG. 84) and a case where the SAM $305_1$ orders the public key certificate data $CER_{SAM2}$ from the EMD service center 302 ((7) in FIG. 84, etc.).

Further, when the SAM $305_2$ acquires the public key certificate data $CER_{SAM1}$ of the SAM $305_1$, there are for example a case where the public key certificate data $CER_{SAM1}$ is transmitted from the SAM $305_1$ to the SAM $305_2$ preceding the communication ((9) in FIG. 84), a case where the SAM $305_2$ orders the public key certificate data $CER_{SAM1}$ from the EMD service center 302 by itself, and a case where the SAM $305_2$ orders the public key certificate data $CER_{SAM1}$ via the network apparatus with the SAM $305_1$ mounted therein ((7), (8) in FIG. 84).

Further, when the SAM $305_4$ acquires the public key certificate data $CER_{SAM13}$ of the SAM $305_{13}$, there are for example a case where the public key certificate data $CER_{SAM13}$ is transmitted from the SAM $305_{13}$ to the SAM $305_4$ preceding the communication ((12) in FIG. 84), a case where the SAM $305_4$ orders the public key certificate data $CER_{SAM13}$ from the EMD service center 302 by itself ((10) in FIG. 84), and a case where the SAM $305_4$ orders the public key certificate data $CER_{SAM13}$ via the network apparatus in the user home network 303b.

Further, when the SAM $305_{13}$ acquires the public key certificate data $CER_{SAM4}$ of the SAM $305_4$, there are for example a case where the public key certificate data $CER_{SAM4}$ is transmitted from the SAM $305_4$ to the SAM $305_{13}$ preceding the communication ((11) in FIG. 84), a case where the SAM $305_{13}$ orders the public key certificate data $CER_{SAM4}$ from the EMD service center 302 by itself ((13) in FIG. 84), and a case where the SAM $305_{13}$ orders the public key certificate data $CER_{SAM4}$ via the network apparatus in the user home network 303b.

Handling of Public Key Certificate Revocation List (Data) in Second Embodiment

In the second embodiment, in order to prevent a content provider 301, a service provider 310, and SAMs $305_1$ to $305_4$ used for an illegal action etc. from communicating with another apparatus in the EMD service center 302, the public key certificate revocation list for invalidating the public key certificate data of the apparatus used for the related illegal action is generated. Then, the related public key certificate revocation list CRL is transmitted to the content provider 301, service provider 310, and SAMs $305_1$ to $305_4$.

Note that, it is also possible that the public key certificate revocation list CRL be generated in for example the content provider 301, the service provider 310, and the SAMs $305_1$ to $305_4$ other than the EMD service center 302.

First, an explanation will be made of the case where the EMD service center 302 invalidates the public key certificate data $CER_{CP}$ of the content provider 301.

Figure 85:
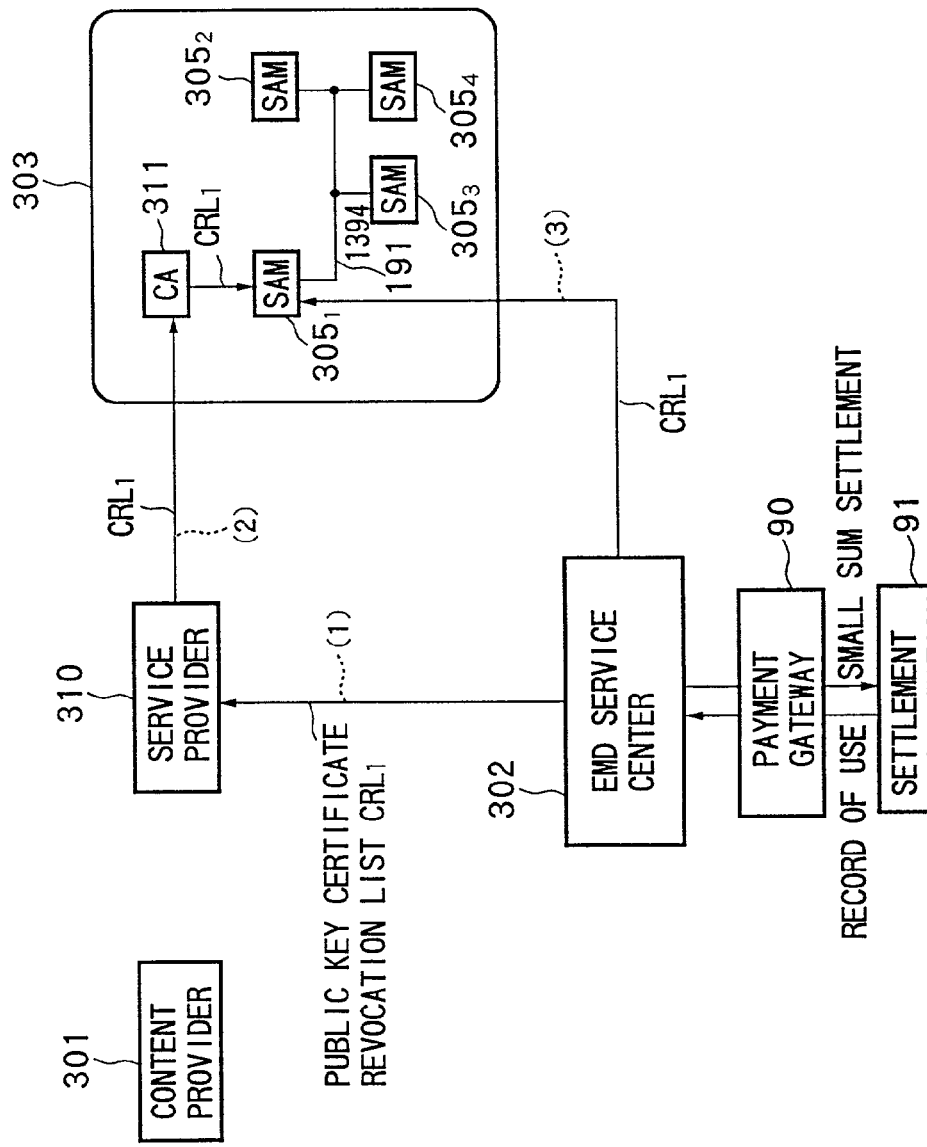
FIG. 85 is a view for explaining processing for invalidating public key certificate data of the content provider.

As shown in FIG. 85, the EMD service center 302 transmits a public key certificate revocation list $CRL_1$ indicating the invalidation of the public key certificate data $CER_{CP}$ to the service provider 310 ((1) in FIG. 85). When verifying the signature data input from the content provider 301, the service provider 310 decides the validity of the public key certificate data $CER_{CP}$ by referring to the public key certificate revocation list $CRL_1$, verifies the signature using the public key data $K_{CP,P}$ when it decides that it is valid, and invalidates the data from the content provider 301 without verifying the signature when it decides that it is invalid. Note that, it is also possible not to invalidate the data, but reject the communication.

Further, the EMD service center 302 transmits the public key certificate revocation list $CRL_1$ to for example the SAM $305_1$ in the user home network 303 by utilizing distribution resources of the service provider 310 by either one of the broadcast type or on-demand type ((1), (2) in FIG. 85). When verifying the signature data of the content provider 301 stored in the secure container input from the service provider 310, the SAM $305_1$ decides the validity of the public key certificate data $CER_{CP}$ by referring to the public key certificate revocation list $CRL_1$, verifies the signature using the public key data $K_{CP,P}$ when it decides it is valid, and invalidates the related secure container without verifying the signature when it decides it is invalid.

Note that, it is also possible for the EMD service center 302 to directly transmit the public key certificate revocation list $CRL_1$ to the SAM $305_1$ via the network apparatus in the user home network 303 ((3) in FIG. 85).

Next, an explanation will be made of the case where the EMD service center 302 invalidates the public key certificate data $CER_{SP}$ of the service provider 310.

Figure 86:
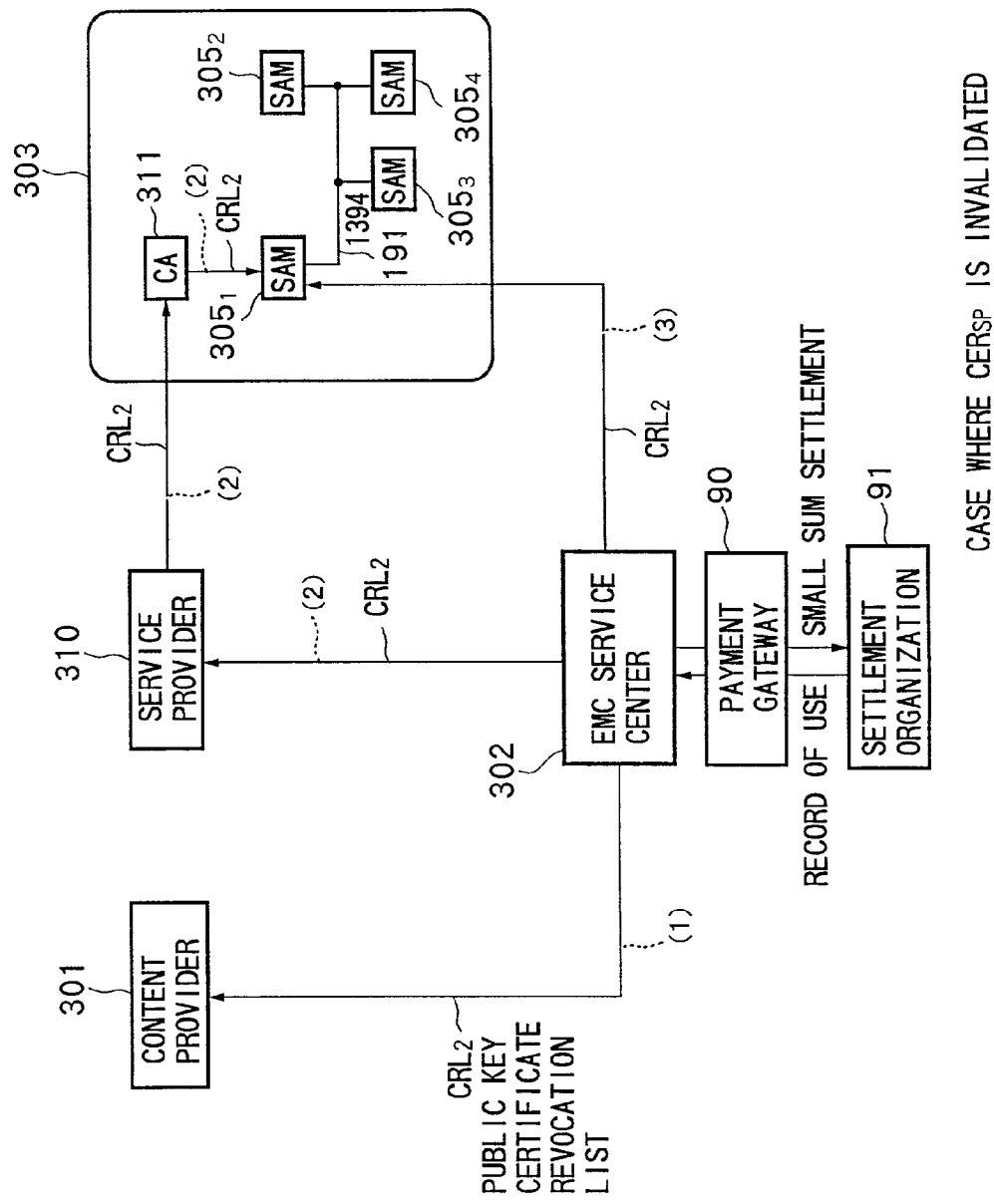
FIG. 86 is a view for explaining processing for invalidating public key certificate data of the service provider.

As shown in FIG. 86, the EMD service center 302 transmits a public key certificate revocation list $CRL_2$ indicating the invalidation of the public key certificate data $CER_{SP}$ to the content provider 301 ((1) in FIG. 86). When verifying the signature data input from the service provider 310, the content provider 301 decides the validity of the public key certificate data $CER_{SP}$, by referring to the public key certificate revocation list $CRL_2$, verifies the signature using the public key data $K_{SP,P}$ when it decides it is valid, and invalidates the data from the service provider 310 without verifying the related signature when it decides it is invalid.

Further, the EMD service center 302 transmits the public key certificate revocation list $CRL_2$ to for example the SAM $305_1$ in the user home network 303 by utilizing the distribution resources of the service provider 310 by either the broadcast type or on-demand type ((2) in FIG. 86). When verifying the signature data of the content provider 301 stored in the secure container input from the service provider 310, the SAM $305_1$ decides the validity of the public key certificate data $CER_{SP}$ by referring to the public key certificate revocation list $CRL_2$, verifies the signature using the public key data $K_{SP,P}$ when it decides it is valid, and invalidates the related secure container without verifying the signature when it decides it is invalid.

In this case, in the service provider 310, the module for transferring the public key certificate revocation list $CRL_2$ must have tamper resistance. Further, in the service provider 310, the public key certificate revocation list $CRL_2$ must be stored in a region where tampering by related parties of the service provider 310 is difficult.

Note that, it is also possible for the EMD service center 302 to directly transmit the public key certificate revocation list $CRL_2$ to the SAM $305_1$ via the network apparatus in the user home network 303 ((3) in FIG. 86).

Next, an explanation will be made of a case where the EMD service center 302 invalidates for example the public key certificate data $CER_{SAM2}$ of the SAM $305_2$.

Figure 87:
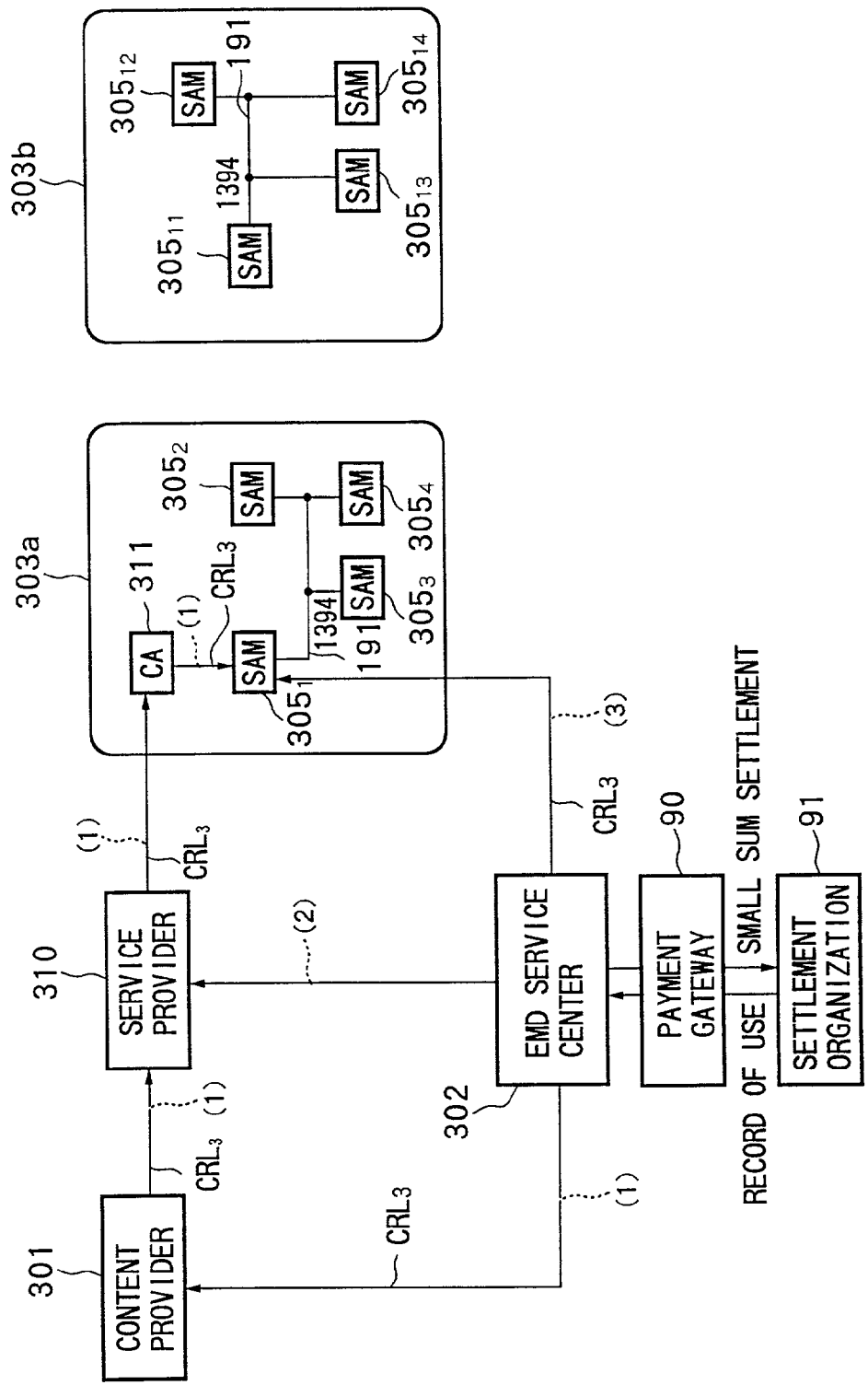
FIG. 87 is a view for explaining processing for invalidating public key certificate data of a SAM.

As shown in FIG. 87, the EMD service center 302 transmits a public key certificate revocation list $CRL_3$ indicating the invalidation of the public key certificate data $CER_{SAM2}$ to the content provider 301 ((1) in FIG. 87). The content provider 301 transmits the public key certificate revocation list $CRL_3$ to the service provider 310. The service provider 310 transmits the public key certificate revocation list $CRL_3$ to for example the SAM $305_1$ in the user home network 303 by utilizing its own distribution resources by either the broadcast type or on-demand type ((1) in FIG. 87). When verifying the signature data of the SAM $305_2$ added to the data input from the SAM $305_2$, the SAM $305_1$ decides the validity of the public key certificate data $CER_{SAM2}$ by referring to the public key certificate revocation list $CRL_3$, verifies the signature using the public key data $K_{SAM2,P}$ when it decides it is valid, and invalidates the related data without verifying the signature when it decides it is invalid.

In this case, in the service provider 310, the module for transferring the public key certificate revocation list $CRL_3$ must have tamper resistance. Further, in the service provider 310, the public key certificate revocation list $CRL_3$ must be stored in a region where tampering by related parties of the service provider 310 is difficult.

It is also possible for the EMD service center 302 to transmit the public key certificate revocation list $CRL_3$ to the SAM $305_1$ via the service provider 310 ((1), (2) in FIG. 87).

Note that, it is also possible for the EMD service center 302 to directly transmit the public key certificate revocation list $CRL_3$ to the SAM $305_1$ via the network apparatus in the user home network 303 ((3) in FIG. 87).

Further, the EMD service center 302 generates and stores the public key certificate revocation list $CRL_3$ indicating the invalidation of for example the public key certificate data $CER_{SAM2}$ of the SAM $305_2$.

Figure 88:
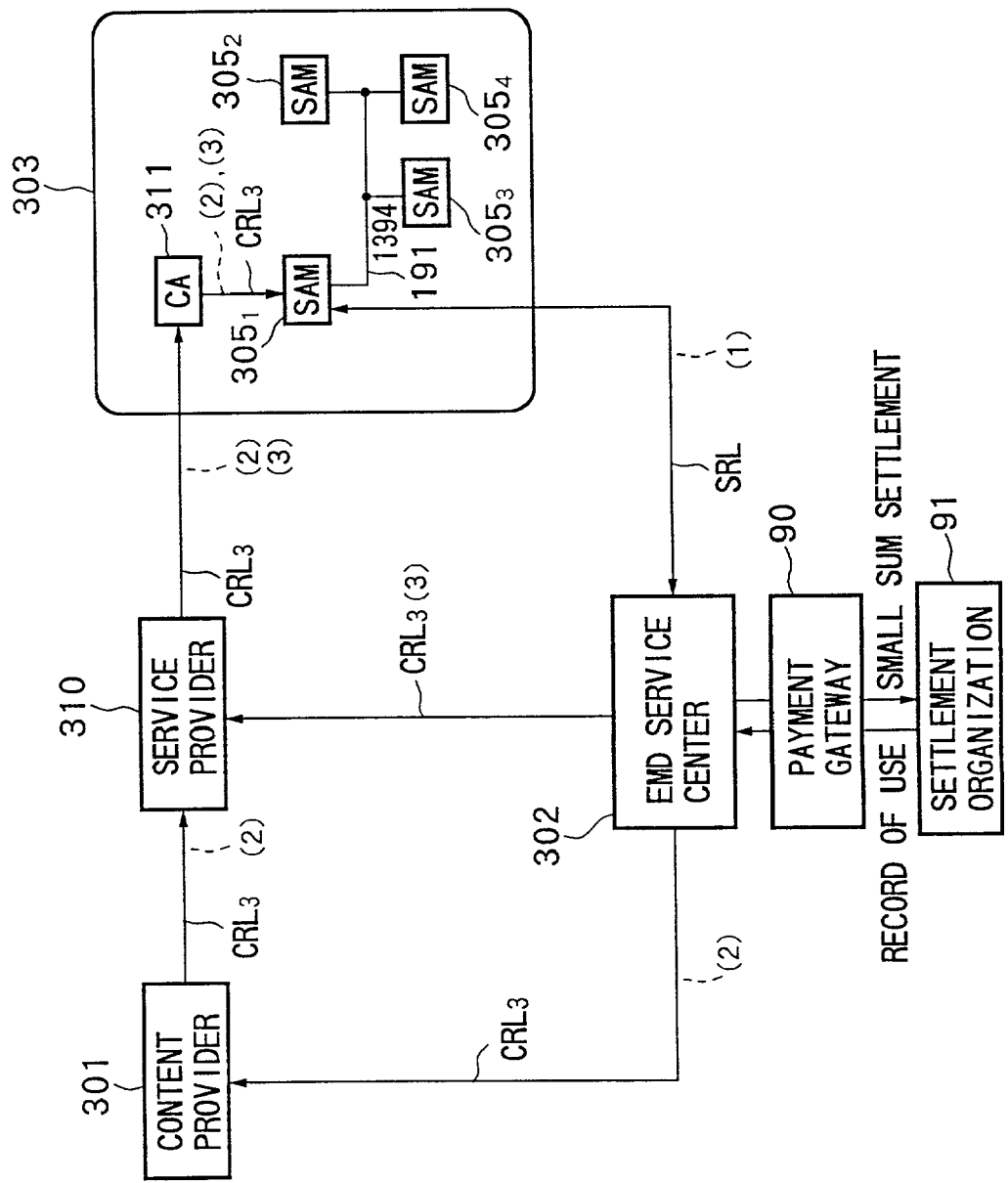
FIG. 88 is a view for explaining other processing for invalidating public key certificate data of a SAM.

Further, the user home network 303 generates a SAM registration list SRL of the SAMs connected to the bus 191 and transmits this to the EMD service center 302 ((1) in FIG. 88).

The EMD service center 302 identifies the SAMs (for example SAM $305_2$) for which invalidation is indicated by the public key certificate revocation list $CRL_3$ among the SAMs $305_1$ to $305_4$ indicated in the SAM registration list, sets revocation flags corresponding to the related SAMs in the SAM registration list SRL so as to indicate the invalidity, and thereby generates a new SAM registration list SRL.

Next, the EMD service center 302 transmits the related generated SAM registration list SRL to the SAM $305_1$ ((1) in FIG. 88).

The SAM $305_1$ determines the existence of the verification of the signature data and whether or not the communication is permitted by referring to the revocation flags of the SAM registration list SRL when communicating with another SAM.

Further, the EMD service center 302 generates the public key certificate revocation list $CRL_3$ and transmits this to the content provider 301 ((2) in FIG. 88).

The content provider 301 transmits the public key certificate revocation list $CRL_3$ to the service provider 310 ((2) in FIG. 88).

Next, the service provider 310 transmits the public key certificate revocation list $CRL_3$ to the SAM $305_1$ by either the broadcast type or on-demand type by utilizing its own distribution resources ((2) in FIG. 88).

The SAM $305_1$ identifies the SAM (for example SAM $305_2$) for which invalidation is indicated by the public key certificate revocation list $CRL_3$ among the SAMs $305_1$ to $305_4$ indicated in the SAM registration list generated by itself and sets revocation flags corresponding to the related SAMs in the SAM registration list SRL so as to indicate the invalidity.

After that, the SAM $305_1$ determines the existence of the verification of the signature data and whether or not communication is permitted by referring to the revocation flags of the related SAM registration list SRL when communicating with another SAM.

Further, the EMD service center 302 generates the public key certificate revocation list $CRL_3$ and transmits this to the service provider 310 ((3) in FIG. 88).

Next, the service provider 310 transmits the public key certificate revocation list $CRL_3$ to the SAM $305_1$ by either one the broadcast type or on-demand type by utilizing its own distribution resources ((3) in FIG. 88).

The SAM $305_1$ specifies the SAMs (for example SAM $305_2$) for which invalidation is indicated by the public key certificate revocation list $CRL_3$ among the SAMs $305_1$ to $305_4$ indicated in the SAM registration list generated by itself and sets revocation flags corresponding to the related SAMs in the SAM registration list SRL so as to indicate the invalidity.

After that, the SAM $305_1$ determines the existence of the verification of the signature data and whether or not communication is permitted by referring to the revocation flags of the related SAM registration list SRL when communicating with another SAM.

Role Etc. of EMD Service Center 302

Figure 89:
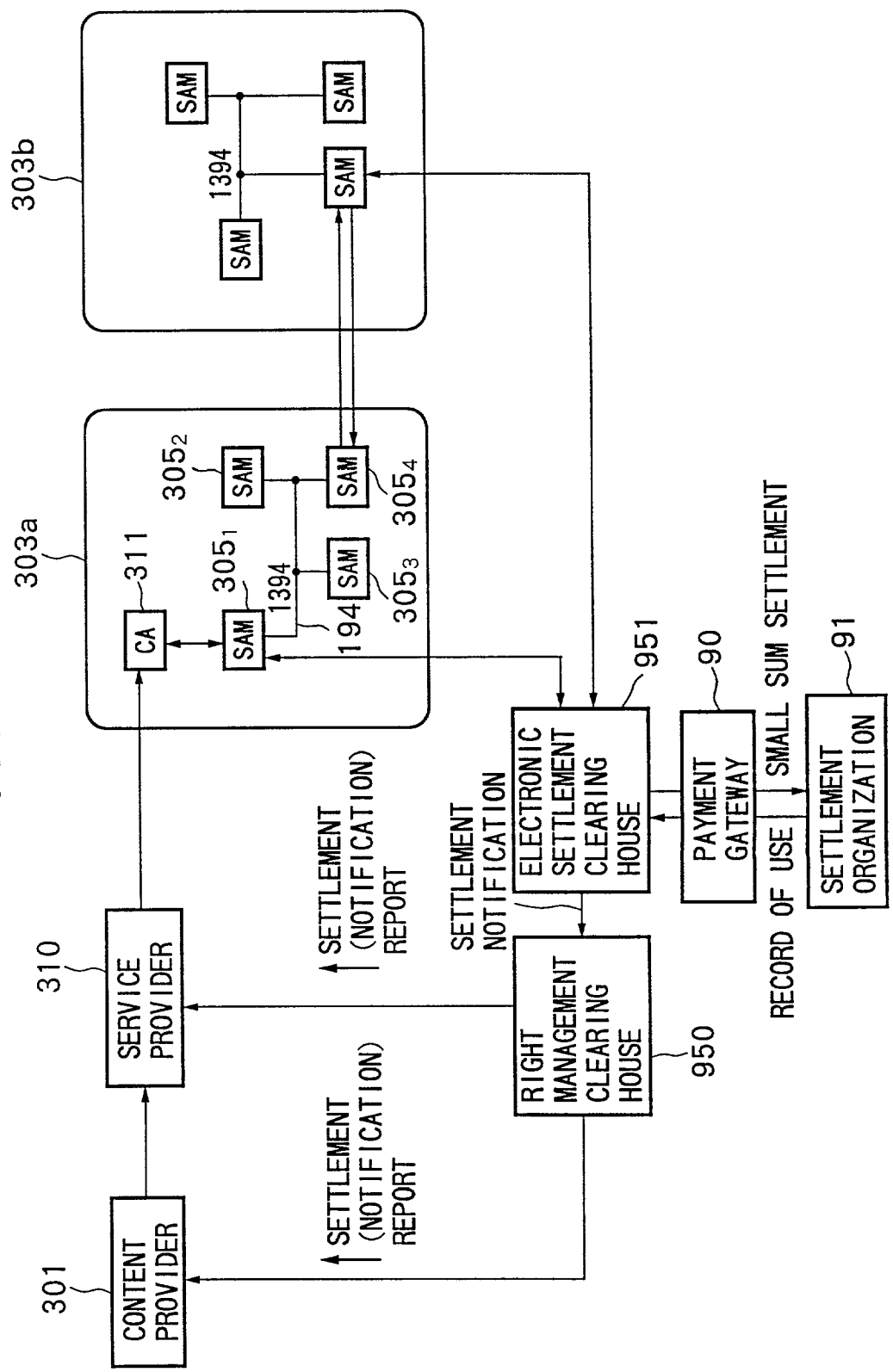
FIG. 89 is a view for explaining a case where a right management clearing house and an electronic settlement clearing house are provided in place of the EMD service center in the EMD system shown in FIG. 49.

FIG. 89 is a view of the configuration of the EMD system when the functions of the EMD service center (clearing house) 302 shown in FIG. 49 are divided between a right management clearing house 950 and an electronic settlement clearing house 951.

In the related EMD system, in the electronic settlement clearing house 951 performs the settlement processing (profit distribution processing) based on the usage log data 308 from the SAMs of the user home networks 303a and 303b, generates the settlement claim data of the content provider 301 and the service provider 310, and performs settlement at the settlement organization 91 via the payment gateway 90.

Further, the right management clearing house 950 generates the settlement reports of the content provider 301 and the service provider 310 in accordance with the settlement notification from the electronic settlement clearing house 951 and transmits them to the content provider 301 and the service provider 310.

Further, it performs the registration (authorization) etc. of the usage control policy data 106 and the content key data Kc of the content provider 301.

Figure 90:
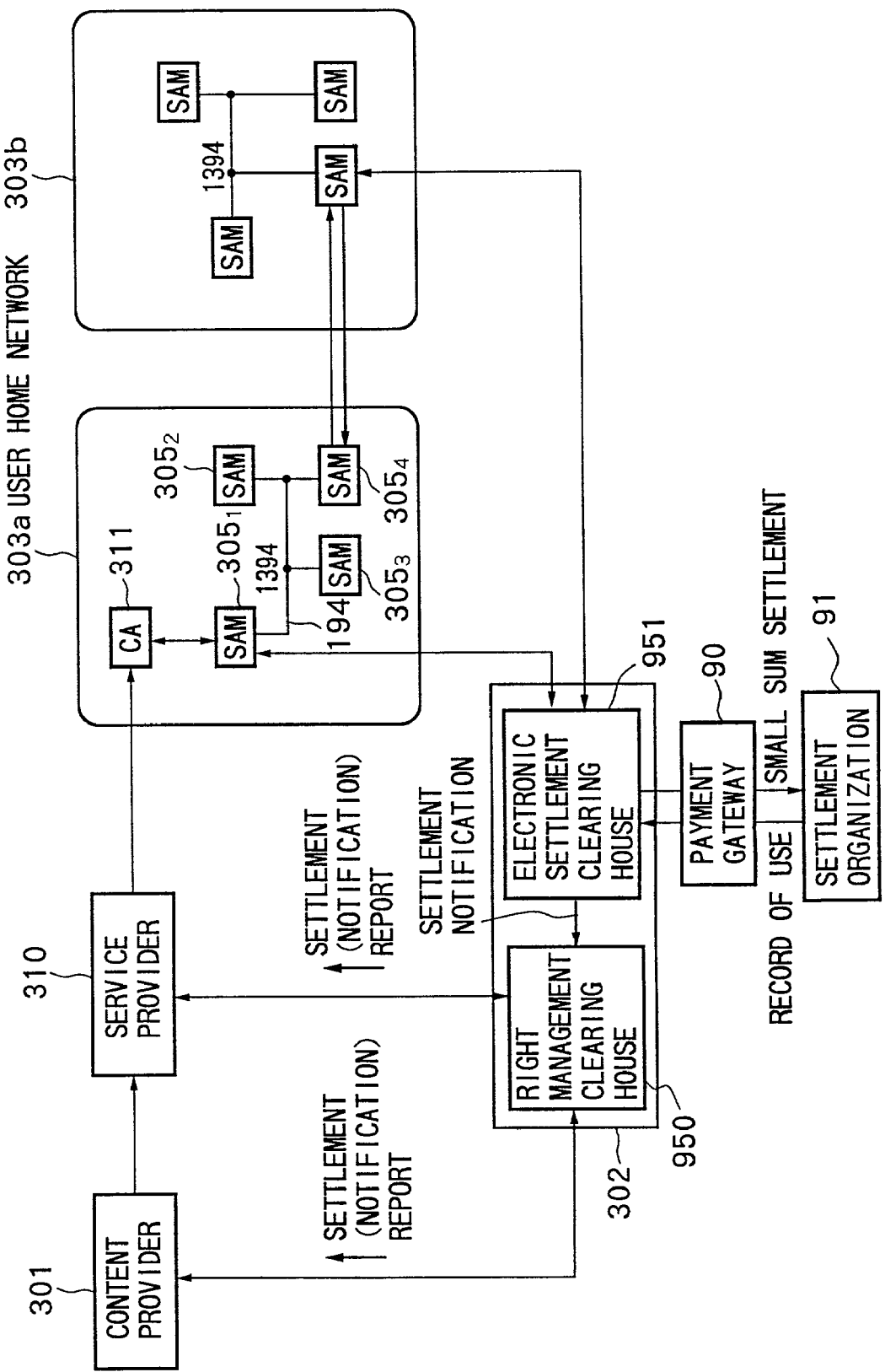
FIG. 90 is a view of the configuration of an EMD system when providing the right management clearing house and the electronic settlement clearing house shown in FIG. 89 in a single EMD service center.

Note that, as shown in FIG. 90, when the right management clearing house 950 and the electronic settlement clearing house 951 are accommodated in a single apparatus, the EMD service center 302 shown in FIG. 49 is formed.

Figure 91:
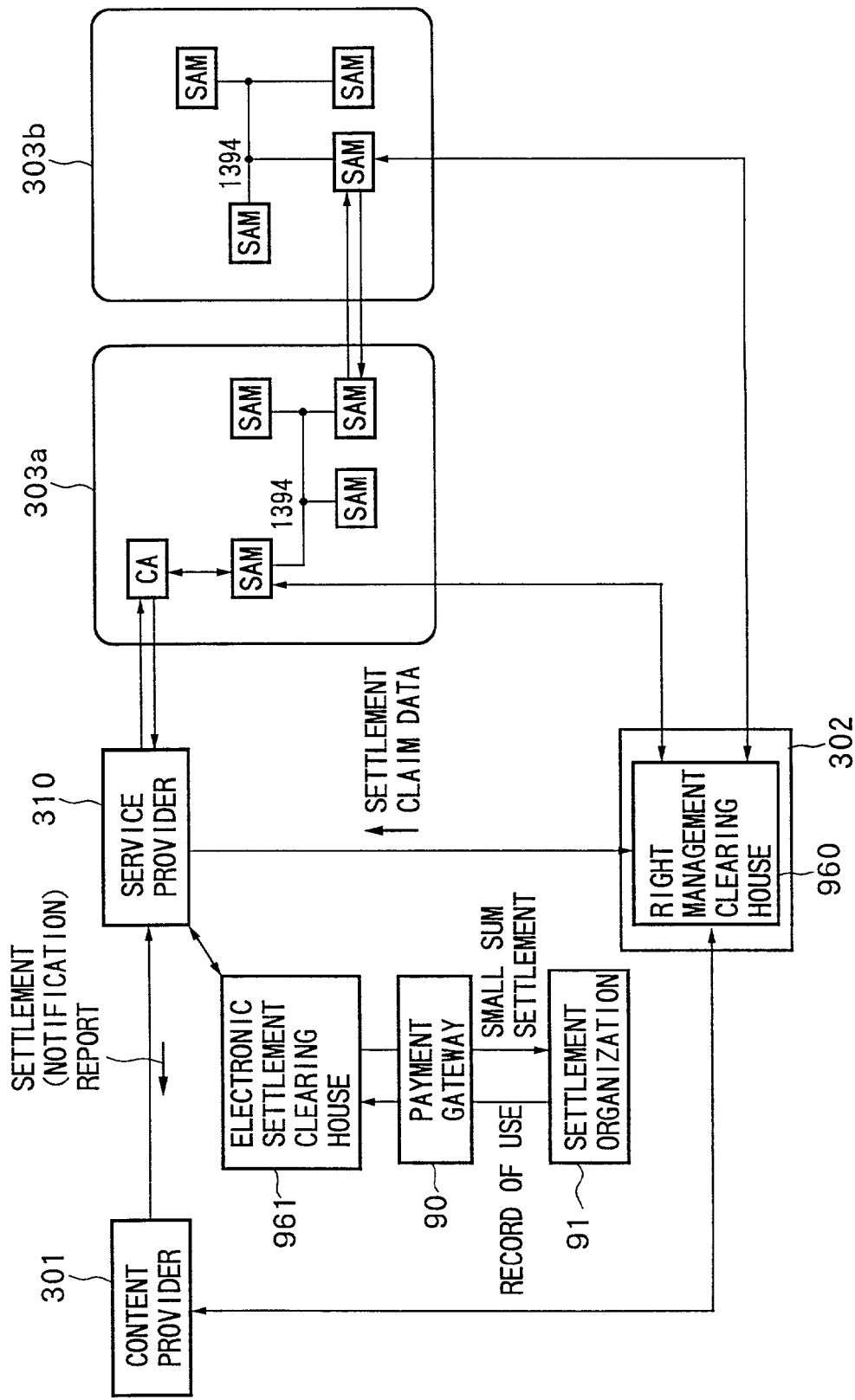
FIG. 91 is a view of the configuration of an EMD system where the service provider directly performs settlement at the electronic settlement clearing house.

Further, in the present invention, for example, as shown in FIG. 91, it is also possible to provide the functions of a right management clearing house 960 in the EMD service center 302, perform the registration etc. of the usage control policy data 106 in the right management clearing house 960 and, at the same time, generate the settlement claim data of the service provider 310 based on the usage log data 308 from the SAMs and transmit this to the service provider 310. In this case, the service provider 310 utilizes its own charge system as an electronic settlement clearing house 961 and performs the settlement based on the settlement claim data from the right management clearing house 960.

Figure 92:
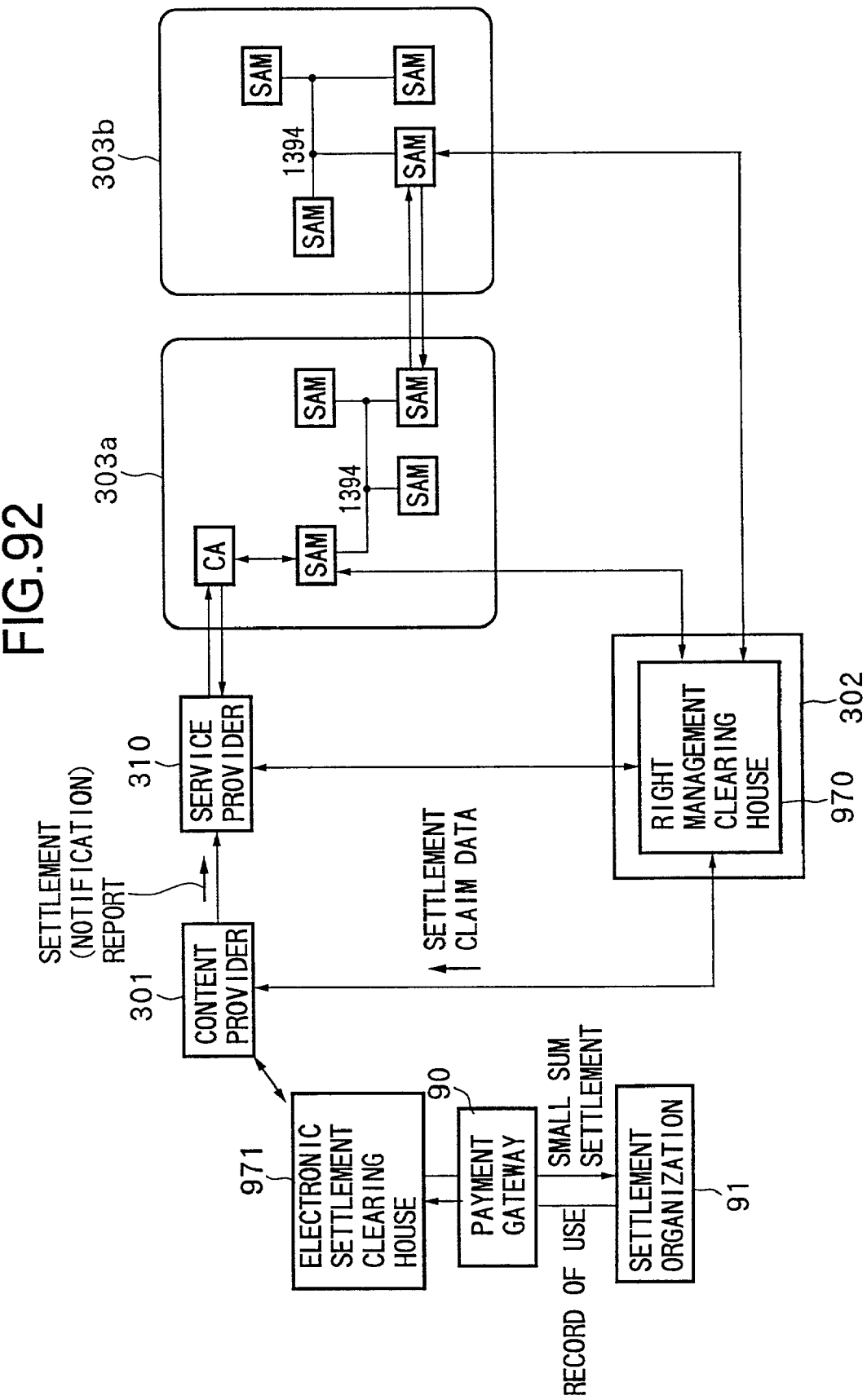
FIG. 92 is a view of the configuration of an EMD system where the content provider directly performs the settlement at the electronic settlement clearing house.

Further, in the present invention, for example as shown in FIG. 92, it is also possible to provide the function of a right management clearing house 970 in the EMD service center 302, perform the registration etc. of the usage control policy data 106 in the right management clearing house 970 and, at the same time, generate the settlement claim data of the content provider 301 based on the usage log data 308 from the SAM and transmit this to the content provider 301. In this case, the content provider 301 utilizes its own charge system as an electronic settlement clearing house 971 and performs the settlement based on the settlement claim data from the right management clearing house 970.

EIGHTH MODIFICATION OF SECOND EMBODIMENT

In the second embodiment, the case where the secure container 104 of the format shown in FIG. 4 was provided from the content provider 301 to the service provider 310 and the secure container 304 of the format shown in FIG. 53 was distributed from the service provider 310 to the user home network 303 in the EMD system 300 shown in FIG. 49 was illustrated.

Namely, in the second embodiment, as shown in FIG. 4 and FIG. 53, the case of storing a single content file CF and a single key file KF corresponding to the related content file CF in the secure container 104 and the secure container 304 was illustrated.

In the present invention, it is also possible to store a plurality of content files CF and a plurality of key files KF corresponding to the related plurality of content files CF in the secure container 104 and the secure container 304.

Figure 93:
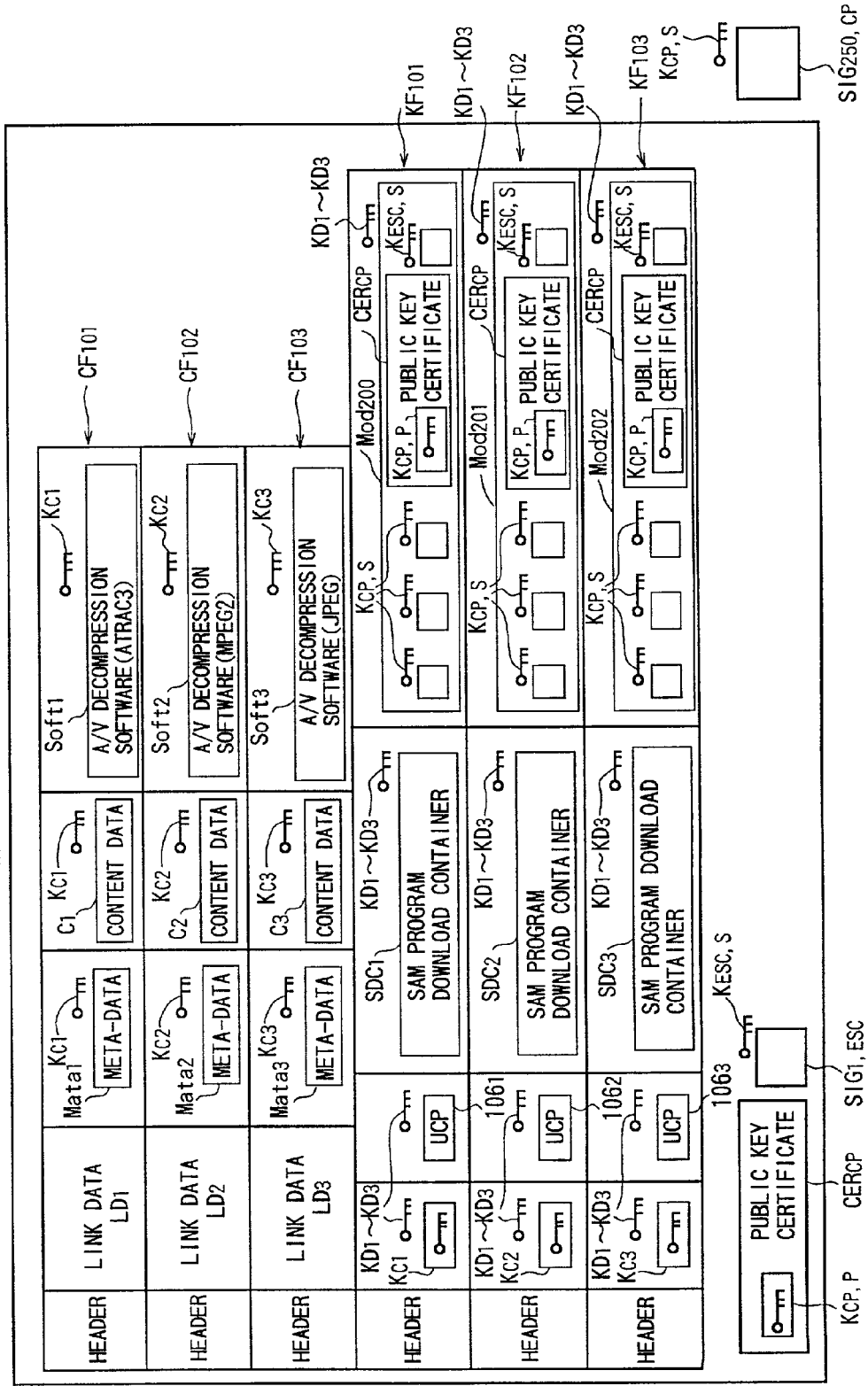
FIG. 93 is a view for explaining the format of the secure container provided from the content provider to the service provider shown in FIG. 49 in an eighth modification of the second embodiment of the present invention.

FIG. 93 is a view for explaining the format of the secure container 104a provided from the content provider 301 to the service provider 310 shown in FIG. 49 in the present modification.

As shown in FIG. 93, the secure container 104a stores the content files $CF_{101}$, $CF_{102}$, and $CF_{103}$, the key files $KF_{101}$, $KF_{102}$, and $KF_{103}$, the public key certificate data $CER_{CP}$, the signature data $SIG_{1,ESC}$, and the signature data $SIG_{C250,CP}$.

Here, the signature data $SIG_{C250,CP}$ is generated by the content provider 301 taking the hush values with respect to all of the content files $CF1_{101}$, $CF_{102}$, and $CF_{103}$, the key files $KF_{101}$, $KF_{102}$, and $KF_{103}$, the public key certificate data $CER_{CP}$, and the signature data $SIG_{1,ESC}$ using the secret key data $K_{CP,S}$ of the content provider 301.

The content file $CF_{101}$ stores a header, link data $LD_1$, meta-data $Meta_1$, content data $C_1$, and an A/V decompression software $Soft_1$.

Here, the content data $C_1$ and the A/V decompression software $Soft_1$ is encrypted by using the content key data $Kc_1$ mentioned above, while the meta-data $Meta_1$ is encrypted by using the content key data $Kc_1$ according to need.

Further, the content data $C_1$ is compressed by for example the ATRAC3 method. The A/V decompression software $Soft_1$ is the software for the decompression of the ATRAC3 method.

Further, the link data $LD_1$ indicates the link to the key file $KF_{101}$.

The content file $CF_{102}$ stores the header, link data $LD_2$, meta-data $Meta_2$, content data $C_2$, and an A/V decompression software $Soft_2$ are stored.

Here, the content data $C_2$ and the A/V decompression software $Soft_2$ are encrypted by using the content key data $Kc_2$ mentioned above, while the meta-data $Meta_2$ is encrypted by using the content key data $Kc_2$ according to need.

Further, the content data $C_2$ is compressed by for example the MPEG2 method. The A/V decompression software $Soft_2$ is the software for the decompression of the MPEG2 method.

Further, the link data $LD_2$ indicates the link to the key file $KF_{102}$.

The content file $CF_{103}$ stores a header, link data $LD_3$, meta-data $Meta_3$ content data $C_{21}$ and an A/V decompression software $Soft_3$.

Here, the content data $C_3$ and the A/V decompression software $Soft_3$ are encrypted by using the content key data $Kc_3$ mentioned above, while the meta-data $Meta_3$ is encrypted by using the content key data $Kc_3$ according to need. Further, the content data $C_3$ is compressed by for example the JPEG method. The A/V decompression software $Soft_3$ is software for the decompression of the JPEG method.

Further, the link data $LD_3$ indicates the link to the key file $KF_{103}$.

The key file $KF_{101}$ stores a header, content key data $Kc_1$ encrypted by using the distribution key data $KD_1$ to $KD_3$, usage control policy data $106_1$, SAM program download container $SDC_1$, and signature certificate module $Mod_{200}$.

Figure 94:
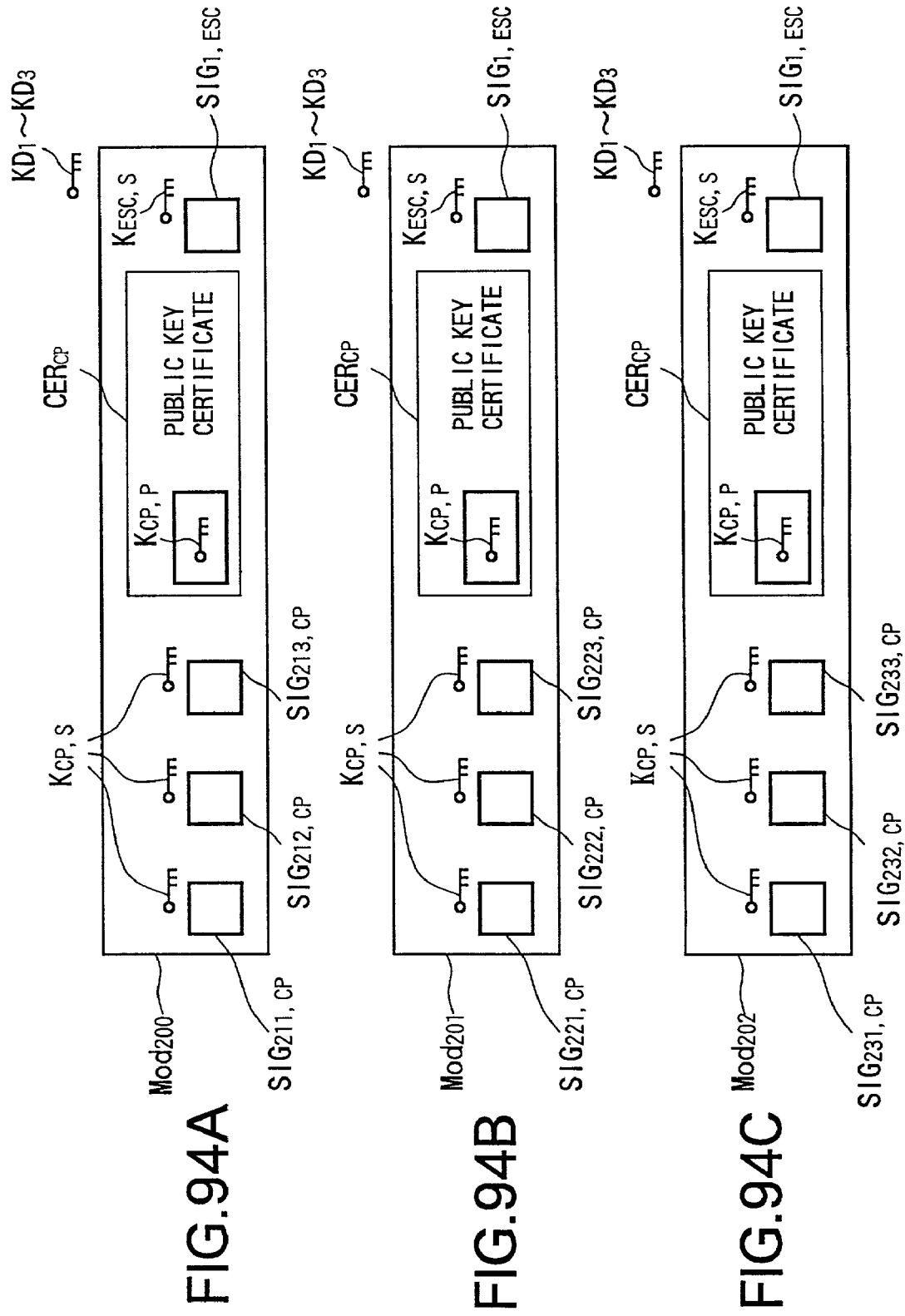
FIG. 94 is a view for explaining a detailed format of a module stored in FIG. 93.

Here, the signature certificate module $Mod_{200}$, as shown in FIG. 94A, stores the signature data $SIG_{211,CP}$, $SIG_{212,CP}$, and $SIG_{213,CP}$ generated by taking the hush values of the content data $C_1$, content key data $Kc_1$, and the usage control policy data $106_1$ and using the secret key data $K_{CP,S}$ of the content provider 301, the public key certificate data $CER_{CP}$ of the public key data $K_{CP,P}$, and the signature data $SIG_{1,ESC}$ of the EMD service center 302 with respect to the related public key certificate data The key file $KF_{102}$ stores a header, content key data $Kc_2$ encrypted by using the distribution key data $KD_1$ to $KD_3$, usage control policy data $106_2$, SAM program download container $SDC_2$, and a signature certificate module $Mod_{201}$.

Here, the signature certificate module $Mod_{201}$, as shown in FIG. 94B, stores the signature data $SIG_{221,CP}$, $SIG_{222,CP}$, and $SIG_{223,CP}$ generated by taking the hush values of the content data $C_2$, content key data $Kc_2$, and the usage control policy data $106_2$ and using the secret key data $K_{CP,S}$ of the content provider 301, public key certificate data $CER_{CP}$, and signature data $SIG_{1,ESC}$ with respect to the related public key certificate data $CER_{CP}$.

The key file $KF_{103}$ stores a header, content key data $Kc_3$ encrypted by using the distribution key data $KD_1$ to $KD_3$, usage control policy data $106_3$, a SAM program download container $SDC_3$, and a signature certificate module $Mod_{202}$.

Here, the signature certificate module $Mod_{202}$, as shown in FIG. 94C, stores the signature data $SIG_{231,CP}$, $SIG_{232,CP}$, and $SIG_{233,CP}$ generated by taking the hush values of the content data $C_3$, content key data $Kc_3$, and usage control policy data $106_3$ and using the secret key data $K_{CP,S}$ of the content provider 301, public key certificate data $CER_{CP}$, and signature data $SIG_{1,ESC}$ with respect to the related public key certificate data $CER_{CP}$.

When receiving the distribution of the secure container 104a shown in FIG. 93, the service provider 310 confirms the legitimacy of the signature data $SIG_{250,CP}$ by using the public key data $K_{CP,P}$ stored in the public key certificate data $CER_{CP}$ after confirming the legitimacy of the related public key certificate data $CER_{CP}$ by using the public key data $K_{ESC,P}$ of the EMD service center 302.

Figure 95:
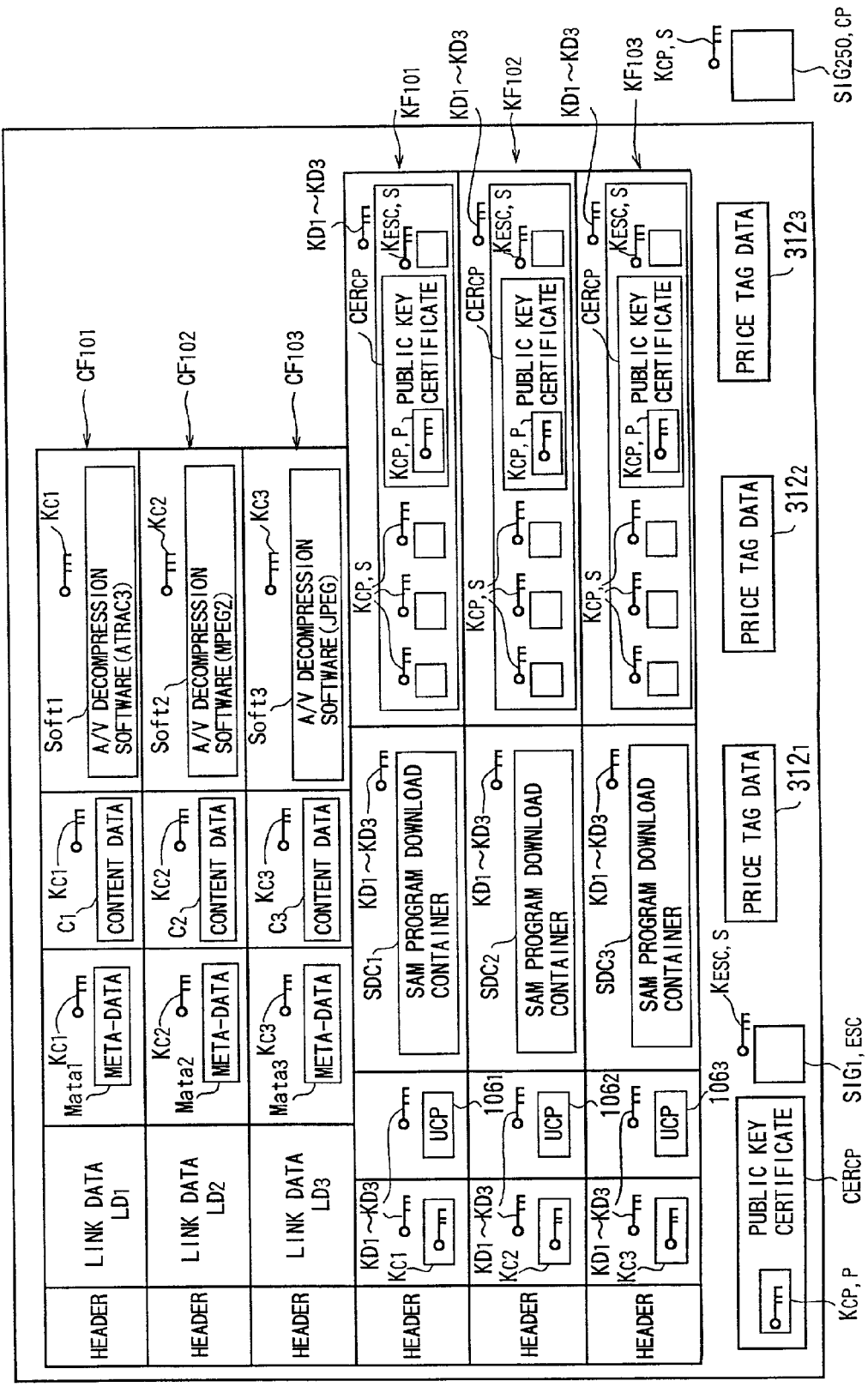
FIG. 95 is a view for explaining the format of the secure container provided from the service provider to the SAM shown in FIG. 49 in the eighth modification of the second embodiment of the present invention.

Then, when confirming the legitimacy of the signature data $SIG_{C250,CP}$, as shown in FIG. 95, the service provider 310 generates the secure container 304a storing the content files $CF_{101}$, $CF_{102}$, and $CF_{103}$ and the key files $KF_{101}$, $KF_{102}$, and $KF_{103}$ obtained from the secure container 104a, public key certificate data $CER_{SP}$ of the service provider 310, signature data $SIG_{61,ESC}$, price tag data $312_1$, $312_2$, and $312_3$, and a signature data $SIG_{260,SP}$.

Here, the price tag data $312_1$, $312_2$, and $312_3$ indicate the sale prices of the content data $C_1$, $C_2$, and $C_3$.

Further, the signature data $SIG_{260,SP}$ is generated by taking the hush value with respect to all of the content files $CF_{101}$, $CF_{102}$, and $CF_{103}$, key files $KF_{101}$, $KF_{102}$, and $KF_{103}$, public key certificate data $CER_{SP}$, signature data $SIG_{61,ESC}$, and the price tag data $312_1$, $312_2$, and $312_3$ and by using the secret key data $K_{SP,S}$ of the service provider 310.

The service provider 310 distributes the secure container 304a shown in FIG. 95 to the user home network 303.

In the user home network 303, the SAMs $305_1$ to $305_4$ confirm the legitimacy of the signature data $SIG_{61,ESC}$ stored in the secure container 304a, then confirm the legitimacy of the signature data $SIG_{260,SP}$ by using the public key data $K_{SP,KP}$ stored in the public key certificate data $CER_{SP}$.

Thereafter, the SAMs $305_1$ to $305_4$ perform the right clearing for the content data $C_{101}$, $C_{102}$, and $C_{103}$ in accordance with the link statuses indicated in the links $LD_1$, $LD_2$, and $LD_3$ based on the key files $KF_{101}$, $KF_{102}$, and $KF_{103}$.

Note that, in the eighth modification, the case where the signature data $SIG_{C250,CP}$ with respect to all of the content files $CF_{101}$, $CF_{102}$, and $CF_{103}$, key files $KF_{101}$, $KF_{102}$, and $KF_{103}$ public key certificate data $CER_{CP}$, and signature data $SIG_{1,ESC}$ was generated in the content provider 301 as shown in FIG. 93 was illustrated, but it is also possible to generate the signature data for each of for example the content files $CF_{101}$, $CF_{102}$, and $CF_{103}$ and the key files $KF_{101}$, $KF_{102}$, and $KF_{103}$ and store this in the secure container 104a.

Further, in the eighth modification, the case where the signature data $SIG_{260,CP}$ with respect to all of the content files $CF_{101}$, $CF_{102}$, and $CF_{103}$, key files $KF_{101}$, $KF_{102}$, and $KF_{103}$, public key certificate data $CER_{SP}$, signature data $SIG_{61,ESC}$, and price tag data $312_1$, $312_2$, and $312_3$ was generated in the service provider 310 as shown in FIG. 95 was illustrated, but it is also possible to generate the signature data for each of them and store them in the secure container 304a.

Further, in the eighth modification, the case where the secure container 304 stored a plurality of content files $CF_{101}$, $CF_{102}$, and $CF_{103}$ provided from the single service provider 310 in the single secure container 304a and distributed it to the user home network 303 was illustrated, but it is also possible to distribute a plurality of content files CF provided from a plurality of content providers 301a and 301b in the single secure container and distribute the same to the user home network 303 as shown in FIG. 81.

Note that, the format shown in FIG. 93 can be similarly applied to also the case where the secure container 104 is transmitted from the content provider 101 to the user home network 103 shown in FIG. 1 in the first embodiment.

Further, in the above embodiment, the case where the settlement processing was carried out based on the usage log data input from the SAM in the EMD service center was illustrated, but it is also possible to transmit the usage control status data from a SAM to the EMD service center whenever the purchase mode of the content is determined in the SAM and perform the settlement processing by using the received usage control status data in the EMD service center.

Below, the concept of the content file CF and the key file KF etc. generated in the content provider 101 will be summarized.

Figure 96:
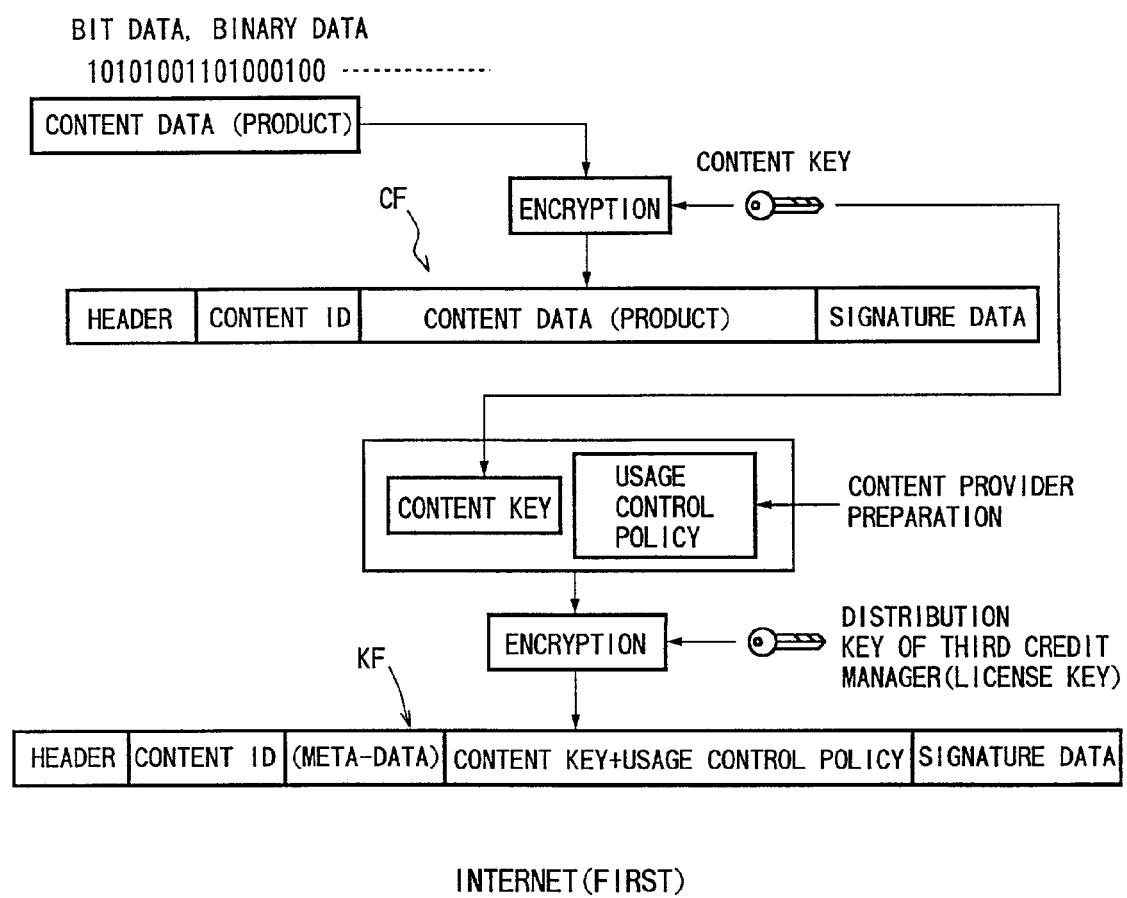
FIG. 96 is a conceptual view of a case where the secure container is provided by using the Internet.

When the content provider 101 provides content by using the Internet, as shown in FIG. 96, a content file CF containing a header, content ID, encrypted content data C using the content key data Kc, and signature data is generated as shown in FIG. 96. After the usage control policy data indicating the handling of the related content data C and the content key data Kc are encrypted by the distribution key data of the predetermined reliable managers, that is, the EMD service centers 102 and 302, they are stored in the key file KF. Further, the key file KF stores a header and the content ID and, according to need, the meta-data and the signature data.

Then, the content file CF and key file KF are provided directly from the content provider 101 to the user home networks 103 and 303 or provided from the content provider 101 to the user home networks 103 and 303 via the service provider 310.

Figure 97:
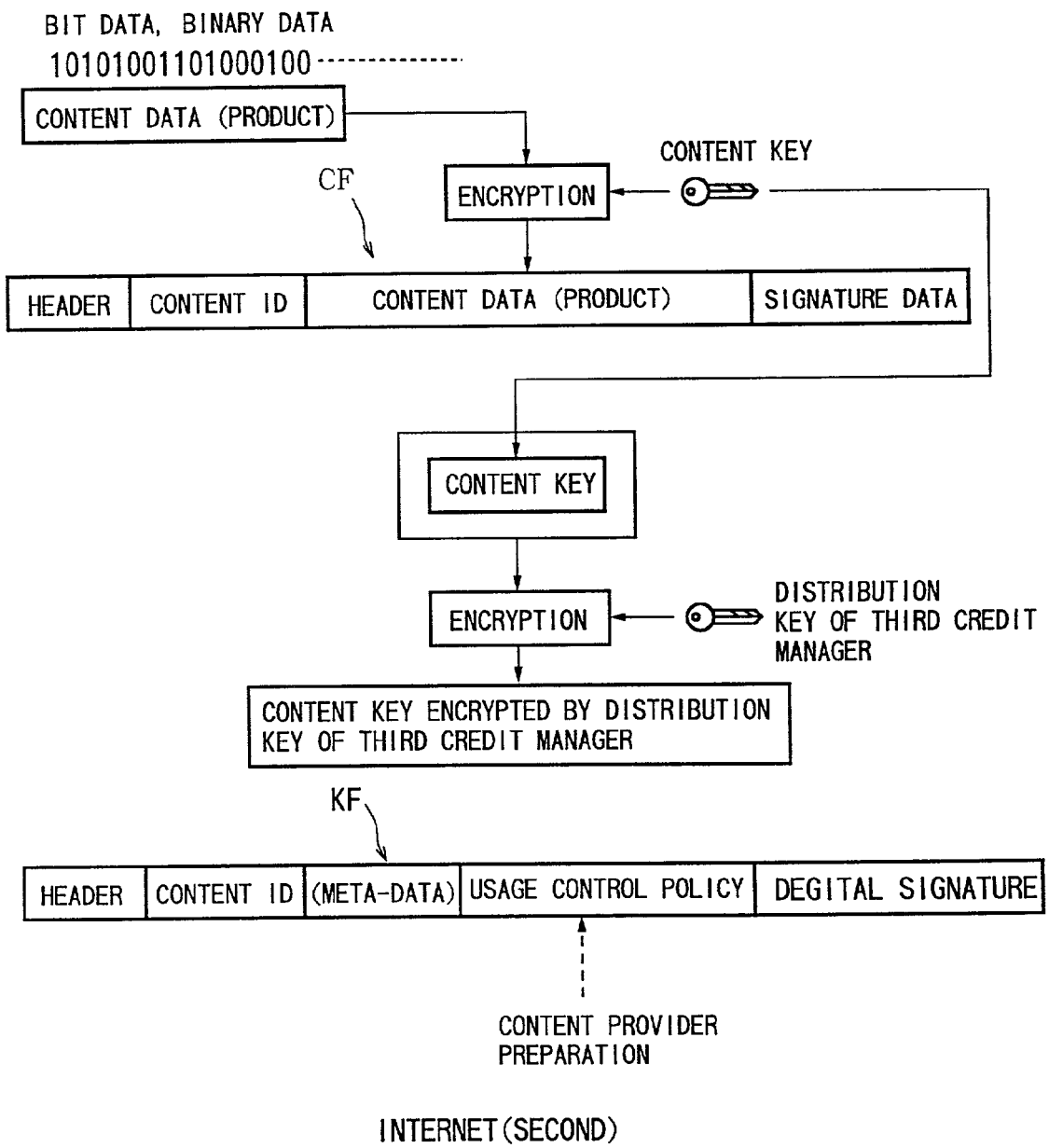
FIG. 97 is another conceptual view of the case where the secure container is provided by using the Internet.

Further, when the content provider 101 provides the content by using the Internet, as shown in FIG. 97, it is possible even if the content key data Kc is not stored in the key file KF, but the content key data Kc encrypted by the distribution key data of the predetermined reliable managers, that is, the EMD service centers 102 and 302, are provided from the EMD service centers 102 and 302 to the user home networks 103 and 303.

Figure 98:
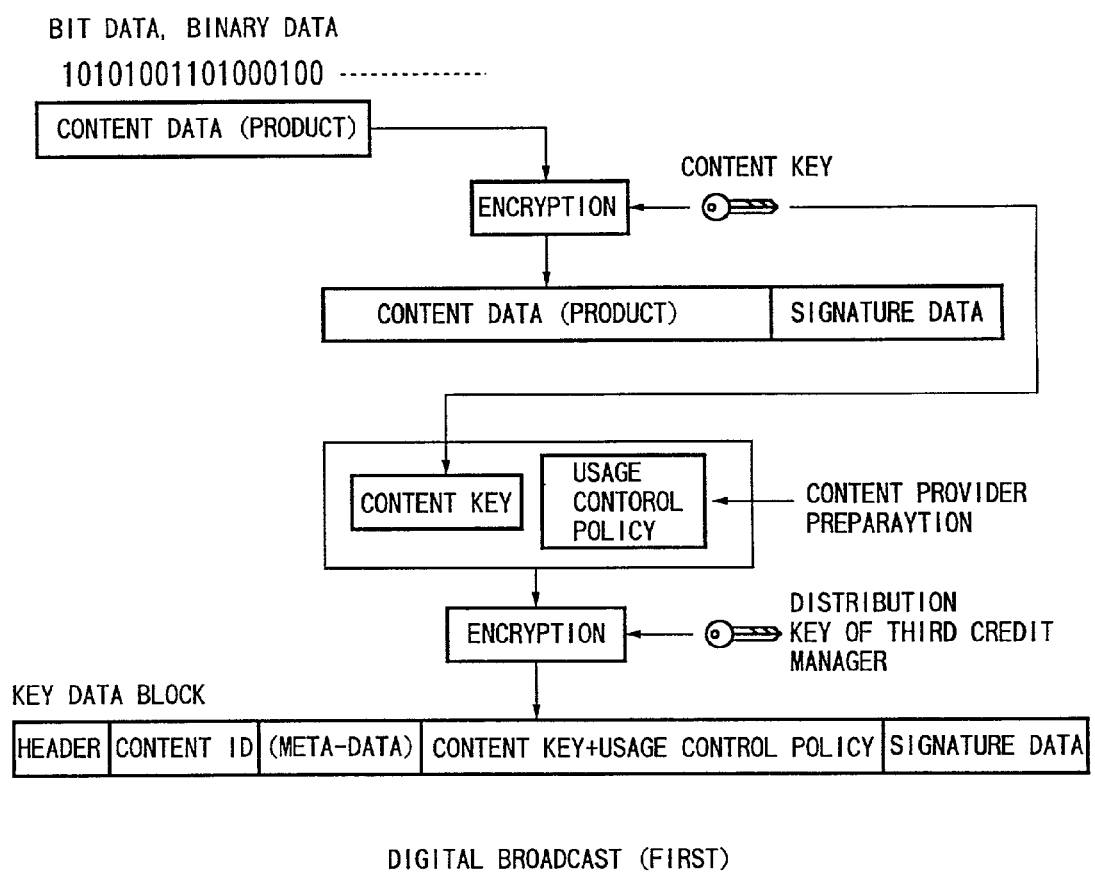
FIG. 98 is a conceptual view of a case where the secure container is provided by using a digital broadcast.

Further, when the content provider 101 provides the content by using a digital broadcast, for example, as shown in FIG. 98, it provides the content data C encrypted by using the content key data Kc and the signature data from the content provider 101 to the user home networks 103 and 303 directly or via the service provider 310. In this case, the key data blocks corresponding to the key file KF shown in FIG. 97 are provided from the content provider 101 to the user home networks 103 and 303 directly or via the service provider 310.

Figure 99:
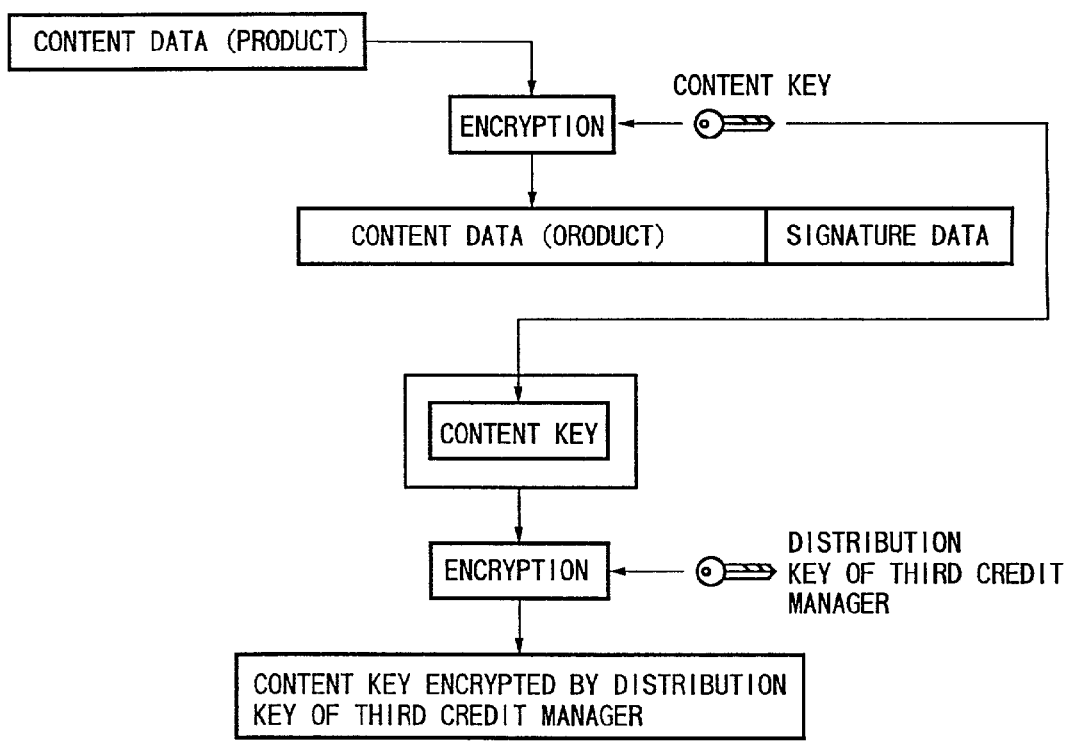
FIG. 99 is another conceptual view of the case where the secure container is provided by using a digital broadcast.
Figure 100:
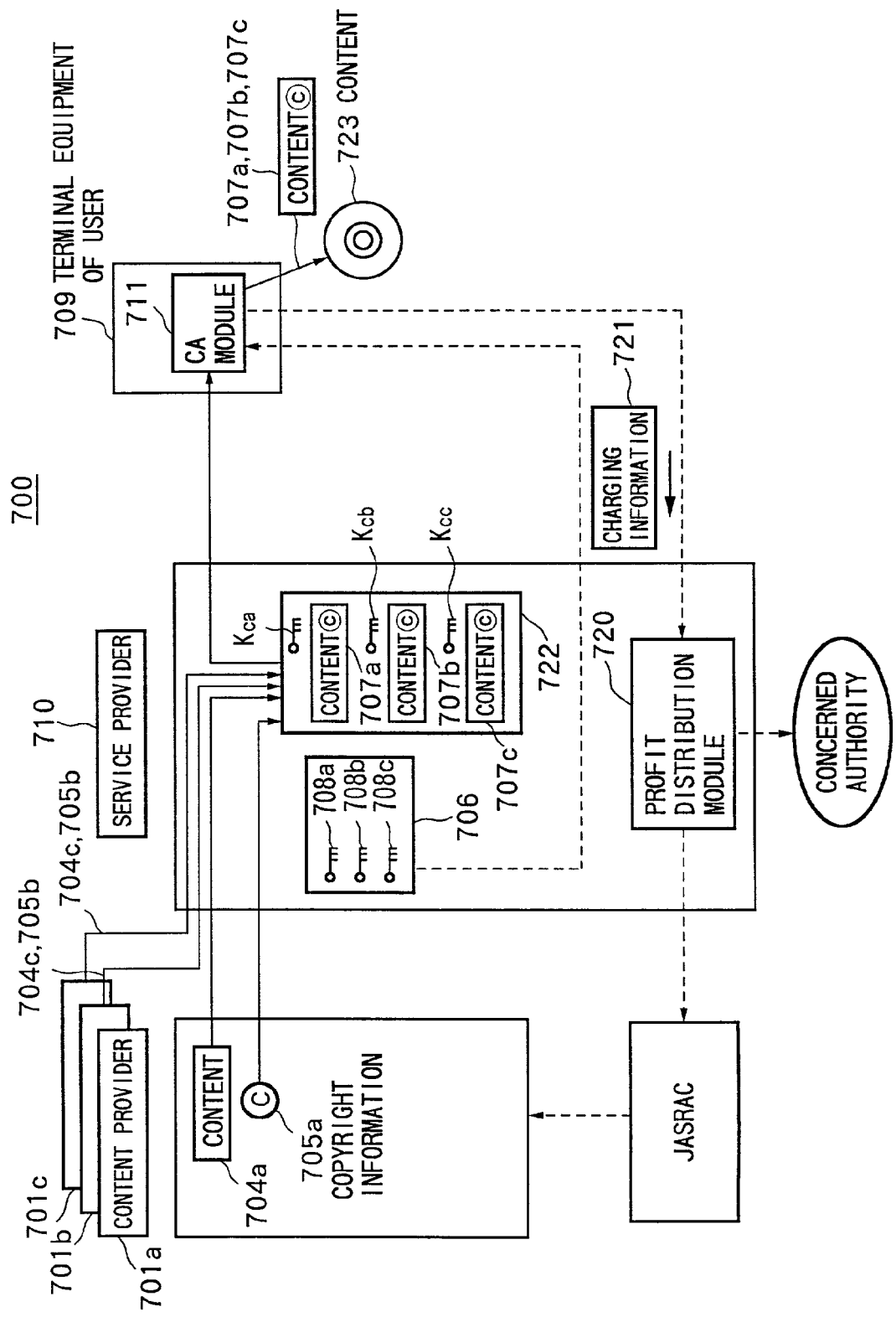
FIG. 100 is a view of the configuration of a conventional EMD system.

Further, in this case, for example, as shown in FIG. 99, it is also possible to provide the content key data Kc encrypted by the distribution key data of the EMD service centers 102 and 302 as the predetermined reliable managers from the EMD service centers 102 and 302 to the user home networks 103 and 303.

CAPABILITY OF UTILIZATION IN INDUSTRY

As explained above, according to the present invention, the profit of related parties of the data providing apparatus is suitably protected.

Also, according to the present invention, the illicit tampering with the usage control policy data etc. can be suitably avoided.

Further, according to the present invention, the load of the inspection for protecting the profit of the related parties of the data providing apparatus can be reduced.

The invention claimed is:

1. A data providing system for distributing content data from a data providing apparatus to a data processing apparatus, wherein
   said data providing apparatus distributes a module storing the content data encrypted by using content key data, encrypted content key data, and an encrypted usage control policy data indicating handling of said content data to said data processing apparatus and
   said data processing apparatus decrypts said content key data and said usage control policy data stored in said distributed module and determines the handling of said content data based on the related decrypted usage control policy data,
   wherein said data providing apparatus performs mutual authentication with said data processing apparatus, encrypts said module using session key data obtained by said mutual authentication, and transmits said encrypted module to said data processing apparatus,
   wherein a management apparatus manages said data providing apparatus and said data processing apparatus,
   wherein said data providing apparatus sends said usage control policy data and requests said management apparatus to certify legitimacy of said usage control policy data and said management apparatus registers and services said usage control policy data from said data providing apparatus, and certifies the legitimacy of said usage control policy data in response to a request from said data providing apparatus.

2. A data providing system as set forth in claim 1, wherein:
   said data providing apparatus distributes said module storing said content key data and said usage control policy data encrypted using distribution key data to said data processing apparatus and
   said data processing apparatus decrypts said content key data and said usage control policy data stored in said distributed module using said distribution key data.

3. A data providing system as set forth in claim 2, wherein said management apparatus manages said distribution key data and distributes said distribution key data to said data providing apparatus and said data processing apparatus.

4. A data providing system as set forth in claim 3, wherein:
   said data processing apparatus determines at least one of a purchase mode and usage mode of distributed content data based on usage control policy data and transmits log data indicating a log of at least said determined purchase mode and usage mode and
   said management apparatus performs profit distribution processing for distributing profit obtained accompanied with said purchase and said usage of said content data in said data processing apparatus to related parties of said data providing apparatus based on said received log data.

5. A data providing system as set forth in claim 1, wherein said data providing apparatus generates its own signature data for at least one of said content key data and said usage control policy and distributes said module storing said generated signature data to said data processing apparatus.

6. A data providing system as set forth in claim 5, wherein said data providing apparatus generates said signature data using its own secret key data and distributes said module storing public key data corresponding to said secret key data to said data processing apparatus.

7. A data providing system as set forth in claim 6,
   wherein said management apparatus prepares public key certificate data certifying the legitimacy of said public key data, wherein
   said data providing apparatus distributes said module storing said public key certificate data to said data processing apparatus.

8. A data providing system as set forth in claim 1, wherein said data providing apparatus distributes
   a first file storing said content data and
   a second file storing said content key data and said usage control policy
   to said data processing apparatus.

9. A data providing system as set forth in claim 8, wherein said data providing apparatus generates signature data using its own secret key data for the first file and the second file and distributes said module storing said generated signature data to said data processing apparatus.

10. A data providing system as set forth in claim 9, wherein said data processing apparatus distributes said module storing public key data corresponding to said secret key data to said data processing apparatus.

11. A data providing system as set forth in claim 10, wherein said data processing apparatus verifies the legitimacy of signature data stored in said module using public key data stored in said module.

12. A data providing system as set forth in claim 1, wherein said data providing apparatus generates a storage medium storing said module.

13. A data providing system as set forth in claim 1, wherein said data processing apparatus determines at least one of a purchase mode and usage mode of said content data based on said usage control policy.

14. A data providing system as set forth in claim 1, wherein said data processing apparatus outputs said decrypted content key data and said encrypted content data to a decryption apparatus.

15. A data providing system as set forth in claim 1, wherein said data processing apparatus is comprised of a module making it difficult for the processing content, predetermined data stored in an internal memory, and data being processed from being monitored and tampered with from the outside.

16. A data providing system comprising:
   a data providing apparatus that provides a first module storing content data encrypted by using content key data, encrypted content key data, and encrypted usage control policy data indicating the handling of said content data to said data distribution apparatus,
   a data distribution apparatus that distributes a second module storing said encrypted content data, content key data, and usage control policy data stored in said provided first module to said data processing apparatus, a data processing apparatus that decrypts said content key data and said usage control policy data stored in said distributed second module and determines the handling of said content data based on the related decrypted usage control policy data, and a management apparatus that manages said data providing apparatus and said data processing apparatus, wherein said data distribution apparatus performs mutual authentication with said data processing apparatus, encrypts said second module using session key data obtained by said mutual authentication, and transmits said encrypted second module to said data processing apparatus, wherein said data providing apparatus sends said usage control policy data and requests to said management apparatus to certify legitimacy of said usage control policy data, and wherein said management apparatus registers and serves said usage control policy data from said data providing apparatus, and certifies the legitimacy of said usage control policy data in response to a request from said data providing apparatus.

17. A data providing system as set forth in claim 16, wherein said data distribution apparatus distributes a module storing price data showing a price of said content data to said data processing apparatus.

18. A data providing system as set forth in claim 17, wherein said data distribution apparatus generates signature data using its own secret key data for said price data and stores said signature data in said second module.

19. A data providing system as set forth in claim 18, wherein said data providing apparatus provides said second module storing public key data corresponding to its own secret key data to said data processing apparatus.

20. A data providing system as set forth in claim 19, wherein said data processing apparatus verifies the legitimacy of signature data stored in said second module using public key data stored in said second module.

21. A data providing system as set forth in claim 16, wherein:

said data providing apparatus provides said first module storing said content key data and said usage control policy data encrypted using distribution key data to said data distribution apparatus and said data processing apparatus decrypts said content key data and said usage control policy data stored in said distributed second module using said distribution key data.

22. A data providing system as set forth in claim 21, wherein said data providing apparatus generates its own signature data for at least one of said content key data and said usage control policy and provides said first module storing said generated signature data and storing a third module encrypted using said distribution key data to said data distribution apparatus and said data distribution apparatus stores said provided third module in said second module and distributes it to said data processing apparatus.

23. A data providing system as set forth in claim 22, wherein said data providing apparatus generates said signature data using its own secret key data and provides said third module storing public key data corresponding to said secret key data to said data distribution apparatus.

24. A data providing system as set forth in claim 23, wherein said management apparatus prepares public key certificate data certifying the legitimacy of said public key data, wherein said data providing apparatus provides said first module storing said third module storing said public key certificate data to said data distribution apparatus.

25. A data providing system as set forth in claim 21, wherein said management apparatus manages said distribution key data and distributes said distribution key data to said data providing apparatus and said data processing apparatus.

26. A data providing system as set forth in claim 25, wherein:

said data processing apparatus determines at least one of a purchase mode and usage mode of distributed content data based on usage control policy data and transmits log data indicating a log of at least said determined purchase mode and usage mode and said management apparatus performs profit distribution processing for distributing profit obtained accompanied with said purchase and said usage of said content data in said data processing apparatus to related parties of said data providing apparatus based on said received log data.

27. A data providing system as set forth in claim 16, wherein said data providing apparatus provides a first file storing said content data and a second file storing said content key data and said usage control policy to said data distribution apparatus.

28. A data providing system as set forth in claim 27, wherein said data providing apparatus generates signature data using its own secret key data for the first file and the second file and provides said first module storing said generated signature data to said data distribution apparatus.

29. A data providing system as set forth in claim 28, wherein said data distribution apparatus verifies the signature data of said first file and said second file using public key data of said data providing apparatus.

30. A data providing system as set forth in claim 27, wherein said data providing apparatus provides said first module storing link data showing a linkage of said first file and said second file to said data distribution apparatus.

31. A data providing system as set forth in claim 27, wherein said data processing apparatus provides said first module storing public key data corresponding to said secret key data to said data distribution apparatus.

32. A data providing system as set forth in claim 16, wherein said data providing apparatus generates a storage medium storing said module.

33. A data providing system as set forth in claim 16, wherein said data processing apparatus determines at least one of a purchase mode and usage mode of said content data based on said usage control policy.

34. A data providing system as set forth in claim 16, wherein said data processing apparatus outputs said decrypted content key data and said encrypted content data to a decryption apparatus.

35. A data providing system as set forth in claim 16, wherein said data processing apparatus is comprised of a module making it difficult for the processing content, predetermined data stored in an internal memory, and data being processed from being monitored and tampered with from the outside.

36. A data providing system comprising:

a data providing apparatus that provides a first module storing content data encrypted by using content key data, encrypted content key data, and encrypted usage control policy data indicating the handling of said content data to said plurality of data distribution apparatuses, a first data distribution apparatus that distributes the second module storing said encrypted content data, content key data, and usage control policy data stored in said provided first module to said data processing apparatus, a second data distribution apparatus that distributes a third module storing said encrypted content data, content key data, and usage control policy data stored in said provided first module to said data processing apparatus, a data processing apparatus that decrypts said content key data and said usage control policy data stored in said distributed second module and said third module and determines the handling of said content data based on the related decrypted usage control policy data, and a management apparatus that manages said data providing apparatus and said data processing apparatus, wherein said data distribution apparatus performs mutual authentication with said data processing apparatus, encrypts said second module using session key data obtained by said mutual authentication, and transmits said encrypted second module to said data processing apparatus, wherein said data providing apparatus sends said usage control policy data and requests to said management apparatus to certify legitimacy of said usage control policy data, and wherein said management apparatus registers and serves said usage control policy data from said data providing apparatus, and certifies the legitimacy of said usage control policy data in response to a request from said data providing apparatus.

37. A data providing system comprising:

a first data providing apparatus that provides a first module storing first content data encrypted by using first content key data, encrypted first content key data, and encrypted first usage control policy data indicating the handling of said first content data to said data distribution apparatus, a second data providing apparatus that provides a second module storing second content data encrypted by using second content key data, encrypted second content key data, and encrypted second usage control policy data indicating the handling of said second content data to said data distribution apparatus, a data distribution apparatus that distributes a third module storing said encrypted first content data, said first content key data, and said first usage control policy data stored in said provided first module and said encrypted second content data, said second content key data, and said second usage control policy data stored in said provided second module to said data processing apparatus, a data processing apparatus that decrypts said first content key data and said first usage control policy data stored in said distributed third module, determines the handling of said first content data based on the related decrypted first usage control policy data, decrypts said second content key data and said second usage control policy data stored in said distributed third module, and determines the handling of said second content data based on the related decrypted second usage control policy data, and a management apparatus that manages said first data providing apparatus and said data processing apparatus, wherein said data distribution apparatus performs mutual authentication with said data processing apparatus, encrypts said second module using session key data obtained by said mutual authentication, and transmits said encrypted second module to said data processing apparatus, wherein said first data providing apparatus sends said first usage control policy data and requests to said management apparatus to certify legitimacy of said first usage control policy data, and wherein said management apparatus registers and serves said first usage control policy data from said first data providing apparatus, and certifies the legitimacy of said first usage control policy data in response to a request from said first data providing apparatus.

38. A data providing system comprising:

a data providing apparatus that distributes content data and usage control policy data indicating the handling of the related content data to said data processing apparatus, a data processing apparatus that determines at least one of a purchase mode and a usage mode of said distributed content data based on said distributed usage control policy data and transmits log data indicating the log of at least one of the related determined purchase mode and usage mode to said management apparatus, and a management apparatus that manages said data providing apparatus and said data processing apparatus and performs profit distribution processing for distributing the profit obtained accompanied with said purchase and said usage of said content data in said data processing apparatus to related parties of said data providing apparatus based on received log data, wherein said data providing apparatus performs mutual authentication with said data processing apparatus, encrypts said module using session key data obtained by said mutual authentication, and transmits said encrypted module to said data processing apparatus, wherein said data providing apparatus sends said usage control policy data and requests to said management apparatus to certify legitimacy of said usage control policy data, and wherein said management apparatus registers and serves said usage control policy data from said data providing apparatus, and certifies the legitimacy of said usage control policy data in response to a request from said data providing apparatus.

39. A data providing system as set forth in claim 38, wherein said data providing apparatus encrypts said content data using predetermined key data and distributes it to said data processing apparatus, said data processing apparatus decrypts said received content data using said key data, and said management apparatus manages said key data.

40. A data providing system as set forth in claim 39, wherein said data providing apparatus encrypts said key data and distributes a module storing said encrypted key data, encrypted content data, and said usage control policy data to said data processing apparatus.

41. A data providing system as set forth in claim 40, wherein said management apparatus manages distribution key data and distributes said distribution key data to said data providing apparatus and said data processing apparatus, said data providing apparatus encrypts said key data and said usage control policy data using said distributed distribution key data, and said data processing apparatus decrypts said key data and said usage control policy data using said distributed distribution key data.

42. A data providing system as set forth in claim 41, wherein said management apparatus distributes a plurality of distribution key data having predetermined terms of validity to said data providing apparatus and said data processing apparatus for exactly a predetermined period.

43. A data providing system as set forth in claim 39, wherein said management apparatus authenticates the legitimacy of at least one of said usage control policy data and said key data.

44. A data providing system as set forth in claim 40, wherein
said data providing apparatus generates signature data for at least one of said encrypted content data and usage control policy data using its own secret key data and distributes a module storing said encrypted content data, said encrypted key data, said encrypted usage control policy data, and said signature data to said data processing apparatus,
said data processing apparatus verifies said signature data stored in said distributed module using public key data corresponding to said secret key data, and
said management apparatus manages said public key data.

45. A data providing system as set forth in claim 44, wherein said data providing apparatus distributes said module storing public key data corresponding to its own secret key data to said data processing apparatus.

46. A data providing system as set forth in claim 44, wherein said management apparatus distributes said module storing public key data corresponding to secret key data of said data providing apparatus to said data processing apparatus.

47. A data providing system as set forth in claim 38, wherein
said data providing apparatus generates predetermined key data and registers said generated key data to said management apparatus,
said management apparatus manages said registered key data and transmits corresponding key data to said data processing apparatus when processing for purchasing of content data is performed in said data processing apparatus, and
said data processing apparatus decrypts said received content data using said received key data.

48. A data providing system as set forth in claim 38, wherein
said management apparatus distributes distribution key data to said data providing apparatus and said data processing apparatus,
said data providing apparatus encrypts said usage control policy using said distribution key data and distributes it to said data processing apparatus, and
said data processing apparatus decrypts said received usage control policy data using said distribution key data.

49. A data providing system as set forth in claim 38, wherein said management apparatus generates settlement claim data used when claiming settlement processing in accordance with said profit distribution processing, adds signature data based on its own secret key data to said settlement claim data, and transmits it to an apparatus performing said settlement processing or said data providing apparatus.

50. A data providing system as set forth in claim 38, wherein said management apparatus performs processing for registration of said data processing apparatus, manages said registered data processing apparatus, and performs profit distribution processing based on said log data received from said registered data processing apparatus.

51. A data providing system as set forth in claim 38, wherein said data processing apparatus determines a purchase mode of said distributed content data based on said usage control policy data, generates usage control status data in accordance with said determined purchase mode, and controls usage of said distributed content data based on said usage control status data.

52. A data providing system as set forth in claim 38, wherein said data processing apparatus is comprised of a module making it difficult for the processing content, predetermined data stored in an internal memory, and data being processed from being monitored and tampered with from the outside.

53. A data providing system comprising:
a data providing apparatus that provides content data and usage control policy data indicating the handling of the related content data to said data distribution apparatus,
a data distribution apparatus that distributes said provided content data and said usage control policy data to said data processing apparatus,
a data processing apparatus that has a first module for communicating with said data distribution apparatus and a second module for determining at least one of a purchase mode and usage mode of said distributed content data based on said distributed usage control policy data and transmitting log data indicating the log of the related determined purchase mode and usage mode to said management apparatus, and
a management apparatus that manages the data providing apparatus, data distribution apparatus, and data processing apparatus and performs profit distribution processing for distributing the profit obtained accompanied with said data processing apparatus receiving said distribution of said content data and purchasing and using said content data to related parties of said data providing apparatus and said data distribution apparatus based on said log data received from said second module,
wherein said data providing apparatus performs mutual authentication with said data processing apparatus, encrypts said module using session key data obtained by said mutual authentication, and transmits said encrypted module to said data processing apparatus,
wherein said data providing apparatus sends said usage control policy data and requests to said management apparatus to certify legitimacy of said usage control policy data, and wherein said management apparatus registers and serves said usage control policy data from said data providing apparatus, and certifies the legitimacy of said usage control policy data in response to a request from said data providing apparatus.

54. A data providing system as set forth in claim 53, wherein said data providing apparatus encrypts said content data using content key data and provides it to said data distribution apparatus.

55. A data providing system as set forth in claim 53, wherein said data distribution apparatus generates price data showing the price of said distributed content data and distributes said price data to said data processing apparatus.

56. A data providing system as set forth in claim 53, wherein
said data providing apparatus encrypts said content key data and said usage control policy by using distribution key data and provides it to said data distribution apparatus, said data processing apparatus decrypts said content key data and said usage control policy using said distribution key data, and said management apparatus manages said distribution key data and distributes said distribution key data to said data providing apparatus and said data processing apparatus.

57. A data providing system as set forth in claim 54, wherein said data providing apparatus generates first signature data for at least one of said encrypted content data, said encrypted content key data, and said encrypted usage control policy data using its own first secret key data and provides a first module storing said encrypted content data, said encrypted key data, said encrypted usage control policy data, and said first signature data to said data distribution apparatus, said data distribution apparatus verifies said first signature data using first public key data corresponding to said first secret key data, then stores second signature data generated using its own second secret key data in said first module to generate a second module and distributes said second module to said data processing apparatus, said data processing apparatus verifies said first signature data stored in said distributed second module using said first public key data and verifies said second signature data stored in said distributed second module using second public key data corresponding to said second secret key data, and said management apparatus manages said first public key data and said second public key data.

58. A data providing system as set forth in claim 57, wherein said data providing apparatus provides said first module storing said first public key data to said data distribution apparatus and said data distribution apparatus distributes said second module storing said first public key data and said second public key data to said data processing apparatus.

59. A data providing system as set forth in claim 57, wherein said management apparatus distributes said first public key data and said second public key data to said data processing apparatus.

60. A data providing system as set forth in claim 53, wherein said data distribution apparatus distributes price data showing the price of said distributed content data to said data processing apparatus and said management apparatus authenticates the legitimacy of the data of at least one of key data used when encrypting said content data and said price data.

61. A data providing system as set forth in claim 53, wherein said data distribution apparatus distributes to said data processing apparatus a module storing said provided encrypted content data, said provided usage control policy data, said key data encrypting said content data, and price data showing the price of said distributed content data.

62. A data providing system as set forth in claim 53, wherein said management apparatus performs profit distribution processing for distributing profit obtained accompanied with said data processing apparatus receiving distribution of said content data and purchasing and using said content data to related parties of said data providing apparatus and said data distribution apparatus, generates settlement claim data to be used when claiming settlement, add its own signature data to said settlement claim data, and transmits this to an apparatus for performing said settlement processing.

63. A data providing system as set forth in claim 62, wherein said management apparatus transmits settlement report data showing the results of said profit distribution processing to at least one of said data providing apparatus and said data distribution apparatus.

64. A data providing system as set forth in claim 53, wherein said management apparatus performs profit distribution processing for distributing profit obtained accompanied with said data processing apparatus receiving distribution of said content data and purchasing and using said content data to related parties of said data providing apparatus and said data distribution apparatus, generates settlement claim data to be used when claiming settlement, adds its own signature data to said settlement claim data, and transmits this to at least one of said data providing apparatus and said service providing apparatus.

65. A data providing system as set forth in claim 53, wherein said management apparatus performs processing for registration of said data processing apparatus, manages said registered data processing apparatus, and performs said profit distribution processing based on said log data received from said registered data processing apparatus.

66. A data providing system as set forth in claim 53, wherein said data processing apparatus determines at least one of a purchase mode and usage mode of said distributed content data based on said usage control policy data, generates usage control status data in accordance with said determined purchase mode and usage mode, and controls usage of said distributed content data based on said usage control status data.

67. A data providing system as set forth in claim 53, wherein said second module of said data processing apparatus is a module making it difficult for the processing content, predetermined data stored in an internal memory, and data being processed from being monitored and tampered with from the outside.

68. A data providing system comprising:

a data providing apparatus that provides content data and usage control policy data indicating the handling of the related content data to said data distribution apparatus, a data distribution apparatus that distributes said provided content data and said usage control policy data to said data processing apparatus and performs charge processing concerning the distribution of said content data based on a data distribution apparatus use purchase log data received from said data processing apparatus, a data processing apparatus that has a first module for creating the data distribution apparatus use purchase log data indicating the log of the purchase of said content data distributed from said data distribution apparatus and transmitting the same to said data distribution apparatus and a second module for determining at least one of the purchase mode and the usage mode of said distributed content data based on said distributed usage control policy data and transmitting a management apparatus use log data indicating the log of the related determined purchase mode and usage mode to said management apparatus, and a management apparatus that performs profit distribution processing for distributing the profit obtained accompanied with said purchase and said usage of said content data in said data processing apparatus to related parties of said data providing apparatus and said data distribution apparatus based on said management apparatus use log data, wherein said data providing apparatus performs mutual authentication with said data processing apparatus, encrypts said module using session key data obtained by said mutual authentication, and transmits said encrypted module to said data processing apparatus, wherein said data providing apparatus sends said usage control policy data and requests to said management apparatus to certify legitimacy of said usage control policy data, and wherein said management apparatus registers and serves said usage control policy data from said data providing apparatus, and certifies the legitimacy of said usage control policy data in response to a request from said data providing apparatus.

69. A data processing apparatus for receiving the distribution of content data and usage control policy data indicating the handling of the related content data from a data providing apparatus via a data distribution apparatus and transmitting said log data to a management apparatus for performing profit distribution processing for distributing the profit obtained accompanied with the purchase and usage of the related distributed content data to related parties of said data providing apparatus and said data distribution apparatus based on said management apparatus use log data, said data processing apparatus comprising, a first module for creating data distribution apparatus use purchase log data indicating the log of the purchase of said content data distributed from said data distribution apparatus and transmitting the same to said data distribution apparatus and a second module for determining at least one of a purchase mode and usage mode of said distributed content data based on said distributed usage control policy data and transmitting said management apparatus use log data indicating the log of the related determined purchase mode and usage mode to said management apparatus, wherein said data providing apparatus performs mutual authentication with said data processing apparatus, encrypts said module using session key data obtained by said mutual authentication, and transmits said encrypted module to said data processing apparatus, wherein said data providing apparatus sends said usage control policy data and requests to said management apparatus to certify legitimacy of said usage control policy data, and wherein said management apparatus registers and serves said usage control policy data from said data providing apparatus, and certifies the legitimacy of said usage control policy data in response to a request from said data providing apparatus.

70. A data providing system comprising a data providing apparatus, data distribution apparatus, data processing apparatus, and management apparatus, wherein said data providing apparatus provides content data to said data distribution apparatus, said data distribution apparatus distributes said provided content data to said data processing apparatus, said data processing apparatus uses said distributed content data, and said management apparatus manages the operation of a data providing service by said data providing apparatus, said data distribution apparatus, and said data processing apparatus, generates signature data indicating that the related data is generated by itself by using its own secret key data when each of said data providing apparatus, said data distribution apparatus, and said data processing apparatus supplies the data to another apparatus, generates and manages public key certificate data of public key data corresponding to secret key data of said data providing apparatus, said data distribution apparatus, and said data processing apparatus when the legitimacy of the signature data corresponding to the data is verified by using the public key data of the related other apparatus when receiving the supply of the related data from the other apparatus, registers and serves usage control policy data indicating the handling of the related content data from said data providing apparatus, and certifies the legitimacy of said usage control policy data in response to a request from said data providing apparatus, and wherein said data providing apparatus, said data distribution apparatus, and said data processing apparatus acquire said their own public key certificate data from said management apparatus before communicating with the other apparatus and transmit the related acquired public key certificate data to said other apparatus wherein said data providing apparatus performs mutual authentication with said data processing apparatus, encrypts said module using session key data obtained by said mutual authentication, and transmits said encrypted module to said data processing apparatus.

71. A data providing system comprising a data providing apparatus, data distribution apparatus, data processing apparatus, and management apparatus, wherein said data providing apparatus provides content data to said data distribution apparatus, said data distribution apparatus distributes said provided content data to said data processing apparatus, said data processing apparatus uses said distributed content data, and said management apparatus manages the operation of a data providing service by said data providing apparatus, said data distribution apparatus, and said data processing apparatus, generates the signature data indicating that the related data is generated by itself by using its own secret key data when each of said data providing apparatus, said data distribution apparatus, and said data processing apparatus supplies data to another apparatus, generates and manages public key certificate data of public key data corresponding to secret key data of said data providing apparatus, said data distribution apparatus, and said data processing apparatus when the legitimacy of the signature data corresponding to the data is verified by using the public key data of the related other apparatus when receiving the supply of the related data from the other apparatus, registers and serves usage control policy data indicating the handling of the related content data from said data providing apparatus, and certifies the legitimacy of said usage control policy data in response to a request from said data providing apparatus, wherein said data providing apparatus performs mutual authentication with said data processing apparatus, encrypts said module using session key data obtained by said mutual authentication, and transmits said encrypted module to said data processing apparatus, and wherein said data providing apparatus, said data distribution apparatus, and said data processing apparatus acquire their own public key certificate data from said management apparatus before communicating with the other apparatus and transmit the related acquired public key certificate data to said other apparatus at said communication.

72. A data providing system comprising a data providing apparatus, data distribution apparatus, data processing apparatus, and management apparatus, wherein:

said data providing apparatus provides content data to said data distribution apparatus, said data distribution apparatus distributes said provided content data to said data processing apparatus, said data processing apparatus uses said distributed content data, and said management apparatus manages the operation of a data providing service by said data providing apparatus, said data distribution apparatus, and said data processing apparatus, generates signature data indicating that the related data is generated by itself by using its own secret key data when each of said data providing apparatus, said data distribution apparatus, and said data processing apparatus supplies data to another apparatus, generates and manages public key certificate data of public key data corresponding to secret key data of said data providing apparatus, said data distribution apparatus, and said data processing apparatus when the legitimacy of the signature data corresponding to the data is verified by using the public key data of the related other apparatus when receiving the supply of the related data from the other apparatus, generates public key certificate revocation list for specifying public key certificate data to be invalidated among said generated public key certificate data and thereby to restrict said communication or said distribution using public key certificate data specified by said public key certificate revocation list by said data providing apparatus, said data distribution apparatus, and said data processing apparatus, registers and serves usage control policy data indicating the handling of the related content data from said data providing apparatus, and certifies the legitimacy of said usage control policy data in response to a request from said data providing apparatus wherein said data providing apparatus performs mutual authentication with said data processing apparatus, encrypts said module using session key data obtained by said mutual authentication, and transmits said encrypted module to said data processing apparatus.

73. A data providing system as set forth in claim 72, wherein said management apparatus generates public key certificate revocation list specifying public key certificate data corresponding to said data providing apparatus, said data distribution apparatus, and said data processing apparatus used for illegal actions.

74. A data providing system comprising a data providing apparatus, data distribution apparatus, data processing apparatus, and management apparatus, wherein:

said data providing apparatus provides content data to said data distribution apparatus, said data distribution apparatus distributes said provided content data to said data processing apparatus, said management apparatus manages the operation of a data providing service by said data providing apparatus, said data distribution apparatus, and said data processing apparatus, generates signature data indicating that the related data is generated by an apparatus itself by using its own secret key data when said data providing apparatus supplies data to another apparatus, generates and manages public key certificate data of public key data corresponding to secret key data of said data providing apparatus for when another apparatus verifies the legitimacy of the related signature data by using the public key data corresponding to said secret key data, generates public key certificate revocation list for specifying public key certificate data to be invalidated among said generated public key certificate data, distributes the related public key certificate revocation list to said data processing apparatus, registers and serves usage control policy data indicating the handling of the related content data from said data providing apparatus, and certifies the legitimacy of said usage control policy data in response to a request from said data providing apparatus, and said data processing apparatus verifies whether or not public key certificate data of said data providing apparatus providing said distributed content data is invalid based on said public key certificate revocation list distributed from said management apparatus and controls the usage of said distributed content data based on the result of the related verification wherein said data providing apparatus performs mutual authentication with said data processing apparatus, encrypts said module using session key data obtained by said mutual authentication, and transmits said encrypted module to said data processing apparatus.

75. A data providing system as set forth in claim 74, wherein said management apparatus directly distributes said public key certificate revocation list to said data processing apparatus.

76. A data providing system as set forth in claim 74, wherein said management apparatus distributes said public key certificate revocation list to said data processing apparatus through said data distribution apparatus, by broadcasting, or by an on-demand system.

77. A data providing system comprising a data providing apparatus, data distribution apparatus, data processing apparatus, and management apparatus, wherein:

said management apparatus manages the operation of a data providing service by said data providing apparatus, said data distribution apparatus, and said data processing apparatus, generates signature data indicating that the related data is generated by an apparatus itself by using its own secret key data when said data providing apparatus supplies data to another apparatus, generates and manages public key certificate data of public key data corresponding to secret key data of said data providing apparatus for when another apparatus verifies the legitimacy of the related signature data by using the public key data corresponding to said secret key data, generates public key certificate revocation list for specifying public key certificate data to be invalidated among said generated public key certificate data, distributes the related public key certificate revocation list to said data distribution apparatus, registers and serves usage control policy data indicating the handling of the related content data from said data providing apparatus, and certifies the legitimacy of said usage control policy data in response to a request from said data providing apparatus, and said data distribution apparatus verifies whether or not public key certificate data of said data providing apparatus providing said provided content data is invalid based on said public key certificate revocation list distributed from said management apparatus, and controls the distribution of said provided content data to said data processing apparatus based on the result of the related verification wherein said data providing apparatus performs mutual authentication with said data processing apparatus, encrypts said module using session key data obtained by said mutual authentication, and transmits said encrypted module to said data processing apparatus.

78. A data providing system comprising a data providing apparatus, data distribution apparatus, data processing apparatus, and management apparatus, wherein:

said management apparatus manages the operation of a data providing service by said data providing apparatus, said data distribution apparatus, and said data processing apparatus, generates signature data indicating that the related data is generated by an apparatus itself by using its own secret key data when said data distribution apparatus supplies data to another apparatus, generates and manages public key certificate data of public key data corresponding to secret key data of said data distribution apparatus for when another apparatus verifies the legitimacy of the related signature data by using the public key data corresponding to said secret key data, generates public key certificate revocation list for specifying public key certificate data to be invalidated among said generated public key certificate data, distributes the related public key certificate revocation list to said data providing apparatus, registers and serves usage control policy data indicating the handling of the related content data from said data providing apparatus, and certifies the legitimacy of said usage control policy data in response to a request from said data providing apparatus, said data providing apparatus verifies whether or not public key certificate data of the data distribution apparatus of the destination of provision of the content data is invalid and controls the provision of said content data to said data distribution apparatus based on the result of the related verification, said data distribution apparatus distributes said provided content data to said data processing apparatus, and said data processing apparatus uses said distributed content data wherein said data providing apparatus performs mutual authentication with said data processing apparatus, encrypts said module using session key data obtained by said mutual authentication, and transmits said encrypted module to said data processing apparatus.

79. A data providing system comprising a data providing apparatus, data distribution apparatus, data processing apparatus, and management apparatus, wherein:

said management apparatus manages the operation of a data providing service by said data providing apparatus, said data distribution apparatus, and said data processing apparatus, generates signature data indicating that the related data is generated by an apparatus itself by using its own secret key data when said data distribution apparatus supplies data to another apparatus, generates and manages public key certificate data of public key data corresponding to secret key data of said data distribution apparatus for when another apparatus verifies the legitimacy of the related signature data by using the public key data corresponding to said secret key data, generates public key certificate revocation list for specifying public key certificate data to be invalidated among said generated public key certificate data, distributes the related public key certificate revocation list to said data distribution apparatus, registers and serves usage control policy data indicating the handling of the related content data from said data providing apparatus, and certifies the legitimacy of said usage control policy data in response to a request from said data providing apparatus, said data providing apparatus provides content data to said data distribution apparatus, said data distribution apparatus distributes said provided content data and said distributed public key certificate revocation list to said data processing apparatus, and said data processing apparatus verifies whether or not public key certificate data of said data distribution apparatus distributing said distributed content data is invalid based on said distributed public key certificate revocation list and controls the usage of said distributed content data based on the result of the related verification wherein said data providing apparatus performs mutual authentication with said data processing apparatus, encrypts said module using session key data obtained by said mutual authentication, and transmits said encrypted module to said data processing apparatus.

80. A data providing system as set forth in claim 79, wherein said data distribution apparatus has a configuration which makes it difficult to tamper with said public key certificate revocation list distributed from said management apparatus.

81. A data providing system as set forth in claim 79, wherein said management apparatus encrypts said public key certificate revocation list using distribution key data and distributes it to said data distribution apparatus and distributes said distribution key data to said data processing apparatus and said data processing apparatus decrypts said distributed public key certificate revocation list using said distribution key data.

82. A data providing system as set forth in claim 79, wherein said data distribution apparatus distributes said public key certificate revocation list to said data processing apparatus by broadcasting or by an on-demand system.

83. A data providing method as set forth in claim 79, wherein said data distribution apparatus distributes said public key certificate revocation list to said data processing apparatus by broadcasting or by an on-demand system.

84. A data providing system comprising a data providing apparatus, data distribution apparatus, data processing apparatus, and management apparatus, wherein:

said management apparatus manages the operation of a data providing service by said data providing apparatus, said data distribution apparatus, and said data processing apparatus, generates signature data indicating that the related data is generated by an apparatus itself by using its own secret key data when said data distribution apparatus supplies data to another apparatus, generates and manages public key certificate data of public key data corresponding to secret key data of said data distribution apparatus for when another apparatus verifies the legitimacy of the related signature data by using public key data corresponding to said secret key data, generates public key certificate revocation list for specifying public key certificate data to be invalidated among said generated public key certificate data, distributes the related public key certificate revocation list to said data processing apparatus, registers and serves usage control policy data indicating the handling of the related content data from said data providing apparatus, and certifies the legitimacy of said usage control policy data in response to a request from said data providing apparatus, said data providing apparatus provides content data to said data distribution apparatus, said data distribution apparatus distributes said provided content data to said data processing apparatus, and said data processing apparatus verifies whether or not public key certificate data of said data distribution apparatus distributing said distributed content data is invalid based on said distributed public key certificate revocation list and controls the usage of said distributed content data based on the result of the related verification wherein said data providing apparatus performs mutual authentication with said data processing apparatus, encrypts said module using session key data obtained by said mutual authentication, and transmits said encrypted module to said data processing apparatus.

85. A data providing system comprising a data providing apparatus, data distribution apparatus, data processing apparatus, and management apparatus, wherein:

said management apparatus manages the operation of a data providing service by said data providing apparatus, said data distribution apparatus, and said data processing apparatus, generates signature data indicating that the related data is generated by an apparatus itself by using its own secret key data when said data distribution apparatus supplies data to another apparatus, generates and manages public key certificate data of public key data corresponding to secret key data of said data distribution apparatus for when another apparatus verifies the legitimacy of the related signature data by using public key data corresponding to said secret key data, generates public key certificate revocation list for specifying public key certificate data to be invalidated among said generated public key certificate data, distributes the related public key certificate revocation list to said data providing apparatus, registers and serves usage control policy data indicating the handling of the related content data from said data providing apparatus, and certifies the legitimacy of said usage control policy data in response to a request from said data providing apparatus, said data providing apparatus provides content data and said public key certificate revocation list to said data distribution apparatus, said data distribution apparatus distributes said provided content data and public key certificate revocation list to said data processing apparatus said data providing apparatus performs mutual authentication with said data processing apparatus, encrypts said module using session key data obtained by said mutual authentication, and transmits said encrypted module to said data processing apparatus, and said data processing apparatus verifies whether or not public key certificate data of said data distribution apparatus distributing said distributed content data is invalid based on said distributed public key certificate revocation list and controls the usage of said distributed content data based on the result of the related verification.

86. A data providing system comprising a data providing apparatus, data distribution apparatus, a plurality of data processing apparatuses, and a management apparatus, wherein:

said management apparatus manages the operation of a data providing service by said data providing apparatus, said data distribution apparatus, and said data processing apparatuses, generates signature data indicating that the related data is generated by an apparatus itself by using its own secret key data when a data processing apparatus supplies data to another apparatus, generates and manages public key certificate data of public key data corresponding to secret key data of said data processing apparatuses for when another apparatus verifies the legitimacy of the related signature data by using the public key data corresponding to said secret key data, generates public key certificate revocation list for specifying public key certificate data to be invalidated among said generated public key certificate data, distributes the related public key certificate revocation list to said data providing apparatus, registers and serves usage control policy data indicating the handling of the related content data from said data providing apparatus, and certifies the legitimacy of said usage control policy data in response to a request from said data providing apparatus, said data providing apparatus provides content data and said public key certificate revocation list to said data distribution apparatus, said data providing apparatus performs mutual authentication with said data processing apparatus, encrypts said module using session key data obtained by said mutual authentication, and transmits said encrypted module to said data processing apparatus, said data distribution apparatus distributes said provided content data and public key certificate revocation list to said data processing apparatuses, and said data processing apparatuses verify whether or not public key certificate data of said other data processing apparatuses are invalid based on the public key certificate revocation list distributed from said data distribution apparatus and control the communication with other data processing apparatuses based on the result of the related verification.

87. A data providing system as set forth in claim 86, wherein said data distribution apparatus has a configuration which makes it difficult to tamper with said public key certificate revocation list distributed from said management apparatus.

88. A data providing system as set forth in claim 86, wherein said management apparatus encrypts said public key certificate revocation list using distribution key data and distributes it to said data distribution apparatus and distributes said distribution key data to said data processing apparatus and said data processing apparatus decrypts said distributed public key certificate revocation list using said distribution key data.

89. A data providing system comprising a data providing apparatus, data distribution apparatus, a plurality of data processing apparatuses, and a management apparatus, wherein:

said management apparatus manages the operation of a data providing service by said data providing apparatus, said data distribution apparatus, and said data processing apparatuses, generates signature data indicating that the related data is generated by an apparatus itself by using its own secret key data when a data processing apparatus supplies data to another apparatus, generates and manages public key certificate data of public key data corresponding to secret key data of said data processing apparatuses for when another apparatus verifies the legitimacy of the related signature data by using the public key data corresponding to said secret key data, generates public key certificate revocation list for specifying public key certificate data to be invalidated among said generated public key certificate data, distributes the related public key certificate revocation list to said data providing apparatus, registers and serves usage control policy data indicating the handling of the related content data from said data providing apparatus, and certifies the legitimacy of said usage control policy data in response to a request from said data providing apparatus, said data providing apparatus provides content data to said data distribution apparatus, said data providing apparatus performs mutual authentication with said data processing apparatus, encrypts said module using session key data obtained by said mutual authentication, and transmits said encrypted module to said data processing apparatus, said data distribution apparatus distributes said provided content data and said distributed public key certificate revocation list to said data processing apparatuses, and said data processing apparatuses verify whether or not public key certificate data of other data processing apparatuses are invalid based on the public key certificate revocation list distributed from said data distribution apparatus, and control the communication with other data processing apparatuses based on the result of the related verification.

90. A data providing system as set forth in claim 89, wherein said data distribution apparatus has a configuration which makes it difficult to tamper with said public key certificate revocation list distributed from said management apparatus.

91. A data providing system as set forth in claim 89, wherein said management apparatus encrypts said public key certificate revocation list using distribution key data and distributes it to said data distribution apparatus and distributes said distribution key data to said data processing apparatus and said data processing apparatus decrypts said distributed public key certificate revocation list using said distribution key data.

92. A data providing system comprising a data providing apparatus, data distribution apparatus, a plurality of data processing apparatuses, and a management apparatus, wherein:

a data processing apparatus supplies registration data, indicating an already registered data processing apparatus connected in a predetermined network to which is connected, to said management apparatus, refers to a revocation flag in registration data supplied from said management apparatus and restricts communication with another data processing apparatus having public key certificate data indicated as invalid by the revocation flag, said management apparatus manages the operation of a data providing service by said data providing apparatus, said data distribution apparatus, and said data processing apparatuses, generates and manages public key certificate data of public key data corresponding to secret key data for when a data processing apparatus generates signature data indicating legitimacy of data using its own secret key data when supplying data to another apparatus, generates public key certificate revocation list for specifying public key certificate data to be invalidated among said generated public key certificate data, stores the related public key certificate revocation list, generates new registration data by setting said revocation flag in said registration data supplied from data processing apparatuses based on the related public key certificate revocation list, distributes the related generated registration data to said data processing apparatuses, registers and serves usage control policy data indicating the handling of the related content data from said data providing apparatus, and certifies the legitimacy of said usage control policy data in response to a request from said data providing apparatus, said data providing apparatus provides content data to said data distribution apparatus, said data providing apparatus performs mutual authentication with said data processing apparatus, encrypts said module using session key data obtained by said mutual authentication, and transmits said encrypted module to said data processing apparatus, and said data distribution apparatus distributes said provided content data to said data processing apparatuses.

93. A data providing system comprising a data providing apparatus, data distribution apparatus, a plurality of data processing apparatuses, and a management apparatus, wherein:

said management apparatus manages the operation of a data providing service by said data providing apparatus, said data distribution apparatus, and said data processing apparatuses, generates and manages public key certificate data of public key data corresponding to said secret key data for when a data processing apparatus generates signature data indicating the legitimacy of data by using its own secret key data when supplying the related data to another apparatus, generates public key certificate revocation list for specifying public key certificate data to be invalidated among said generated public key certificate data, distributes the related public key certificate revocation list to said data providing apparatus, registers and serves usage control policy data indicating the handling of the related content data from said data providing apparatus, and certifies the legitimacy of said usage control policy data in response to a request from said data providing apparatus, said data providing apparatus provides content data and said public key certificate revocation list to said data distribution apparatus, said data distribution apparatus distributes said provided content data and said public key certificate revocation list to said data processing apparatuses, said data providing apparatus performs mutual authentication with said data processing apparatus, encrypts said module using session key data obtained by said mutual authentication, and transmits said encrypted module to said data processing apparatus, and a data processing apparatus sets a revocation flag in registration data indicating an already registered data processing apparatus connected in a predetermined network to which it is connected based on said distributed public key certificate revocation list and restricts communication with another data processing apparatus having public key certificate data indicated as invalid by the related revocation flag.

94. A data providing system comprising a data providing apparatus, data distribution apparatus, a plurality of data processing apparatuses, and a management apparatus, wherein:

said management apparatus manages the operation of a data providing service by said data providing apparatus, said data distribution apparatus, and said data processing apparatuses, generates and manages public key certificate data of public key data corresponding to secret key data for when a data processing apparatus generates signature data indicating the legitimacy of the data by using its own secret key data when supplying the related data to another apparatus, generates public key certificate revocation list for specifying public key certificate data to be invalidated among said generated public key certificate data, distributes the related public key certificate revocation list to said data distribution apparatus, registers and serves usage control policy data indicating the handling of the related content data from said data providing apparatus, and certifies the legitimacy of said usage control policy data in response to a request from said data providing apparatus, said data providing apparatus provides content data to said data distribution apparatus, said data distribution apparatus distributes said provided content data and said public key certificate revocation list to said data processing apparatuses, said data providing apparatus performs mutual authentication with said data processing apparatus, encrypts said module using session key data obtained by said mutual authentication, and transmits said encrypted module to said data processing apparatus, and a data processing apparatus sets a revocation flag in registration data indicating an already registered data processing apparatus connected in a predetermined network to which it is connected based on said distributed public key certificate revocation list and restricts communication with another data processing apparatus having public key certificate data indicated as invalid by the related revocation flag.

95. A data providing system comprising:

a data providing apparatus that provides content data and usage control policy data indicating the handling of the related content data to said data distribution apparatus, a data distribution apparatus that distributes said provided content data and said usage control policy data to said data processing apparatus, a data processing apparatus that has a first module for communicating with said data distribution apparatus and a second module for determining at least one of a purchase mode and usage mode of said distributed content data based on said distributed usage control policy data and transmitting log data indicating the log of the related determined purchase mode and usage mode to said management apparatus, a management apparatus that manages the data providing apparatus, data distribution apparatus, and data processing apparatus and has a settlement function for performing profit distribution processing for distributing the profit obtained accompanied with said data processing apparatus receiving distribution of said content data and purchasing and using said content data to related parties of said data providing apparatus and said data distribution apparatus based on said log data received from said second module and performing settlement based on the result of the related profit distribution processing and a right management function for registering said usage control policy data, wherein said data providing apparatus sends said usage control policy data and requests to said management apparatus to certify legitimacy of said usage control policy data, and wherein said management apparatus registers and serves said usage control policy data from said data providing apparatus, and certifies the legitimacy of said usage control policy data in response to a request from said data providing apparatus wherein said data providing apparatus performs mutual authentication with said data processing apparatus, encrypts said module using session key data obtained by said mutual authentication, and transmits said encrypted module to said data processing apparatus.

96. A data providing system as set forth in claim 95, wherein said management apparatus has a first management apparatus having a settlement function and a second management apparatus having a right management function.

97. A data providing system as set forth in claim 95, wherein said settlement is electronic settlement.

98. A data providing system comprising:

a data providing apparatus that provides content data and usage control, policy data indicating the handling of the related content data to said data distribution apparatus, a data distribution apparatus that has a charging function for performing settlement processing by using settlement claim data distributed from said management apparatus and distributes said provided content data and said usage control policy data to said data processing apparatus, a data processing apparatus that has a first module for communicating with said data distribution apparatus and a second module for determining at least one of a purchase mode and usage mode of said distributed content data based on said distributed usage control policy data and transmitting log data indicating the log of the related determined purchase mode and usage mode to said management apparatus, a management apparatus that manages the data providing apparatus, data distribution apparatus, and data processing apparatus and has a settlement claim data creation function for performing profit distribution processing for distributing the profit obtained accompanied with said data processing apparatus receiving distribution of said content data and purchasing and using said content data to related parties of said data providing apparatus and said data distribution apparatus based on said log data received from said second module, creating settlement claim data used when performing settlement based on the result of the related profit distribution processing, and supplying the same to said data distribution apparatus and a right management function for registering said usage control policy data, wherein said data providing apparatus performs mutual authentication with said data processing apparatus, encrypts said module using session key data obtained by said mutual authentication, and transmits said encrypted module to said data processing apparatus, wherein said data providing apparatus sends said usage control policy data and requests to said management apparatus to certify legitimacy of said usage control policy data, and wherein said management apparatus registers and serves said usage control policy data from said data providing apparatus, and certifies the legitimacy of said usage control policy data in response to a request from said data providing apparatus.

99. A data providing system comprising:

a data providing apparatus that has a charging function for performing settlement processing by using settlement claim data distributed from said management apparatus and provides content data and usage control policy data indicating the handling of the related content data to said data distribution apparatus, a data distribution apparatus that distributes said provided content data and said usage control policy data to said data processing apparatus, a data processing apparatus that has a first module for communicating with said data distribution apparatus and a second module for determining at least one of a purchase mode and usage mode of said distributed content data based on said distributed usage control policy data and transmitting log data indicating the log of the related determined purchase mode and usage mode to said management apparatus, a management apparatus that manages the data providing apparatus, data distribution apparatus, and data processing apparatus and has a settlement claim data creation function for performing profit distribution processing for distributing the profit obtained accompanied with said data processing apparatus receiving said distribution of said content data and purchasing and using said content data to related parties of said data providing apparatus and said data distribution apparatus based on said log data received from said second module, creating settlement claim data used when performing settlement based on the result of the related profit distribution processing, and distributing the same to said data providing apparatus and a right management function for registering said usage control policy data, wherein said data providing apparatus performs mutual authentication with said data processing apparatus, encrypts said module using session key data obtained by said mutual authentication, and transmits said encrypted module to said data processing apparatus wherein said data providing apparatus sends said usage control policy data and requests to said management apparatus to certify legitimacy of said usage control policy data, and wherein said management apparatus registers and serves said usage control policy data from said data providing apparatus, and certifies the legitimacy of said usage control policy data in response to a request from said data providing apparatus.

100. A data providing method using a data providing apparatus, data distribution apparatus, data processing apparatus, and management apparatus comprising the steps of:

providing content data and usage control policy data indicating the handling of the related content data from said data providing apparatus to said data distribution apparatus, performing mutual authentication with said data processing apparatus, encrypting said module using session key data obtained by said mutual authentication, and transmitting said encrypted module to said data processing apparatus, distributing said content data and said usage control policy data provided from said data distribution apparatus to said data processing apparatus to said data processing apparatus, generating data distribution apparatus use purchase log data indicating the log of the purchase of said content data distributed from said data distribution apparatus and transmitting the same to said data distribution apparatus, determining at least one of a purchase mode and usage mode of said distributed content data based on said distributed usage control policy data, and transmitting management apparatus use log data indicating the log of the related determined purchase mode and usage mode to said management apparatus at said data processing apparatus, distributing the profit obtained accompanied with said purchase and said usage of said content data in said data processing apparatus to related parties of said data providing apparatus and said data distribution apparatus based on said management apparatus use log data at said management apparatus, registering and serving said usage control policy data from said data providing apparatus, certifies the legitimacy of said usage control policy data in response to a request from said data providing apparatus, and performing charging processing concerning the distribution of said content data based on the data distribution apparatus use purchase log data received from said data processing apparatus at said data distribution apparatus.

101. A data providing method using a data providing apparatus, data distribution apparatus, data processing apparatus, and management apparatus to provide content data, wherein said data providing apparatus provides content data to said data distribution apparatus, said data distribution apparatus distributes said provided content data to said data processing apparatus, said data providing apparatus performs mutual authentication with said data processing apparatus, encrypts said module using session key data obtained by said mutual authentication, and transmits said encrypted module to said data processing apparatus, and said data processing apparatus manages the operation of a data provision service by said data providing apparatus, data distribution apparatus, and data processing apparatus, and said management apparatus manages operation of a data providing service by said data providing apparatus, said data distribution apparatus, and said data processing apparatus, registers and serves usage control policy data indicating the handling of the related content data from said data providing apparatus, and certifies the legitimacy of said usage control policy data in response to a request from said data providing apparatus, and wherein the transmission of data among said data providing apparatus, said data distribution apparatus, said data processing apparatus, and said management apparatus is carried out by using mutual authentication using a public key encryption method, signature creation, signature verification, and encryption of data by a common key encryption method.

102. A data providing method using a data providing apparatus, data distribution apparatus, data processing apparatus, and management apparatus to provide content data, wherein said data providing apparatus provides content data to said data distribution apparatus, said data providing apparatus performs mutual authentication with said data processing apparatus, encrypts said module using session key data obtained by said mutual authentication, and transmits said encrypted module to said data processing apparatus, said data distribution apparatus distributes said provided content data to said data processing apparatus, said data processing apparatus uses said distributed content data, and said management apparatus manages the operation of a data providing service by said data providing apparatus, said data distribution apparatus, and said data processing apparatus, generates signature data indicating that the related data is generated by itself by using its own secret key data when each of said data providing apparatus, said data distribution apparatus, and said data processing apparatus supplies the data to another apparatus, generates and manages public key certificate data of public key data corresponding to secret key data of said data providing apparatus, said data distribution apparatus, and said data processing apparatus when the legitimacy of the signature data corresponding to the data is verified by using the public key data of the related other apparatus when receiving the supply of the related data from the other apparatus, registers and serves usage control policy data indicating the handling of the related content data from said data providing apparatus, and certifies the legitimacy of said usage control policy data in response to a request from said data providing apparatus, and wherein said data providing apparatus, said data distribution apparatus, and said data processing apparatus acquire said their own public key certificate data from said management apparatus before communicating with the other apparatus and transmit the related acquired public key certificate data to said other apparatus.

103. A data providing method using a data providing apparatus, data distribution apparatus, data processing apparatus, and management apparatus to provide content data, wherein said data providing apparatus provides content data to said data distribution apparatus, said data distribution apparatus distributes said provided content data to said data processing apparatus, said data providing apparatus performs mutual authentication with said data processing apparatus, encrypts said module using session key data obtained by said mutual authentication, and transmits said encrypted module to said data processing apparatus, said data processing apparatus uses said distributed content data, and said management apparatus manages the operation of a data providing service by said data providing apparatus, said data distribution apparatus, and said data processing apparatus, generates the signature data indicating that the related data is generated by itself by using its own secret key data when each of said data providing apparatus, said data distribution apparatus, and said data processing apparatus supplies data to another apparatus, generates and manages public key certificate data of public key data corresponding to secret key data of said data providing apparatus, said data distribution apparatus, and said data processing apparatus when the legitimacy of the signature data corresponding to the data is verified by using the public key data of the related other apparatus when receiving the supply of the related data from the other apparatus, registers and serves usage control policy data indicating the handling of the related content data from said data providing apparatus, and certifies the legitimacy of said usage control policy data in response to a request from said data providing apparatus, and wherein said data providing apparatus, said data distribution apparatus, and said data processing apparatus acquire their own public key certificate data from said management apparatus when communicating with the other apparatus and transmit the related acquired public key certificate data to said other apparatus at said communication.

104. A data providing method using a data providing apparatus, data distribution apparatus, data processing apparatus, and management apparatus to provide content data, wherein:

said data providing apparatus provides content data to said data distribution apparatus, said data distribution apparatus distributes said provided content data to said data processing apparatus, said data processing apparatus uses said distributed content data, said data providing apparatus performs mutual authentication with said data processing apparatus, encrypts said module using session key data obtained by said mutual authentication, and transmits said encrypted module to said data processing apparatus, and said management apparatus manages the operation of a data providing service by said data providing apparatus, said data distribution apparatus, and said data processing apparatus, generates signature data indicating that the related data is generated by itself by using its own secret key data when each of said data providing apparatus, said data distribution apparatus, and said data processing apparatus supplies data to another apparatus, generates and manages public key certificate data of public key data corresponding to secret key data of said data providing apparatus, said data distribution apparatus, and said data processing apparatus when the legitimacy of the signature data corresponding to the data is verified by using the public key data of the related other apparatus when receiving the supply of the related data from the other apparatus, generates public key certificate revocation list for specifying public key certificate data to be invalidated among said generated public key certificate data and thereby to restrict said communication or said distribution using public key certificate data specified by said public key certificate revocation list by said data providing apparatus, said data distribution apparatus, and said data processing apparatus, registers and serves usage control policy data indicating the handling of the related content data from said data providing apparatus, and certifies the legitimacy of said usage control policy data in response to a request from said data providing apparatus.

105. A data providing method as set forth in claim 104, wherein said management apparatus generates public key certificate revocation list specifying public key certificate data corresponding to said data providing apparatus, said data distribution apparatus, and said data processing apparatus used for illegal actions.

106. A data providing method using a data providing apparatus, data distribution apparatus, data processing apparatus, and management apparatus to provide content data, wherein:

said data providing apparatus provides content data to said data distribution apparatus, said data distribution apparatus distributes said provided content data to said data processing apparatus, said data providing apparatus performs mutual authentication with said data processing apparatus, encrypts said module using session key data obtained by said mutual authentication, and transmits said encrypted module to said data processing apparatus, said management apparatus manages the operation of a data providing service by said data providing apparatus, said data distribution apparatus, and said data processing apparatus, generates signature data indicating that the related data is generated by an apparatus itself by using its own secret key data when said data providing apparatus supplies data to another apparatus, generates and manages public key certificate data of public key data corresponding to secret key data of said data providing apparatus for when another apparatus verifies the legitimacy of the related signature data by using the public key data corresponding to said secret key data, generates public key certificate revocation list for specifying public key certificate data to be invalidated among said generated public key certificate data, distributes the related public key certificate revocation list to said data processing apparatus, registers and serves usage control policy data indicating the handling of the related content data from said data providing apparatus, and certifies the legitimacy of said usage control policy data in response to a request from said data providing apparatus, and said data processing apparatus verifies whether or not public key certificate data of said data providing apparatus providing said distributed content data is invalid based on said public key certificate revocation list distributed from said management apparatus and controls the usage of said distributed content data based on the result of the related verification.

107. A data providing method as set forth in claim 106, wherein said management apparatus directly distributes said public key certificate revocation list to said data processing apparatus.

108. A data providing method as set forth in claim 106, wherein said management apparatus distributes said public key certificate revocation list to said data processing apparatus through said data distribution apparatus, by broadcasting, or by an on-demand system.

109. A data providing method using a data providing apparatus, data distribution apparatus, data processing apparatus, and management apparatus to provide content data, wherein:

said management apparatus manages the operation of a data providing service by said data providing apparatus, said data distribution apparatus, and said data processing apparatus, generates signature data indicating that the related data is generated by an apparatus itself by using its own secret key data when said data providing apparatus supplies data to another apparatus, generates and manages public key certificate data of public key data corresponding to secret key data of said data providing apparatus for when another apparatus verifies the legitimacy of the related signature data by using the public key data corresponding to said secret key data, generates public key certificate revocation list for specifying public key certificate data to be invalidated among said generated public key certificate data, distributes the related public key certificate revocation list to said data distribution apparatus, registers and serves usage control policy data indicating the handling of the related content data from said data providing apparatus, and certifies the legitimacy of said usage control policy data in response to a request from said data providing apparatus, said data providing apparatus performs mutual authentication with said data processing apparatus, encrypts said module using session key data obtained by said mutual authentication, and transmits said encrypted module to said data processing apparatus, and said data distribution apparatus verifies whether or not public key certificate data of said data providing apparatus providing said provided content data is invalid based on said public key certificate revocation list distributed from said management apparatus, and controls the distribution of said provided content data to said data processing apparatus based on the result of the related verification.

110. A data providing method using a data providing apparatus, data distribution apparatus, data processing apparatus, and management apparatus to provide content data, wherein:

said management apparatus manages the operation of a data providing service by said data providing apparatus, said data distribution apparatus, and said data processing apparatus, generates signature data indicating that the related data is generated by an apparatus itself by using its own secret key data when said data distribution apparatus supplies data to another apparatus, generates and manages public key certificate data of public key data corresponding to secret key data of said data distribution apparatus for when another apparatus verifies the legitimacy of the related signature data by using the public key data corresponding to said secret key data, generates public key certificate revocation list for specifying public key certificate data to be invalidated among said generated public key certificate data, distributes the related public key certificate revocation list to said data providing apparatus, registers and serves usage control policy data indicating the handling of the related content data from said data providing apparatus, and certifies the legitimacy of said usage control policy data in response to a request from said data providing apparatus, wherein said data providing apparatus performs mutual authentication with said data processing apparatus, encrypts said module using session key data obtained by said mutual authentication, and transmits said encrypted module to said data processing apparatus, said data providing apparatus verifies whether or not public key certificate data of the data distribution apparatus of the destination of provision of the content data is invalid and controls the provision of said content data to said data distribution apparatus based on the result of the related verification, said data distribution apparatus distributes said provided content data to said data processing apparatus, and said data processing apparatus uses said distributed content data.

111. A data providing method using a data providing apparatus, data distribution apparatus, data processing apparatus, and management apparatus to provide content data, wherein:

said management apparatus manages the operation of a data providing service by said data providing apparatus, said data distribution apparatus, and said data processing apparatus, generates signature data indicating that the related data is generated by an apparatus itself by using its own secret key data when said data distribution apparatus supplies data to another apparatus, generates and manages public key certificate data of public key data corresponding to secret key data of said data distribution apparatus for when another apparatus verifies the legitimacy of the related signature data by using the public key data corresponding to said secret key data, generates public key certificate revocation list for specifying public key certificate data to be invalidated among said generated public key certificate data, distributes the related public key certificate revocation list to said data distribution apparatus, registers and serves usage control policy data indicating the handling of the related content data from said data providing apparatus, and certifies the legitimacy of said usage control policy data in response to a request from said data providing apparatus, said data providing apparatus provides content data to said data distribution apparatus, said data providing apparatus performs mutual authentication with said data processing apparatus, encrypts said module using session key data obtained by said mutual authentication, and transmits said encrypted module to said data processing apparatus, said data distribution apparatus distributes said provided content data and said distributed public key certificate revocation list to said data processing apparatus, and said data processing apparatus verifies whether or not public key certificate data of said data distribution apparatus distributing said distributed content data is invalid based on said distributed public key certificate revocation list and controls the usage of said distributed content data based on the result of the related verification.

112. A data providing method as set forth in claim 111, wherein said data distribution apparatus has a configuration which makes it difficult to tamper with said public key certificate revocation list distributed from said management apparatus.

113. A data providing method as set forth in claim 111, wherein said management apparatus encrypts said public key certificate revocation list using distribution key data and distributes it to said data distribution apparatus and distributes said distribution key data to said data processing apparatus and said data processing apparatus decrypts said distributed public key certificate revocation list using said distribution key data.

114. A data providing method using a data providing apparatus, data distribution apparatus, data processing apparatus, and management apparatus to provide content data, wherein:

said management apparatus manages the operation of a data providing service by said data providing apparatus, said data distribution apparatus, and said data processing apparatus, generates signature data indicating that the related data is generated by an apparatus itself by using its own secret key data when said data distribution apparatus supplies data to another apparatus, generates and manages public key certificate data of public key data corresponding to secret key data of said data distribution apparatus for when another apparatus verifies the legitimacy of the related signature data by using public key data corresponding to said secret key data, generates public key certificate revocation list for specifying public key certificate data to be invalidated among said generated public key certificate data, distributes the related public key certificate revocation list to said data processing apparatus, registers and serves usage control policy data indicating the handling of the related content data from said data providing apparatus, and certifies the legitimacy of said usage control policy data in response to a request from said data providing apparatus, said data providing apparatus provides content data to said data distribution apparatus, said data providing apparatus performs mutual authentication with said data processing apparatus, encrypts said module using session key data obtained by said mutual authentication, and transmits said encrypted module to said data processing apparatus, said data distribution apparatus distributes said provided content data to said data processing apparatus, and said data processing apparatus verifies whether or not public key certificate data of said data distribution apparatus distributing said distributed content data is invalid based on said distributed public key certificate revocation list and controls the usage of said distributed content data based on the result of the related verification.

115. A data providing method using a data providing apparatus, data distribution apparatus, data processing apparatus, and management apparatus to provide content data, wherein:

said management apparatus manages the operation of a data providing service by said data providing apparatus, said data distribution apparatus, and said data processing apparatus, generates signature data indicating that the related data is generated by an apparatus itself by using its own secret key data when said data distribution apparatus supplies data to another apparatus, generates and manages public key certificate data of public key data corresponding to secret key data of said data distribution apparatus for when another apparatus verifies the legitimacy of the related signature data by using public key data corresponding to said secret key data, generates public key certificate revocation list for specifying public key certificate data to be invalidated among said generated public key certificate data, distributes the related public key certificate revocation list to said data providing apparatus, registers and serves usage control policy data indicating the handling of the related content data from said data providing apparatus, and certifies the legitimacy of said usage control policy data in response to a request from said data providing apparatus, said data providing apparatus performs mutual authentication with said data processing apparatus, encrypts said module using session key data obtained by said mutual authentication, and transmits said encrypted module to said data processing apparatus, said data providing apparatus provides content data and said public key certificate revocation list to said data distribution apparatus, said data distribution apparatus distributes said provided content data and public key certificate revocation list to said data processing apparatus, and said data processing apparatus verifies whether or not public key certificate data of said data distribution apparatus distributing said distributed content data is invalid based on said distributed public key certificate revocation list and controls the usage of said distributed content data based on the result of the related verification.

116. A data providing method using a data providing apparatus, data distribution apparatus, a plurality of data processing apparatuses, and a management apparatus to provide content data, wherein:
said management apparatus manages the operation of a data providing service by said data providing apparatus, said data distribution apparatus, and said data processing apparatuses, generates signature data indicating that the related data is generated by an apparatus itself by using its own secret key data when a data processing apparatus supplies data to another apparatus, generates and manages public key certificate data of public key data corresponding to secret key data of said data processing apparatuses for when another apparatus verifies the legitimacy of the related signature data by using the public key data corresponding to said secret key data, generates public key certificate revocation list for specifying public key certificate data to be invalidated among said generated public key certificate data, distributes the related public key certificate revocation list to said data providing apparatus, registers and serves usage control policy data indicating the handling of the related content data from said data providing apparatus, and certifies the legitimacy of said usage control policy data in response to a request from said data providing apparatus,
said data providing apparatus performs mutual authentication with said data processing apparatus, encrypts said module using session key data obtained by said mutual authentication, and transmits said encrypted module to said data processing apparatus,
said data providing apparatus provides content data and said public key certificate revocation list to said data distribution apparatus,
said data distribution apparatus distributes said provided content data and public key certificate revocation list to said data processing apparatuses, and
said data processing apparatuses verify whether or not public key certificate data of said other data processing apparatuses are invalid based on the public key certificate revocation list distributed from said data distribution apparatus and control the communication with other data processing apparatuses based on the result of the related verification.

117. A data providing method as set forth in claim 116, wherein said data distribution apparatus has a configuration which makes it difficult to tamper with said public key certificate revocation list distributed from said management apparatus.

118. A data providing method as set forth in claim 116, wherein
said management apparatus encrypts said public key certificate revocation list using distribution key data and distributes it to said data distribution apparatus and distributes said distribution key data to said data processing apparatus and
said data processing apparatus decrypts said distributed public key certificate revocation list using said distribution key data.

119. A data providing method using a data providing apparatus, data distribution apparatus, a plurality of data processing apparatuses, and a management apparatus to provide content data, wherein:
said management apparatus manages the operation of a data providing service by said data providing apparatus, said data distribution apparatus, and said data processing apparatuses, generates signature data indicating that the related data is generated by an apparatus itself by using its own secret key data when a data processing apparatus supplies data to another apparatus, generates and manages public key certificate data of public key data corresponding to secret key data of said data processing apparatuses for when another apparatus verifies the legitimacy of the related signature data by using the public key data corresponding to said secret key data, generates public key certificate revocation list for specifying public key certificate data to be invalidated among said generated public key certificate data, distributes the related public key certificate revocation list to said data providing apparatus, registers and serves usage control policy data indicating the handling of the related content data from said data providing apparatus, and certifies the legitimacy of said usage control policy data in response to a request from said data providing apparatus,
said data providing apparatus performs mutual authentication with said data processing apparatus, encrypts said module using session key data obtained by said mutual authentication, and transmits said encrypted module to said data processing apparatus,
said data providing apparatus provides content data to said data distribution apparatus,
said data distribution apparatus distributes said provided content data and said distributed public key certificate revocation list to said data processing apparatuses, and
said data processing apparatuses verify whether or not public key certificate data of other data processing apparatuses are invalid based on the public key certificate revocation list distributed from said data distribution apparatus, and control the communication with other data processing apparatuses based on the result of the related verification.

120. A data providing method as set forth in claim 119, wherein said data distribution apparatus has a configuration which makes it difficult to tamper with said public key certificate revocation list distributed from said management apparatus.

121. A data providing method as set forth in claim 119, wherein
said management apparatus encrypts said public key certificate revocation list using distribution key data and distributes it to said data distribution apparatus and distributes said distribution key data to said data processing apparatus and
said data processing apparatus decrypts said distributed public key certificate revocation list using said distribution key data.

122. A data providing method using a data providing apparatus, data distribution apparatus, a plurality of data processing apparatuses, and a management apparatus to provide content data, wherein:
a data processing apparatus supplies registration data, indicating an already registered data processing apparatus connected in a predetermined network to which is connected, to said management apparatus, refers to a revocation flag in registration data supplied from said management apparatus and restricts communication with another data processing apparatus having public key certificate data indicated as invalid by the revocation flag, said management apparatus manages the operation of a data providing service by said data providing apparatus, said data distribution apparatus, and said data processing apparatuses, generates and manages public key certificate data of public key data corresponding to secret key data for when a data processing apparatus generates signature data indicating legitimacy of data using its own secret key data when supplying data to another apparatus, generates public key certificate revocation list for specifying public key certificate data to be invalidated among said generated public key certificate data, stores the related public key certificate revocation list, generates new registration data by setting said revocation flag in said registration data supplied from data processing apparatuses based on the related public key certificate revocation list, distributes the related generated registration data to said data processing apparatuses, registers and serves usage control policy data indicating the handling of the related content data from said data providing apparatus, and certifies the legitimacy of said usage control policy data in response to a request from said data providing apparatus, said data providing apparatus provides content data to said data distribution apparatus, said data providing apparatus performs mutual authentication with said data processing apparatus, encrypts said module using session key data obtained by said mutual authentication, and transmits said encrypted module to said data processing apparatus, and said data distribution apparatus distributes said provided content data to said data processing apparatuses.

123. A data providing method using a data providing apparatus, data distribution apparatus, a plurality of data processing apparatuses, and a management apparatus to provide content data, wherein:

said management apparatus manages the operation of a data providing service by said data providing apparatus, said data distribution apparatus, and said data processing apparatuses, generates and manages public key certificate data of public key data corresponding to said secret key data for when a data processing apparatus generates signature data indicating the legitimacy of data by using its own secret key data when supplying the related data to another apparatus, generates public key certificate revocation list for specifying public key certificate data to be invalidated among said generated public key certificate data, distributes the related public key certificate revocation list to said data providing apparatus, registers and serves usage control policy data indicating the handling of the related content data from said data providing apparatus, and certifies the legitimacy of said usage control policy data in response to a request from said data providing apparatus, said data providing apparatus performs mutual authentication with said data processing apparatus, encrypts said module using session key data obtained by said mutual authentication, and transmits said encrypted module to said data processing apparatus, said data providing apparatus provides content data and said public key certificate revocation list to said data distribution apparatus, said data distribution apparatus distributes said provided content data and said public key certificate revocation list to said data processing apparatuses, and a data processing apparatus sets a revocation flag in registration data indicating an already registered data processing apparatus connected in a predetermined network to which it is connected based on said distributed public key certificate revocation list and restricts communication with another data processing apparatus having public key certificate data indicated as invalid by the related revocation flag.

124. A data providing method using a data providing apparatus, data distribution apparatus, a plurality of data processing apparatuses, and a management apparatus to provide content data, wherein:

said management apparatus manages the operation of a data providing service by said data providing apparatus, said data distribution apparatus, and said data processing apparatuses, generates and manages public key certificate data of public key data corresponding to secret key data for when a data processing apparatus generates signature data indicating the legitimacy of the data by using its own secret key data when supplying the related data to another apparatus, generates public key certificate revocation list for specifying public key certificate data to be invalidated among said generated public key certificate data, distributes the related public key certificate revocation list to said data distribution apparatus, registers and serves usage control policy data indicating the handling of the related content data from said data providing apparatus, and certifies the legitimacy of said usage control policy data in response to a request from said data providing apparatus, said data providing apparatus performs mutual authentication with said data processing apparatus, encrypts said module using session key data obtained by said mutual authentication, and transmits said encrypted module to said data processing apparatus, said data providing apparatus provides content data to said data distribution apparatus, said data distribution apparatus distributes said provided content data and said public key certificate revocation list to said data processing apparatuses, and a data processing apparatus sets a revocation flag in registration data indicating an already registered data processing apparatus connected in a predetermined network to which it is connected based on said distributed public key certificate revocation list and restricts communication with another data processing apparatus having public key certificate data indicated as invalid by the related revocation flag.

125. A data providing method using a data providing apparatus, data distribution apparatus, data processing apparatus, and management apparatus to provide content data, wherein:

said data providing apparatus provides content data and usage control policy data indicating the handling of the related content data to said data distribution apparatus, said data providing apparatus performs mutual authentication with said data processing apparatus, encrypts said module using session key data obtained by said mutual authentication, and transmits said encrypted module to said data processing apparatus, said data distribution apparatus distributes said provided content data and said usage control policy data to said data processing apparatus, said data processing apparatus has a first module for communicating with said data distribution apparatus and a second module for determining at least one of a purchase mode and usage mode of said distributed content data based on said distributed usage control policy data and transmitting log data indicating the log of the related determined purchase mode and usage mode to said management apparatus, said management apparatus manages the data providing apparatus, data distribution apparatus, and data processing apparatus, registers and serves usage control policy data indicating the handling of the related content data from said data providing apparatus, and certifies the legitimacy of said usage control policy data in response to a request from said data providing apparatus, and has a settlement function for performing profit distribution processing for distributing the profit obtained accompanied with said data processing apparatus receiving distribution of said content data and purchasing and using said content data to related parties of said data providing apparatus and said data distribution apparatus based on said log data received from said second module and performing settlement based on the result of the related profit distribution processing and a right management function for registering said usage control policy data.

* * * * *